(12) United States Patent
Magee et al.

(10) Patent No.: US 9,251,540 B1
(45) Date of Patent: Feb. 2, 2016

(54) BANKING SYSTEM CONTROLLED RESPONSIVE TO DATA BEARING RECORDS

(71) Applicant: Diebold Self-Service Systems division of Diebold, Incorporated, Canton, OH (US)

(72) Inventors: Paul D Magee, Canton, OH (US); James Block, North Lawrence, OH (US); Randall W Jenkins, Orrville, OH (US); Tim Crews, Alliance, OH (US); Michael J Harty, Canton, OH (US); Richard C Lute, Mogadore, OH (US); Klaus Steinbach, Canton, OH (US); Natarajan Ramachandran, Uniontown, OH (US); Songtao Ma, Wadsworth, OH (US); Sathish Irudayam, North Canton, OH (US); Robert Konecny, Uniontown, OH (US); James D Atkinson, Erin (CA)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 372 days.

(21) Appl. No.: 13/687,033

(22) Filed: Nov. 28, 2012

Related U.S. Application Data

(60) Continuation-in-part of application No. 13/421,107, filed on Mar. 15, 2012, and a continuation-in-part of application No. 13/396,026, filed on Feb. 14, 2012, now Pat. No. 8,978,971, said application No.

(Continued)

(51) Int. Cl.
  *G06F 17/00* (2006.01)
  *G06Q 40/02* (2012.01)
(52) U.S. Cl.
  CPC ..................................... *G06Q 40/02* (2013.01)
(58) Field of Classification Search
  USPC ............ 235/375, 379, 380; 902/2, 4, 5, 9, 13, 902/14, 20; 705/43, 73
  See application file for complete search history.

(56) References Cited

U.S. PATENT DOCUMENTS

| | | | |
|---|---|---|---|
| 5,668,929 A * | 9/1997 | Foster, Jr. ...................... 704/273 |
| 5,880,444 A * | 3/1999 | Shibata et al. ................. 235/379 |
| 7,644,039 B1 * | 1/2010 | Magee et al. ................... 705/43 |
| 7,922,078 B1 * | 4/2011 | Putman et al. ................. 235/379 |
| 8,593,409 B1 * | 11/2013 | Heubel et al. .................. 345/173 |
| 2006/0180652 A1 * | 8/2006 | Meek et al. ..................... 235/379 |
| 2008/0110981 A1 * | 5/2008 | DeLine et al. ................. 235/381 |

*Primary Examiner* — Michael G Lee
*Assistant Examiner* — Tabitha Chedekel
(74) *Attorney, Agent, or Firm* — Black McCuskey Souers & Arbaugh, LPA

(57) ABSTRACT

An apparatus that operates to cause financial transfers responsive to data read from data bearing records, includes at least one processor that is in operative connection with a card reader, a check acceptor, a cash dispenser and a display. The at least one processor causes the machine to operate to read card data from a user card, and to cause a determination to be made that the read card data corresponds to an authorized financial account. The at least one processor is operative to cause data to be read from a check and/or cash to be dispensed, and a financial transfer to or from the account corresponding to the value thereof. Machine instructions are output and user transaction inputs can be received through either a primary or an auxiliary touch screen display.

49 Claims, 60 Drawing Sheets

Related U.S. Application Data

13/421,107 is a continuation-in-part of application No. 13/317,729, filed on Oct. 26, 2011, now Pat. No. 8,915,422, said application No. 13/421,107 is a continuation-in-part of application No. 13/134,654, filed on Jun. 13, 2011, now Pat. No. 8,573,479, and a continuation-in-part of application No. 12/380,408, filed on Feb. 25, 2009, now Pat. No. 8,833,646, and a continuation-in-part of application No. 12/008,348, filed on Jan. 10, 2008, now Pat. No. 8,146,801, said application No. 12/380,408 is a continuation-in-part of application No. 11/825,271, filed on Jul. 5, 2007, now Pat. No. 7,891,546, said application No. 12/380,408 is a division of application No. 11/638,975, filed on Dec. 14, 2006, now Pat. No. 8,870,063.

(60) Provisional application No. 61/629,834, filed on Nov. 29, 2011, provisional application No. 61/687,451, filed on Apr. 25, 2012, provisional application No. 61/465,220, filed on Mar. 16, 2011, provisional application No. 61/463,313, filed on Feb. 15, 2011, provisional application No. 61/455,827, filed on Oct. 27, 2010, provisional application No. 61/354,778, filed on Jun. 15, 2010, provisional application No. 61/067,660, filed on Feb. 29, 2008, provisional application No. 60/994,742, filed on Sep. 20, 2007, provisional application No. 60/994,680, filed on Sep. 20, 2007, provisional application No. 60/879,991, filed on Jan. 11, 2007, provisional application No. 60/837,743, filed on Aug. 14, 2006, provisional application No. 60/837,742, filed on Aug. 14, 2006, provisional application No. 60/819,126, filed on Jul. 6, 2006, provisional application No. 60/819,127, filed on Jul. 6, 2006, provisional application No. 60/752,188, filed on Dec. 20, 2005.

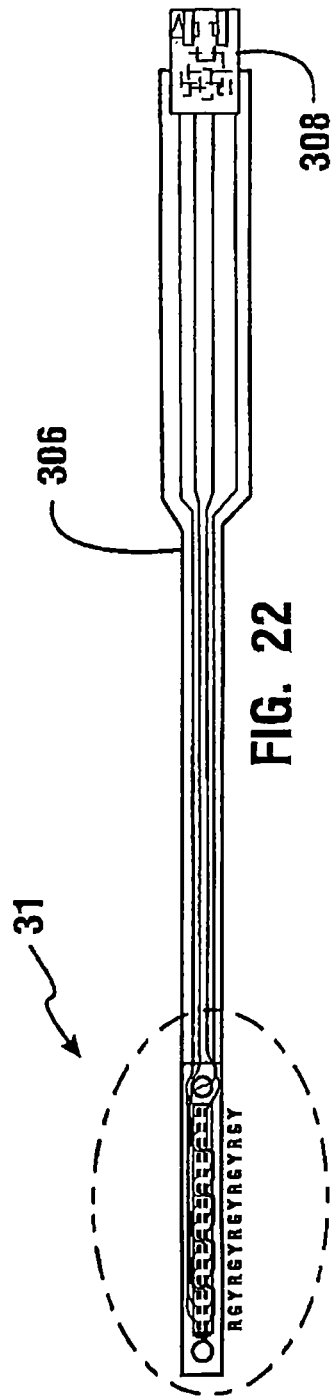
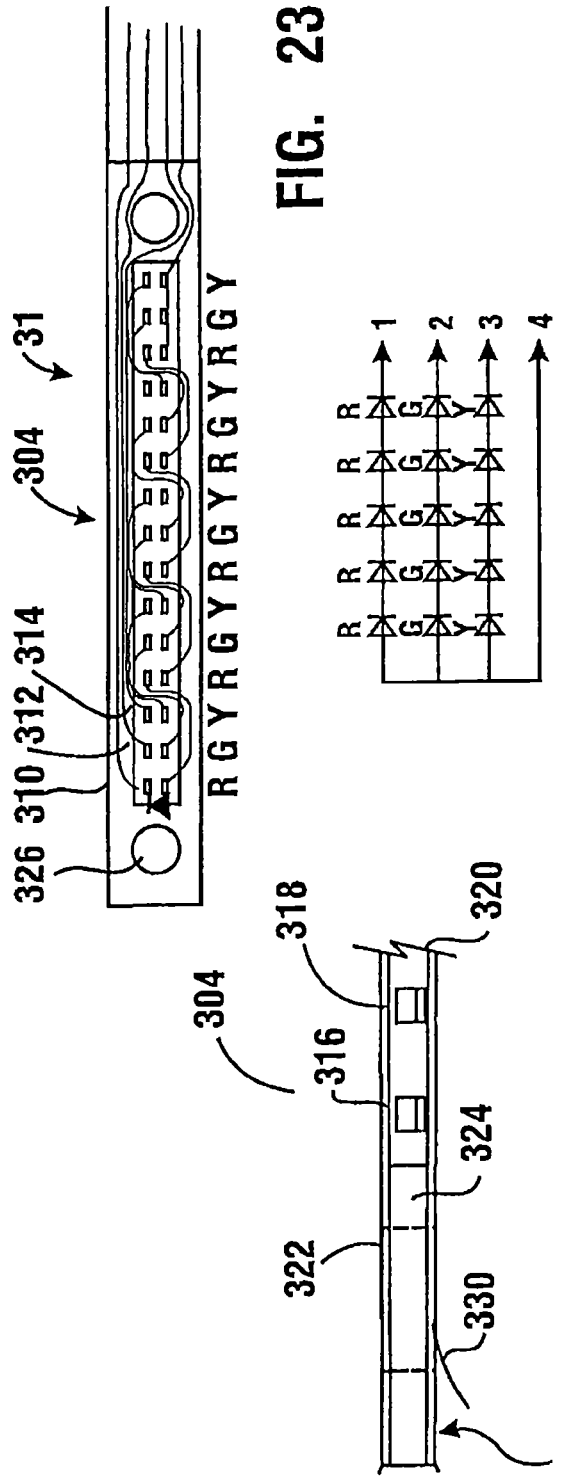
FIG. 22
FIG. 23
FIG. 24
FIG. 25

BANKING SYSTEM CONTROLLED RESPONSIVE TO DATA BEARING RECORDS

CROSS REFERENCE TO RELATED APPLICATIONS

This application claims benefit pursuant to 35 U.S.C. §119 (e) of Provisional Application Nos. 61/629,834 filed Nov. 29, 2011 and 61/687,451 filed Apr. 25, 2012.

This application is related to application Ser. No. 13/421,107 filed Mar. 15, 2012, which claims benefit pursuant to 35 U.S.C. §119(e) of Provisional Application 61/465,220 filed Mar. 16, 2011.

Application Ser. No. 13/421,107 is a continuation-in-part of application Ser. No. 13/396,026 filed Feb. 14, 2012, which claims benefit pursuant to 35 U.S.C. §119(e) of Provisional Application 61/463,313 filed Feb. 15, 2011.

Application Ser. No. 13/421,107 is also a continuation-in-part of application Ser. No. 13/317,729 filed Oct. 26, 2011, which claims benefit pursuant to 35 U.S.C. §119(e) of Provisional Application 61/455,827 filed Oct. 27, 2010.

Application Ser. No. 13/421,107 is a continuation-in-part of application Ser. No. 13/134,654 filed Jun. 13, 2011 which claims benefit pursuant to 35 U.S.C. §119(e) of Provisional Application 61/354,778 filed Jun. 15, 2010.

Application Ser. No. 13/134,654 is a continuation-in-part of application Ser. No. 12/380,408 filed Feb. 25, 2009 which claims benefit pursuant to 35 U.S.C. §119(e) of Provisional Application 61/067,660 filed Feb. 29, 2008.

Application Ser. No. 12/380,408 is a continuation-in-part of application Ser. No. 12/008,348 filed Jan. 10, 2008, now U.S. Pat. No. 8,146,801, which claims benefit pursuant to 35 U.S.C. §119(e) of Provisional Applications 60/994,742 filed Sep. 20, 2007 and 60/994,680 filed Sep. 20, 2007.

Application Ser. No. 12/380,408 is a continuation-in-part of application Ser. No. 11/825,271 filed Jul. 5, 2007, now U.S. Pat. No. 7,891,546, which claims benefit pursuant to 35 U.S.C. §119(e) of Provisional Application 60/879,991 filed Jan. 11, 2007.

Application Ser. No. 12/380,408 is a divisional application of application Ser. No. 11/638,975 filed Dec. 14, 2006 which claims benefit pursuant to 35 U.S.C. §119(e) of Provisional Applications 60/837,743 filed Aug. 14, 2006; 60/837,742 filed Aug. 14, 2006; 60/819,126 filed Jul. 6, 2006; 60/819,127 filed Jul. 6, 2006; and 60/752,188 filed Dec. 20, 2005.

This disclosure of each of these applications is incorporated herein by reference in its entirety.

TECHNICAL FIELD

This invention relates to automated banking machines that operate responsive to data read from data bearing records and which may be classified in U.S. Class 235, Subclass 379.

BACKGROUND ART

Automated banking machines that operate responsive to data read from data bearing records may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user or account, to carry out at least one transaction which may be operative to transfer value to or from at least one account. A record of the transaction is often printed through operation of a printer of the machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of some exemplary embodiments to provide an automated banking machine.

It is a further object of some exemplary embodiments to provide an automated banking machine which provides enhanced security.

It is a further object of some exemplary embodiments to provide an automated banking machine that facilitates user operation.

It is a further object of some exemplary embodiments to provide an automated banking machine that has improved weather resistance.

It is a further object of some exemplary embodiments to provide an automated banking machine that provides a concealment device adapted to cover an input keypad.

It is a further object of some exemplary embodiments to provide an automated banking machine that provides users with an indication of user inputs being received in an encrypted manner.

It is a further object in some exemplary embodiments to provide an automated banking machine that includes features for reducing the transmission of germs to users of the machine.

It is a further object of some exemplary embodiments to provide an automated banking machine that operates in conjunction with currency bills that include tracking devices.

It is a further object of some exemplary embodiments to provide an automated banking machine that is configured for visually impaired users.

It is a further object of some exemplary embodiments to provide an automated banking machine that prevents a spying camera from viewing the inputs by a user on an input device.

It is a further object of some exemplary embodiments to provide an automated banking machine with a keypad that includes a touch screen display.

It is a further object of some exemplary embodiments to provide an automated banking machine that facilitates operation by users with disabilities.

Further objects of exemplary embodiments will be made apparent in the following Detailed Description of Exemplary Embodiments and the appended claims.

Certain of the foregoing objects are accomplished in exemplary embodiments by an automated banking machine. The machine includes a user interface. The user interface includes input devices for receiving identifying inputs that identify user accounts, such as a card reader that is operative to read user cards. The input devices also receive inputs from users that cause the machine to carry out transaction functions. The user interface further includes one or more output devices that output indicia such as instructions for a user in operating the machine.

In some exemplary embodiments, a user input device such as a keypad, may be concealed from unauthorized viewing by a concealment device. The concealment device may include a cover adapted to conceal a keypad and prevent viewing of a user's input, such as a PIN, by another while enabling a person having a point of view of a machine user to view the keypad and their digits providing inputs. Other embodiments may include features that minimize the risk of the transmission of germs between users of the banking machine.

Alternative exemplary embodiments include a keypad device that includes encrypting capabilities within the keypad device. The keypad device is selectively operative to encrypt and not encrypt user inputs responsive to signals received from at least one processor. In exemplary embodiments the machine includes a visual indicator adjacent the keypad. The visual indicator is operative responsive to the at least one processor to indicate whether the inputs being provided by a user are being encrypted by the keypad. This visual indication provides the user with assurance that their inputs are being securely received by the banking machine.

Alternative exemplary embodiments include features which assure that the display on the automated banking machine and/or at least one processor causing outputs to users through the display are authorized components that are authorized to operate in the automated banking machine. This reduces the risk that unauthorized components are installed by unauthorized persons to capture sensitive customer data. Alternative exemplary embodiments provide a secure touch screen display module that provides secure user inputs.

Alternative exemplary embodiments include an automated banking machine that is configured to recognize inputs on a touch screen display without the need to display the character inputted. In particular, data corresponding to a character is received by a processor associated with the automated banking machine in response to a contact with at least one area of an input surface of the touch screen display. The area of contact does not include any visible output indicia that corresponds to the character, before the area is contacted.

Alternative exemplary embodiments include an apparatus comprising an automated banking machine that is operative to cause financial transfers responsive at least in part to read user data. The automated banking machine includes a housing and at least one reader. The at least one reader is operative to read data usable to identify at least one of a user of the machine and a financial account associated with a user transaction session. The machine further includes at least one input device in supported connection with the housing that is operative to receive user inputs. At least one computer is associated with the machine. The at least one computer is in operative connection with the at least one reader and the at least one input device. The at least one computer is operative during a financial transaction to cause user data to be read through operation of the at least one reader and to cause a user account to be assessed a value associated with the financial transaction. At least one light emitter is associated with the at least one input device. The emitter is operative to emit light at an intensity that is sufficient to cause a camera directed at the input device to not be able to effectively view the input device while user inputs are being provided therethrough.

Alternative exemplary embodiments include an apparatus comprising an automated banking machine that is operative to cause financial transfers responsive at least in part to read user data. The automated banking machine includes a housing and at least one reader. The at least one reader is operative to read data usable to identify at least one of a user of the machine and a financial account associated with a user transaction session. The machine further includes at least one input device provided in supported connection with the housing that is operative to receive user inputs. At least one computer is associated with the machine. The at least one computer is in operative connection with the at least one reader and the at least one input device. The at least one computer is operative during a financial transaction to cause user data to be read through operation of the at least one reader and to cause a user account to be assessed a value associated with the financial transaction. A cover that at least partially covers the at least one input device is provided. The cover includes louvers that are operative to allow the user to view the at least one input device through the cover from a point of view of the user inputting the inputs, but limit viewing of the user's inputs to the at least one input device from the viewpoint other than of the individual operating the machine.

Alternative exemplary embodiments include an apparatus comprising an automated banking machine that is operative to cause financial transfers responsive at least in part to data read from data bearing records. The machine includes at least one display that operates as an input device. A touch membrane overlies the display and includes a contact surface that is operative to receive user inputs via contact with the input surface. In an exemplary embodiment, the display outputs visual representations of keys. The input surface is operative to receive inputs corresponding to the visually represented keys responsive to contact with corresponding areas of the input surface. The input surface and underlying display may be operative to receive customer inputs including numeric inputs and transaction selection inputs.

In still other exemplary embodiments the automated banking machine includes a relatively large display as well as a smaller auxiliary display. The machine in some embodiments may include a keypad such as an encrypting PIN pad. In some embodiments the encrypting PIN pad may be located vertically below the large display. The auxiliary input display may be located adjacent to the encrypting PIN pad or otherwise below the display. The auxiliary display may include a smaller touch screen display including an input surface. In some example embodiments, the machine may operate in accordance with its programming so that a user providing at least one input to an input device on the machine, causes the auxiliary display to provide outputs corresponding to at least one transaction selection that would otherwise be output on the primary display. In some exemplary embodiments, the auxiliary display may include a touch screen display such that the user can receive outputs and provide inputs through the auxiliary display for purposes of operating the machine. The ability of the user to receive outputs and provide inputs through the auxiliary display may enable a user in a wheelchair or who is short in stature to more readily operate the machine. It may also enable able-bodied users to be able to more readily shield inputs and screen outputs during the course of a transaction from observation by third parties. In some embodiments, the primary display may be made blank while the user conducts transactions using the auxiliary touch screen display. Alternatively the main display may show promotional or other content or may provide a light source for user operation of the keypad or other input devices when a user conducts transactions via the auxiliary display. In some embodiments the user control may be transferred from the primary display to the auxiliary display in response to inputs received through one or more input devices. Inputs causing transfer of control from the primary display to the auxiliary display, can be provided through one or more of contact with the primary display, contact with function keys, inputs through keypad keys, inputs via the contact surface of the auxiliary display which serves as a touch screen, or other suitable input devices.

In still other example embodiments, the auxiliary display may serve as a touchpad input device. The touchpad operation of the auxiliary display enables a user to control and navigate a pointing device on the primary display. Thus for example, in some embodiments the user through contact with the input surface of the auxiliary display may move the pointing device to select items displayed on the primary display and may then provide inputs to select the items being pointed to. This may be done, for example, through tapping on the input surface of the auxiliary display or otherwise providing an input through an input device. Alternatively or in addition, in other embodiments, the auxiliary display may be utilized as a touchpad surface for purposes of moving items of indicia on the primary display. For example, in some embodiments a user may be able to select an item shown on the primary display and move it to another location. This might include, for example, selecting a particular graphic or icon associated with a particular transaction selection and moving it to a location on the primary display that is more convenient to selection by the user. For example, if the transaction selection is normally located in the upper area of the primary display, the user may use the touchpad feature of the auxiliary display to move the transaction selection indicia downward to a lower portion of the display where it can be more readily selected by a touch-screen input from the user. This may enable, for example, an individual who is in a wheelchair or short in stature to more readily contact the display in order to make desired transaction selections. Alternatively and/or in addition, if the display includes function keys adjacent thereto, the user may use the touchpad feature to cause a particular transaction selection to be aligned with a particular function key which a user can more conveniently press in order to make the transaction selection.

Further in some embodiments, the user may operate the auxiliary display in a manner to enable enlarging or shrinking particular indicia as they are displayed on either the primary display when that is being used for transactions and/or on the auxiliary display when that is the operative interface for the machine. For example in some embodiments, the user may contact the surface of the auxiliary display with two fingers together and then move them apart. When the auxiliary display is the operative interface, this causes the indicia in the area between the user's fingers to enlarge as the fingers are spread further apart and enables the user to more readily see that indicia. Likewise, when the primary display is the operative interface of the machine, the input surface of the auxiliary display may be used as a pointing device and contact of the user's two fingers on the input surface and then spreading them apart will cause indicia corresponding to the area of the pointing device to be enlarged on the primary display. In some exemplary embodiments, the indicia in selected areas may be minimized through a pinching action of the user's fingers. This may be done for indicia on the auxiliary display or on the primary display in the area of the pointer depending on which is the operative interface. Of course these features are exemplary and in other embodiments other features may be used.

Further aspects of the exemplary embodiments will be made apparent in the following detailed description. It should be understood that the features described are exemplary and in other embodiments other approaches may be used which nonetheless employ the features as claimed herein.

BRIEF DESCRIPTION OF DRAWINGS

FIG. 22 is a schematic view of a light emitting device which is operated to facilitate use of the machine by users.

FIG. 23 is an enlarged view of the light emitting device shown in FIG. 22.

FIG. 24 is a schematic view of the light emitting diodes included in the light emitting device.

FIG. 25 is a cross-sectional view of the flexible web which includes the diodes in the light emitting device.

DETAILED DESCRIPTION OF EXEMPLARY EMBODIMENTS

Figure 1:
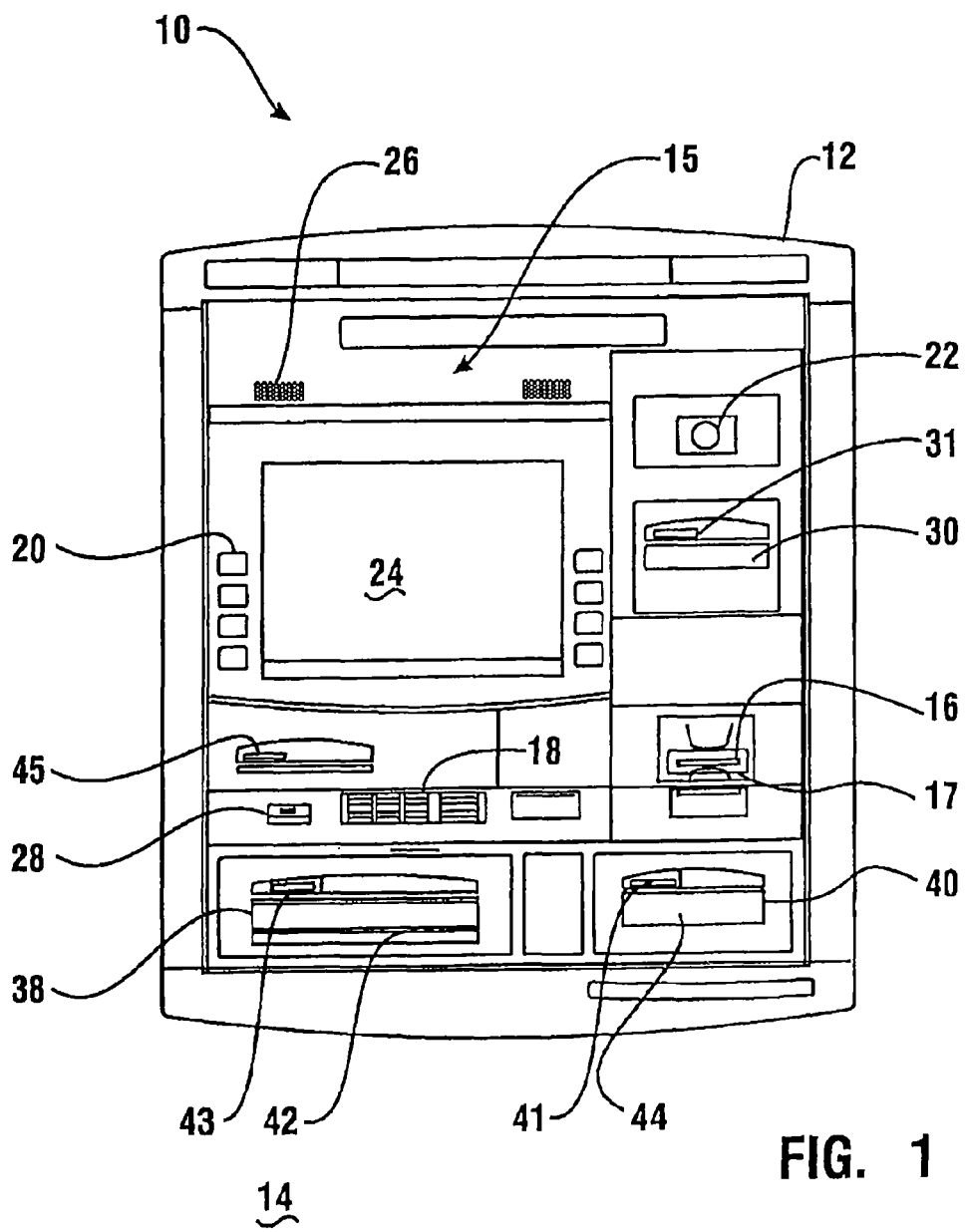
FIG. 1 is a front plan view of a fascia of an exemplary automated banking machine.

Referring now to the drawings and particularly to FIG. 1, there is shown therein a front plan view of an automated banking machine which in the exemplary embodiment is an automated teller machine ("ATM") 10. Machine 10 is a through-the-wall type machine which includes a fascia 12. Fascia 12 is accessible to users of the machine who are positioned externally of the wall 14. In some embodiments wall 14 may be an exterior building wall and machine 10 may be one that is configured for use in a walk-up or drive-up environment. In other embodiments the machine may be used in an indoor environment. Of course this configuration is exemplary and in other embodiments, other types of banking machine configurations may be used.

The exemplary automated banking machine includes a user interface generally indicated 15. The user interface of the exemplary embodiment includes input devices for receiving inputs from users. These input devices include a card reader 16, a keypad 18, function keys 20 and an imaging device such as a camera 22. In the exemplary embodiment the input devices may be used for providing identifying inputs such as indicia read from cards, alphanumerical data, numerical data and/or biometric data which may be used to identify a particular user of the machine and/or their accounts. In exemplary embodiments the card reader is operative to read data from or on user cards, that corresponds to at least one of a user and/or a user's financial account or accounts. The card data may be utilized for purposes of comparison with data stored in the system in which the machine is connected to determine if the user is an authorized user of the machine, and to enable transactions that include the transfer and/or allocation of monetary value. Exemplary card readers may include magnetic stripe readers, smart card readers, radio frequency identification (RFID) readers, near field communication (NFC) readers, inductance readers or other types of contact or contactless readers. In addition, the exemplary input devices are also operative to receive transaction inputs which cause the machine to carry out selected transaction functions. It should be understood that these input devices are exemplary and in other embodiments other types of input devices may be used.

The exemplary user interface 15 further includes output devices. The output devices of the exemplary embodiment include a display 24, a speaker 26 and a headphone jack 28. The output devices of the exemplary embodiment are operative to output indicia either visual, audible or both, which are usable to operate the machine. For purposes of this disclosure the display shall be deemed to include an output device such as a CRT or LCD as well as the associated circuitry which produces outputs from the display. Of course the output devices shown in user interface 15 are exemplary and in other embodiments other or additional output devices may be used.

The exemplary machine 10 further includes other transaction function devices. These transaction function devices include a receipt printer 30 which is operative to provide receipts to users of the machine. As shown in more detail in the interior view of the machine shown in FIG. 2, the receipt printer includes a paper supply 32 which supplies paper on which receipts are printed by a printer mechanism 34. Printed receipts are then transported to the receipt opening in the fascia 12 by a transport 36. In exemplary embodiments the receipt printer used may be of the type shown in U.S. Pat. No. 5,850,075, the disclosure of which is incorporated herein by reference. Of course in other embodiments other types of receipt printers may be used.

The exemplary machine 10 user interface includes on the fascia as shown in FIG. 1, a cash dispensing opening 38 and a cash accepting opening 40. Each of these openings is in operative connection with corresponding transaction function devices as later discussed, and each has an associated gate mechanism which operates to block access through the opening except at appropriate times during transactions by authorized users. In the exemplary embodiment the cash dispensing opening is shown controlled by a gate 42 and the cash accepting opening is controlled by a gate 44. It should be understood that the fascia and devices associated with machine 10 are exemplary and in other embodiments other or different fascia configurations and devices may be used.

In the exemplary embodiment the user interface of the machine includes a plurality of multicolor light emitting devices 17, 31, 41, 43 and 45. Each of the light emitting devices is positioned at a location adjacent to the location on the user interface which is associated with a particular transaction function device. For example, light emitting device 17 is positioned adjacent to the opening to card reader 16. Likewise, light emitting device 31 is positioned adjacent to the slot for delivery of receipts. Likewise, light emitting device 41 is associated with cash-accepting opening 40, and light emitting device 43 is associated with cash-dispensing opening 38. As later explained, in this exemplary embodiment the multicolor light emitting devices are selectively operated to output light of a particular color responsive to conditions of the associated transaction function device. Such features may be used to guide a user in operation of the machine, provide indications concerning the status of devices, alert a user to particular conditions, or provide improved aesthetics for the machine.

Figure 2:
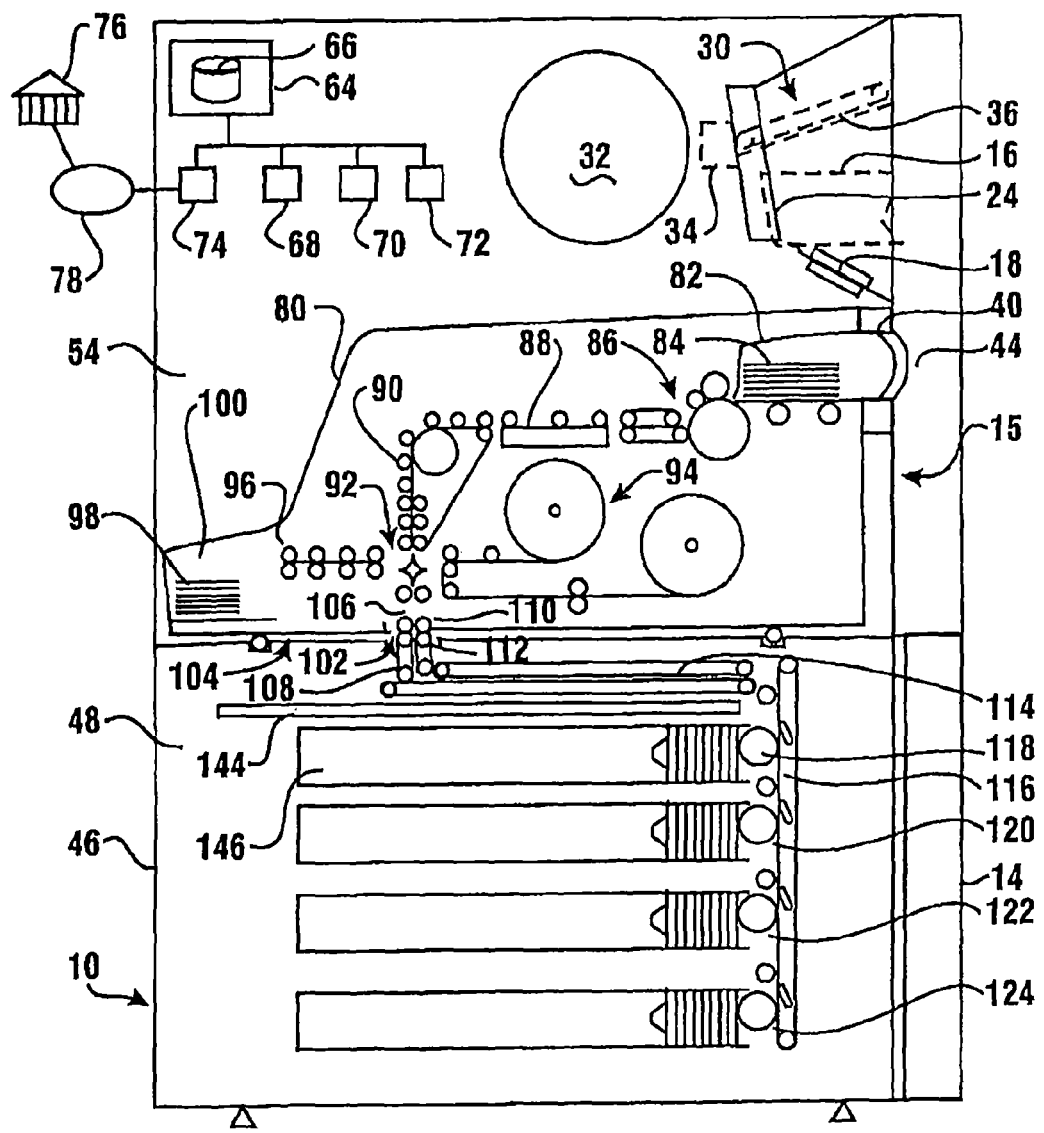
FIG. 2 is a schematic side view of components within a housing of the banking machine shown in FIG. 1.
Figure 3:
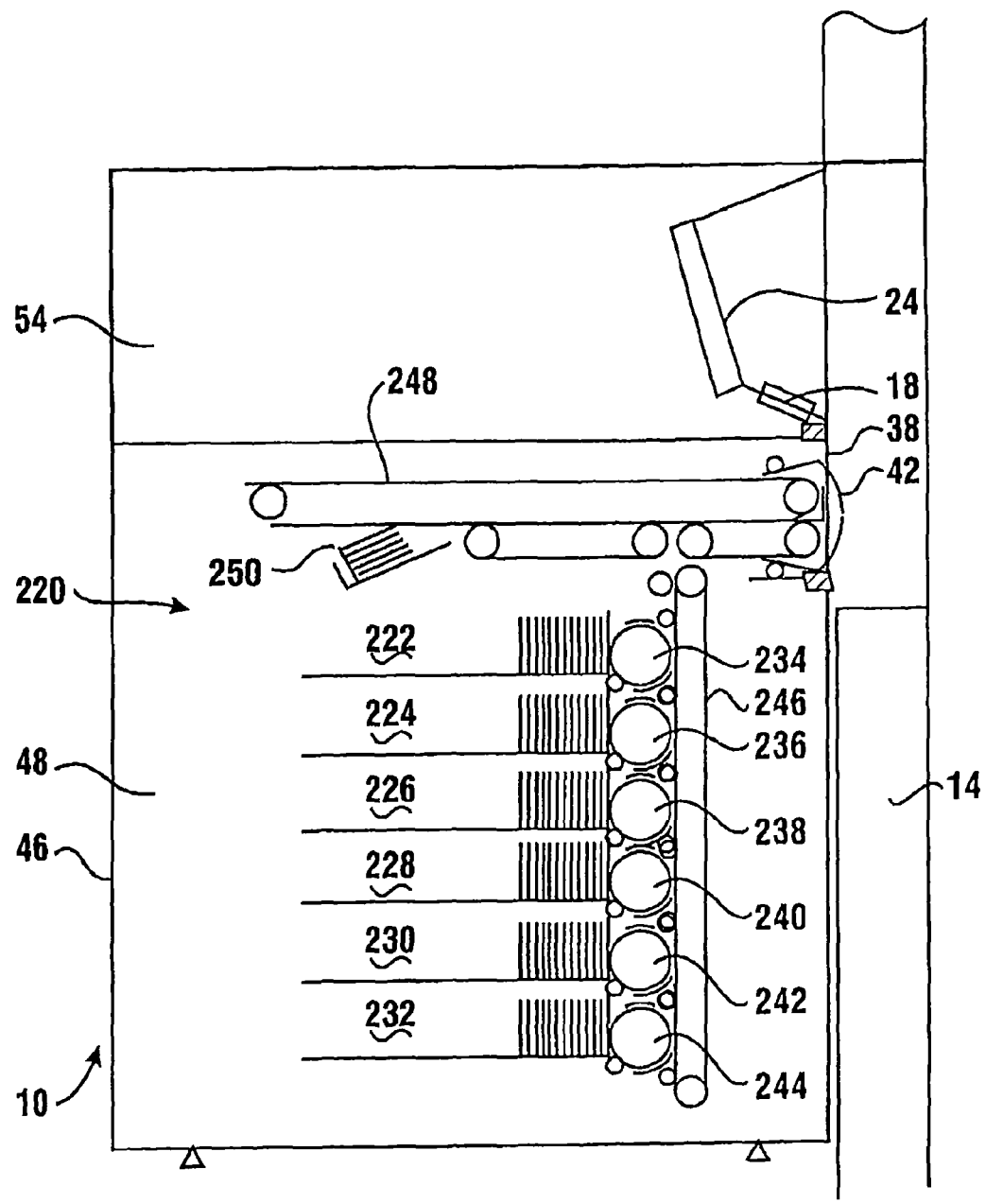
FIG. 3 is a further schematic side view of components within the housing of the banking machine shown in FIG. 1.
Figure 6:
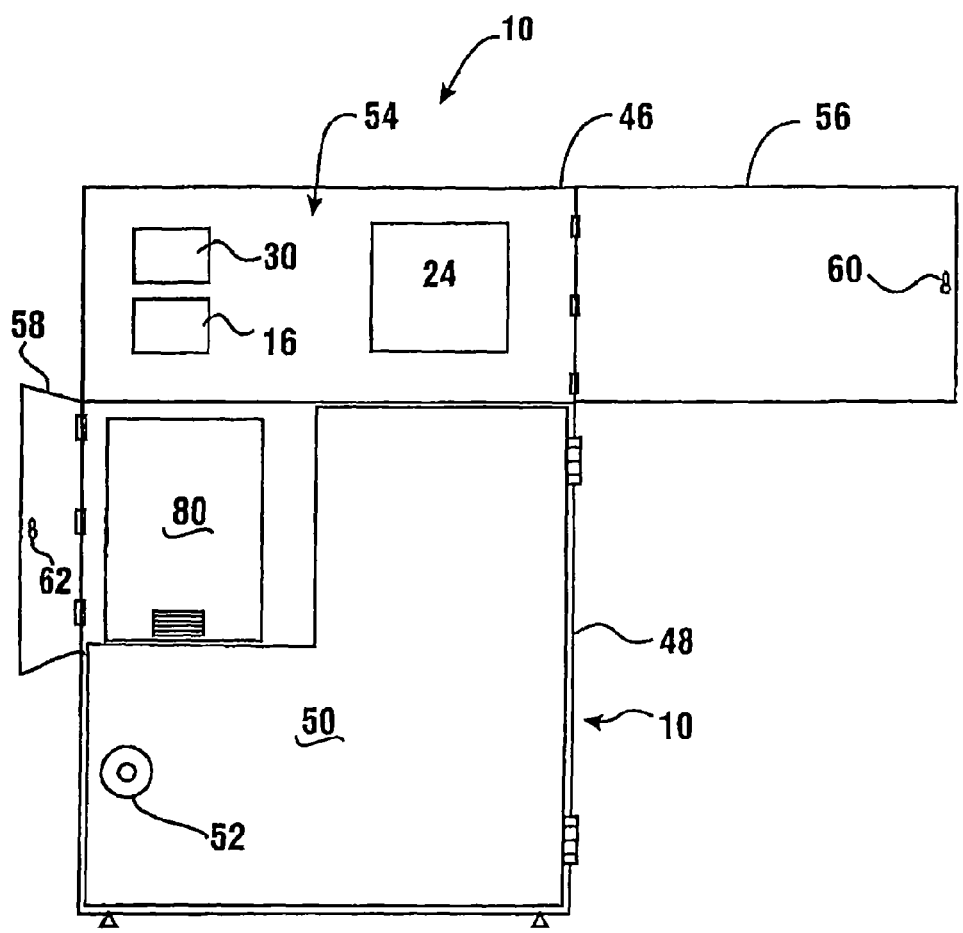
FIG. 6 is a rear view of the housing of the automated banking machine of the exemplary embodiment.
Figure 7:
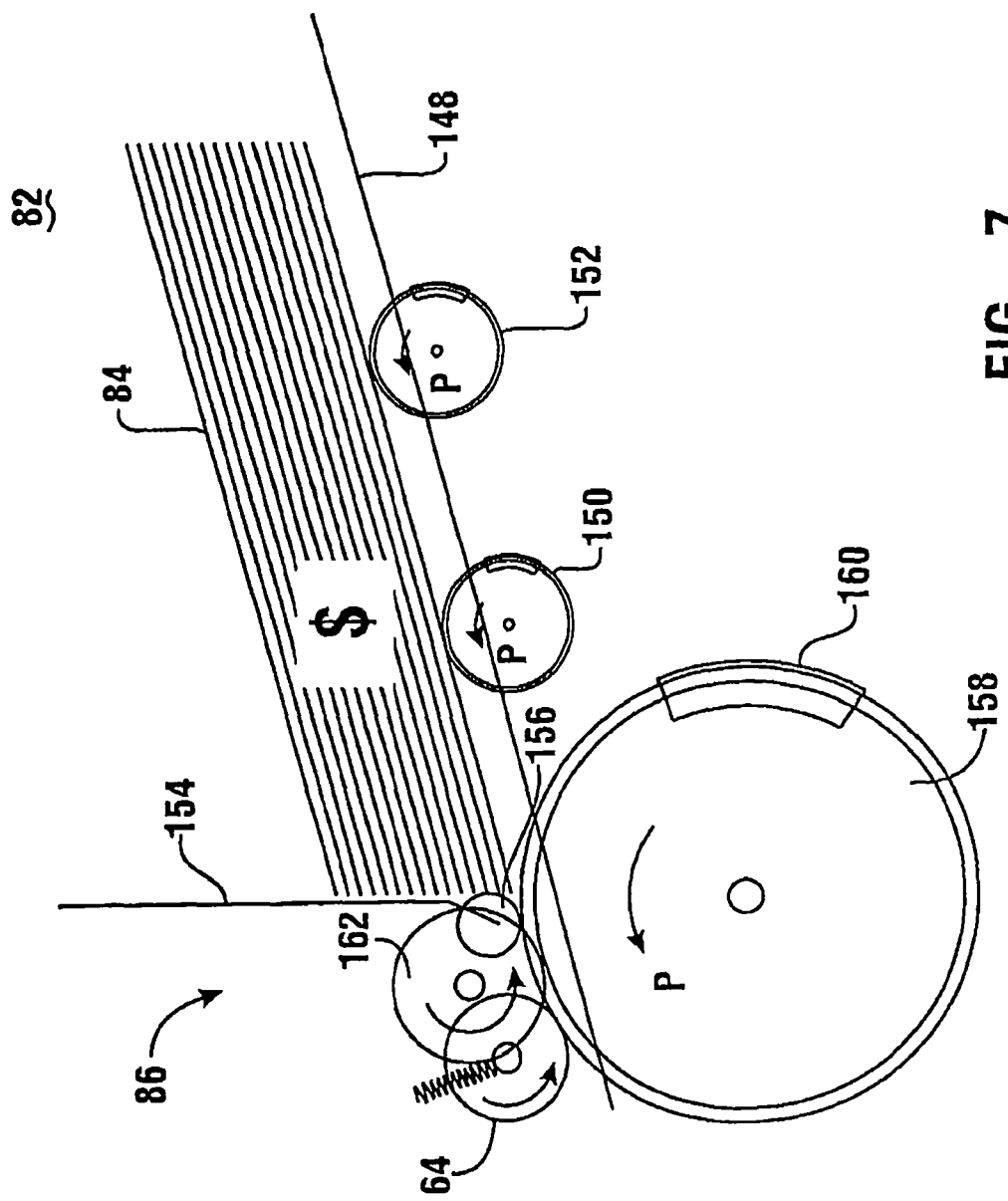
FIG. 7 is a schematic view of an exemplary embodiment of a mechanism for separating sheets from a stack of financial instrument sheets placed within the automated banking machine.

As shown in FIGS. 2, 3 and 6, machine 10 includes a housing 46 which extends generally on an interior side of wall 14. Housing 46 includes a chest portion 48. In the exemplary embodiment chest portion 48 is a generally secure chest which has a safe-like access door 50. Access to the interior of the chest portion is limited to authorized personnel through a suitable locking mechanism schematically indicated 52 (see FIG. 3). In the exemplary embodiment the chest is generally L-shaped in cross section.

Housing 46 further includes an upper portion 54. Upper housing portion 54 which is in connection with the fascia, is in supporting connection with the chest portion 48. In the exemplary embodiment upper housing portion 54 has in association therewith, access doors 56 and 58. Access to the upper housing portion is controlled by one or more locking mechanisms in operative connection with access doors 56 and 58 as represented by key locks 60 and 62. In the exemplary embodiment the secure chest portion 48 is used to house financial instrument sheets such as currency notes, checks and other valuable sheets. The upper housing portion 54 is generally used to house components of the machine that do not hold on an extended basis notes or other financial instrument documents which can be redeemed for value. For purposes of this disclosure a cash dispenser shall be considered to include a device that operates to deliver cash stored inside the machine to a location accessible by a machine user outside of the machine. Of course it should be understood that the construction of machine 10 is exemplary and in other embodiments other approaches may be used.

As schematically shown in FIG. 2, machine 10 includes at least one controller schematically indicated 64. In the exemplary embodiment controller 64 includes at least one processor and is in operative connection with at least one data store schematically indicated 66. A controller or processor may be alternatively referred to herein as a computer. In the exemplary embodiment the data store is operative to hold data representative of instructions such as computer programs, configuration parameters, data about transactions conducted and other information that may be usable in the operation of the machine 10. In some embodiments the at least one processor of the machine may be located within the housing of the machine. In other embodiments the at least one processor may be remotely located from the housing of the machine. In still other example embodiments, the at least one processor may operate the machine via a virtualized environment in one or more remote servers, and the devices of the machine operate in response to the virtual machine operated in the at least one server. Of course these approaches are exemplary, and in other embodiments other approaches may be used.

Controller 64 is in operative connection with numerous transaction function devices within the machine, and is operative to control the operation thereof in accordance with its programming. Controller 64 is shown schematically in operative connection with devices 68, 70 and 72. It should be understood that this representation is schematic only and is intended merely to represent numerous components within the machine which are in operative connection with the controller and the at least one processor included therein. For example the transaction function devices may include moving devices such as motors, solenoids and other devices that are operative to impart motion to components. Likewise transaction function devices may include sensors such as radiation sensors, proximity sensors, switches and other types of sensors that are operative to sense items, users, conditions, properties, characteristics or components within the machine and to enable a controller to perform functions in accordance with its programming. Transaction function devices include output devices such as sound emitters and light emitting devices. For example and without limitation, transaction function devices may include the card reader, display, keyboard, function keys, printer, cash dispenser, cash acceptor, storage mechanisms and other devices previously discussed as well as other devices within the machine which are operative in response to the controller.

In the exemplary embodiment the controller is also in operative connection with a communications device schematically indicated 74. The communications device is operative to communicate messages electronically between the machine 10 and other computers in financial transaction processing systems or other systems or networks. These may include for example communications with systems operated by banks, credit card networks, automated clearinghouses and other entities. In FIG. 2 the communications device 74 in the ATM 10 is schematically shown as providing communication with a financial institution 76 through a network 78. It should be understood that this communication configuration is exemplary and in other embodiments other communication arrangements may be used.

As represented in FIGS. 2 and 6, in the operative position of ATM 10 the housing 46 houses a sheet acceptor mechanism 80 which is also referred to herein as a cash acceptor mechanism. In the exemplary embodiment the mechanism 80 is operative to accept sheets from a machine user through the opening 40, to analyze each sheet for at least one property or characteristic, and to route the sheets selectively for storage within the housing of the machine based on the characteristics analyzed. It should be understood that in various embodiments these sheets may include currency notes, checks or other financial instrument sheets. For purposes of this disclosure currency notes are alternatively referred to as currency bills. It should further be understood that in exemplary embodiments the financial instrument sheets may be sheets comprised of different types of material such as paper, plastic or combinations thereof. It should further be understood that references herein to a cash acceptor mechanism shall be deemed to encompass mechanisms which handle not only currency notes, but also other financial instrument sheets such as checks, money orders, gift certificates, vouchers, scrip and/or other items that correspond to value.

As represented in FIG. 2, cash acceptor mechanism 80 includes a chute 82 which extends through opening 40 in fascia 15 in its operative condition. As previously discussed the user accessible opening to chute 82 is controlled by a movable gate 44. Gate 44 moves responsive to the controller 64 and enables authorized users to access the chute at appropriate times during transaction sequences.

In operation of the machine users are enabled to insert a stack of financial instrument sheets schematically indicated 84, into the chute. The stack 84 may comprise currency notes, checks or other forms of financial instrument sheets.

In operation of the cash acceptor mechanism sheets are individually separated from the stack by a picker mechanism 86, an exemplary embodiment of which is later discussed in detail. Each picked sheet is transported individually from the picker mechanism past the validator device schematically indicated 88. The validator device 88 of the exemplary embodiment is operative to determine at least one characteristic of each sheet. This may include for example a determination as to whether the sheet is a note or check and if a note, the denomination and whether it is valid. If the document is a check, a determination may be made as to whether the check is genuine as well as the indicia associated with the maker of the check and the amount thereof. For example in some exemplary embodiments the validating device may be of the type shown in U.S. Pat. No. 5,923,415, the disclosure of which is incorporated herein by reference in its entirety.

Alternatively or additionally a validating device having features disclosed in U.S. Pat. No. 6,554,185 and/or U.S. Pat. No. 7,137,551, the disclosures of each of which are incorporated herein by reference in its entirety, may be used. Of course in other embodiments other types of validating devices such as imagers, readers, sensors and combinations thereof may be used. For example, in some embodiments the sheet accepting device may include a scanner that is operative to image instruments such as checks and provide data which can be stored and transmitted as an electronic reproduction of that check. In such circumstances an electronic reproduction of the check may be transmitted to remote locations so as to facilitate review and validation of the check.

Alternatively or in addition, the electronic representation of the check may serve as a substitute for the physical paper check which thereafter enables the paper check to be cancelled and subsequently destroyed. This may be done in the manner described in U.S. patent application Ser. No. 11/370,430 filed Mar. 8, 2006 the disclosure of which is incorporated herein by reference in its entirety.

In the exemplary embodiment of the cash acceptor mechanism 80, sheets which have been analyzed through operation of the validator device 88 are moved through a transport 90 to a routing device 92. The routing device is operative responsive to the controller 64 to route sheets selectively to either an escrow device 94 or to a transport 96. Escrow device 94 generally operates to hold sheets in storage on a temporary basis. Such an escrow device may be of the type shown in U.S. Pat. No. 6,371,368, the disclosure of which is incorporated by reference in its entirety herein. Escrow device 94 may be operative to accept sheets and store them. Thereafter responsive to operation of the controller 64 the escrow device may deliver those sheets to the routing device 92 which directs them along sheet paths in the machine to carry out transactions. Of course it should be understood that the escrow device shown is exemplary and in other embodiments other types of escrow devices may be used.

In the exemplary embodiment transport 96 is used to receive unacceptable sheets which have characteristics that do not satisfy certain parameters set by the machine. These may include for example, notes which have one or more characteristics which suggest that they are counterfeit. In other embodiments such sheets may include checks which have properties which suggest that they are reproductions or forged or otherwise unacceptable. Of course in other embodiments other sheets may be deemed unacceptable. As schematically represented in FIG. 2, sheet acceptor mechanism 80 is operated to cause transport 96 to deposit suspect sheets schematically indicated 98 in a storage area 100. In the exemplary embodiment the suspect sheets are stored within the cash acceptor mechanism and outside of the secure chest so that they may be recovered by servicing personnel in a manner that is later discussed. Of course this approach is exemplary and in other embodiments other approaches may be used.

In the exemplary embodiment the cash acceptor mechanism 80 is operative responsive to signals from the controller 64 to cause financial instrument sheets that are determined to be valid or otherwise acceptable, to be directed through a cash accepting opening 102 that extends in an upper surface 104 of the chest. In the operative position of the cash acceptor mechanism shown in FIG. 2, the transport in the cash acceptor mechanism is aligned with the cash accepting opening and a transport 108 that extends into the secure chest. As schematically represented in FIG. 2, in the operative position of the cash acceptor mechanism 80 at least one driving member 110 of the transport 106 is in operative connection with a driven member 112 of the transport 108. In the exemplary embodiment this enables the cash acceptor mechanism to transmit movement to sheet handling mechanisms within the secure chest and to assure coordinated movement of processed sheets therein. Further in the exemplary embodiment the driving and driven members extend in the cash accepting opening so as to block access therethrough by unauthorized persons as later discussed.

Figure 12:
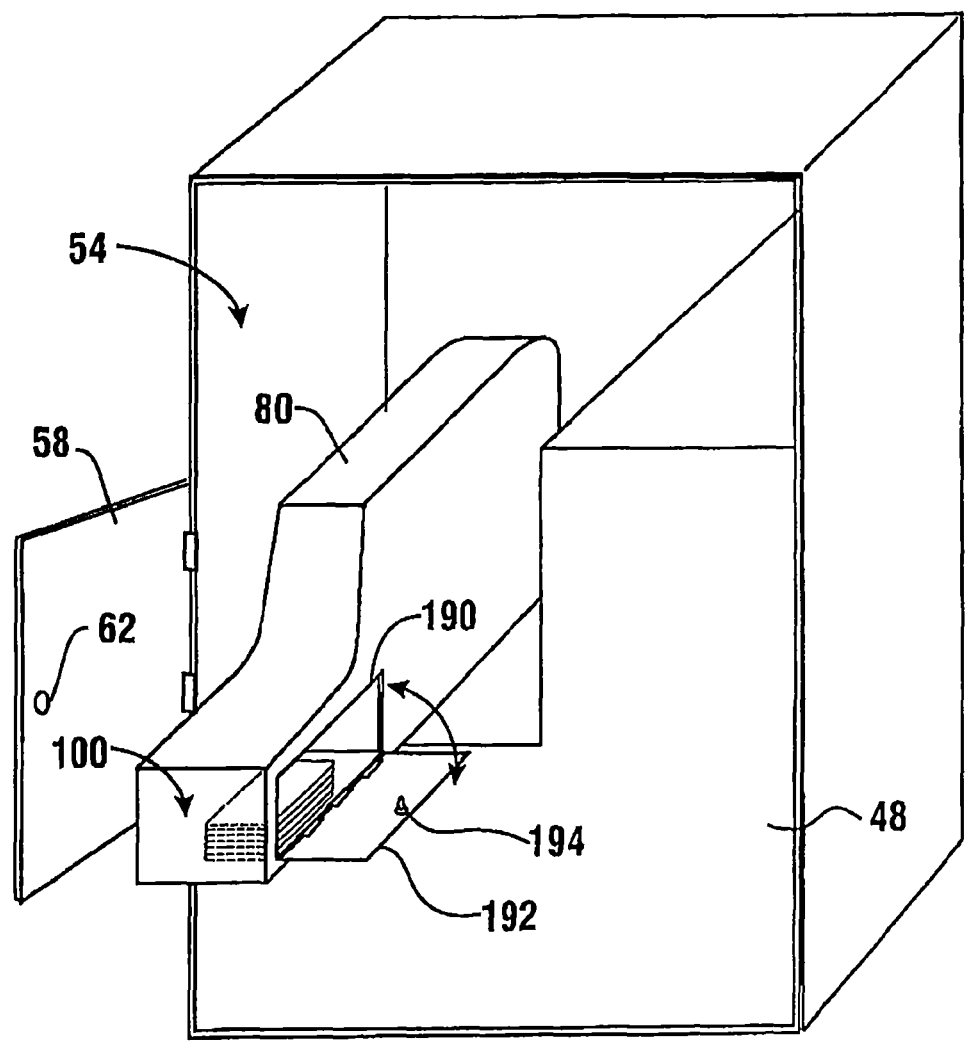
FIG. 12 is a schematic view of the cash acceptor mechanism withdrawn for servicing similar to FIG. 11 and with a first embodiment of an access door in an open position for purposes of accessing unacceptable sheets which have been identified through operation of the cash acceptor mechanism.
Figure 13:
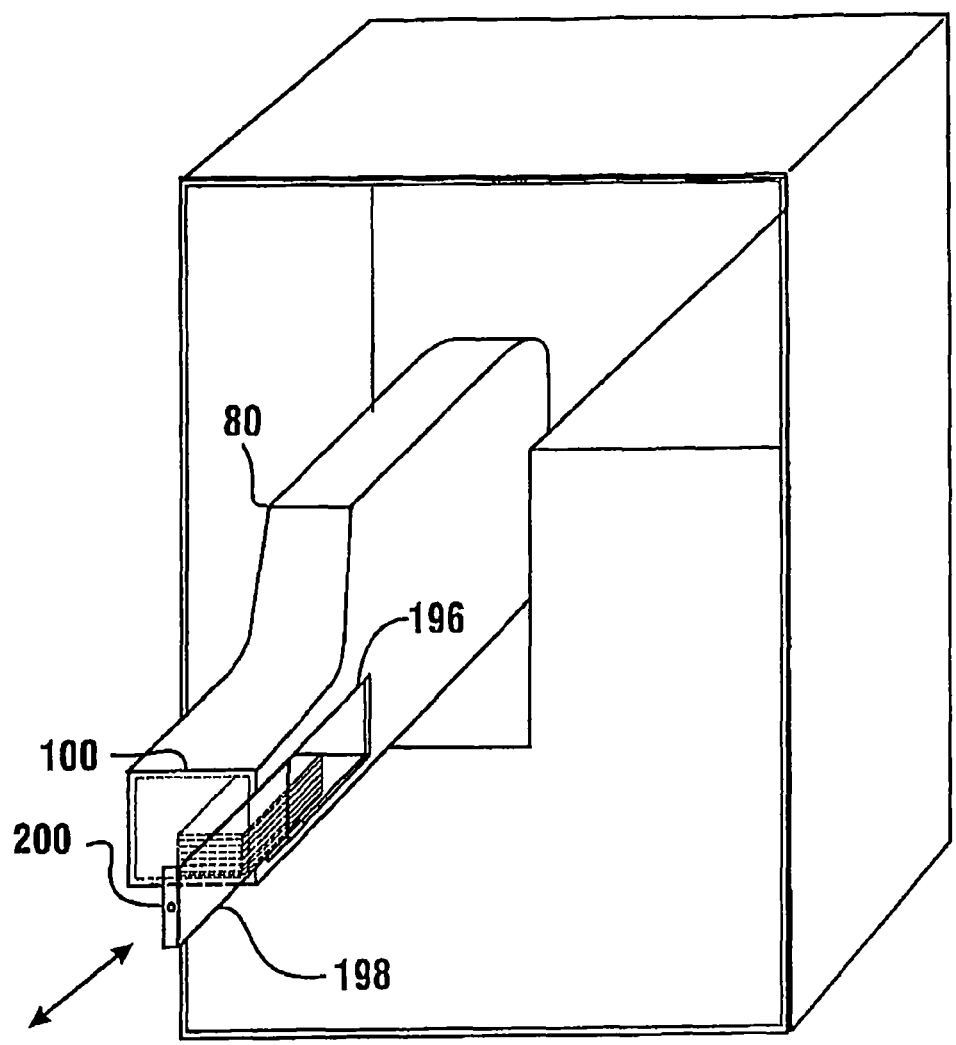
FIG. 13 is a view of the automated banking machine similar to FIG. 12 but with an alternative access mechanism for accessing unacceptable sheets.
Figure 14:
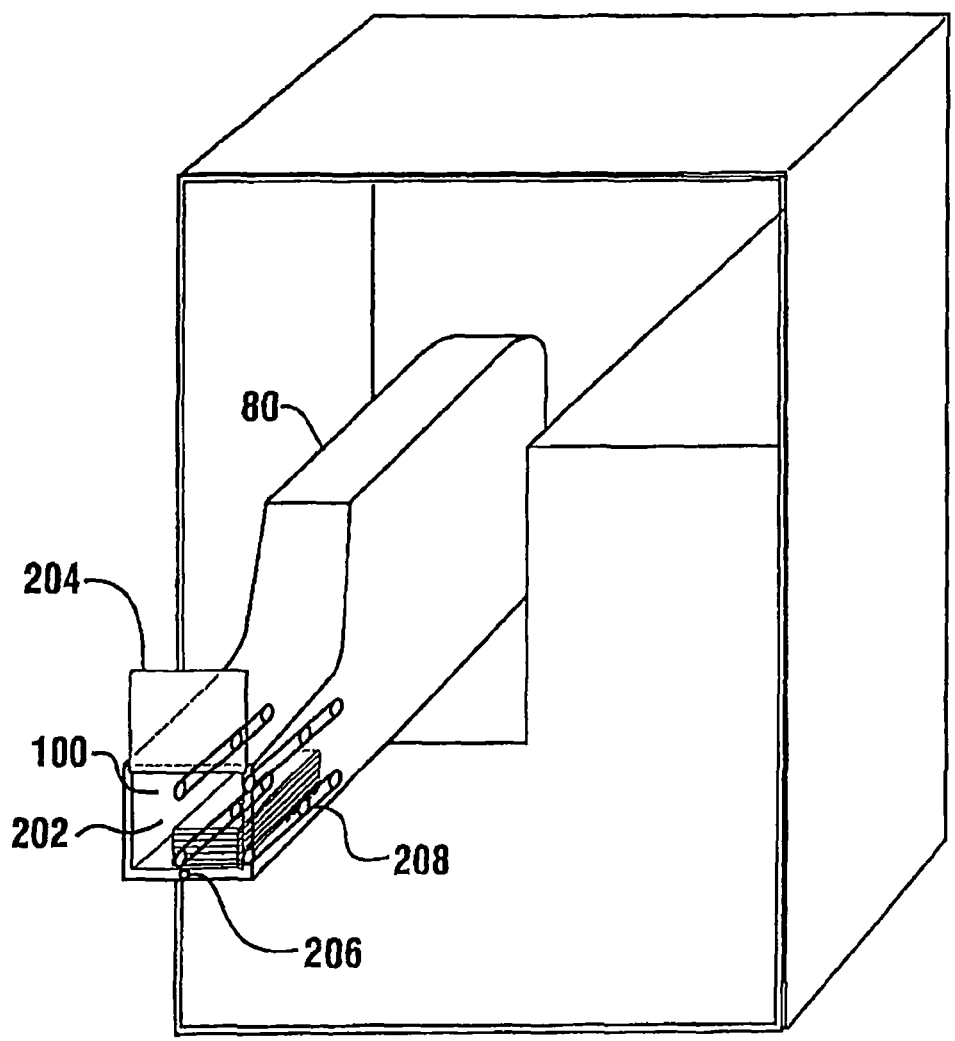
FIG. 14 is yet another view of the automated banking machine similar to FIG. 12 showing a further alternative mechanism for accessing unacceptable sheets.

In the exemplary embodiment when the cash acceptor mechanism is moved from the operative position shown in FIG. 2 to a servicing position such as shown in FIGS. 12, 13 and 14, the driving member 110 and the driven member 112 disengage. In some exemplary embodiments the movement of the cash acceptor mechanism from the operative position to a servicing position may include movably mounting the cash acceptor mechanism such that the mechanism moves both upward away from the secure chest so as to disengage the driving and driven members as well as outward for purposes of servicing. Of course to return the cash acceptor mechanism to the operative position, movement thereof is made both inward and downward so as to reengage the driving and driven members. This may be accomplished by a combination of slides, rollers or other suitable mechanisms. Of course the approach described of providing for engagement between the cash acceptor mechanism and a mechanism for handling sheets within a chest portion is exemplary and in other embodiments other approaches may be used, or the transport within the chest portion may have a separate motor or other moving device.

As shown in FIG. 2, transport 108 which moves sheets generally in a vertical direction through the cash accepting opening is in operative connection with a horizontal transport schematically indicated 114. The horizontal transport is operative to engage sheets moved into the chest portion and to move them transversely away from the cash accepting opening. The horizontally extending transport 114 is in operative connection with a vertically extending transport 116 which is transversely disposed from the cash accepting opening in the secure chest.

Vertical transport 116 is operative to move sheets selectively into engagement with sheet handling mechanisms 118, 120, 122 and 124. In some exemplary embodiments, sheet handling mechanisms 118, 120, 122 and 124 may be sheet stacking mechanisms such as those shown schematically in FIGS. 5 and 6. Alternatively or in addition in other embodiments one or more of the sheet handling mechanisms may include sheet receiving and dispensing mechanisms which are operative to selectively accept sheets for storage as well as to dispense sheets therefrom. Examples of sheet accepting and stacking mechanisms as well as sheet accepting, stacking and dispensing mechanisms which may be used in some exemplary embodiments are described in detail in U.S. Pat. Nos. 6,302,393 and 6,290,070, the disclosures of each of which are incorporated by reference in its entirety.

Figure 4:
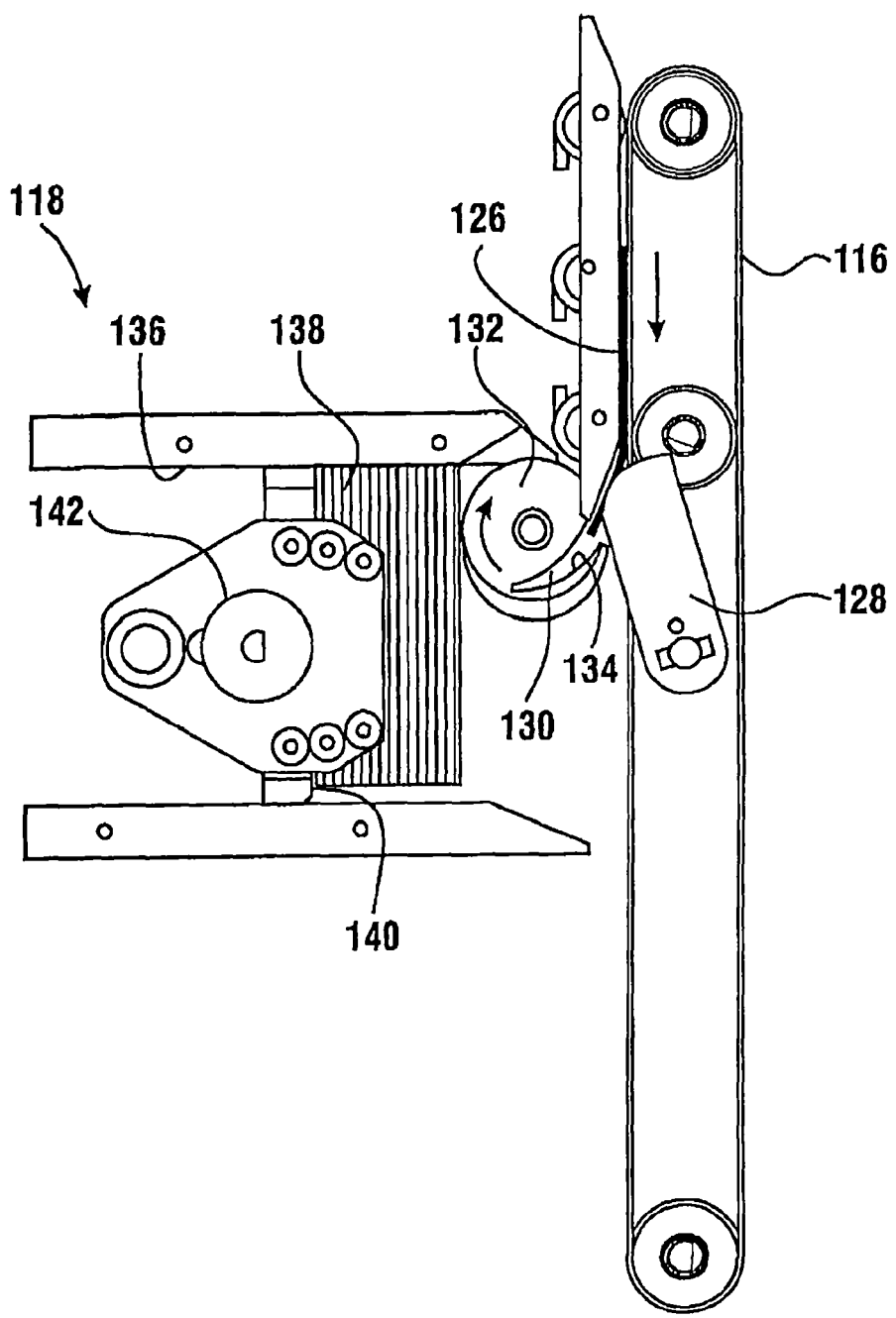
FIG. 4 is a view of a sheet stacking mechanism which may be employed in an exemplary embodiment of the banking machine.

As shown schematically in FIG. 4, the exemplary sheet accepting and stacking mechanism 118 is selectively operative to accept a sheet 126 moving in the vertical transport 116. Sheet 126 is guided to engage the sheet handling mechanism 118 through movement of a gate member 128. The gate member moves responsive to the controller 64 to direct the leading edge of the sheet into a recess 130 of a rotatable member 132. As the leading edge of the sheet 126 enters the recess 130 the rotatable member 132 rotates in the direction of Arrow R. This causes the gripper portion bounding the recess 130 to move inwardly capturing the sheet 126 therein. The rotatable member 132 rotates until the leading edge of the sheet 126 engages a stop surface 136 at which time the gripper portion 134 has moved radially outward such that the sheet disengages from the rotatable member 132 and is integrated into a sheet stack 138. Stack 138 may be for example a stack of currency notes all of which are of the same denomination. Of course in other embodiments the stack 138 may be a collection of other types of sheets.

Figure 5:
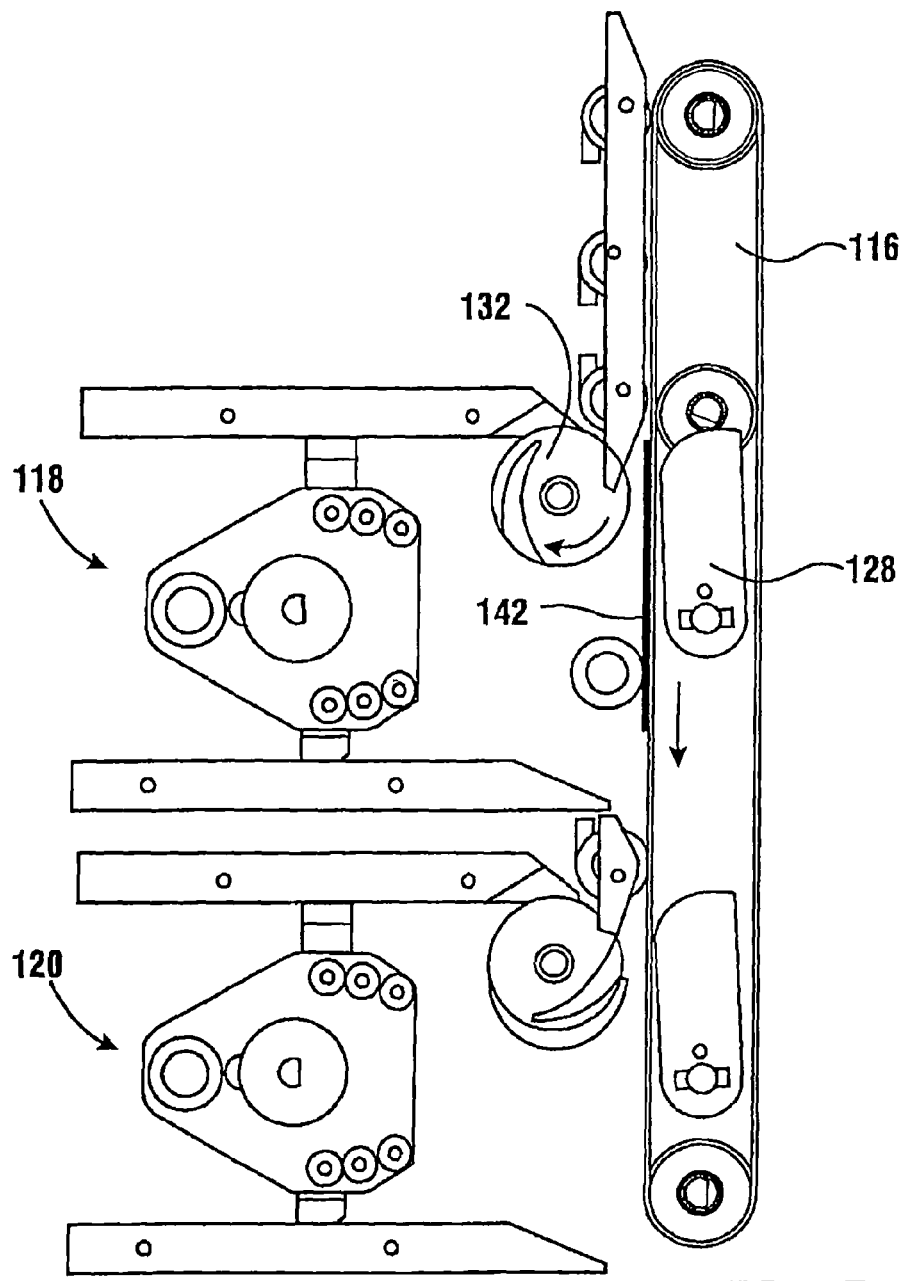
FIG. 5 is a further view of the exemplary sheet stacking mechanism which may be used to hold multiple types of sheets.

In the exemplary embodiment the stack is maintained in abutting relation with the rotatable member by a biasing plate 140 which acts against the back of the stack. The biasing plate 140 is movable responsive to a biasing mechanism 142 which is operative to enable the stack to increase or decrease while maintaining the sheets in an appropriately aligned position. Further details related to an exemplary embodiment of the sheet handling mechanism are described in the incorporated disclosure of U.S. Pat. No. 6,302,393. FIG. 5 further shows the exemplary operation of exemplary sheet handling mechanisms 118 and 120. In this case a sheet 142 moving in transport 116 is enabled to pass the rotatable member 132 when the gate member 128 remains retracted as the sheet passes. This enables the sheet to move to other sheet handling mechanisms such as sheet handling mechanism 120. This arrangement enables sheets having particular characteristics to be stored together, for example, valid currency notes of different denominations to be collected in stacked relation in selected sheet storage areas. Alternatively in other embodiments sheets of similar types such as checks may be segregated from other financial instrument sheets such as notes or travelers checks. In still other embodiments sheets which are to be recycled such as suitable fit currency notes can be segregated from valid yet worn or soiled currency notes which are not suitable for providing to customers. It should be understood that these approaches are exemplary and in other embodiments other approaches may be used.

Figure 11:
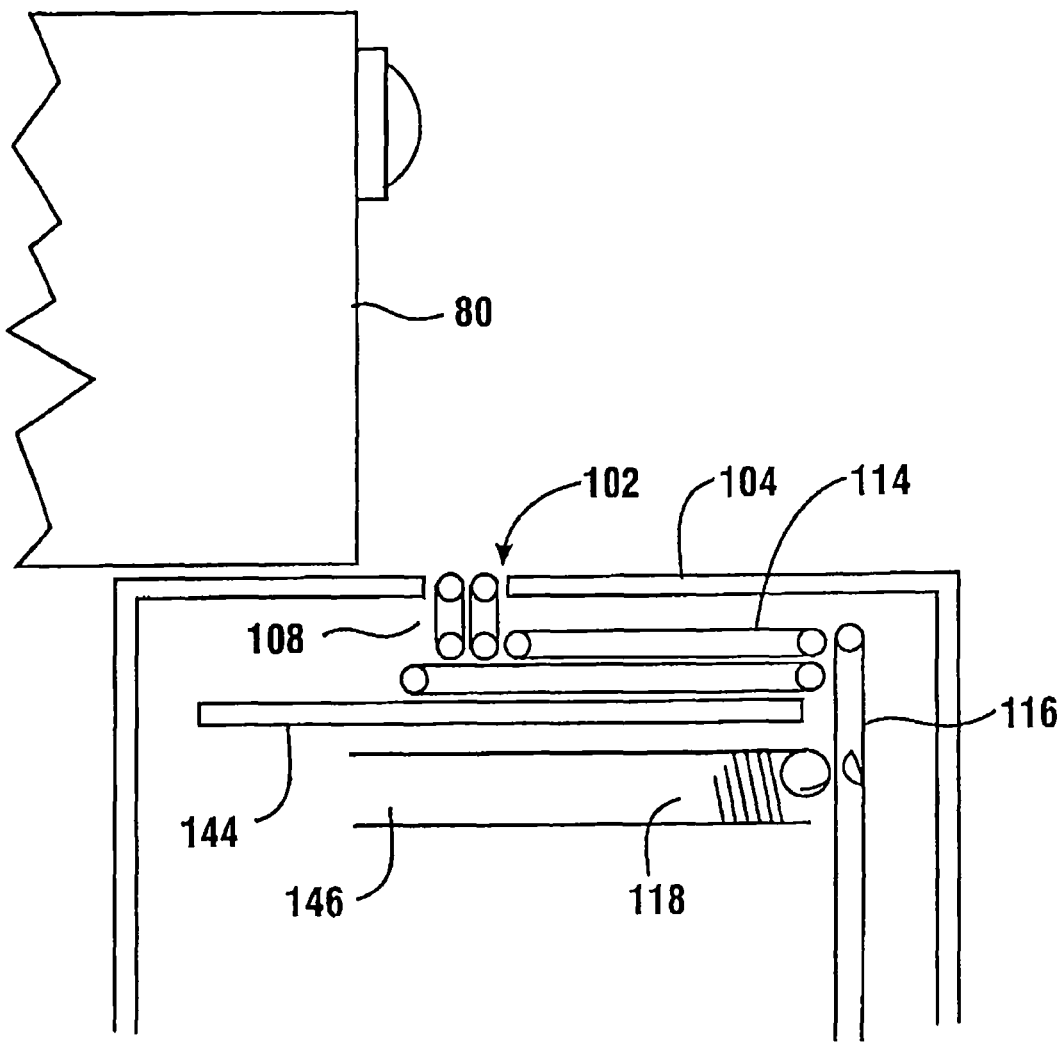
FIG. 11 is a schematic view showing a cash acceptor mechanism moved to a servicing position and exposing the cash accepting opening in an upper portion of the chest of the automated banking machine.

In the exemplary embodiment shown in FIG. 2, a security plate 144 extends within the secure chest in intermediate relation between the horizontal transport 114 and the note storage mechanism such as the storage area 146 associated with sheet handling mechanism 118. The security plate 144 in the exemplary embodiment is secured within the interior of the secure chest and is adapted to prevent unauthorized access through the cash accepting opening 102 in the chest. This may be accomplished by securing the security plate 144 to the walls bounding the interior of the secure chest or other suitable structures. As can be appreciated in the exemplary embodiment the upper housing portion 54 houses the sheet acceptor mechanism 80, it is generally easier to access the area housing the sheet acceptor mechanism than the secure chest. In cases where criminals may attack ATM 10 and attempt to remove the sheet accepting mechanism, ready access through the cash accepting opening is first blocked by the driving and driven members and other components of the transports 106 and 108. However, in the event that criminals attempt to clear away the transport mechanism components, access to the stored sheets in the note storage mechanisms is still blocked by the security plate. FIG. 11 shows greater detail of the cash acceptor mechanism 180 retracted to a servicing position so as to expose the cash accepting opening. In the exemplary embodiment the cash acceptor mechanism is movably mounted in supporting connection with the chest portion on suitable slides or other members. As can be appreciated in this exemplary embodiment the security plate 144 operates to separate the cash accepting opening 102 from the notes or other valuable financial instrument sheets which are stored below the security plate within the secure chest. Of course the security plate is exemplary and other forms of security plates or other structures may be used.

Figure 20:
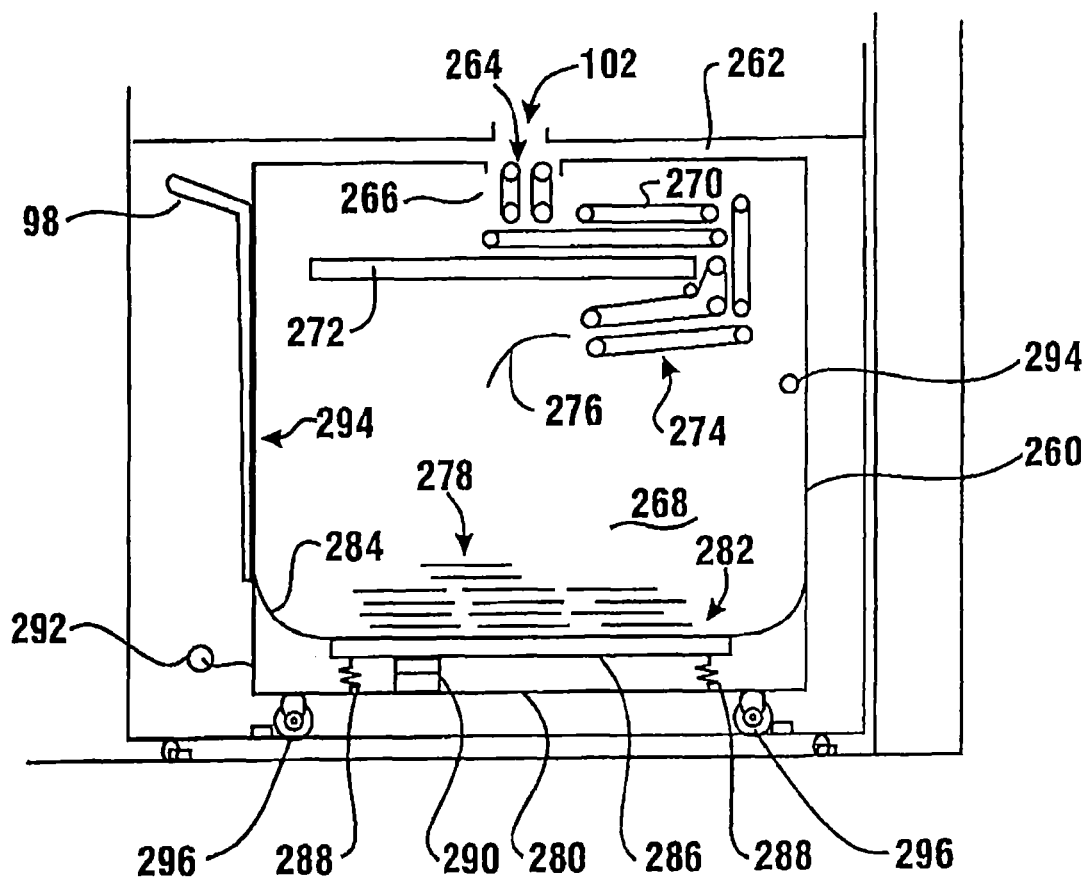
FIG. 20 is a transparent side view of an alternative form of a mechanism for accepting and storing financial instrument sheets that have been processed by the cash acceptor mechanism.

In an alternative embodiment the machine includes a bulk storage container 260 shown in FIG. 20 for holding currency bills, notes, checks or other items that have been deposited into the machine. The container 260 includes a top wall 262 with an opening 264 which corresponds to opening 102 in the chest when the container 260 is in the operative position. Container 260 includes a transport 266 which transports items that pass through the opening 264 into an interior area 268 of the container. A horizontal transport 270 is operative to move deposited items transversely away from the opening 264. A security plate 272 is positioned to reduce the risk of unauthorized access to the interior area 268. A further transport 274 is operative to move deposit items such as currency sheet 276 to a suitable location for being dispatched into the interior area 268 below the security plate. Deposited items schematically represented 278 are held within the interior area of the container 260.

In the exemplary embodiment the container 260 includes a bottom wall 280. The interior area 268 is bounded by a shaker member 282 that is disposed vertically above the bottom wall. In the exemplary embodiment the shaker member comprises a resilient flexible membrane 284. A rigid plate 286 extends in underlying relation of a central portion of the membrane. Flexible supports 288 support the rigid plate 286 above the bottom wall 280. The flexible supports further enable movement of the rigid plate and membrane relative to the bottom wall. In exemplary embodiments the rigid supports 288 may include springs or other members which enable relative vertical and/or horizontal movement of the bottom wall and the rigid plate.

In the exemplary embodiment an actuator 290 extends in intermediate relation between the bottom wall and the rigid plate. In exemplary embodiments the actuator is an electrical vibrating device which is operative to shake the rigid plate and overlying membrane. The shaking action of the actuator 290 is operative to impart shaking motion to the deposited items 278 that are in supporting connection with the membrane. This facilitates the dispersal and settling of deposited items and enables a relatively larger quantity of such items to be collected within the interior area 268 before such items need to be removed. In exemplary embodiments the actuator 290 is electrically connected to the circuitry within the machine through a releasable connector 292. This facilitates removal of the exemplary container as hereafter discussed. In addition, in some embodiments the moving devices for transports within the container may be supplied with signals and/or electrical power through the releasable connector.

In operation of the machine, the interior area 268 of the container 260 is in operative connection with the opening 38 in the housing of the machine through which deposited items are accepted. The deposited items are passed through the cash accepting mechanism or other mechanism for processing such items. Items appropriate for deposit in the container are passed through the opening 102 in the top of the chest. Such items are transported by the transports 266, 270 and 274 to the area below the secure plate 272 and accumulate within the interior area 268. Periodically responsive to the controller, the actuator 290 operates to impart shaking motion to the deposited items 278 within the interior area. This facilitates settling of the items so as to densely pack the items therein. Sensors 294 may be included within the interior area so as to sense the deposited items. The controller may be operative to cause the actuator to shake deposited items responsive to the sensing the level of such items by the sensors. Alternatively the controller may be operative to shake deposited items based on elapsed time, number of items deposited, or other programmable bases. In the exemplary embodiment the sensors 294 may be in operative connection with the controller through the releasable connector 292.

The exemplary container 260 is removably mounted within the secure chest. The exemplary container is supported on rollable supports 296. The rollable supports 296 may be castors, wheels, ball rollers or other type items that enable more ready movement of the container in a loaded condition. In the exemplary embodiment upon opening of the secure chest the container 260 is enabled to move outward from the chest. This is facilitated by a servicer grasping a handle 298 which is attached to the container. The releasable connector 292 is enabled to be disconnected so that the container 260 can be pulled outward from the secure chest. As shown in greater detail in FIG. 21, in the exemplary embodiment the handle 298 is a telescoping handle that is enabled to be moved upward once the handle has cleared the secure chest. This facilitates moving the container outside of the ATM. Thereafter the container may be moved to a suitable location by the handle away from the ATM for purposes of removing the contents. This may be, for example, an area within a vault or other secure room in which the items within the container may be processed.

Figure 21:
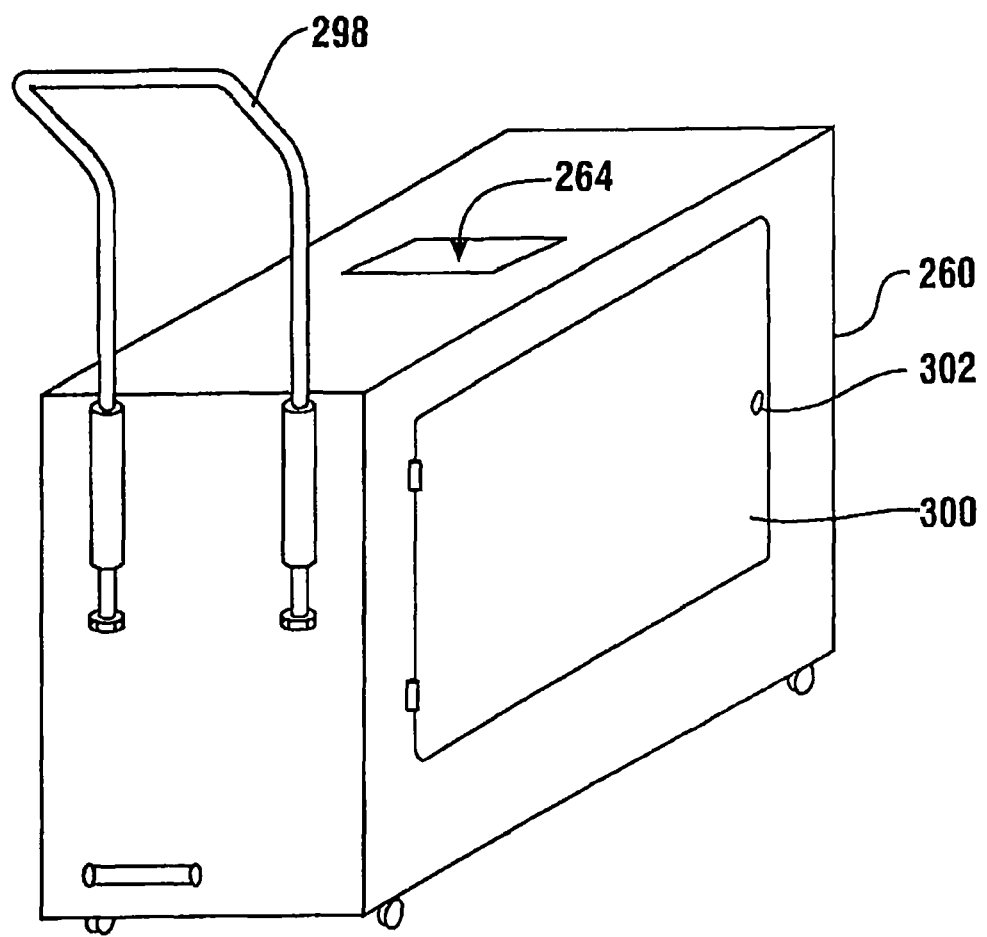
FIG. 21 is an isometric view of the financial instrument holding container shown in FIG. 20, moved outside the machine.

As represented in FIG. 21, the container 260 in the exemplary embodiment includes a door 300. Access to door 300 is controlled by one or more locks represented 302. In the exemplary embodiment door 300 is shown hinged at a side toward the chest door so as to reduce the risk of persons obtaining unauthorized access to the interior of the container when the container is within the machine. Once the container has been moved to a suitable location, the lock 302 may be unlocked; the door opened, and deposited items removed. After the items have been removed, the door 300 may be returned to the closed position. Thereafter the container may be reinstalled in the machine with the handle 298 being retracted so as to enable the container to again be aligned with opening 102. Further, the releasable connector 292 may be reconnected so as to again enable operation of the container within the machine.

As can be appreciated, the exemplary container 260 is enabled to hold a substantial quantity of deposited items. Further, the construction including the rollable supports and telescoping handle facilitates movement of the loaded container out of the machine and the container into the machine. It should be understood that the container is exemplary and in other embodiments other approaches may be used. These may include, for example and without limitation, containers which include multiple interior areas in which deposited items are supported on shaking members. Such embodiments may achieve, for example, a separation of deposited notes, checks and/or envelopes by denomination or deposit type, and achieve more densely packed storage within a particular interior compartment within the container. In addition or in the alternative, in other embodiments shaking members may be provided on side walls or on top walls bounding the container so as to facilitate the shaking of deposited items and the packing and storage thereof. In addition or in the alternative, containers may be used in some embodiments in conjunction with sheet handling mechanisms such that certain sheets are stored precisely positioned in containers for purposes of stacking and/or recycling while other sheets are stored in bulk within a container or compartment within a container.

FIGS. 7 through 10 schematically describe an exemplary embodiment of the picker mechanism 86 used in the cash accepting mechanism 80. In this exemplary embodiment the stack of sheets 84 is positioned in the chute 82 and is in supporting connection with a generally angled lower surface 148. Moving members 150 and 152 are operative to engage the stack and selectively rotate responsive to a motor or other mechanism in the direction of Arrow P so as to move the stack into generally abutting relation with an engaging surface 154. Positioned adjacent to the engaging surface 154 in proximity to the lower surface 158 is an idler roll 156 which is a generally free wheeling roll. The engagement of the stack 84 of the engaging surface 154 and the face of the roll 156 is operative to splay the sheets as shown.

The picker mechanism 86 further includes a generally cylindrical picking member 158. Picking member 158 is rotatable selectively by a motor or other driving member responsive to the controller 64. The picking member during picking operation rotates in the direction of Arrow P as shown. Picking member 158 further includes high friction arcuate segments 160 which in the exemplary embodiment serve as sheet engaging portions and which extend about a portion of the circumference of the picking member.

Picker mechanism 86 of the exemplary embodiment further includes a plurality of rolls 162 that serve as non-contact stripper rolls in a manner later discussed. The picking mechanism further includes a contact stripper roll 164 which biasingly engages the high friction segments 160 of the picking member.

Figure 8:
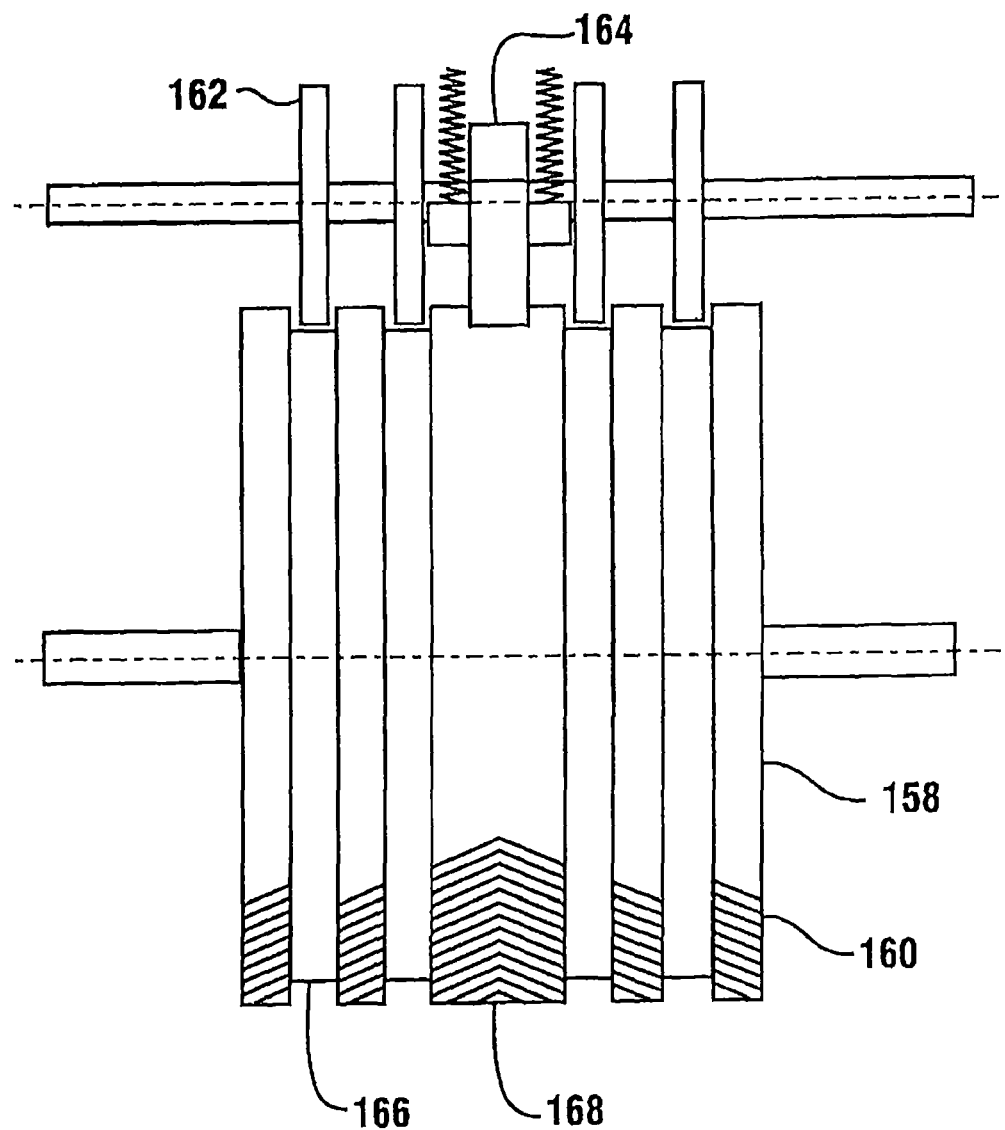
FIG. 8 is a front plan view of an exemplary picking member in combination with a plurality of non-contacting stripper rolls and a contacting stripper roll used for separating individual sheets from the stack.

As represented in FIG. 8, the picking member is a generally cylindrical member that includes a plurality of annular recesses 166. The outer surface of the non-contact stripper rolls 162 extend into a corresponding annular recess 166, but are generally not in stripping engagement therewith. As represented in the exemplary embodiment of FIG. 8, the outer surface of the non-contact stripper rolls 162 are disposed slightly away from the base of the annular recess. As a consequence the outer surface of the non-contact stripper rolls which serve as a first stripper portion are not positioned to be in direct contact stripping engagement with the picking member. However, because the surface of such rolls is disposed in close proximity thereto and generally enables only a single sheet to pass between the picking member and the non-contact stripper rolls, the separation of a single sheet from other sheets is generally achieved. It should be understood however that while in the exemplary embodiment the non-contact stripper rolls are disposed slightly from the picking member, in other embodiments such rolls or other stripper members may operate to actually contact the picking member but may be of such resilient consistency or other properties that the rolls are not in a biased contact stripping engagement as is the case with the contact stripper roll 164.

As shown in FIG. 8 the contact stripper roll is biased to engage a central sheet engaging portion 168 of the picking member. This central sheet engaging portion is generally centered with regard to sheets that are moved by the picker mechanism 86. This reduces the tendency of sheets to twist or skew as they are being moved in the picker mechanism. Of course it should be understood that this arrangement is exemplary and in other embodiments other approaches may be used.

Figure 9:
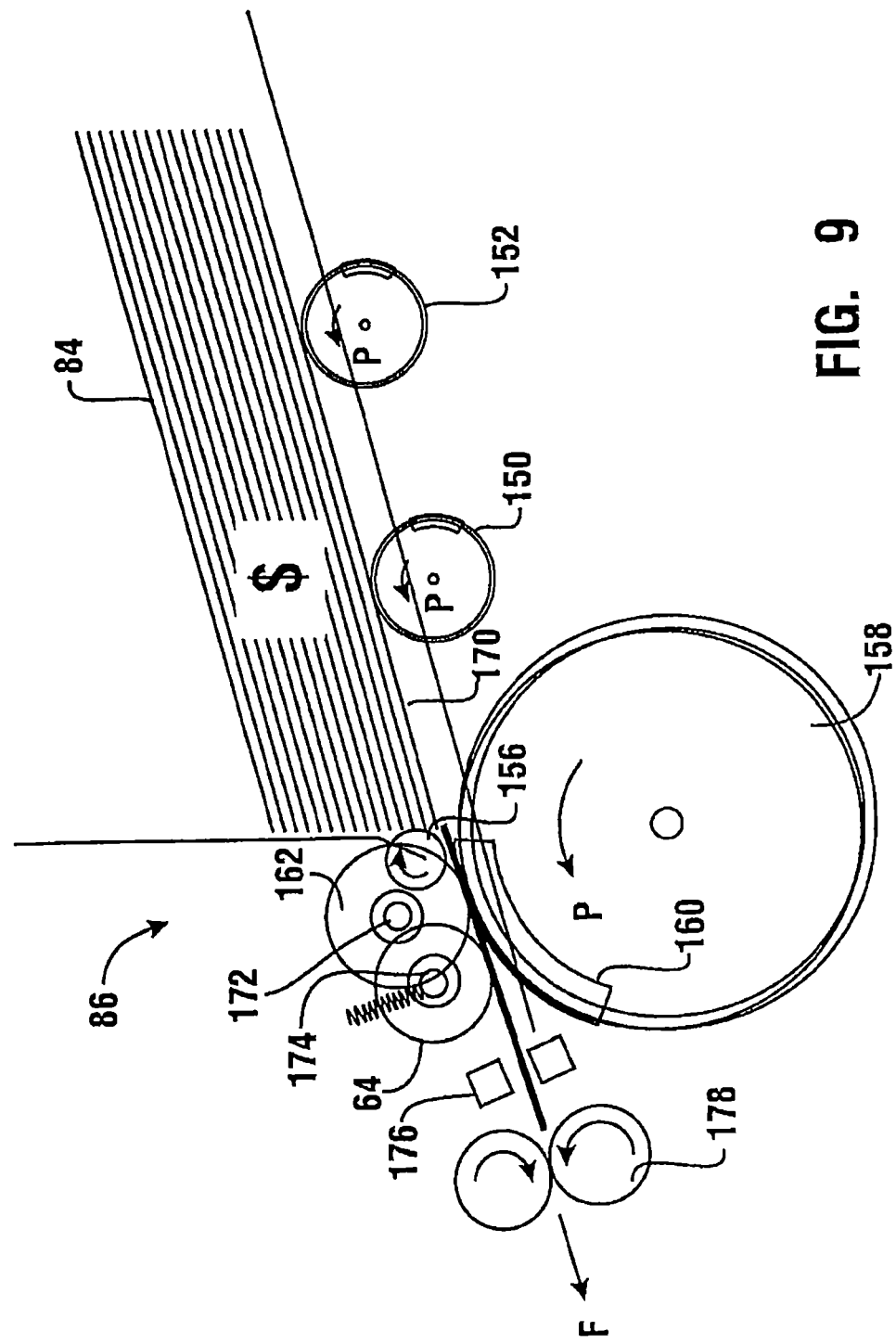
FIG. 9 is a schematic view showing separation of a first sheet from a sheet stack through operation of the mechanism shown in FIG. 7.
Figure 10:
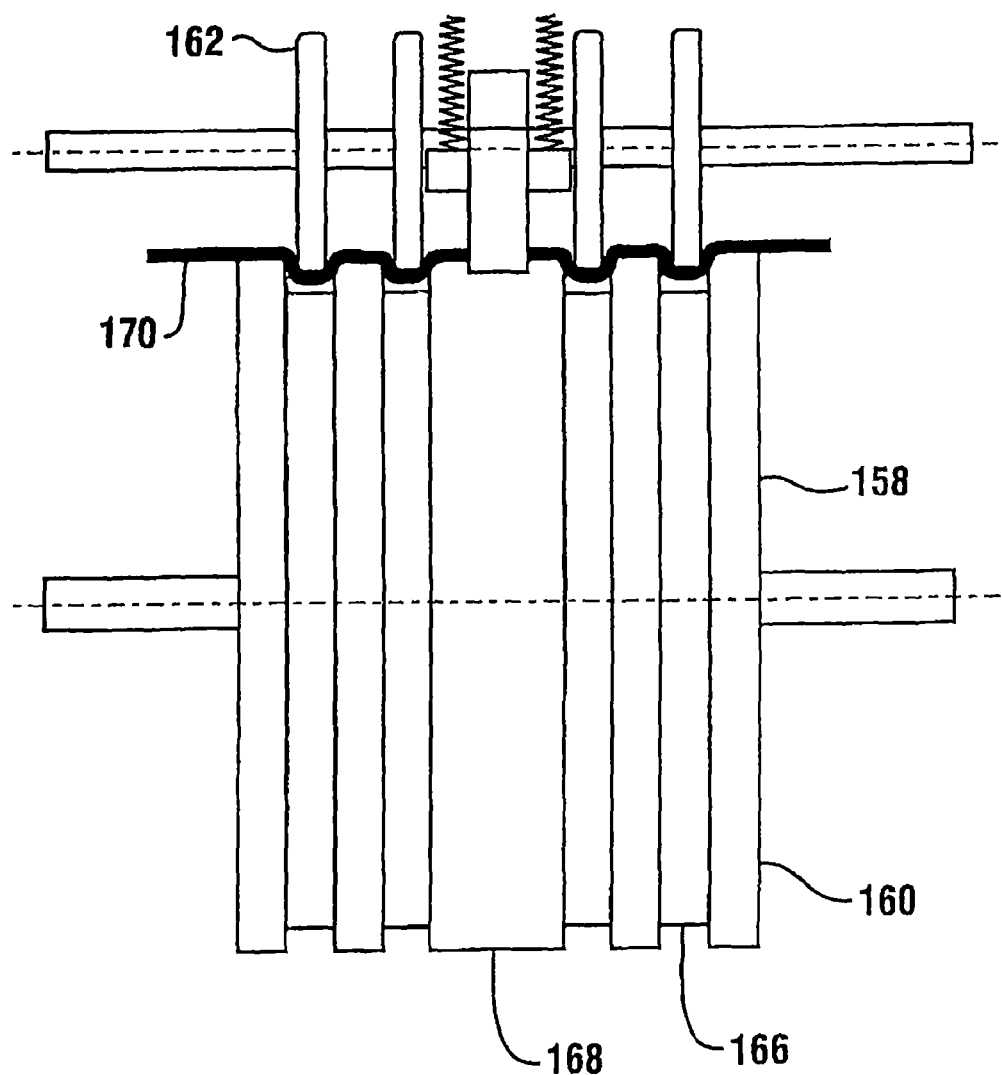
FIG. 10 is a view showing a cross-sectional wave configuration imparted to a sheet through action of the picking member and the non-contacting stripper rolls.

The operation of the exemplary picker mechanism 86 is represented in FIGS. 9 and 10. The picker mechanism is operative to separate sheets individually from the stack 84. This is done by sequentially picking a first sheet 170 which bounds the lower end of the stack while moving the first sheet in a first direction generally indicated by Arrow F so as to move the sheet away from the stack. To accomplish this, the controller 64 operates motors or other moving mechanisms to cause the moving members 150 and 152 to rotate as the picker mechanism 168 similarly rotates in a counterclockwise direction as shown. The rotation of the picking member causes the high friction arcuate segments 160 which serve as sheet engaging portions to engage a lower face of the first sheet and pull the sheet in intermediate relation between the picking member and the non-contact stripper rolls 162. As the first sheet is moved the idler roll 156 rotates to facilitate the movement of the first sheet between the picking member and the non-contact stripper rolls.

The non-contact stripper rolls 162 are in operative connection with a one-way clutch 172 such that the first stripper rolls remain stationary when the first sheet is engaged therewith and moving in the direction of Arrow F. Because the resistance force provided by the non-contact stripper rolls against the face of the sheet engaged therewith is less than the moving force imparted to the opposed face of the sheet, the first sheet 170 is moved into intermediate relation between the picking member and the non-contact stripper rolls. This causes the sheet to assume the cross-sectional wave configuration shown in FIG. 10. This is caused by the sheet being deformed by the non-contact stripper rolls into the annular recesses 166 of the picker member. This cross-sectional wave configuration is generally operative in combination with the opposing force applied by the non-contact stripper rolls, to separate the first sheet from other sheets that may be moving therewith from the stack.

As the first sheet 170 moves further in the direction of Arrow F as shown in FIG. 9, the leading edge of the sheet then engages the contact stripper roll 164 which is biased to engage the sheet engaging portions of the picking member.

The contact stripper roll is also in operative connection with a one-way clutch 174 such that in the exemplary embodiment the contact stripper roll remains stationary as the first sheet moves in the direction of Arrow F. The engagement of the contact stripper roll and the first sheet operates to displace the contact stripper roll so as to enable the sheet 170 to move in intermediate relation between the contact stripper roll and the central sheet engaging portion 168. The resistance force of the non-contact stripper roll is generally operative to separate any sheets other than the first sheet 170 from moving in the direction of Arrow F.

As shown in FIG. 9 the sensor 176 is positioned adjacent to the contact stripper roll in the exemplary embodiment. Sensor 176 is operative to sense the presence of double sheets which may have been able to pass the non-contact and contact stripper rolls. Suitable sensors in some embodiments may be those shown in U.S. Pat. Nos. 6,241,244 and 6,242,733, the disclosures of which are incorporated herein by reference in its entirety. Upon sensing a double sheet the controller of the machine is enabled to make additional attempts to strip the sheet as later discussed. However, in the event that only a single sheet is sensed the picker member 158 continues moving in the counterclockwise direction until the leading edge of the sheet reaches takeaway rolls 178. In the exemplary embodiment takeaway rolls are operative to engage the sheet and to move the sheet in the cash accepting mechanism toward the validator device 88. In the exemplary embodiment one rotation of the picking member is operative to separate one sheet from the stack.

In the event that the sensor 176 senses that a double sheet or other multiple sheet has been able to pass the contact and non-contact stripper rolls, the controller of this exemplary embodiment is operative to stop the movement of the picker member 158 in the counterclockwise direction as shown prior to the first sheet 170 being disengaged therefrom. Thereafter the controller is operative to reverse the direction of the picker member 158 and the moving members 150 and 152 so as to move the first sheet back toward the stack. Through the operation of one-way clutches 172 and 174 the contact stripper roll 164 and the non-contact stripper rolls 162 are enabled to rotate in a counterclockwise direction as shown so as to facilitate the return of the sheets to the stack. Thereafter the controller may operate the picker mechanism 86 to again pick a single bill. Repeated attempts may be made until a single sheet is separated from the stack so that it may be processed by the cash acceptor mechanism.

It has been found that the exemplary embodiment of the picker mechanism 86 is well adapted for separating various types of financial instrument sheets having different properties. In general, sheets such as currency notes that are new or other types of sheets which have generally consistent properties of rigidity and friction from sheet to sheet are separated through the operation of the picker mechanism and the non-contact stripper rolls. However, in situations where rigidity and frictional properties vary substantially from sheet to sheet, the contacting stripper roll which subsequently engages the sheets after they have engaged the non-contact stripper rolls is effective in separating sheets that would not otherwise be separated. This may be particularly helpful for example in processing sheets that may include plastic and paper currency notes, checks or other documents that have significantly variable properties and which are mixed together in a stack from which the sheets must be individually picked.

It should be understood that while picking rolls and cylindrical members are used in the exemplary embodiment, in other embodiments other picking and stripping structures such as belts, pads, fingers and other members may be used.

The exemplary embodiment comprises a through-the-wall type machine in which the fascia is exposed to the elements. As a result, rain and snow may impact on the fascia and in the absence of suitable measures may enter the machine. As can be appreciated the cash accepting opening 40 in the fascia must be sufficiently large to accept the chute 82 which holds a stack of documents 84 as previously discussed. During transactions when an authorized user indicates that they wish to insert the stack of sheets into the chute, the gate 44 must be opened which results in exposure of the chute to the elements.

Figure 17:
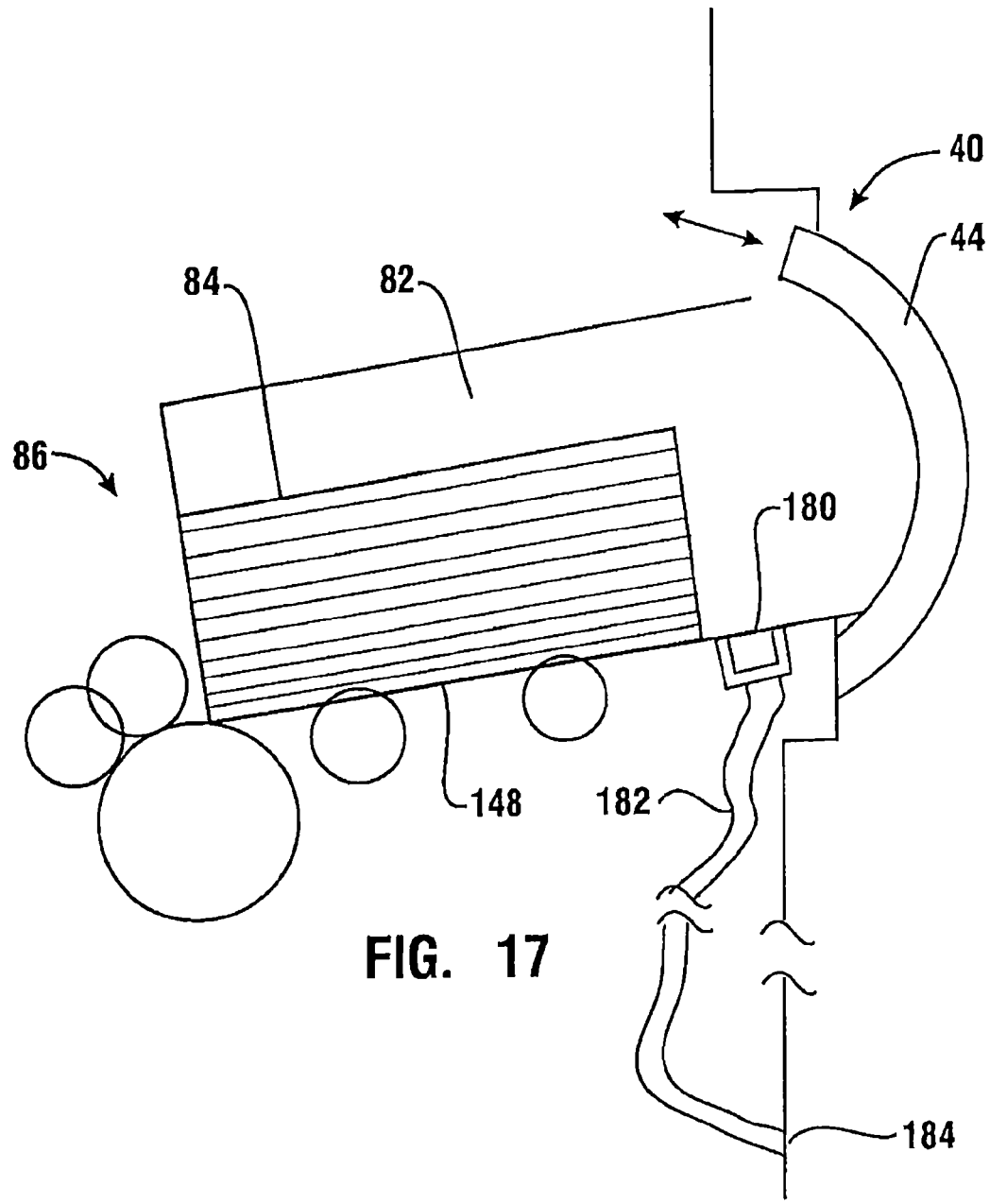
FIG. 17 is a schematic cross-sectional view of a chute to and from which stacks of sheets are received and removed through the fascia of the machine, and including devices for capturing and draining water which may enter the chute.
Figure 18:
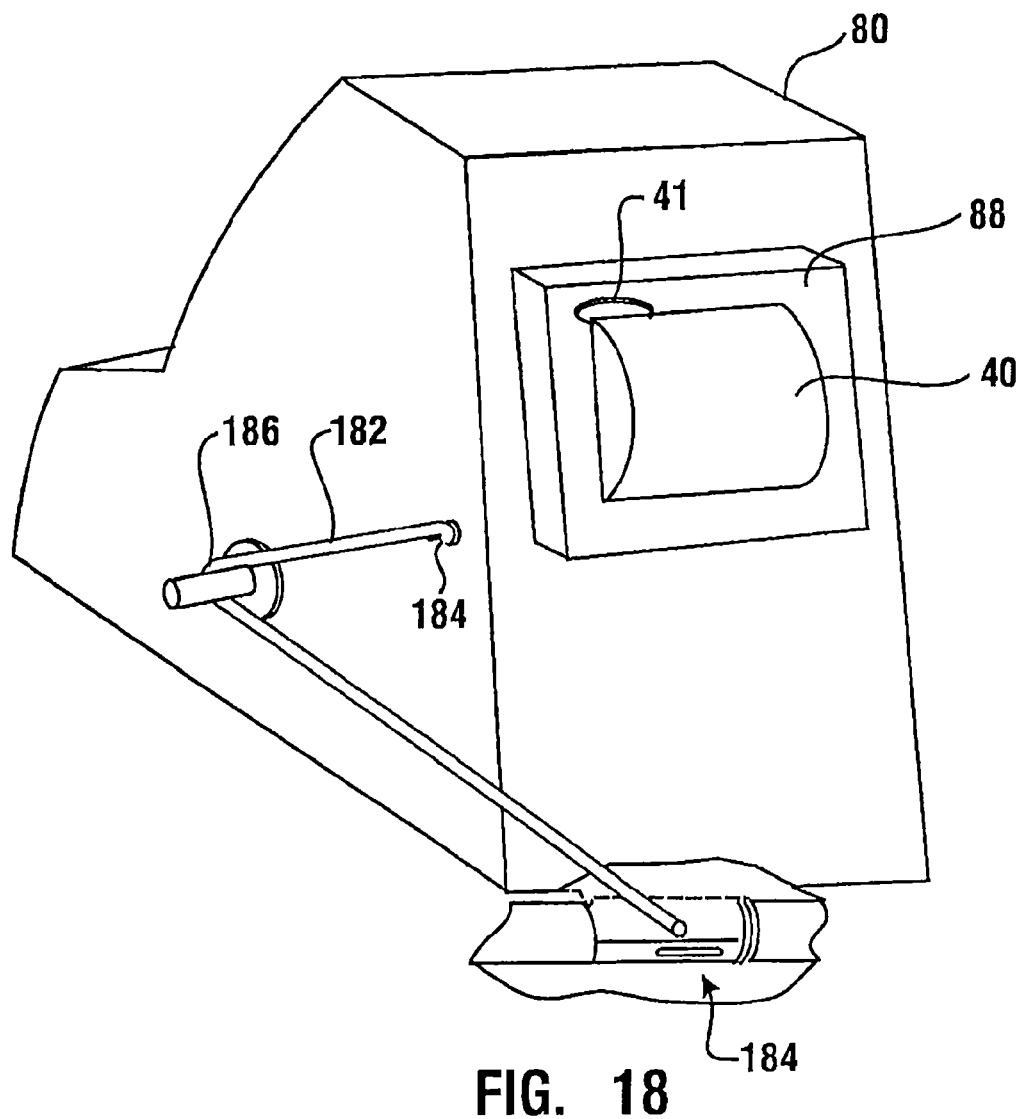
FIG. 18 is an external isometric view of the cash acceptor mechanism represented in FIG. 17 and including a schematic representation of the drain used for passing water collected in the chute to the outside of the machine.
Figure 19:
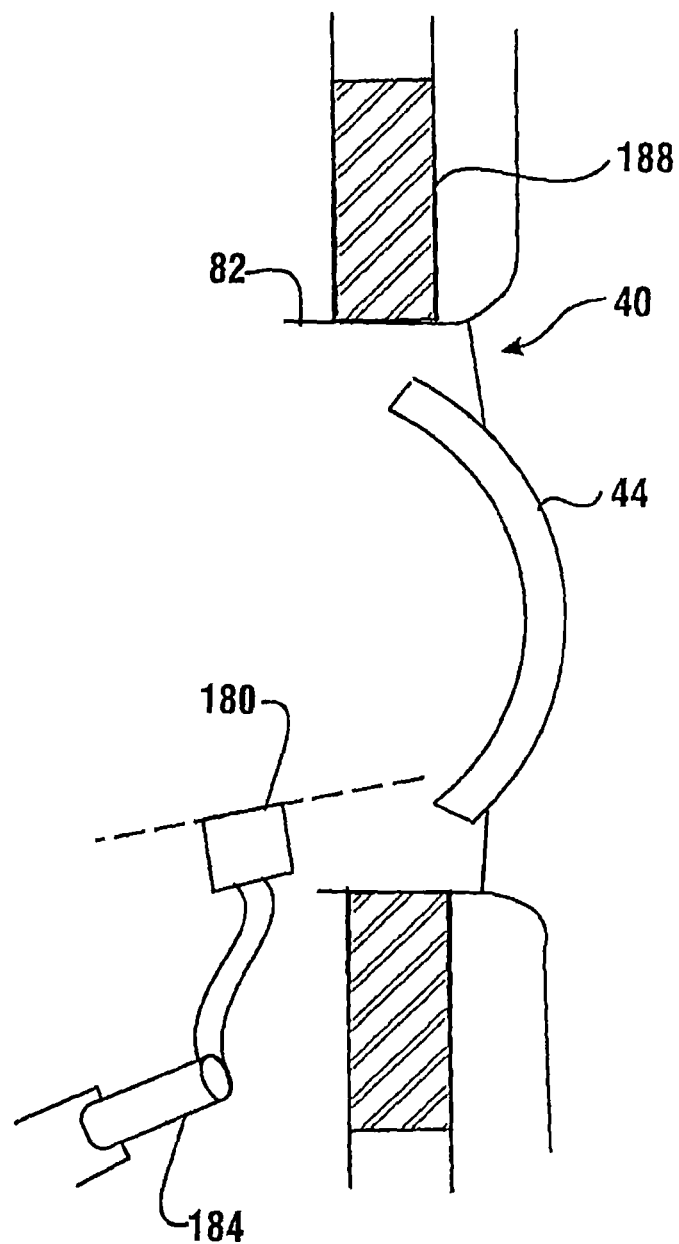
FIG. 19 is a schematic view representative of a sealing system used in an exemplary embodiment to minimize the risk of contaminants entering the machine through the opening in the machine fascia through which the chute extends in an operative position of the cash acceptor mechanism.

To minimize the risk posed by rain and snow to the currency acceptor mechanism 80, the exemplary embodiment includes the capability to capture and direct from the machine moisture which may enter the chute. The approach used in the exemplary embodiment is represented in FIGS. 17 through 19. As shown in FIG. 17, the lower surface of the chute 148 includes at least one water accepting opening 180 therein. In the exemplary embodiment the water accepting opening comprises one or more troughs which extend transversely across the lower surface of the sheet. Of course in other embodiments other approaches may be used. The fluid accepting openings are in fluid connection with a conduit schematically represented 182 which is in fluid connection with a drain 184 which delivers the water outside the machine. As represented in FIGS. 18 and 19 the trough 180 is in operative connection with a fluid fitting 184 which connects to a generally flexible fluid conduit 182 such as a tube. The conduit 182 connects to the drain 184 which in the exemplary embodiment includes a cavity at a lower side of the fascia and which includes openings through which the water may drain to the outside of the machine housing.

In the exemplary embodiment a tube support 186 is positioned to control the direction of the tube and assure drainage when the cash acceptor mechanism is in the operative position as well as when the cash acceptor mechanism is in a service position such as is shown in FIG. 12. In the exemplary embodiment the tube support minimizes the risk of the fluid conduit being crimped or otherwise assuming a position which prevents the drainage of water from the interior of the chute to the outside of the machine. It should be understood, however, that the approach shown is exemplary and in other embodiments other approaches may be used.

In the exemplary embodiment, provision is made to minimize the risk of moisture entering the machine in the area of the cash accepting opening through which the chute 82 extends in the operative position of the cash acceptor mechanism 80. As shown in FIGS. 18 and 19, in the exemplary embodiment a resilient gasket 188 extends in surrounding relation of the chute 82 in the area adjacent to the fascia. The resilient gasket is supported on a front face of the cash acceptor mechanism. As shown in FIG. 19, when the cash acceptor mechanism 80 is positioned such that the chute extends through the cash acceptor opening 40 in the fascia, the resilient gasket is positioned in sandwiched fluid tight relation between the front face of the cash acceptor mechanism and the interior face of the fascia. As the seal provided by the gasket extends in surrounding relation of the chute, the risk of moisture or other contaminants entering the machine through the cash acceptor opening is minimized. Of course it should be understood that this approach is exemplary and in other embodiments other approaches may be used.

As discussed in connection with FIG. 2, the cash acceptor mechanism 80 in response to operation of the validator device 88 and the controller 64 determines at least one characteristic indicative of whether financial instrument sheets are acceptable to the machine. In the exemplary embodiment unacceptable sheets may be suspect sheets such as potentially counterfeit notes, invalid checks or other unacceptable documents. When such documents are detected, they are directed to a storage area 100 which in the exemplary embodiment is within the cash acceptor mechanism and outside the chest portion. Periodically these unacceptable sheets must be recovered by servicing personnel for purposes of either verifying the invalidity of the sheets or for purposes of tracing the sheets to the user who placed them in the machine. In the exemplary embodiment such sheets are recoverable by authorized persons who have access to the upper housing portion 54 but who may be prevented from having access to the chest 48 where documents determined to be valid are stored.

In the exemplary embodiment access to the storage area 100 is controlled by a suitable access device. In one form of such an access device shown in FIG. 12, an opening 190 is provided to the storage area 100. Access to the opening is controlled by a flip-down access door 192. In some embodiments, the flip-down access door 192 may be opened only when the cash acceptor mechanism 80 has been moved rearward to extend outside of the housing subsequent to opening access door 58. In some embodiments the flip-down access door may be provided with a locking mechanism 194 such as a key lock or other suitable locking mechanism. As a result in this exemplary embodiment in order to access the sheets in the storage area 100, the user could be required to have the necessary capabilities through keys, combinations or otherwise to unlock both lock 62 on access door 58 as well as lock 194 and flip-down door 192 in order to access the sheets. It should be understood, however, that although in the embodiment shown the cash acceptor mechanism 180 is shown retracted out of the machine to facilitate opening the flip-down door and extracting the sheets, in other embodiments the flip-down door may be sized, segmented or otherwise adapted such that the cash acceptor mechanism may not need to be retracted from its operative position in order to access sheets in the storage area 100.

FIG. 13 shows yet a further alternative for accessing sheets in the storage area 100. In this exemplary embodiment an opening 196 is provided through the storage area so as to enable access to the sheets therein. Access through opening 196 is provided to a sliding door 198. Door 198 is operative to slide along the direction of Arrow S in opposed tracks, slots or other suitable mechanisms for holding and guiding the door in supporting connection with the cash acceptor mechanism. In some embodiments door 198 may include a locking mechanism 200. Locking mechanism 200 may be a suitable key, combination or other locking mechanism for assuring that only authorized personnel are enabled to access the documents in the storage area.

As can be appreciated from FIG. 13, door 198 may be both unlocked and opened without having to retract the cash accepting mechanism rearward. In some embodiments this may serve to speed servicing and the removal of invalid sheets from the machine. FIG. 14 shows yet another exemplary embodiment for accessing sheets in the storage area 100.

In this embodiment an opening 202 is provided in a rear face of the cash accepting mechanism 80. Access to opening 202 is controlled by a door 204. In the exemplary embodiment door 204 is a sliding door adapted to be selectively moved in tracks, slots or similar devices. In some embodiments a suitable locking mechanism schematically indicated 206 is used to assure that only authorized personnel have access to the door. In the embodiment shown in FIG. 14, a transport 208 is provided for moving the sheets in the storage area 100 to the service personnel through the opening 202. A transport 208 may be operative in response to provided inputs to input devices by the servicing personnel or may be automatic responsive to the opening of the door 204. Of course it should be understood that all of the approaches shown are exemplary and in other embodiments other approaches may be used.

In some exemplary embodiments suspect notes or other documents are correlated with particular transactions conducted at the machine and/or with particular users of the machine. This may be accomplished through operation of the validator and the controller. In some exemplary embodiments the suspect documents in storage may be arranged in a particular order and the controller is operative to provide one or more outputs such as through a screen or a printer indicating the transactions and/or users which correspond to the suspect sheets. Alternatively or in addition, provisions may be made for the cash acceptor mechanism to be in operative connection with a printer which prints transaction and/or user identifying information on each of the suspect sheets. This may include for example, visible or non-visible indicia. In some embodiments the indicia may be removable such as removable labels or indicia that can be washed off or otherwise removed or neutralized. In other embodiment the characteristics determined by the validator may be such that the data is sufficiently detailed and of types that create a unique electronic profile of each suspect sheet. This data can be stored at the machine in a data store through operation of the controller or elsewhere in a connected data store. This sheet identifying data may then later be used by a servicer or other persons recovering or analyzing the suspect sheets to correlate each sheet with the transaction and/or user that provided the sheet to the machine. This may be done in some embodiments by putting the machine controller in a mode for such analysis and feeding each suspect sheet through the cash acceptor mechanism. The controller may then operate to correlate the stored data related to the transaction and/or user with the stored data that uniquely identifies the sheet. Such information is then provided to a user of the machine recovering the sheets. Alternatively, such analysis may be conducted by transferring data away from the machine along with the suspect sheets, and conducting the analysis at another validator. Of course these approaches are exemplary of approaches that may be used to uniquely identify a suspect sheet and associate it with a user and/or a transaction.

In the exemplary embodiment of the cash acceptor mechanism 80, it is desirable to maintain the interior components of the cash acceptor mechanism isolated and in sealed relation except when access is required for servicing. As can be appreciated, while the exemplary embodiment positions the cash acceptor mechanism in intermediate relation between a vertically extending wall of the generally L-shaped chest and the wall of the housing to provide enhanced security, it also presents challenges for servicing. While the ability of the exemplary embodiment to move the cash acceptor mechanism rearward through a service opening of the machine facilitates servicing, problems are still potentially presented by the need to have to remove cover panels and the like. Further, there is always a risk that cover panels, once removed, will not be replaced resulting in infiltration of contaminants to the cash acceptor mechanism and causing malfunctions or failures.

Figure 15:
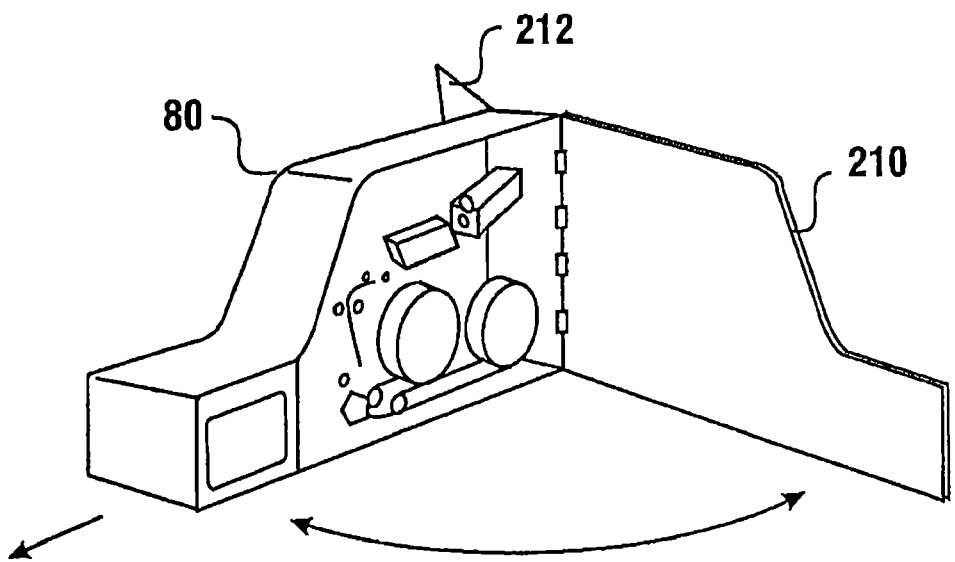
FIG. 15 is a schematic view of the cash acceptor mechanism with a first form of a service panel shown in an open position for purposes of servicing.

To reduce the risk of service persons not replacing service panels, the exemplary embodiments are made to minimize the risk that service panels will be removed and not replaced. As shown in FIG. 15, in one exemplary embodiment a side service panel 210 is mounted in hinged relation in supporting connection with the cash acceptor mechanism. This enables the service panel 210 to be opened once the cash acceptor mechanism has been moved rearward from the machine. This enables ready access to the components within the machine.

In addition in this exemplary embodiment, the front service panel 212 is mounted in hinged relation adjacent the front of the cash acceptor mechanism. This front service panel enables access to components accessible through a front opening of the cash accepting mechanism.

As can be appreciated because of the hinged character of service panels 210 and 212, the panels may be readily opened. However, the hinged mounting makes it difficult for a technician to entirely remove the panels from the machine. Further the cash acceptor mechanism cannot be returned to service without closing the service panels. Of course as can be appreciated, suitable latching mechanisms or other holding devices may be used so as to assure that once the service panels are returned to their closed position, they remain therein until such time as the service panels need to be opened again for servicing.

Figure 16:
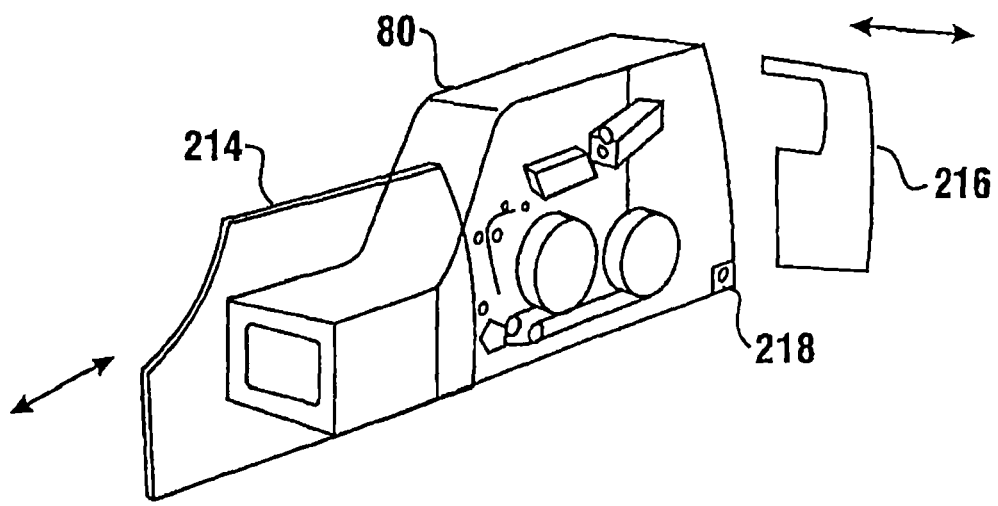
FIG. 16 is a view of the cash acceptor mechanism similar to FIG. 15 but with an alternative form of service panels shown in an accessible position.

FIG. 16 shows yet a further schematic view of an alternative approach to providing service panels on the cash acceptor mechanism 80 that provide protection for internal components and yet can be readily removed for servicing. In the embodiment shown in FIG. 16, service panels 214 and 216 are provided such that they can move in the direction indicated by the adjacent arrows. Service panels 214 and 216 in the exemplary embodiment are mounted in channels, slots or other suitable devices on the cash acceptor mechanism for guiding and holding the panels in position. The useful aspect of the service panels shown in FIG. 16 is that the cash acceptor mechanism 80 need not be removed from the operative position in order to open the interior of the mechanism by moving the service panel. Indeed in the exemplary embodiment, service panel 214 may be entirely removed exposing the components of the cash acceptor mechanism without moving the cash acceptor mechanism from the operative position. Service panel 216 which may include the front face supporting the resilient gasket, may be made more readily removable by moving the gasket relative to the chute. The ability to remove service panels may be particularly useful in situations where a service person needs to observe the cash acceptor mechanism in operation in order to diagnose and remedy certain problems.

In some embodiments it may be desirable to include devices to assure that the service panels 214 and 216 are reinstalled on the cash acceptor mechanism after servicing procedures are completed. This may be accomplished by including contact switches such as the contact switch schematically represented as 218 to sense when the service panels have been placed back in position. Such contact switches may limit the operation of the cash acceptor mechanism until such panels are replaced. Alternatively the circuitry within the machine may cause an alarm or other indication to be given or may disable operation of the currency acceptor mechanism if the access doors to the upper housing are closed and the service panels have not been returned to their operative position. Of course other approaches may be used.

As can be appreciated, the arrangements of service panels shown in FIGS. 15 and 16 for the cash acceptor mechanism are exemplary and in other embodiments other approaches may be used.

In the exemplary machine 10 there is also included a mechanism for dispensing cash through the cash dispensing opening 38 in the fascia. This cash dispensing mechanism generally indicated 220 is schematically represented in FIG. 3. In the exemplary embodiment the cash dispensing mechanism is positioned in the higher side of the generally L-shaped chest and includes a plurality of note storage areas 222, 224, 226, 228, 230 and 232. In some exemplary embodiments the note storage areas may be housed within removable currency cassettes which are suitable for holding notes and which may be readily removed from the machine. In the exemplary embodiment each of the note storage areas is in operative connection with a picker mechanism 234, 236, 238, 240, 242 and 244. Each of these picker mechanisms are selectively operative responsive to controller 64 to selectively dispense notes or other sheets from the corresponding storage area responsive to appropriate inputs to input devices of the user interface. In some exemplary embodiments the picker mechanisms used may be similar to the picker mechanism 86 used to separate sheets from a stack in the cash acceptor mechanism 80.

In the exemplary embodiment a vertically extending transport 246 is in operative connection with the picker mechanisms and a presenter mechanism 248. In operation of the machine the presenter mechanism is operative to receive sheets dispensed by the picker mechanisms and to move the sheets upward through the transport 246 to accumulate the sheets into a stack schematically indicated 250. After the desired sheets have been accumulated, the presenter mechanism is operative to move the stack toward the cash dispensing opening 38 while the controller is operative to open the cash dispensing gate 42. This enables the stack of sheets to be dispensed to a user of the machine.

It should be understood that while in the exemplary embodiment the cash dispensing mechanism 220 has been described as dispensing various denominations of currency notes; in other embodiments the cash dispensing mechanism may dispense other types of sheets. These may include, for example, travelers' checks, stamps, vouchers, scrip, gift certificates, or other documents. Further, in some embodiments the machine may be operative to dispense combinations of both notes and other documents as may be requested by the user. Of course the mechanisms shown are exemplary and in other embodiments other approaches may be used.

In operation of the exemplary machine 10, a user operating the machine provides inputs sufficient to identify the user's account through the input devices of the machine. This may include, for example, providing a card and/or alpha-numeric data through the input devices which can be correlated through operation of the controller in the machine and/or by interaction with a remote computer to determine whether the card data corresponds to an authorized user as well as a financial account of the user. The controller thereafter operates the output devices of the machine so as to prompt the user to provide inputs and to select a particular type of transaction or provide other inputs. In situations where the user wishes to conduct a cash accepting transaction, the machine operates responsive to the controller 64 to open the gate 44 to the chute 82 which enables the user to provide a stack of notes or other documents into the machine.

In response to the user providing the stack of documents 84 and/or in response to inputs from the user, the cash acceptor mechanism 80 operates to unstack the documents through operation of the picker mechanism 86 and to determine at least one of the characteristics of each document through operation of the validator device 88. The determined characteristics of the documents may cause valid or acceptable documents to be routed through operation of the routing device 92 into the escrow device 94 where they may be temporarily stored. Also, the controller may operate the routing device 92 to direct suspect documents such as invalid documents or probable counterfeit notes to the transport 86 and the storage area 100.

In the exemplary embodiment once the documents have been moved past the validator, the controller may operate to advise the user of the machine's determination with regard to the documents through outputs through one or more output devices. In some exemplary embodiments the user may be offered the option to recover the valid or invalid documents or both. This may be accomplished by the escrow device delivering the documents to the same or different transports such that the documents may be returned to the chute or other area of the machine that is accessible to the user. Likewise if the option is offered, invalid documents may likewise be routed back to the user. Of course various approaches may be used depending on the particular machine configuration and the programming associated with the controller.

In the exemplary transaction, if the documents determined to be valid are to be stored within the machine, the controller operates responsive to inputs from the user and/or its programming to cause the escrow device 94 to deliver the documents. The documents are directed by the routing device 92 through the cash accepting opening 102 in the chest in which they are transported and stored in the appropriate sheet handling mechanisms or in an appropriate bulk storage container. In the exemplary embodiment the user's account is credited for valid sheets deposited. Information is collected concerning any invalid sheets provided by the user so that if the sheets are later determined to be valid, the user may be credited or alternatively the user may be contacted to determine the source of the invalid sheets. Of course as can be appreciated, this transaction is exemplary and in other embodiments other approaches may be used.

Using the exemplary machine 10 a user may also conduct cash dispensing transactions. This may be done either during the same session as a cash accepting transaction or as part of a separate session. In such a transaction the user of the ATM provides inputs to the input devices that are sufficient to identify one or more accounts of the user and/or other identifying inputs.

Responsive to prompts through the output devices, the user provides inputs indicating that they wish to conduct a transaction involving the dispense of notes or other types of sheets, and the amount, nature or character of the sheets that the user has requested.

Responsive to the inputs from the user the controller 64 is operative to cause the cash dispenser mechanism 220 and the picker mechanisms located therein to deliver the requested sheets to the presenter mechanism 248, which is operative to accumulate the requested sheets into a stack 250. Once the sheets are accumulated, the sheets are moved outward to the user as the gate mechanism is opened. Hereafter the controller operates to cause the value of the dispensed cash or other sheets to be charged to the user's account.

Some embodiments may be useful in handling sheets that include programmable tracking devices or other programmable memory devices thereon. For example some embodiments may be useful in handling sheets that include programmable radio frequency identification (RFID) data stores thereon. Still other types of sheets may include programmable tracking devices that have processing and data storage capabilities such as for example Memory SpotJ devices available from Hewlett-Packard. For example in some embodiments currency bills may include programmable tracking devices that can be programmed with data that can be later read to determine information concerning the bill. Such information may include data which is used to verify that the bill is genuine. Alternatively or in addition the programmable tracking devices can be used to store and deliver information about entities and/or transactions in which the bill has been involved. In still other embodiments programmable tracking devices may be used on sheets such as checks, tickets, script or other items for purposes of authenticating the genuineness thereof and/or indicating transactions in which such items have been used. Of course these approaches are exemplary.

In operation of an exemplary machine the machine may include one or more sensors which are operative to sense programmable tracking devices on currency bills or other sheets. Such sensors may operate based on radio frequency back scatter principles or other sensing techniques as may be appropriate. Alternatively or in addition, a machine may include one or more programming devices which are operative to program the programmable tracking devices included on currency bills or sheets. In some embodiments and depending on the type of programmable tracking devices, the sensors and programming devices may be separate or a part of the same device. In the exemplary embodiment shown in FIG. 2 such sensors and programming devices may be incorporated with the validator device 88. Alternatively one or more such devices may be separate and included in appropriate areas of the machine. In some embodiments sensors and programming devices may operate to program the devices on sheets that are moving through the machine while in others such devices may be read and/or programmed while in storage. Approaches taken will depend on the particular types of devices used, the type of sheets involved and the transaction functions carried out by the machine.

In some exemplary embodiments the machine may include sensors for sensing whether currency bills that are received by the machine include programmable tracking devices. For bills that include such devices, the at least one processor in the machine may operate the at least one programming device to include data in the memory associated with the tracking device on the bill that corresponds to the user and/or the transaction. This may include for example data corresponding to the name of the user, the user's account, the machine in which the bill is received, the time and date of the transaction, the amount involved in the transaction, the nature of the transaction and/or other data that corresponds to the transaction in which the bill is received. Of course these items are exemplary. Further in some embodiments the at least one processor associated within the machine may also operate to segregate bills that include programmable tracking devices and store them in a particular storage area. This storage area may be different than another storage area in the machine used to store bills that do not include such programmable tracking devices. Thus for example the machine may operate to store twenty dollar bills that include programmable tracking devices in one storage area while twenty dollar bills that do not include such devices are stored in a different area. In some embodiments the storage areas may be within containers that are removable from the interior of the machine.

In addition in some exemplary embodiments the at least one sensor may operate as a reading device to read data that is included in the memory associated with the programmable tracking device on each bill proximate to the time that the bill is input to the machine. The at least one processor in the machine may operate in accordance with its programming to record and/or analyze this data for particular data of interest. Alternatively or in addition the machine may transmit selected items of data from the bills to other computers for purposes of analysis. Such analysis may include information about transactions in which particular currency bills have previously been involved. Such information may be useful in terms of tracking activities such as detecting money laundering, improper payments, tax evasion or other activities that may be of interest. Of course these approaches are exemplary.

In some embodiments a machine may include bill dispensing devices that are capable of dispensing currency bills or other sheets that include programmable tracking devices. In some embodiments such machines may also include dispensing devices that are also capable of dispensing currency bills that do not include programmable tracking devices. Such embodiments may include machines that include bill receiving devices and cash dispensers as part of an integrated mechanism such as a cash recycler. In other embodiments the machine may only include mechanisms that dispense bills from storage. In still other embodiments machines may include separate bill receiving devices. Of course various combinations of such devices may be included in the same or different machines.

Some embodiments may operate in accordance with the programming associated with at least one processor to cause data to be included on bills or other sheets that are dispensed from the machine. This may be accomplished through operation of one or more programming devices in the machine. Such programming devices may operate, for example, to include data on currency bills moving in the machine that are going to be dispensed to a particular user. The programming device may operate to include data in the programmable tracking devices that include information that corresponds to the user receiving the bill and/or other information. Such information may include for example, the recipient's name, account number, the machine at which the bill is received, the transaction time and date, the transaction amount involved, the transaction type or other information. Of course this approach is exemplary.

In some embodiments the at least one processor in the machine is operative to provide outputs through the display of the machine which includes indicia advising the user that they are receiving currency bills that include programmable tracking devices. This may include for example outputs which indicate that the bill that they are receiving includes such tracking devices and/or the nature of the data which is being provided in memory on the bills. Of course in some embodiments such information may be output through other devices on the machine such as through a speaker, headphone jack or other type of device through which messages may be perceived by a user.

In some embodiments the at least one processor may be programmed to offer a user the option of not including any or certain data in the programmable tracking devices of bills or other sheets that are provided to the user. The user may provide one or more inputs to input devices on the machine to indicate that they do not wish the bills or other sheets that are received to include any or at least some of this data. In cases where a user has provided such inputs, the at least one processor operates so that such information is not included in the programmable tracking devices of the currency bills the user receives.

In still other embodiments the at least one processor may operate to give a user an option of receiving bills with or without such programmable tracking devices. For example some users may prefer to receive bills which do not include such programmable tracking devices thereon. The at least one processor may provide outputs giving a machine user an option to provide an input to select to receive such bills. By providing at least one input the user may indicate to the machine that the bills to be dispensed should not include such programmable tracking devices. The machine may then operate in accordance with its programming to dispense only bills to that particular user that do not include such programmable tracking devices. In some embodiments the at least one processor may also operate to provide outputs to a user to indicate that there is an additional charge for receiving bills that do not include such programmable tracking devices. If a user provides inputs indicating that they wish to receive such bills despite the additional charge, the at least one processor will operate to assess a charge for the receipt of such bills in addition to the face value associated with the bills. Alternatively in some embodiments the at least one processor in the machine may operate to store information in the machine concerning the user's request to receive bills without programmable tracking devices. Information about such transactions or the users involved therewith may be communicated by the machine to other computers for purposes of analysis. Such information may be used for example to identify possible illicit activities. Of course these approaches are exemplary.

It should be understood that although the exemplary use of programmable tracking devices on sheets is used in connection with currency bills, the principles may also be used in connection with other parts of sheets or items. These may include for example tickets, checks, scrip, gaming materials or other items that can be redeemed for goods or services. For example and without limitation, the principles described can be used in conjunction with gaming systems of the type described in U.S. Provisional Application Ser. No. 60/789,644 filed Apr. 5, 2006 the disclosure of which is incorporated herein by reference in its entirety.

It should be understood that the transactions described are exemplary and additional types of transactions may be carried out through operation of various embodiments. In addition as previously discussed, mechanisms that are operative to both accept and dispense cash such as those described in the incorporated disclosures may be utilized as substitutes for, or in addition to, the mechanisms described herein so as to carry out transactions. Other types of transaction function devices may be included in some embodiments. For example as previously discussed, embodiments may include a scanner which enables the machine to image and validate checks. In such cases it may be desirable for the machine to have the capability to cancel the check or destroy the check so there is no risk that the check may be later be stolen and used fraudulently. In some embodiments suitable mechanisms may be provided for carrying out such functions. In addition it may be desirable in some embodiments to have the machine produce bank checks, travelers' checks, tickets or other documents and suitable mechanisms may be provided for producing such documents in the selected amounts. Further, in alternative embodiments features used by merchants such as devices for accepting deposit bags, dispensing rolled coin and other devices may be incorporated into an automated banking machine having features described herein. As can also be appreciated, features of the exemplary embodiments may also be used in numerous other types of automated banking machines.

Exemplary embodiments include light emitting devices 17, 31, 41, 43 and 45. In the exemplary embodiment the light emitting devices are positioned in areas on the user interface at locations associated with particular transaction function devices. For example, light emitting device 31 is associated with the receipt printer 30 and light emitting device 17 is associated with the card reader 16. In the exemplary embodiment the light emitting devices are in operative connection with the one or more controllers in the machine. In addition, such devices are capable of emitting light of selected colors at particular times during the transaction responsive to the operative condition of the transaction function device of the machine with which the light emitting device is associated.

In the exemplary embodiment the light emitting devices include an array of LEDs of different colors embedded on a flexible circuit. For example, FIG. 22 represents light emitting device 31. However, it should be understood that in the exemplary embodiment all the light emitting devices are generally similar. Light emitting device 31 includes an array of LEDs 304 connected through a circuit on a flexible substrate such as a polymide film, for example, DuPont Kapton7 material, and includes a flexible connector portion 306. The flexible connector terminates in an electrical connector 308. Electrical connector 308 is releasably connectable to a driving circuit or other electrical circuit in the machine which operably connects to one or more controllers for purposes of controlling the illumination of the light emitting device.

As shown in FIG. 23, in the exemplary embodiment the light emitting device includes three different color LEDs. These LEDs are red, green and yellow, which are represented by "R," "G," and "Y" in the figures as shown. As represented in FIG. 23, in the exemplary embodiment the LEDs are in an array such that LEDs of only one color are vertically aligned along a single line of the light emitting device. For example, as shown in FIG. 23, a line 310 comprises a line of vertically aligned red LEDs. As shown in FIG. 23, a line 312 is a line of only green LEDs, and a line 314 of only yellow LEDs. As shown in FIG. 23, in the exemplary embodiment the lines repeat so that there are five vertical lines of each color LED. It should be understood that while in the exemplary embodiment the LEDs of each color are arranged in vertically aligned relation; in other embodiments other arrangements such as horizontal alignment or other matrices of LEDs may be used. It should also be appreciated that although the LEDs are connected electrically in series as shown in FIG. 24, the electrical connections on the flexible circuit provide for spaced vertically aligned pairs of LEDs of only one color. As shown in FIG. 25, in the exemplary embodiment the light emitting devices are supported in a flexible web. The web is thin in the preferred embodiment, having a thickness of approximately 1.20 millimeters. This facilitates the positioning of the light emitting devices on the user interface. In the exemplary embodiment, LEDs which are represented 316 and 318 are mounted on a base layer 320 including the circuit on a flexible substrate. An outer layer 322 which in the exemplary embodiment comprises a polyester layer overlies the LEDs. A spacer 324 extends between the base layer and the outer layer. As best shown in FIG. 23 multiple spacers may be used. In the exemplary embodiment the spacers are positioned outboard of the LEDs and include openings 326 to facilitate positioning the light emitting devices on the machine. This may include, for example, extending pins, studs, or fastening devices through the openings so as to secure the light emitting devices in the proper position. Further, in the exemplary embodiment the release layer includes an underlying adhesive layer 328. The adhesive layer enables attaching of a light emitting device to a selected area within the machine. The adhesive layer is initially exposed for purposes of attaching the light emitting device by removal of an adhesive release layer 330 as shown in FIG. 25.

In an exemplary embodiment the light emitting devices are attached to components of the machine with which they are associated. This may be done, for example, by using modular construction for the transaction function devices within the machine and attaching the particular light emitting device to the associated module. For example, FIG. 18 shows the cash accepting device 80 which is arranged as a modular device for purposes of processing sheets that may be received in the machine. In the exemplary embodiment the associated light emitting device 41 is mounted in supporting connection with the module. The adjacent fascia area of the machine provides an opening through which the light emitting device may be viewed when it is in the operative position. In some embodiments the fascia of the machine may include a transparent or translucent material separating the light emitting device from the exterior of the machine. However, in other embodiments the light emitting devices may be exposed on the exterior of the machine. The attachment of the light emitting devices directly to the modular components of the machine may facilitate assembly and service of the machine. Placing the light emitting device directly on the module of the transaction function device with which it is associated, may reduce the amount of wiring and connectors needed for purposes of assembly and service.

In the exemplary embodiment the multicolor light emitting devices are operated under the control of one or more controllers in the machine. Each light emitting device is operated to emit light of a selected color and/or in a selected manner responsive to the operative condition of an associated transaction function device. For example, exemplary machines may be selectively programmable to emit a particular color light responsive to a given operative condition. For example, the light emitting device adjacent to the card reader may emit green light when it is ready to receive the card of a user, and then change to a yellow light after the card has been received therein. Alternatively or in addition, lights of a different color may flash or alternate to reflect conditions of a particular device. Further, for example, in the event of an improper action such as a user attempting to insert a card into the card reader incorrectly, the controller may be programmed to have the associated light emitting device emit red light or otherwise flash a color of light so as to indicate to the user that they have done something improper. Similarly, if a particular transaction function device is malfunctioning or not available, red light may be output.

In some exemplary embodiments the controller may be programmed so as to illuminate the light emitting devices to guide a user in operation of the machine. This may include, for example, illuminating or flashing a particular colored light to indicate a required user activity at a particular location on the machine. For example, at a particular time in the transaction the controller may cause to be output on the display an indication to the customer that they are to take their receipt. When the machine has delivered the receipt, the controller may operate to cause the light emitting device 31 associated with the receipt delivery to illuminate, flash or otherwise indicate to the user that activity is required by the user in the area of the receipt delivery slot.

In some exemplary embodiments the controller may be programmed to cause the light emitting devices to selectively illuminate intermittently and for a different duration depending on the operative condition of an associated device. For example, if a user provides inputs so as to request a cash-dispensing transaction, the light emitting device 43 adjacent to the cash dispensing opening may illuminate in a yellow condition as the machine operates internally to move bills toward the cash dispensing opening. Thereafter as the bills are pushed through the opening and presented to the user, the controller may cause the color of the light emitting device to change to green. In addition, the controller may cause the green light to flash so as to draw the user's attention to the fact that the money is ready to be taken. Further, in an exemplary embodiment, if the user has not taken their cash after a certain time and the machine is programmed to retract it, the controller may cause the light emitting device to flash or may operate so as to flash different colors in an alternating fashion so as to capture the attention of the user prior to the money being retracted.

In other embodiments, the colors emitted by the light emitting devices may be selectively programmed based on aesthetic reasons. For example, if the entity which operates the machine has particular trade dress involving certain colors the controller may be programmed to have the light emitting devices correspond with that trade dress. Thus, for example, if the particular entity's trade dress color is green, the machine may be programmed to utilize the green LEDs as lead-through indicators in prompting the user in how to operate the machine. Likewise if a different operating entity with a similar machine utilizes yellow as part of their trade dress scheme, the controller may be programmed to illuminate the yellow LEDs in the light emitting devices as the lead-through indicators.

It should further be understood that although the use of three colors of light emitting devices is shown, this is exemplary and in other embodiments additional types of light emitting devices may be provided. In addition it should be understood that although light emitting devices in the exemplary embodiment are arranged so that only one color may be output from a given light emitting device at a given time, in other embodiments provision may be made to illuminate multiple color LEDs simultaneously. In such arrangements, LEDs in primary colors may be included so as to achieve ranges of hue through color combinations. This may be done by illuminating multiple light emitting sources simultaneously and/or varying the intensity of such sources through operation of a controller so as to achieve various colors. This may include, for example, providing for a gradual change in the hue of the light emitting device in accordance with the status of the associated transaction function device. This may include, for example, providing an indication to the user of the status of the completion of a particular task. Combinations of two or more colors may also be selectively produced. It should also be understood that although LEDs are used as the light source in the exemplary embodiment, in other embodiments other approaches may be used. It should be understood that the structures and operations described are exemplary and numerous other structures and methods may be used.

Figure 26:
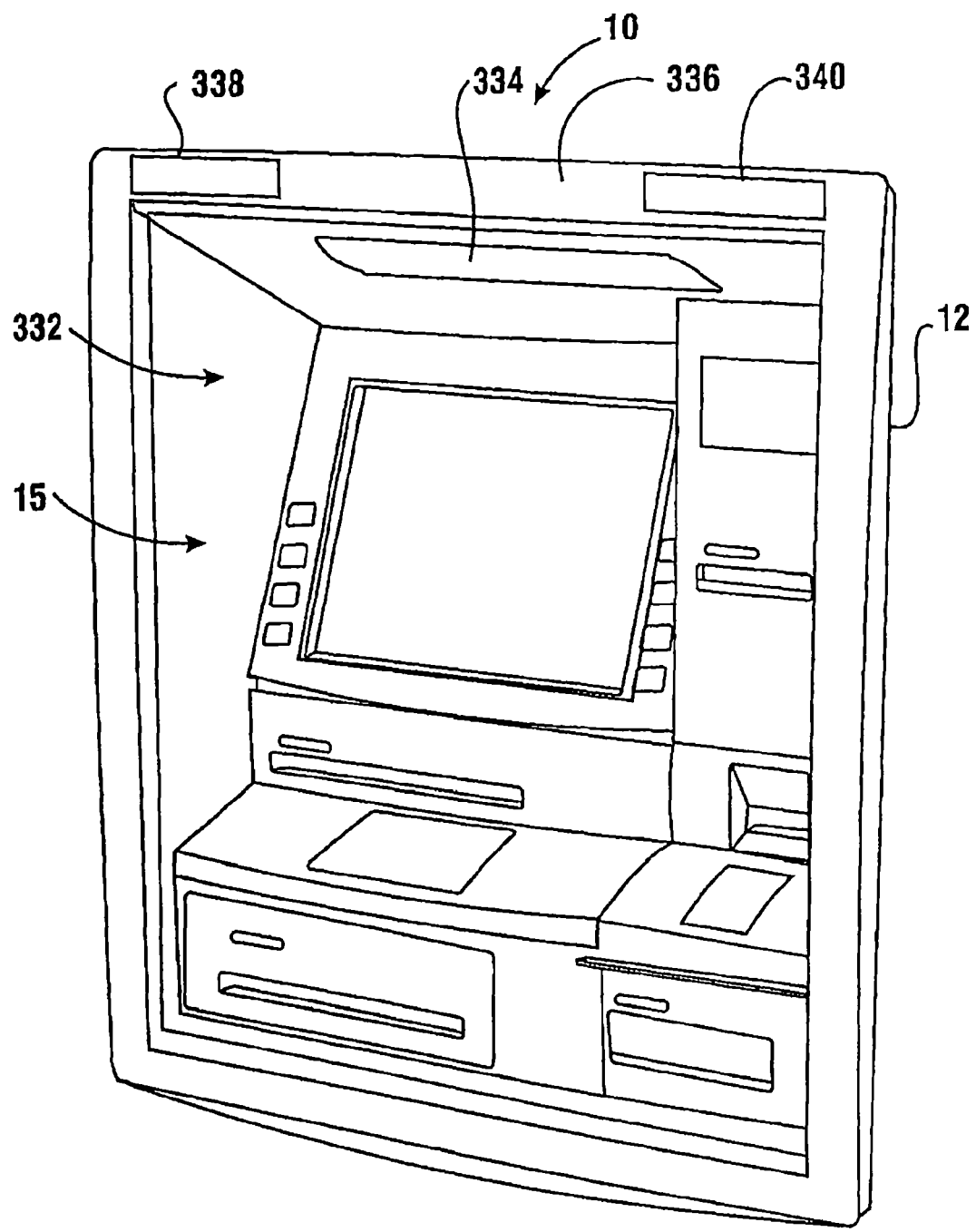
FIG. 26 is an isometric view of the fascia shown in FIG. 1 and particularly the mirrors thereon which facilitate a user viewing the area adjacent to them when operating the machine.

In some exemplary embodiments of ATM 10, provision is made to facilitate a user's operation of the machine and to minimize the risk of persons improperly observing a user or their activities. Such undesirable activities may include, for example, unauthorized persons observing the user's input of their PIN number or other data. As shown in FIG. 26, fascia 12 of the exemplary embodiment includes a recessed area 332 in which the display, function keys, card reader and receipt outlet are positioned. This recessed area 332 is illuminated by a light source 334. Light source 334 provides illumination generally in the downward direction so as to enable the user to more readily view the locations of the input and output devices on the fascia of the machine.

In the exemplary embodiment the fascia 12 includes a top panel portion 336 which is positioned generally above the light source 334 and the user interface of the machine. As represented in FIG. 26, the top panel portion includes a pair of convex mirrors 338, 340. The convex mirrors 338, 340 are generally horizontally disposed and are positioned at opposed sides of the user interface.

Figure 27:
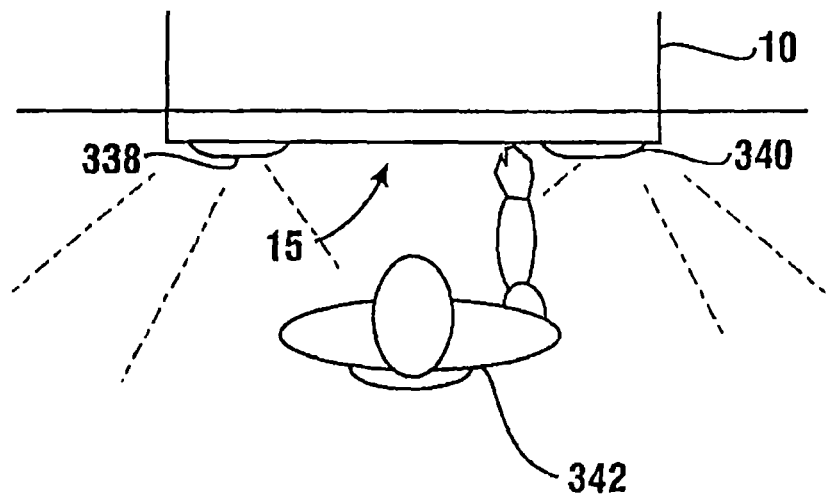
FIG. 27 is a schematic top view indicating the area viewable by a user operating the machine.

As represented in FIG. 27, a user 342 operating the ATM 10 will generally have their body aligned with the user interface 15 of the machine. As a result, the user is generally enabled to view in the convex mirrors an area behind the user generally indicated 343. The user is enabled to do this by looking in the mirrors 338 and 340 to the user's left and right, respectively. By looking in these mirrors, the user is enabled to generally see what is going on behind them as well as in a transverse direction from the area directly behind the user. This may enable the user to determine if one or more persons are in their proximity as well as whether such persons may be attempting to observe the user or their inputs to the machine. In some embodiments where the machine is operated in an external environment, lighting sources may be provided in the area 343 to facilitate the user's observation of persons who may be present therein.

It should be understood that the arrangement shown is exemplary and in other embodiments other mirror or observation arrangements may be used. In addition, in some embodiments provision may be made to maintain the cleanliness of the mirrors so as to reduce the risk that the user's ability to observe surrounding activities is impaired. These provisions may include, for example, automated devices which wipe the surface of the mirrors periodically. These may be external wiping devices or in some embodiments internal wiping devices. This may be accomplished, for example, by having the convex mirrors be in supporting connection with one or more rotatable members that may be periodically rotated within the fascia by a motor or other moving device that operates responsive to the machine controller so as to expose a new external surface. Cleaning devices on the interior of the fascia may operate to wipe contaminants from the surface of the mirror as it passes internally such that further rotation exposes a clean mirror surface to the user. This may include for example contact wiper blades that engage the surface of the mirror. Movement of the mirror surface such as rotation thereof in engagement with the wiper blades may serve to remove accumulations of dirt on the reflective surface. In some embodiments the mirror surface may be part of a cylindrical body, and rotation of the body about a central longitudinal axis may provide wiping action as the mirror surface moves past stationary wipers engaged therewith. In some embodiments the stationary wipers may be comprised of resilient material and/or may include movable mounting mechanisms so as to bias the wiper into engagement with the movable mirror surface. In alternative embodiments a reservoir of cleaning solution may be provided within or adjacent to the machine. A suitable pump or other device may be used to apply the cleaning solution to the mirror surface as it is moved relative to the wipers so as to facilitate the removal of dirt therefrom. Of course these approaches are merely exemplary and in other embodiments other approaches may be used.

In some embodiments the buildup of material on the mirror surface may be detected to determine when there is a need for cleaning. This may be done for example by providing a mirror that has some significant light transmission properties as well as light reflective properties in the manner of a half-silvered mirror. For example a radiation source and sensor may be positioned behind the mirror. In such embodiments radiation emitted by the radiation source is partially reflected from the interior of the mirror surface and the magnitude of the reflected radiation is sensed by the sensor. A buildup of dirt on the outer surface of the mirror changes the amount of radiation reflected from the internal radiation source to the sensor. In some exemplary embodiments the buildup of dirt on the exterior mirror surface increases the magnitude of radiation reflected from the internal mirror surface. This change in the magnitude of reflected radiation is detected and used as the basis for determining a need for cleaning the mirror. For example immediately after cleaning the mirror the ATM controller or other processor may cause the emitter to output radiation and the sensor to sense the magnitude of internally reflected radiation from an internal surface of the mirror. This initial value is stored by the controller in one or more data stores. Thereafter on a periodic basis, for example on a timed basis or after each or a set number of transactions, the emitter may again output radiation and the level of reflected radiation sensed. The controller may then compare the then current level of reflected radiation to the initial value.

In response to sensing a difference greater than the set amount, which difference corresponds to an unacceptable level of dirt built up on an exterior surface of the mirror, the controller operates to provide one or more signals. The signals result in the mirrors being cleaned. Such signals may include for example operating a device such as a motor or other mechanism so as to cause movement of the mirror to undergo cleaning. Alternatively in some embodiments the controller may cause a message to be sent to a remote servicer indicating a need for cleaning of the mirror surfaces on the fascia. In still other embodiments the controller may cause the machine to operate to try to clean the mirrors through the internal cleaning mechanism and then test the reflectance again after the attempted self cleaning. If the self cleaning effort does not cause the reflectance value to reach the prior initial value or within a programmed range (indicating perhaps that the mirror has been spray painted) the controller is operative to cause a message to be set to contact a remote servicer. Of course these approaches are merely exemplary and in other embodiments other approaches may be used.

In some other alternative embodiments the controller may sense for dirt on a mirror through the use of mirrors or other reflective devices that pass at least some significant amount of light therethrough from the exterior to the interior. One or more light sensors in operative connection with the machine controller are positioned behind the mirror surface. An external light sensor is positioned on the exterior of the machine to sense the level of ambient light. A controller is programmed to determine an unacceptable level of accumulation of dirt on the mirror based on the level of external ambient light that is sensed as passing through the mirror. This may be done for example by sensing the magnitude of the signal from the ambient light sensor and comparing the magnitude of ambient light to the magnitude of light sensed as reaching the sensor located behind the mirror. As can be appreciated when little or no dirt is accumulated on the mirror surface, the greatest amount of light will reach the sensor behind the mirror. As dirt accumulates, the level of light transmitted will decrease. If the magnitude of the light sensed as passing through the mirror and reaching the sensor relative to the level of ambient light declines to a preset ratio or other value, the controller may then operate in accordance with its programmed instructions to operate the necessary device to self clean the mirror, generate signals so as to contact a servicer, or take other appropriate action.

In further alternative embodiments one or more external ambient light sensors may be in operative connection with the controller, and an internal emitter and sensor behind a mirror surface that enables light to pass therethrough may also be used. In such embodiments the controller may be programmed to analyze the amount of ambient light that is expected to pass through the mirror and reach the sensor based on the ambient light level. In such circumstances the controller can compensate for the ambient light when sensing the level of reflected light from the internal emitter. Such compensation may further help more accurately detect when there is a need for the mirror to be cleaned. Of course the particular relationships and compensation levels will depend on the particular mirror configuration. Alternatively or in addition in some exemplary embodiments, the controller may operate so as to sense the level of ambient radiation and the magnitude thereof that passes through the mirror to reach the sensor at a different time than when the controller operates the internal emitter and senses reflected radiation. The controller may be operative to compare these two separate values and the relationship thereof and/or changes in reflectance and light transmissivity over time so as to determine when the mirror needs to be cleaned. Of course these approaches are merely exemplary and in other embodiments other approaches may be used.

In still other embodiments the mirrors may be operative only during transactions or portions thereof. This may be done for example by providing mirrors that are operative only when a person is sensed as adjacent the machine or the machine is involved in conducting a particular portion of a transaction. For example a sensor such as a sonic sensor, radiation sensor, weight sensor or other suitable device may detect a user in proximity to the machine. Upon sensing the user adjacent the machine the controller may be operative to cause one or more mirrors to be exposed externally on the fascia of the machine. This may be done for example by having movable members in supporting connection with the mirror surfaces driven by motors or other suitable moving devices that are in operative connection with the controllers. Upon sensing a user adjacent the machine the controller is operative to cause the motors or other moving devices to cause the mirrors to move into an operative position so a user can view the area behind them.

For example in some embodiments the reflective surfaces which comprise the mirror may be in supporting connection with a rotatable member. The rotatable member may be rotated when the customer is present at the machine so that the reflective surface is positioned so as to provide the user with a view of the area behind them. Further, when the customer is sensed as leaving the area of the machine, such departure of the user is sensed and the controller in response thereto is operative to cause the members that include the reflected surfaces to move so that the reflector surfaces are no longer exposed. Such an approach may provide an advantage in that the mirror surfaces are exposed to the elements only during the times when transactions are occurring and therefore are less likely to accumulate dirt as quickly. In addition, in some embodiments wipers or other suitable cleaning devices may be provided adjacent to the reflective surfaces so that as the reflective surfaces move the surfaces are wiped and cleaned so as to remain relatively dirt free.

Although in some embodiments the reflective surfaces may move into the operative position for a customer responsive to sensing a user adjacent to the machine, in other embodiments other approaches may be used. These may include for example moving the mirror surfaces to the operative position only in response to certain actions or certain transaction types being conducted by the user at the machine. Alternatively or in addition the mirrors may be moved to the operative position only in response to other conditions such as ambient lighting conditions, the time of day and/or the sensing of persons or objects entering an area behind the user in which persons or objects are sensed. Alternatively or in addition the controller may be programmed and appropriate sensors may be provided to move the mirrors to the operative position based on the nature of the use being made by the user of the machine. For example in a machine that is intended for both drive up and walk up use, appropriate sensors may be positioned so as to sense whether the user is positioned in a vehicle or has approached the machine on foot. This may be done for example through proximity sensors, magnetic sensors, weight sensors or other suitable sensors. The controller may be programmed to make a determination based on one or more sensor inputs whether the user is in a vehicle or is on foot. In situations where the user is determined to be in a vehicle the deployment of the mirrors to the operative position may be deemed unnecessary because the vehicle may serve to block access by unauthorized users to viewing the inputs that the user makes to the machine. Alternatively if the user is determined to have approached the machine on foot, the controller may be operative to deploy the mirrors to the operative position so as to assure that the user can view the area behind them in which unauthorized persons may be attempting to view inputs to the machine.

In still other embodiments, alternative or additional provisions may be made to further help to prevent the observation of inputs by users to the machine. For example in some embodiments the machine fascia may be provided with lighting that is directed rearward from the fascia outside of the line of sight of the user. Such rearward directed lighting, when activated, may operate to obscure the view of unauthorized persons or devices attempting to observe inputs by the user to a machine. Such rearward directed lighting may be selectively operative when a user is sensed as adjacent to the machine so as to reduce the risk of the interception of the user inputs and/or to provide lighting in the area behind the user. In other embodiments the controller may be programmed so as to be operative to initiate the rearward directed lighting only during certain portions of the transaction where the user is conducting certain activities. For example the controller may be programmed so as to activate the lighting when the user is providing an input of a PIN number which unauthorized persons may wish to intercept. Further in some embodiments the rearward directed lighting may be activated only at those times that the mirrors are moved into the activated position. Alternatively or in addition the lighting devices may be mounted in supporting connection with the mechanisms associated with the mirror structures. Further provision may be made in some cases so as to provide mechanisms for cleaning the lighting devices as they are moved into the operative position. Of course these approaches are exemplary and in other embodiments other approaches may be used. Further, the principles discussed may be used with other types of automated banking machines and in other circumstances other than those described in connection with the exemplary embodiment.

Figure 28:
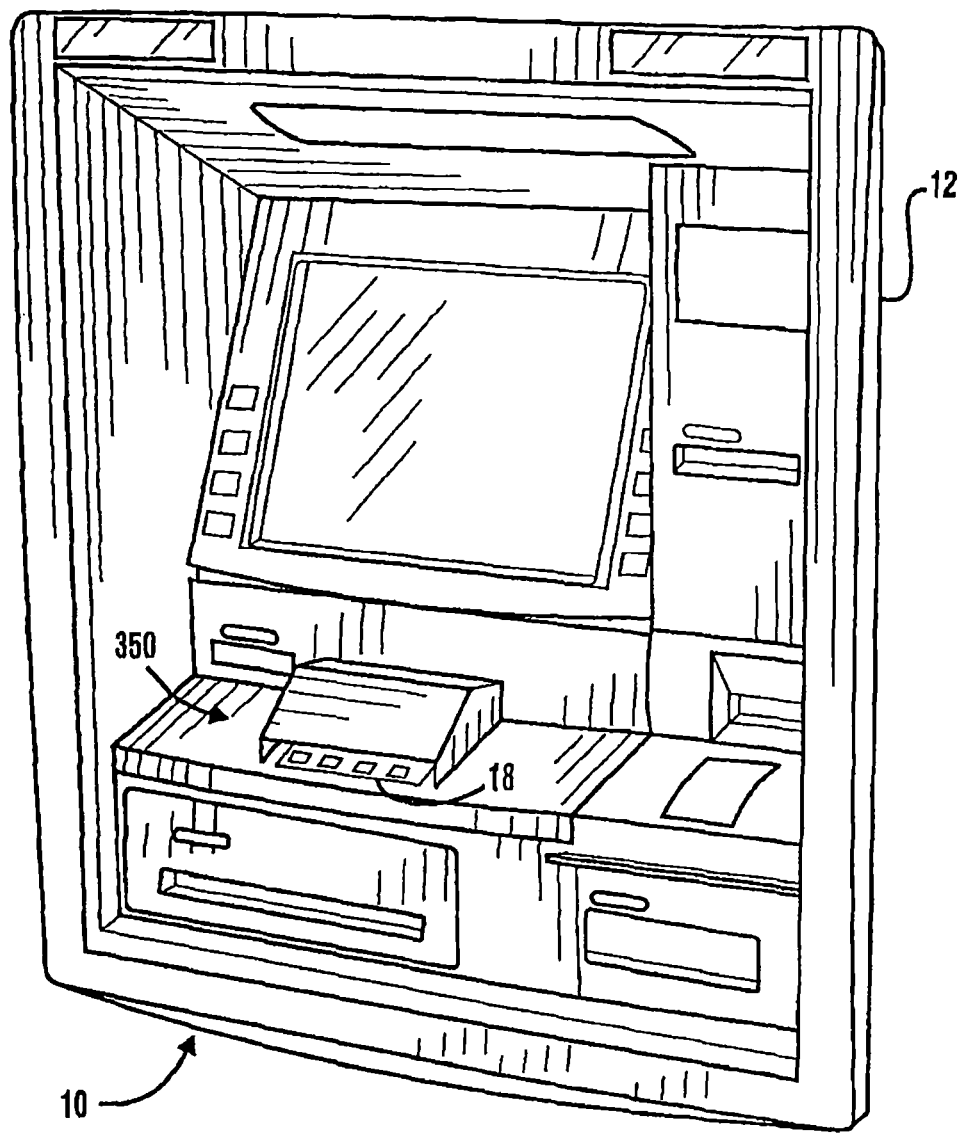
FIG. 28 is an isometric view of a fascia similar to that shown in FIG. 26 showing a concealment device.
Figure 29:
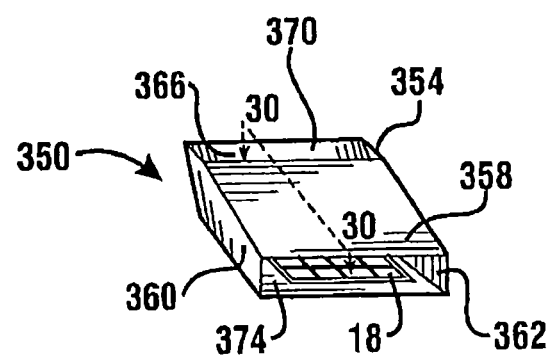
FIG. 29 is an isometric view of a concealment device shown as covering a keypad.

FIGS. 28-31 are directed to yet other exemplary embodiments to further help to prevent the observation of inputs by users to the machine by unauthorized persons. As shown in FIG. 28 a user input device which in the exemplary embodiment comprises a keypad 18 comprising a plurality of keys, may be covered by a concealment device generally denoted 350. As shown in FIG. 29, the concealment device 350 may include a body which is alternatively referred to as a casing 354, including top cover 358, first and second side walls 360, 362, respectively, and back wall 366 which bound an interior area. Elements of the exemplary casing 354 extend in generally surrounding relation of the keypad and in this embodiment cooperate to form a viewing portal 370. A viewing portal comprises an area in which a user can view the input device and the actuation thereof by the user such as by a user's fingers which are alternatively referred to herein as digits. In the exemplary embodiment shown viewing portal 370 is formed by a gap between the top cover 358 and back wall 366, although various other approaches may be used. For example, the top cover 358 may abut back wall 366 and viewing portal 370 may be cut out of the top cover 358. Viewing portal 370 may alternatively be an open slot, or it may be formed of transparent material. Alternatively, the viewing portal may comprise other combinations for indirect viewing and may include for example a camera or other image device in the casing, and a display positioned in a location for viewing only from a point of view of the machine user. In some embodiments the display may be the display of the machine, such as display 24. Alternatively the viewing portal may comprise one or more displays supported on the casing 354, the machine fascia 12 or other location that limits viewing of the inputs being made only to the machine user.

The elements of casing 354 cooperate to define an interior area 374. The user input device or keypad 18 may be accessible to a user through hand entry slot 376 which is bounded by the casing. The user in this embodiment is enabled to extend one or several fingers and a portion of their hand in the slot to actuate the keys of the keypad.

Figure 30:
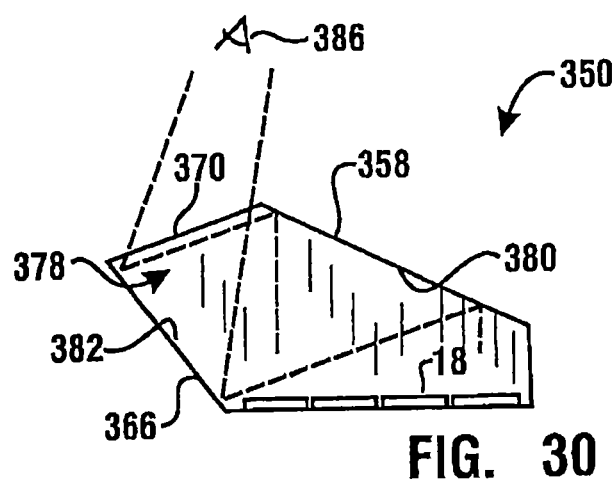
FIG. 30 is a cross-sectional view of a concealment device taken along the line 30-30 of FIG. 29.

With reference to FIG. 30, concealment device 350 includes an indirect viewing mechanism generally denoted 378. In this exemplary embodiment, the indirect viewing mechanism 378 includes reflecting surfaces within the interior area. A first mirror 380 is disposed on an interior surface of the top cover 358. A second mirror 382 may be positioned on an interior surface of back wall 366. In the exemplary embodiment, first mirror 380 is operable to reflect an image of user input device; in this example keypad 18 toward the back wall 366. Second mirror 382 is operable to reflect that image so that it can be viewed through the viewing portal 370. The viewing portal 370 is arranged to allow a user to view the reflected image from a viewing position in the user's line of sight 386. Thus indirect viewing mechanism 378 utilizes the properties of reflected light in order to allow a user to indirectly view inputs as they are being made by the user's fingers to keypad 18. The double reflection of the image of the keypad 18 presents an image in correct orientation to the user.

The arrangement and user's required body position necessary to extend a hand through the opening to actuate the keypad may prevent unwanted viewing of the user inputs from a position directly behind the user and the casing 354 operates to cut down on sight lines from viewpoints on the top and sides. In this exemplary embodiment, input device 18 cannot be readily viewed by a person other than one having a point of view of the user of the banking machine, thus enhancing the security of any input made.

A user may thus use the automated banking machine with greater confidence that various inputs, including a PIN, may not be readily viewed by another. Also, the exemplary embodiments of the concealment device 350 prevent unauthorized devices that may be positioned to view the machine fascia such as cameras, from viewing the input of the user's PIN.

Figure 31:
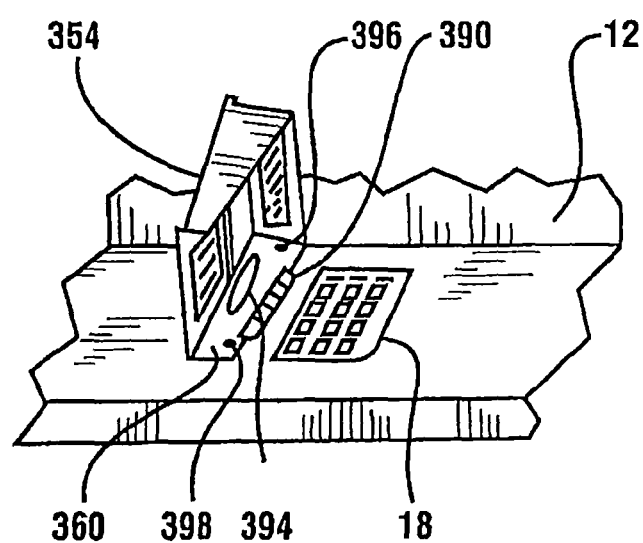
FIG. 31 is a partial isometric view of a fascia showing a concealment device in an uncovered position.

In yet another exemplary embodiment, an exemplary casing 354 is selectively positionable with respect to the user input device 18 between a covered position, as illustrated in FIG. 27, and an uncovered position, as illustrated in FIG. 31. The casing 354 or a portion thereof may be mounted in supporting connection with the fascia 12 via one or more hinges 390 or other supports which enable movement thereof. In this exemplary embodiment, hinge 390 extends between first side wall 360 and fascia 12 to allow selective positioning of casing 354. Thus, in this embodiment if a user believes that the added security of the concealment device is unnecessary under the circumstances, the casing 354 can be moved from its covered position to an uncovered position to allow direct viewing of the keypad 18.

In alternative embodiments the device may include a movable cover for securely providing access to the input device. For example the top cover 358 may be mounted in movable supporting connection with the casing. The top cover may be movable to an open position such that the input device becomes more accessible when the cover is moved from a closed position to an open position. In some embodiments based on the mounting, the size of the opening may be increased as the movable cover is moved from the closed position to the open position. In some embodiments a user may be able to open and close the cover or other enclosure as they deem fit. In alternative embodiments the casing may be held closed by a lock or other latching mechanism. The lock or latching mechanism may be opened by a servicer or other authorized person for servicing such as cleaning or other maintenance functions. Of course these approaches are exemplary and in other embodiments other approaches may be used.

In yet another exemplary embodiment, an exemplary concealment device 350 may include a lighting mechanism such as light 394, operable to illuminate interior area 374. The illustrated positioning of the lighting mechanism is merely exemplary and in other embodiments, other approaches may be used. For example, the lighting mechanism may be incorporated into the keypad 18, or may be mounted on the interior of the top cover 358. For example, the keypad may include a backlighting mechanism such that the keys are illuminated. Such an illumination mechanism may be combined with a mechanism that detects unauthorized devices that are intended to intercept a user's inputs. Such a system is shown in U.S. patent application Ser. No. 10/832,960 filed Apr. 27, 2004 which is incorporated herein by reference as if fully set forth herein. Alternatively or in addition, embodiments may include backlighting of the input device and lighting of the interior area from a direction other than that of the face of the input device. Such apparatus may help in viewing the user's fingers in actuating the keys of the keypad. In some alternative embodiments lights of difference colors may be used to further aid in viewing the input device and the user's fingers. For example in some embodiments the keypad may be backlit in one color while a light of a different color within the casing primarily illuminates the user's fingers. This may make it easier to view the user's fingers in relation to the keys of the keypad. Of course this approach is exemplary of many that may be used.

In still other embodiments provisions may be made to facilitate viewing the casing. For example in some embodiments, particularly those designed for use in an outdoor environment, moisture may tend to condense within the interior area of the casing. In some embodiments devices for minimizing condensation may be provided. Such devices may include for example, an air movement device such as a fan schematically indicated 396. The fan may be operative responsive to a controller or other device to cause air movement in the casing and minimize condensation of moisture. In some embodiments a heater 398 may be provided to heat air within the casing. The heater may be operative responsive to the controller in the machine or other controller to heat the air within the casing so as to reduce the risk of condensation.

In some embodiments sensors may be provided in or adjacent to the casing to detect conditions that likely result in condensation. These may include temperature and/or humidity sensors that are used to sense conditions that result in condensation. In response to such conditions the heater and/or the fan are caused to operate. Alternatively or in addition, sensor systems of the type previously discussed in connection with the detection of the need to clean the mirrors 338 and 340 may be used in connection with the reflective surfaces within the casing. For example, such approaches may be used for detecting condensation on the surfaces and may cause a controller to turn on and off the fan and/or heater as appropriate. Alternatively or in addition, signals from temperature and/or humidity sensors may also be used in the programs executed by the controller in deciding what actions to take. Alternatively in some embodiments, provision may be made for signaling the need for cleaning the reflective surfaces in a manner similar to that discussed in connection with the mirrors 338 and 340. Alternatively or in addition, provisions may be made in some embodiments for providing for automated cleaning thereof. It should further be understood that although the fan and heater are schematically shown in the casing, in some embodiments such devices may be positioned within the housing of the machine and suitable fluid conduits provided to achieve air flow and/or heating within the interior area of the casing. Of course these approaches are exemplary and in other embodiments other approaches may be used.

In some embodiments sensors may be provided to detect attempts to install unauthorized input interception devices. These may include for example, sensors that sense radiation properties within the interior of the casing so as to detect installation of an unauthorized device for detecting the pressing of keys. Alternatively devices for imparting vibration to the fascia and/or casing and sensing changes in vibration properties may be used to detect the presence of an unauthorized device. Alternatively or in addition, sensors which detect changes in levels or fluctuations in radio frequencies may be installed to detect the installation of a radio transmitter associated with an unauthorized input interception device. Approaches described may also be of the type disclosed in the incorporated disclosure of U.S. application Ser. No. 10/832, 960. Controllers in operative connection with such sensors which detect unauthorized input interception devices may be operative to notify a remote entity, modify operation of the machine, initiate countermeasures to prevent input interception, invalidate user cards and/or cause the machine to cease operation. Of course these approaches are exemplary and in other embodiments other approaches may be used.

In alternative embodiments other approaches may be used to minimize interception of inputs by unauthorized persons. For example in some embodiments the reflective surfaces may be configured such that a user's eyes must be positioned in a particular location to readily observe the keypad and fingers. As a result, an unauthorized person or device attempting to observe user inputs in a position that is remote or even relatively close to a user's position cannot actually observe the inputs. This might be done for example by using contoured mirror surfaces that enable a clear image only from a point of view in a particular location. In alternative embodiments the reflective surfaces and/or the casing may be made to be movable by the user. This could be done through a movable mounting of the casing in supporting connection with the fascia of the ATM such that the user can precisely position the spot at which the inputs may be readily observed. In some alternative embodiments the keypad or other input device may also be made movable such that the user can precisely position the portal for viewing. Such approaches may also make the ATM more readily suitable for use by both left and right hand users as well as persons of varying heights. Of course, these approaches are exemplary of many that may be used.

Of course as previously discussed, some embodiments may have an imaging device in the casing and may provide outputs for viewing on one or more displays. In some embodiments provision may be made to enable a user through hand and/or finger movements to adjust the position of one or more display screens or the position of the output image within a field of view such as on the machine display. For example, a display screen may be positioned on the casing, and may be movable with or relative to the casing to a desired position by the user to minimize the risk of input observation. Alternatively if an output though the display is used, the user may position a frame showing the user's fingers and input device selectively on the display in a way that assures it is blocked from viewing by others.

In some embodiments the display screen may be operative only during selected time periods during transactions when inputs to the input device are possible or required. For example, an image of the keypad and the user's fingers may appear only in a portion of the display during a transaction when the machine is in condition to receive confidential inputs. For example, the image may be output when a user is required to input a personal identification number (PIN). At other times the image of the input device may not be presented. Alternatively one or more sensors may sense the introduction of the user's fingers into the interior area of the casing and cause a controller in the machine to provide screen outputs. This may be appropriate for example in situations where a user enters various inputs such as a PIN, amounts or other instructions at various times during various transactions.

Further, in some embodiments a controller may be programmed to sense that a user is using voice guidance features for operating the machine. This might be done for operation of the machine by a visually impaired person. In such circumstances the machine may sense that a user has connected headphones to a headphone jack on the machine to receive audio instructions. In such embodiments the controller may operate to shut off or restrict viewing through the viewing device. This may include not having the image of the input device appear on the machine display or other screen. Alternatively in other embodiments the controller may not actuate the lights that enable viewing the input device in the casing. Of course difference approaches may be used depending on the particular embodiment.

It should be understood that while the exemplary embodiment is discussed as being in connection with a keypad, other embodiments may be used with other types of banking machine input devices.

Figure 32:
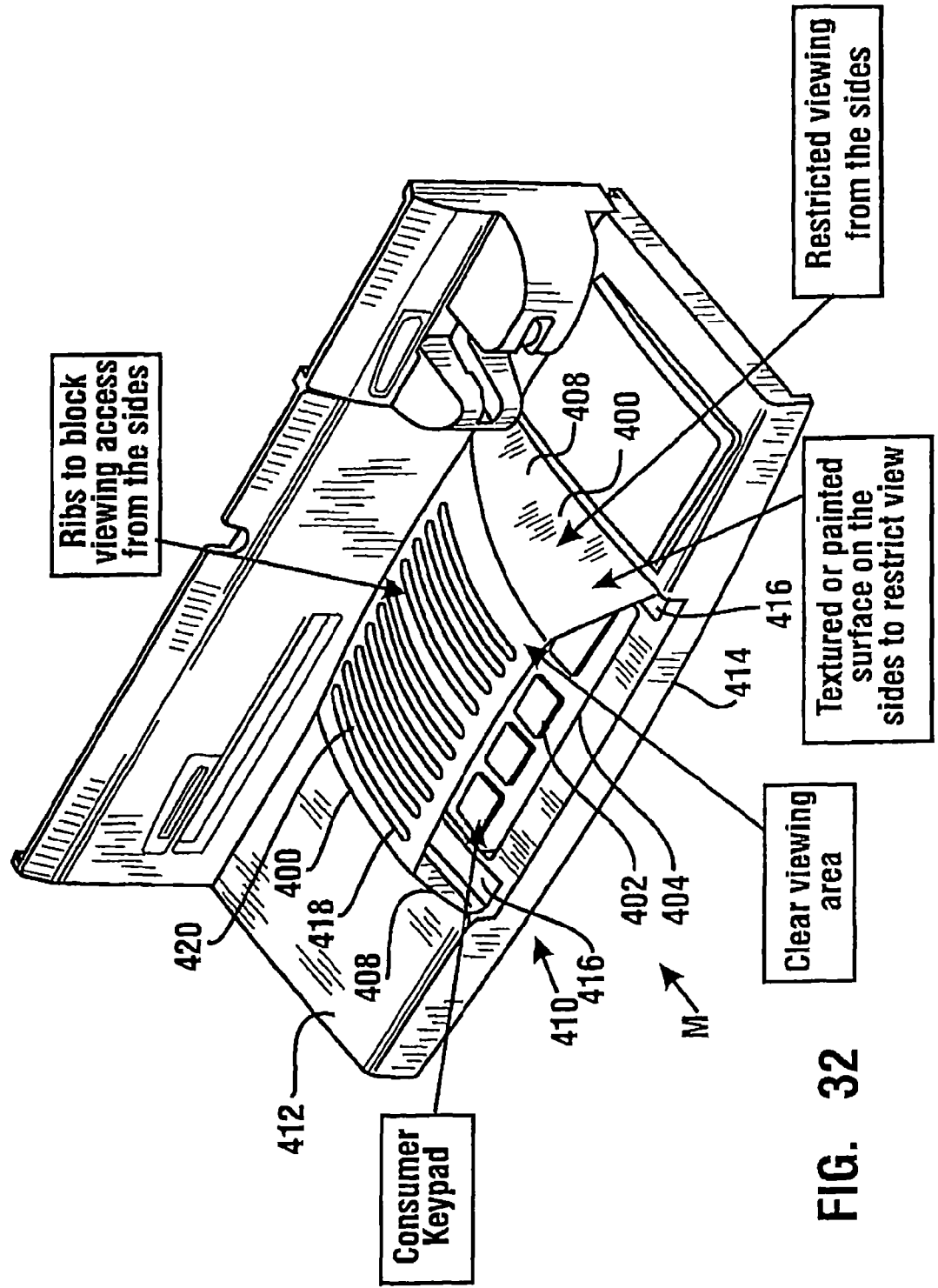
FIG. 32 is an isometric view of an alternative concealment device for preventing viewing of inputs to an automated banking machine customer keypad by unauthorized persons.
Figure 33:
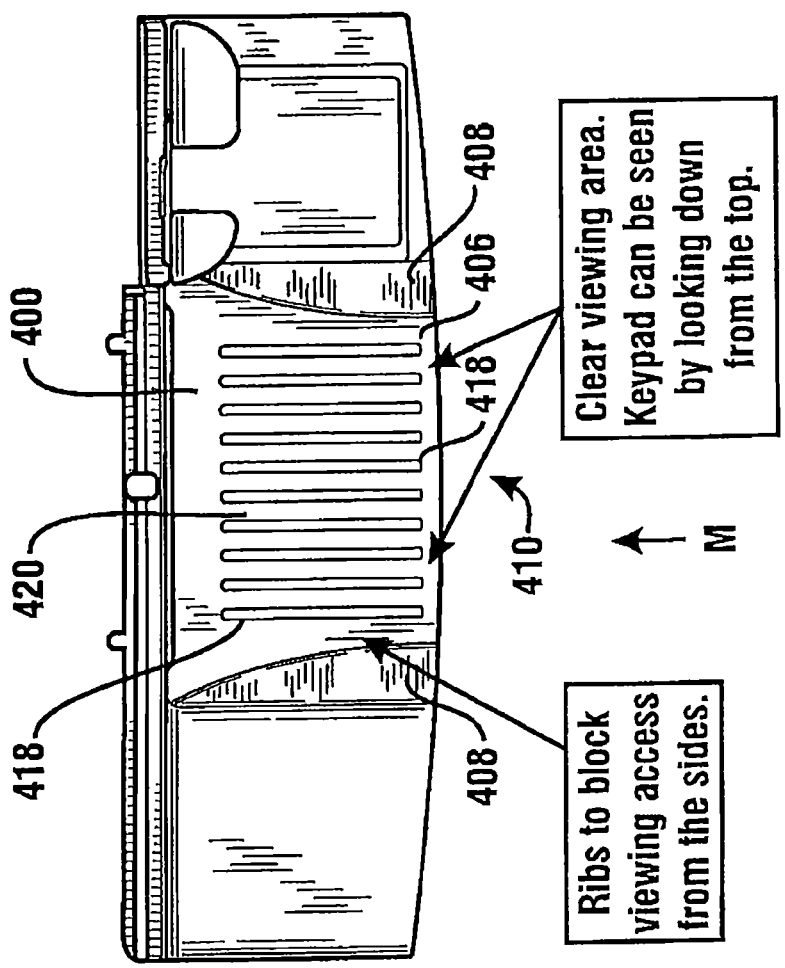
FIG. 33 is a top view of the embodiment of the concealment device shown in FIG. 32.

FIGS. 32 and 33 disclose an alternative embodiment that prevents the unauthorized viewing of customer inputs to a keypad of an automated banking machine. This exemplary embodiment includes a cover 400. Cover 400 overlies at least a portion of all of the keys 402 of a keypad 404. Cover 400 of this exemplary embodiment includes a top portion 406. Cover 400 also includes a pair of tapered side wall portions 408. Top portion 406 and wall portions 408 bound an opening 410. Opening 410 enables users to extend their digits through the opening generally in the direction of arrow M so as to enable a user to engage all of the key engaging surfaces of the keys which make up the keypad.

In this exemplary embodiment the cover 400 is attached to fascia 412. Fascia 412 includes a rectangular depression or recess 414. The tapered wall portions 408 terminate in inturned flange portions 416. In the exemplary embodiment the flange portions are sized so as to extend in corresponding shaped recesses or pockets within the recess 414 of the fascia. In the exemplary embodiment the inturned flange portions 416 engage the fascia in the pockets and are held in fixed engagement therewith through adhesive or other fastening devices. As can be appreciated from FIGS. 32 and 33, the exemplary embodiment provides for the tapered side walls 408 to extend upward from the recess 414 in the fascia in close abutting engagement with the generally vertically extending walls of the fascia which bound the recess. This helps to minimize the risk of vandalism in which the cover 400 is pried off the fascia.

In the exemplary embodiment the top portion 406 is generally tapered so that the top portion extends closer to the upper surface of the keys which make up the keypad with increasing distance from the opening 410. It should be understood however that the inner surface of the top portion remains sufficiently disposed from the keys so as to provide sufficient digit access thereto. Also in the exemplary embodiment the tapered side wall portions 408 taper inwardly with increasing distance from the surface of the keys and join with the top portion. In the exemplary embodiment the cover 400 is integrally formed of suitable plastic or other durable material. Of course in other embodiments other approaches may be used.

The exemplary cover 400 is constructed such that the tapered side wall portions 408 are comprised of generally nontransparent material while the top portion 406 is comprised of transparent material. This helps to assure that a user having a point of view of that of a user of the machine is able to view the keypad and the engagement of his or her digits with the keys through the top portion. Persons attempting to intercept the inputs of the machine user generally do not have the ability to intercept visual signals near the point of view of the machine user and are blocked from viewing the manual digit engagement of the keys by the generally nontransparent sidewalls 408.

In this exemplary embodiment cover 400 includes on the top portion 406 a plurality of elongated outward extending projections 418. The outward extending projections which are alternatively referred to herein as ribs extend generally along the direction of Arrow M. Extending between the projections 418 are visual openings 420. In the exemplary embodiment visual openings also extend on the top portion outboard of the furthest projection on each lateral side to the point where the top portion engages the tapered side wall portion. The visual openings provide for generally undistorted viewing of the keypad and the manual digit engagement of the keys by the user through the top portion. The elongated projections 418 operate to distort the view of the keys by unauthorized persons not having the point of view of the machine user. Thus in the exemplary embodiment even if an unauthorized person is able to place a camera or other viewing device in reasonable proximity to the top portion of the cover, the requirement to have the viewpoint of the camera offset from the point of view of the user results in the projections preventing the camera from having a clear view of the user's inputs. Of course this approach is exemplary and in other embodiments other approaches may be used.

In some embodiments of the cover 400 the elongated projections 418 may be configured so as to prevent the viewing therethrough even from certain points of view of a machine user. In such embodiments the machine user's view of the keypad from a narrow range of positions is sufficient through the visual openings 420 to provide the necessary inputs. In other embodiments the projections 418 may be configured so that moderately distorted viewing is possible therethrough from the point of view of the machine user. In such cases the distortion from the point of view of the user is limited, while viewing from a viewpoint angularly disposed from the machine user's point of view, is sufficiently distorted so that it is not reasonably possible to determine the user's manual inputs.

In alternative embodiments rather than having projections that extend outward from the top portion of the cover, the projections may extend inwardly so as to provide sufficient distortion in viewing from other than a user's point of view to reduce the risk of inputs being intercepted. In still other embodiments the projections may extend in various directions and in different ways as is appropriate to achieve a reduction in the risk of unauthorized viewing. In still other embodiments projections may be included on covers so that although the entire cover is comprised of transparent materials, the projections are configured to make viewing through the cover reasonably impossible from all but the desired point of view of the authorized machine user. Some embodiments may include features such as those previously discussed, to facilitate viewing by the authorized user. This may include for example, providing lighting within the cover so as to facilitate viewing by the user. Such lighting may include the provision of fiberoptic strands or other suitable light guides to facilitate the output of light of a suitable type so as to enable the provision of inputs by a user. Similarly fiberoptic outputs may be used to emit light from surfaces of the cover that help to obscure viewing of user inputs from viewpoints other than the user's point of view. This may be done selectively and at times during transactions when the machine is in a state to receive user inputs. This may be accomplished by at least one processor in the machine controlling the output from one or more light sources.

Further alternative embodiments may also include provisions for detecting and minimizing the risk of condensation within the cover. This may include for example, providing sensors for detecting condensation either inside or outside the cover. This may include for example sensors which sense the transmission of the light through the cover or which directly detect the presence of moisture. Such sensors may be in operative connection with one or more processors within the machine so that the machine can take appropriate steps to eliminate the problem and/or if the problem cannot be detected as having been remedied after the machine takes action, to cause the machine to notify an appropriate entity such as a service company. For example in some embodiments provision may be made for the machine to cause a flow of air to be directed beneath the cover on a periodic or continuous basis. Such air flow may be controlled so as to minimize the risk of condensation or other conditions which obscure viewing through the cover. It should further be understood that the techniques described in connection with detecting the accumulation of dirt on viewing mirrors may also be applied to assuring the sufficient clarity of the top portion of the cover so as to enable operation of the machine by users. Of course these approaches are merely exemplary and in other embodiments other approaches may be used.

Figure 39:
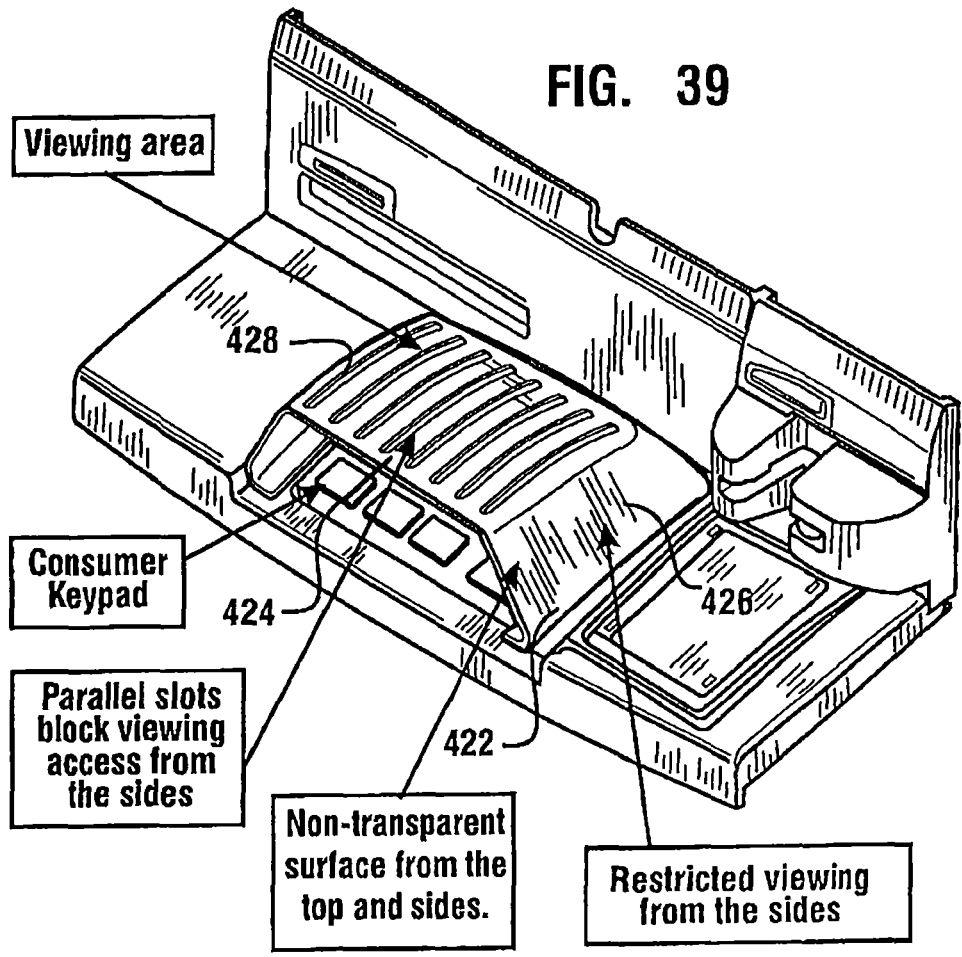
FIG. 39 is an isometric view similar to FIG. 32 but including an alternative form of a keypad cover.

FIG. 39 shows an alternative cover 422. Cover 422 is generally constructed and operated in a manner similar to cover 400 except as specifically discussed. Cover 422 of this exemplary embodiment has a top portion 424 and sidewall portions 426 comprised of generally nontransparent material. In this exemplary embodiment top portion 424 includes a plurality of parallel slots 428 which serve as visual openings. In this embodiment the visual openings 428 are openings through the top portion of the cover that are sized and spaced such that a user in a limited range of viewing positions at the user interface of the banking machine is enabled to see their manual digit engagement with the keys of the keypad underlying the cover through the openings. The exemplary openings are configured such that an unauthorized person or viewing device that is angularly disposed from the point of view of the machine user, is unable to adequately view the keys engaged by a user when performing a transaction. For example in this exemplary embodiment unauthorized users attempting to intercept inputs from a viewpoint to the side of the machine user do not have sufficient visual access to the keys to see what keys are being engaged. However, the openings will enable the machine user to see what keys the user is pressing.

Of course it should be understood that this approach is exemplary and in other embodiments other approaches may be used. This may include for example, providing visual openings of various dimensions, configurations and sizes in lieu of the elongated openings shown. As can be appreciated arrangements of visual openings of various shapes and sizes may provide a machine user within a suitable range of points of view with an adequate view of the keys of the keypad while obscuring viewing by unauthorized users. As can be appreciated in exemplary embodiments the ability of the covers to require that a user position their head and eyes in a particular area to view digit engagement with the keys, urges the machine user to position their body at the machine in a way that further blocks unauthorized observation of the user's inputs.

In alternative embodiments other approaches to producing the visual openings may be used. This may include for example, embedding materials within the cover so that the cover includes certain areas that are transparent and other areas that block viewing from a viewpoint disposed from the point of view of a user. Alternatively in some embodiments a plurality of structures, markings or other suitable devices may be included within the cover so as to only enable viewing therethrough from a permitted direction or location. This may include for example, achieving a light polarizing effect. Such effect may enable the person having the point of view of a machine user to be able to readily see through the top portion of the cover, while a device or person viewing the cover from an angle of incidence beyond the narrow range of a user's point of view is unable to see through the cover. In still other embodiments covers may implement electro-optic features to control the point of view from which user inputs can be detected. This may include for example including liquid crystal materials in at least a portion of the cover. The opaque or visible properties of the cover with respect to the field of view of the user may be controlled responsive to operation of at least one processor in the machine. For example the liquid crystal material may be activated in a selected area of the cover to enable viewing therethrough. On other areas the liquid crystal material remains opaque. In still other embodiments electro-optic properties such as providing a polarizing effect or Fresnel lens effect may be achieved to limit observation of the keys to a field of view of the user. In still other embodiments liquid crystal material within the cover may be used to provide a Fresnel lens effect which achieves magnification of the keys for a user. This may be selectively controlled through operation of a processor in the machine. Changes in magnification or focus effects achieved with the liquid crystal may be based on the user inputs to the machine or data stored remotely of the machine which is operative to determine when a particular user or user type is identified as operating the machine. For example if a user is sensed as connecting headphones to the machine so as to operate the machine in response to audio outputs, the at least one processor may operate to obscure all viewing of the keypad through the cover. Alternatively if a machine user indicates or is otherwise identified as one who requires magnification, the Fresnel lens properties may be used to provide magnification. Of course these approaches are exemplary and in other embodiments other approaches may be used.

Figure 37:
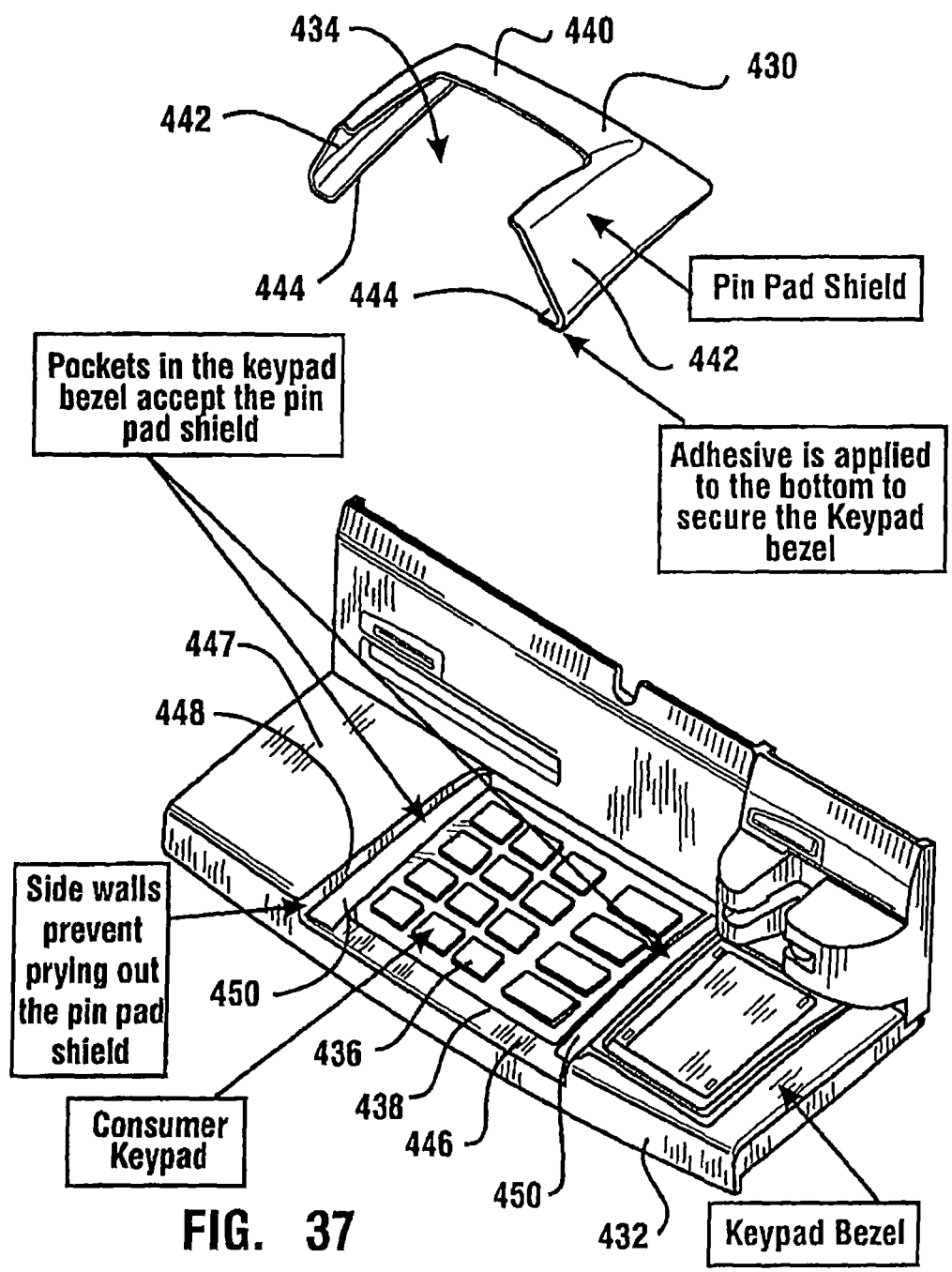
FIG. 37 is an isometric view of a portion of a banking machine fascia and an associated keypad cover.
Figure 38:
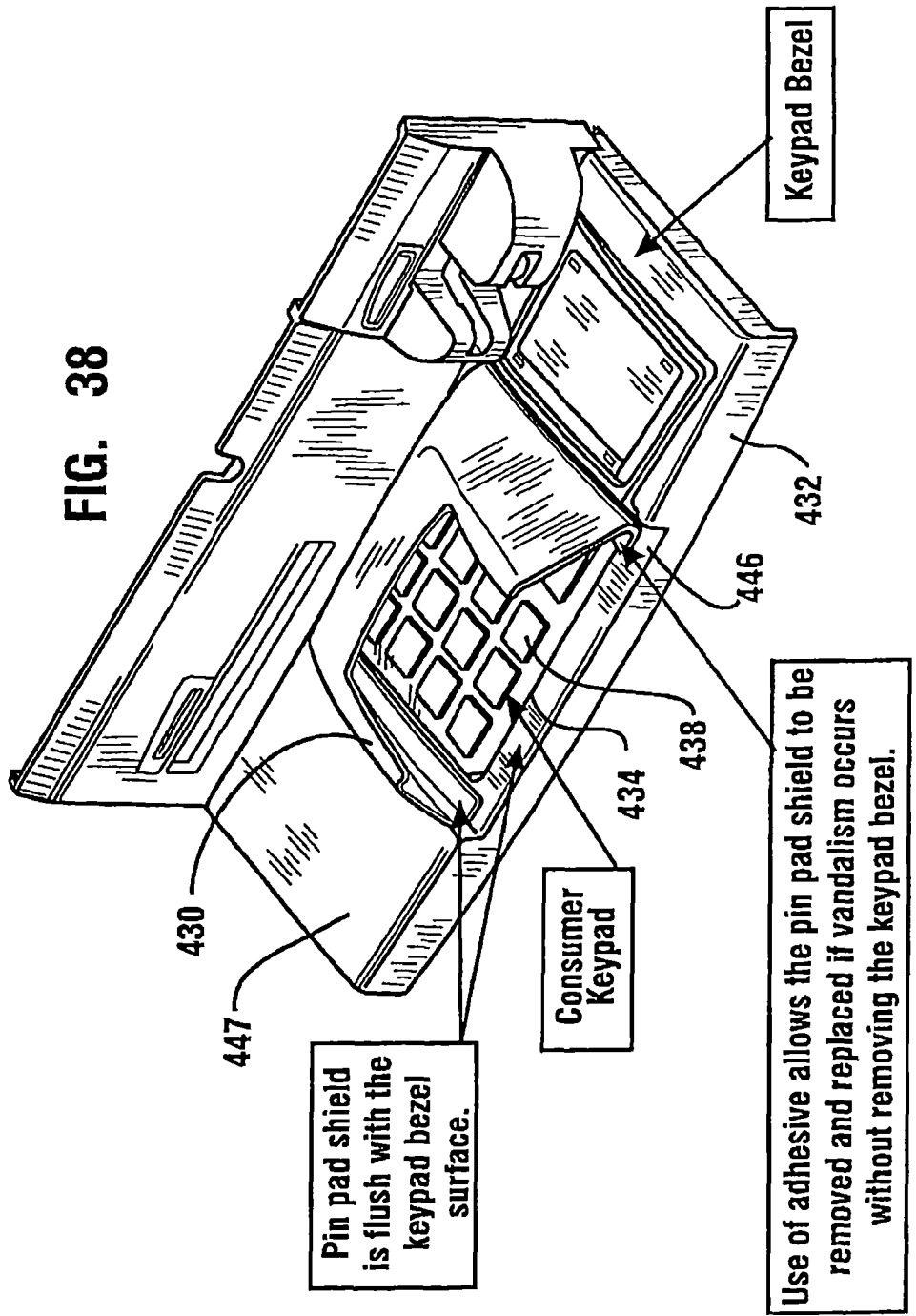
FIG. 38 is an isometric view similar to FIG. 37 but with the keypad cover shown in fixed engagement with the fascia.

FIGS. 37 and 38 show yet another alternative exemplary keypad cover 430 as well as an exemplary method used to install the cover on a fascia 432 of an automated banking machine. Cover 430 of the exemplary embodiment is generally similar in construction to cover 422 except that cover 430 includes one relatively large opening 434 in the top portion thereof. As represented in FIG. 38 opening 434 when the cover is installed overlies at least some portion of the keys 436 of the keypad 438. However, as shown in FIG. 38 a user is still enabled to view all of the keys from the point of view of a user operating the user interface of the machine. A top portion 440 of the cover bounds the opening 434. Tapered sidewall portions 442 extend outward from the top portion as is the case with the previously described embodiments. The tapered sidewall portions each terminate in inturned flange portions 444.

In the exemplary embodiment the fascia 432 includes a generally rectangular recess 446. The recess is bounded by generally vertically extending fascia walls 448 on each transverse side of the recess 446. The vertically extending walls extend from an outer fascia wall surface 447 to the fascia face within the recess. Extending between the keypad 438 and the fascia walls 448 on the fascia are a pair of pockets 450. In the exemplary embodiment the pockets 450 are recessed within the fascia face and extend below a plane in which the upper surfaces of the keys 436 generally extend when they are not being depressed. The exemplary pockets are sized so that the inturned flange portions 444 are accepted into the pockets when the cover is installed.

As can be appreciated from FIGS. 37 and 38, in the exemplary embodiment when the cover 430 is to be installed, the cover is moved relative to the fascia such that the flange portions 444 are engaged in the pockets 450. The flange portions 444 serve as engaging portions which are accepted in the pockets. In the exemplary embodiment the cover 430 is held in engagement with the fascia through adhesive which is applied in the pockets. This adhesive may be applied on media such as a suitable tape based material or alternatively as a liquid or solid adhesive material. As can be appreciated the adhesive holds the cover 430 positioned as shown in FIG. 38 in engaged relation with the fascia. In the exemplary embodiment the size of the flange portions and the pockets which are engaged hold the cover and fascia together are sized so as to minimize the risk of the cover being pulled off due to vandalism. Further the proximity of the sidewall portions 442 to the fascia walls 448 of the exemplary embodiment minimize the risk of an unauthorized person prying the cover off the fascia. However, in the exemplary embodiment if sufficient force is applied to the cover to tear it off the fascia, the pockets are sized so as to allow the cover to be removed without causing permanent damage to the fascia. This is achieved in an exemplary embodiment by controlling the area of adhesive contact to the area of the pockets and the strength of the adhesive. This approach assures that the adhesive will release before the cover or the fascia breaks. Alternatively in some embodiments a similar result may be accomplished by providing weaker areas in the cover at or above each of the flange portions. These weaker areas may serve as frangible portions that break responsive to applied force before other areas release or break. In some embodiments the point of breakage may be configured so that a new cover can be installed without removal of the prior flange portions. For example, the flange portions of the replacement cover may be attached to the flange portions of the cover that has otherwise been torn away. As a result a new cover can be installed through the method previously discussed, generally without the need to make other repairs to the fascia of the banking machine.

Of course it should be understood that these approaches are exemplary and in other embodiments other approaches may be used.

FIGS. 34 through 36 and 40 show yet another alternative embodiment of an apparatus for reducing the risk of interception of a user's confidential inputs through a keypad. In this embodiment an automated banking machine includes a fascia 452. The fascia 452 includes a generally rectangular recess 454 which is bounded laterally by a pair of fascia sidewalls 456. The keypad 458 which includes a plurality of keys 460, is positioned so as to be manually accessible in the recess. As is the case with the previously described embodiment, users of the automated banking machine are enabled to provide inputs through manual digit engagement with the keys of the keypad. The keys of the keypad generally extend within a plane which extends within the recess of the fascia.

This exemplary embodiment comprises a pair of movable panels 462 and 464. The panels are disposed on opposed lateral sides of the keypad 458. Each of the panels is mounted in supported connection with the machine through a hinge connection (not separately shown). The hinge connection of the exemplary embodiment comprises a structure which enables each respective panel to move rotationally about an axis of the hinge connection adjacent to the area where the panel is connected to the fascia.

Figure 35:
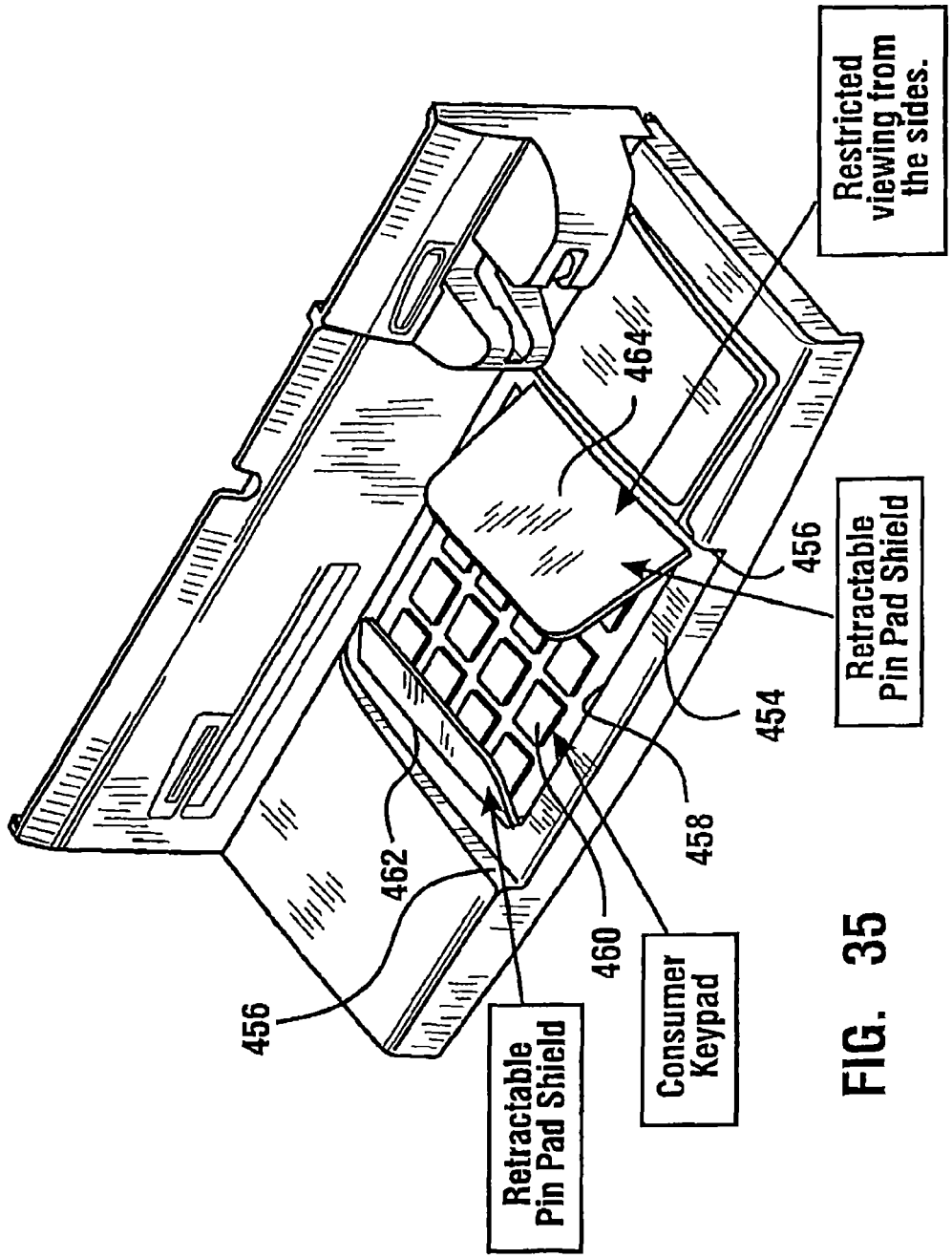
FIG. 35 is an isometric view similar to FIG. 34 but with the panel members of the alternative concealment device shown in a closed position.
Figure 36:
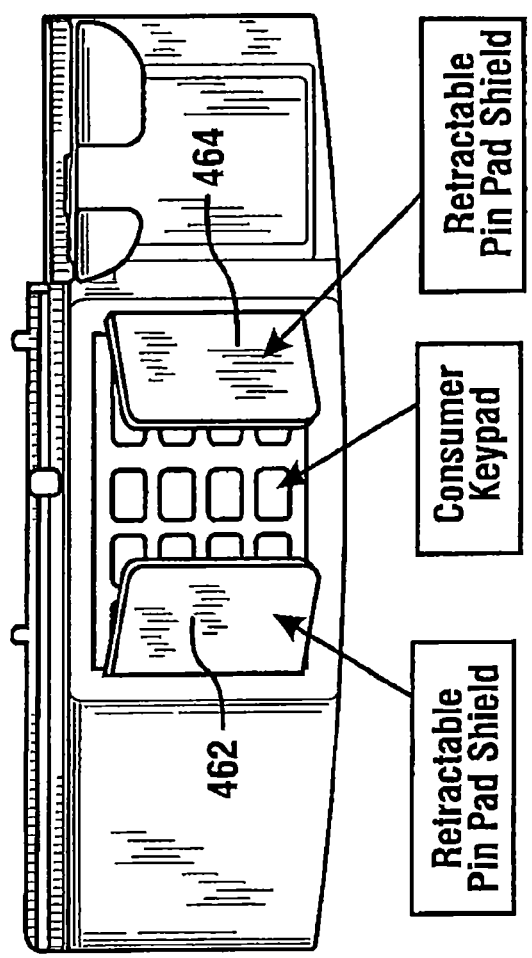
FIG. 36 is a top view of the automated banking machine fascia portion shown in FIG. 35 with the panels shown in a closed position.

In the exemplary embodiment panels 462 and 464 are enabled to be rotated about the hinge connection between a first position and a second position. The first position which is shown in FIGS. 35 and 36 is a position in which the panels extend generally upwardly relative to the fascia so as to prevent viewing of a user's inputs through the keys, from a position other than the point of view of the machine user. In the exemplary embodiment shown in FIGS. 35 and 36 in the first position of the panels, the panels also generally overlie some of the keys of the keypad. In this way the panels are enabled to restrict viewing of the keypad by unauthorized persons while at the same time enabling the user to view the keypad so as to provide their necessary manual inputs such as a PIN number. It should be understood however that although the exemplary embodiment shows the panels extending at an angle in overlying relation of at least some of the keys of the keypad, other embodiments may provide for the panels to be in a different position so as to restrict viewing. This may include for example the panels moving to a position generally perpendicular of the fascia and the plane in which the keys of the keypad extend. In some embodiments movement of the panels to a position generally perpendicular to the keys may be sufficient for purposes of restricting unwanted viewing of the keypad.

Figure 34:
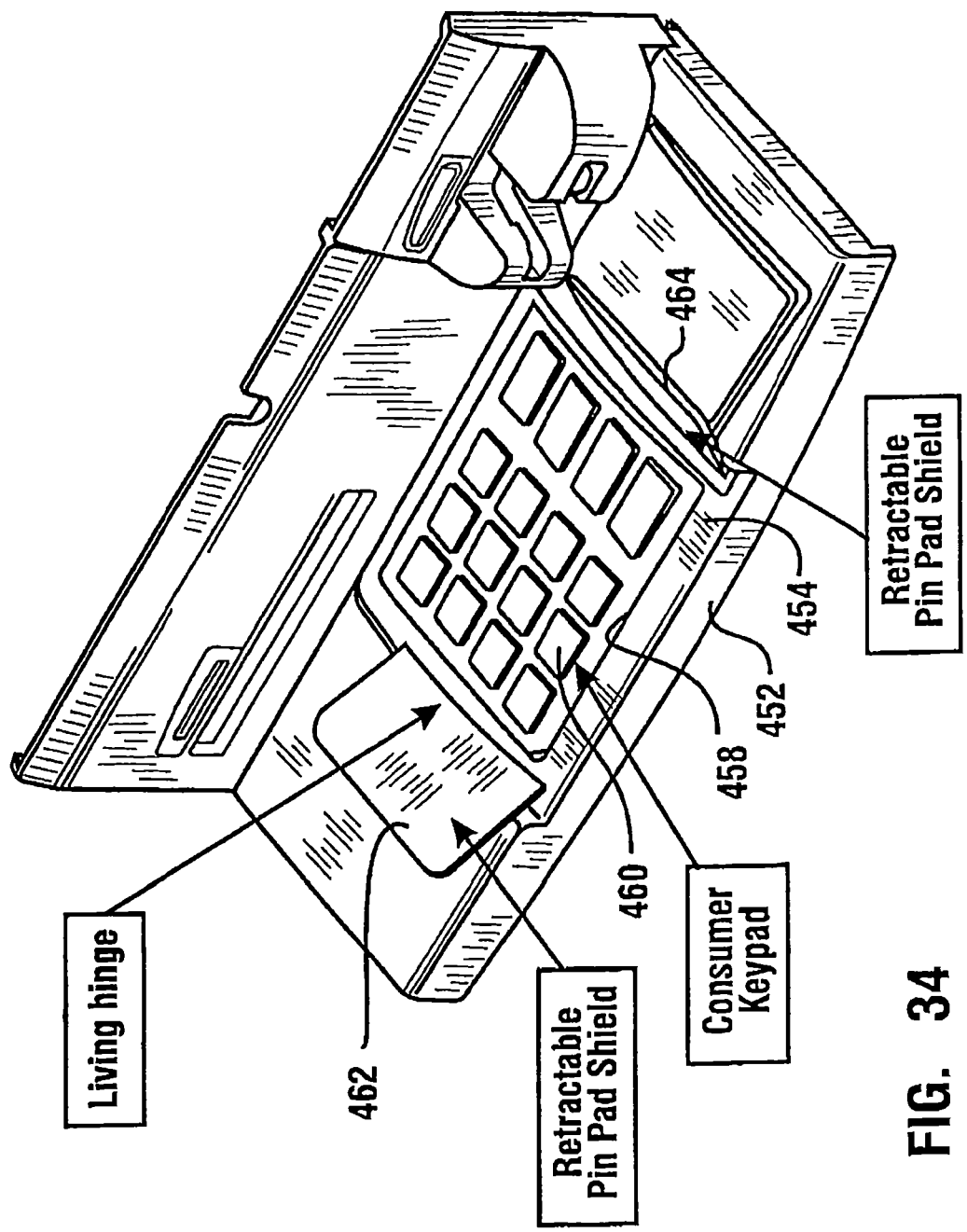
FIG. 34 is an isometric view of a portion of an automated banking machine user interface which includes an alternative device for obscuring the viewing of inputs to a customer keypad by unauthorized persons, the concealment device being shown in an open position.

In the exemplary embodiment the panels 462 and 464 are enabled to move to a second position shown in FIG. 34. In the position shown in FIG. 34 the panels do not overlie the keypad and are not generally operative to restrict viewing from a wider range of viewpoints that are outside the viewpoint of a machine user operating the machine. The panels may be positioned in the second position for purposes of a user providing nonconfidential inputs through the keypad such as amount data or transaction selection data.

In some exemplary embodiments, panels 462 and 464 are manually movable by a user at the banking machine. In such embodiments a user who is about to input confidential data may move one or both of the panels from the first position to the second position so as to reduce the risk of unauthorized observation of the user's input of confidential data such as their PIN number. Thereafter when the user has completed the PIN number input the user may manually move the panels to the second position. Alternatively in this embodiment if the user is concerned that a person may be attempting to observe their inputs from a particular side of the machine, the user may elect to move only one of the panels to the first position so as to obscure viewing from viewpoints on that particular side. Alternatively or in addition the ATM user may move their point of view to a side away from the panel in the first position. In this way the user can control the panels and reduce the risk of observation by other individuals. Of course in this embodiment the user may also determine that no one is nearby and they wish to leave the panels positioned in the second position at all times regardless of the nature of the inputs being provided through the keypad.

In exemplary embodiments the panels 462 and 464 may be held in the position in which they are manually placed through the effect of gravity. Alternatively in other embodiments the panels may be spring-loaded so that for example they are held by gravity in the first position but when a user moves them rotationally beyond a particular angle, they are biased toward the second position. Alternatively each of the panels may be biased toward the first position as well as toward the second position depending on the angle to which they are manually moved. Various approaches may be taken depending on the nature of the system.

In some embodiments the panels and/or the structures which comprise the hinge connection may be attached to the fascia of the machine by adhesive or other materials that resist the removal of the panels, but are nonetheless frangible so that once excessive force is applied the panels break away, reducing the chance of more substantial damage to the fascia. This can be done for example in the manner previously discussed by providing a hinged connection or other suitable connection through a flange portion which is held by adhesive in appropriately sized pockets of the recess of the fascia. Thus if the machine is subject to vandalism and a panel is torn off, a replacement panel may be readily applied. Further it should be understood that while the exemplary embodiment has rectangular panels of the shape shown, other embodiments may include other shaped panels or mounting mechanisms.

Figure 40:
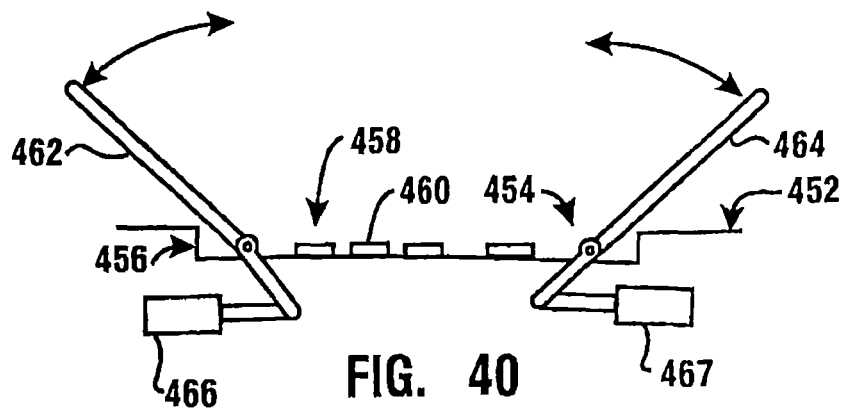
FIG. 40 is a schematic view of an alternative embodiment similar to that shown in FIG. 34 but which includes panels that are movable by movement mechanisms so that the panels operate to restrict viewing of inputs through the keypad at appropriate times during transactions.
Figure 42:
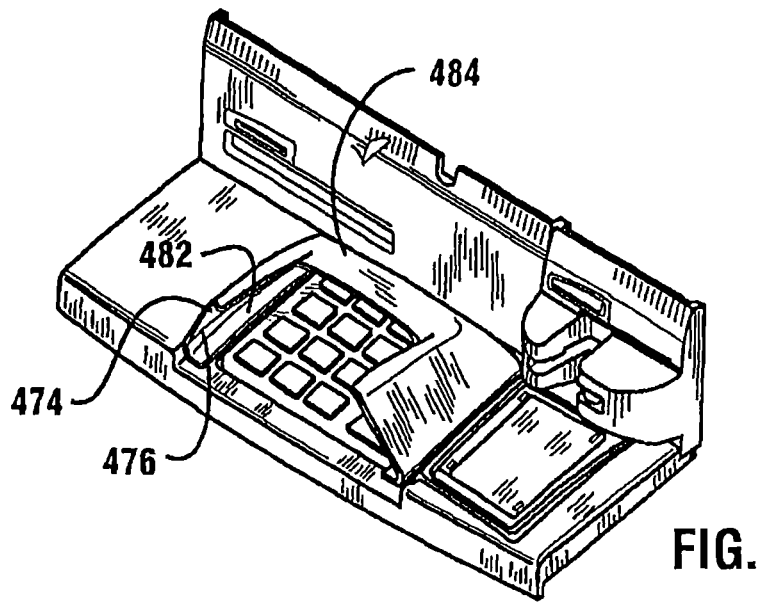
FIG. 42 is an isometric view similar to FIG. 41 with the alternative concealment device installed.
Figure 41:
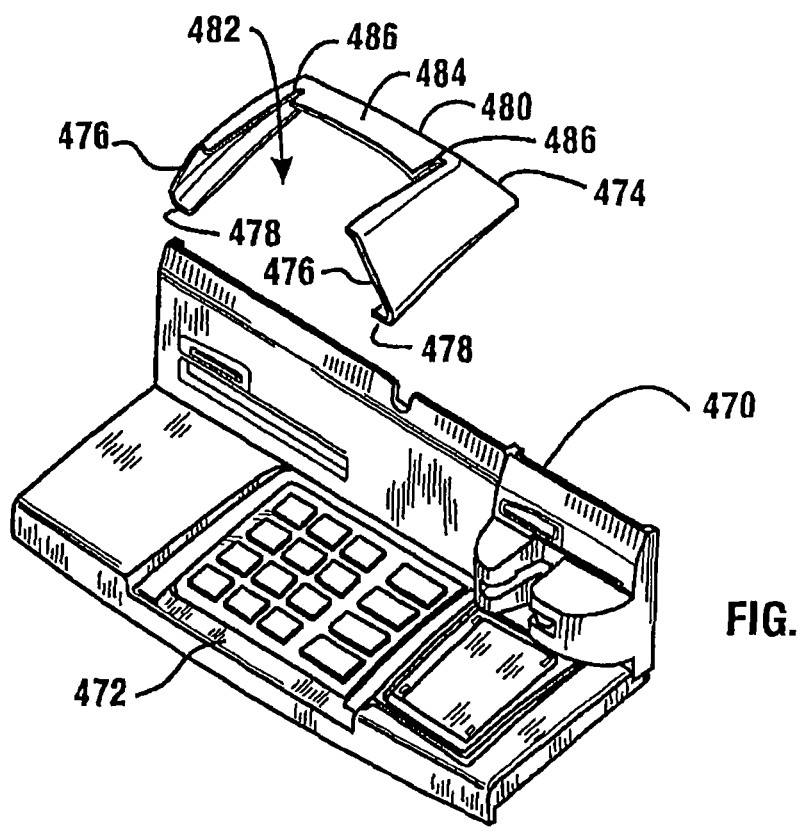
FIG. 41 is an isometric view of an alternative automated banking machine user interface with an alternative concealment device comprised of flexible material positioned for installation on the user interface.

While the exemplary embodiment may include manually movable panels, other embodiments may include panels in operative connection with drives or other movement devices so as to automatically move the panels at appropriate times during transactions. Such a system is schematically represented in FIG. 40. In this system panel 462 is shown in operative connection with a drive 466 and panel 464 is shown in operative connection with a drive 467. Of course it should be understood that drives 466 and 467 may comprise suitable movement devices such as motors, solenoids, actuators or other movement devices. Further such drives may include transmission mechanisms which limit the application of force to the panels and reduce the risk of damage in the event of forced manual movement of the panels or if the panels are prevented from moving due to an obstruction. Various suitable force-limiting transmission mechanisms may be devised that are suitable for the particular embodiment by those having skill in the art.

In the exemplary embodiment at least one processor operating in the automated banking machine may operate in accordance with its programming to determine when the machine is ready to receive a confidential input from a user. This may include for example the at least one processor determining that the machine has reached the point in its operation where the machine is in condition to receive the input of a PIN from a user. Responsive to this determination the at least one processor is operative to cause the drives 466, 467 to move the panels 462, 464 into the raised first position. In this raised first position, the panels are operative to generally block viewing of inputs to the keypad from a viewpoint other than the point of view of the machine user. Likewise in some exemplary embodiments the at least one processor may be operative to determine when a machine user has completed the input of the confidential data such as the PIN and to cause the drives to then move the panels to the second position. Of course this approach is exemplary.

It should be understood that in some embodiments the at least one processor may be operative to move the panels to the first position so as to restrict viewing, not only for the input of PIN data but also under other circumstances where confidential inputs may be required. Further in some alternative embodiments the at least one processor may operate only to provide certain movement for the panels. For example in some embodiments rather than having the panels moved to the first position by the drive, the user may be able to manually move one or both panels to the first position. After the at least one processor determines that the user has completed providing confidential inputs or that the user has completed a transaction, the at least one processor may operate to cause the drives to move the panel that the user has previously manually moved to the first position, back to the second position. In alternative embodiments the at least one processor may operate to cause the panels to be moved to the first position at a determined point in a transaction, but may rely on a user to manually move the panels from the first position back to the second position. Further yet in some other alternative embodiments, the drives may be operative to move the panels but the transmission mechanism may be such that the user can override the drives and move the panels to positions as the user may desire at certain times or at any time during a transaction. Of course these approaches are exemplary and in other embodiments other approaches may be used.

It should be understood that embodiments described with movable panels may incorporate features like those previously described in connection with other embodiments. This may include for example provisions to provide lighting to facilitate user operation of the machine. Such lighting may be incorporated in the panels or in other locations of the fascia so as to facilitate user operation. Alternatively or in addition in other embodiments lighting may be provided through the panels or in other locations so as to provide outputs which are effective to obscure the viewing of user inputs. This may be done for example by providing fiberoptic output points or other lighting from the outputs of the panels.

It should be understood that in other embodiments the panels and fascia may have other configurations. This may include for example, panels that rotate to lie flush relative to a fascia surface when not in use. Alternatively, panels may be retractable relative to the fascia. For example, the panels may move generally vertically to raise and lower them relative to the key pad at appropriate times. In still other embodiments panel structures may be made to expand and retract at appropriate times. Of course, other approaches and structures may be used.

In still other embodiments provision may be made for changing properties of the panels or the covers. This may include for example providing for a liquid crystal material to be encapsulated within the panels or other types of covers previously discussed. Such a liquid crystal material may be acted upon by electrical fields so as to selectively change the material in various selected regions from transparent to opaque. This enables the machine for example, to enable a portion of a panel or a cover to be made transparent upon the sensing of the user's digit in an area adjacent to the keypad. Alternatively or in addition provision can be made for sensing the position of particular digits within a cover or adjacent to a panel using sensors such as infrared, optical, ultrasonic or other suitable sensors. One or more processors associated within the machine may operate pursuant to the sensed location of the user's digit to render the liquid crystal material transparent only in the vicinity of the particular digit while keeping the remainder of the cover or panel opaque so as to minimize the risk of unauthorized viewing.

Other embodiments may incorporate polarizing features or Fresnel lens effects to achieve visibility from the point of view of the user while reducing the risk of unauthorized observation. Of course as previously discussed Fresnel lens effects achieved through liquid crystal may also provide other desirable properties including magnification or obfuscation. In addition responsive to operation of at least one processor in the machine the effects achieved may be varied responsive to operation of the machine. This may provide for example limiting observation capabilities to the point of view of the machine user during input of a user's PIN while enabling greater visibility of other portions of the cover during other transaction steps. Of course these approaches are exemplary.

Alternatively or in addition provision may be made for assuring the visibility through such covers or panels using the principles previously discussed for detecting or eliminating the buildup of dirt or condensation. Further in alternative embodiments provision may be made to minimize the effect of undesirable bacterial accumulation on the keys of the keypad. This may include for example providing for the dispersal of disinfectant material of a generally transparent nature onto the keypad and within the interior and exterior surfaces of a keypad cover and panels. Aerosol materials including disinfectants may likewise be provided in suitable locations adjacent to the keypad. This may be accomplished for example through the programming of one or more processors in the machine which enable a dispersal of an aerosol disinfectant onto the keypad and adjacent structures on a programmed basis. In some embodiments the machine may include a supply of disinfectant material. Suitable pumps and aeration devices may be provided for delivering the disinfectant into and/or on the surfaces where bacterial growth is to be inhibited. Such dispersal of material may be accomplished responsive to operation of at least one processor of the machine to correspond to particular conditions. This may include for example at times when the machine is not operating to conduct transactions. The at least one processor may also operate in accordance with its programming to provide the antibacterial material when environmental conditions are suitable such as temperature and humidity are within particular ranges. In still other embodiments the machine may include a device for generating ozone. Such generation may be done responsive to operation of the processor and the ozone material delivered at appropriate times and in appropriate areas for purposes of disinfecting areas of the machine. Of course these approaches are exemplary.

Alternatively or in addition air flow provided from the machine in the area adjacent to a cover or panels so as to reduce the risk of condensation may also include the dispersal of an aerosol disinfectant into the area adjacent to the keypad. Of course it should be understood that a supply of such disinfectant may be provided in the machine and may be included for example so as to provide suitable disinfecting at points where users would generally be expected to come in contact with the machine in addition to the keypad. This may include for example the area adjacent to card readers, function keys, touch screens or other locations which provide user contact. Of course these approaches are exemplary and in other embodiments other approaches may be used.

In some embodiments the machine may include a supply of disinfectant lotion that is suitable for application to a user's hands. The machine may include a suitable pump and outlet in connection with the supply that provides for output of the disinfectant lotion from the machine in a way that enables the user to rub the lotion on their hands. For example, the at least one processor associated within the machine may be programmed to offer a user an option through an output device of the machine to select to have the disinfectant dispensed from an outlet so they can apply it to their hands. This may be done, for example, when a user indicates they are ending their transaction session, which may involve the return of their card from the machine. In response to the user indicating through an input to an input device that they wish to have such lotion, the processor will cause the pump to operate to dispense an amount of lotion to the user. The user can then apply the lotion to their hands immediately after use of the machine.

Alternatively, some embodiments may offer the user an option to receive disinfectant lotion near the start of a transaction session. This may include for example, in response to a user input. This may be for example, a manual input. Alternatively lotion may be dispensed in response to a sensor on the machine sensing a user's efforts to disinfect the machine, such as with a portable ultraviolet (UV) light as later described. Alternatively the machine may be programmed to dispense disinfectant lotion to the user unless the user provides an input indicating they do not wish to receive the disinfectant lotion. Of course these approaches are exemplary.

In still other alternative embodiments disinfectant may be dispensed in a packaged form. This may include, for example, dispensing a container holding the disinfectant for a user's skin from the machine. In some embodiments, the disinfectant may be an antibacterial liquid or gel material included in a generally flat container, similar to foil or plastic packages used for holding food items such as small quantities of ketchup or mustard, which can be dispensed from the machine. In still other embodiments the disinfectant may be on cloth or other substrate, and dispensed in a packet comprised of foil, plastic or other fluid tight material. Alternatively, such packages may be attached to sheet materials which may be dispensed form the machine in a manner similar to bills, envelopes or other sheet materials. The container may be releasably adhered to, or made an integral part of the sheet material. This may enable the material to be stored in containers and dispensed from the machine in a manner comparable to notes and other sheets. Alternatively, such disinfectant material may be placed in or on sheets or envelopes and dispensed in a manner like that shown for envelopes in U.S. Pat. No. 7,103,958, the disclosure of which is incorporated by reference in its entirety. The approach of the incorporated disclosure may also be used to dispense to a user the disinfectant material in an envelope or other container. The waste material after use can then be placed in the container and discarded in a suitable waste container when the user is done. In some embodiments the machine itself may accept the waste material therein for disposal. In some embodiments a machine user may receive such disinfectant from the machine either at the beginning or end of a transaction session. Further the machine may be operative to charge some or all users for such disinfectant material. This may be accomplished through the programming associated with at least one processor of the machine.

In exemplary embodiments, to produce a suitable disinfectant, generally flat fluid tight packets may be attached to sheets or envelopes of material which are sized to be dispensed by a sheet dispenser (or envelope dispenser) in the machine. Such attachment may be through a suitable means that maintains engagement, such as by adhesive (for example), staples or in the case of an envelope or other container, placing the package inside the envelope or container. The sheet (or envelope which for purposes hereof will be considered sheet material) is then placed in the machine for dispensing from the machine. The sheet materials with the disinfectant may be placed in a sheet holding cassette of a type used to house currency notes from the machine. The cassette may then be placed in the machine and the sheets with disinfectant packages attached selectively dispensed to users. Alternatively the sheet materials may be placed in another location in the machine from which they may be selectively dispensed. Alternatively sheet materials may be formed to include integral disinfectant holding packages. For example, sheet structures sized to be dispensed from the machine may be formed to include pockets therein in which disinfectant materials (or cloth or other substrates bearing disinfectant materials) are housed. Such pockets may be bounded by materials which are generally fluid tight and hold the disinfectant securely until a user deliberately breaks the pocket to access the disinfectant. For example, sheets with pockets may be formed by adhering sheet materials in a blister pack or other sandwich structure. Of course these approaches are exemplary.

Figure 48:
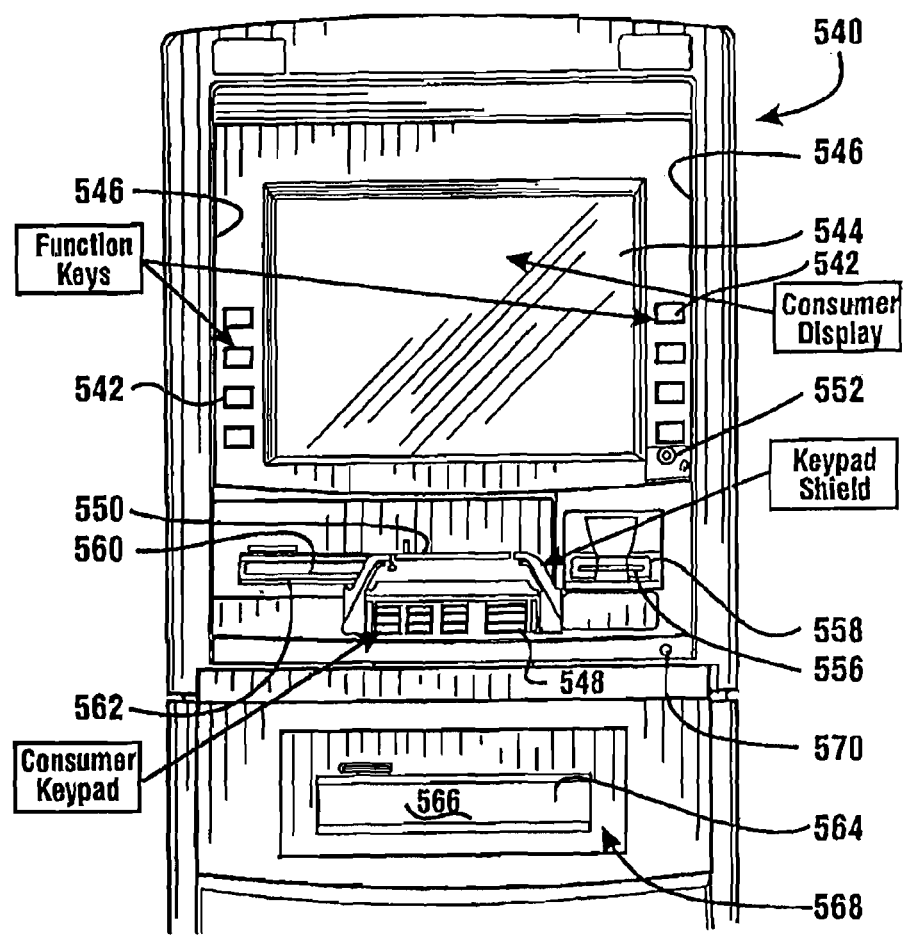
FIG. 48 is a front plan view of an automated banking machine including exemplary user manual contact points.

Ultraviolet (UV) radiation may be used in some embodiments to provide a disinfecting function for manual contact points on a machine. FIG. 48 shows a fascia 540 which includes a number of manual contact points on the machine which may come into contact with the fingers of users operating the machine. These contact points include function keys 542. A plurality of function keys 542 are positioned on each side of a display 544. In this exemplary embodiment the function keys 542 are positioned between the display and a corresponding side surface 546 that extends outwardly from the fascia beyond the surface of the display in the fascia keys.

The exemplary machine in FIG. 48 also includes a keypad 548. Keypad 548 includes a plurality of manually actuatable keys of the type previously described. Keypad 548 has in overlying relation thereof a keypad shield or cover 550. Each of the keys of the keypad as well as the area within the keypad cover may be commonly contacted by user fingers in operation of the machine.

Also included in the exemplary user interface shown is a headphone jack 552. Headphone jack 552 is adapted to receive plug in connectors from headphones used by visually impaired persons in the operation of the machine. An area adjacent to the headphone jack 552 will commonly be contacted by fingers of machine users particularly visually impaired users.

The exemplary machine also includes a card reader of the type previously discussed which is in operative connection with a card reader opening 556. The card reader opening is operative to pass magnetic stripe cards or other card types therethrough. In the exemplary embodiment the card reader opening is surrounded by a card housing 558. In the exemplary embodiment the card housing is of the type that includes selectively illuminatable light indicators therein so as to facilitate the ability of users to insert and receive cards through the card reader opening. In still further embodiments the card housing may be of the type that includes features that are usable to detect the installation of an unauthorized card reading device adjacent to the card reader. For example the housing may be of the type described in U.S. patent application Ser. No. 10/722,067 filed Nov. 25, 2003, the disclosure of which is incorporated herein by reference in its entirety. The area adjacent to the card reader opening which includes the card housing constitutes an area in which machine users to generally contact the machine with their fingers during the course of operation thereof.

The exemplary machine shown in FIG. 48 also includes a receipt printer. A receipt printer is in operative connection with a paper outlet 560. The paper outlet area generally indicated 562, extends generally adjacent to the paper outlet in an area where users will commonly contact the machine fascia when taking receipts that are printed by the machine during transactions. A cash dispenser outlet 564 is operative to deliver cash from the machine to users. In this exemplary embodiment the cash dispenser outlet is generally blocked by one or more gate members 566 except when the machine is operating to deliver cash to a user. During such times at least one processor of the machine is operative to cause an actuator to move the gate member so that currency bills can be extended therethrough. A cash outlet area generally indicated 568 includes an area that extends generally adjacent to the cash dispenser outlet (and may include the outlet as well as the gate member thereof) and which users generally contact the machine with their fingers when obtaining cash from the machine.

In this exemplary embodiment the machine further includes at least one customer sensor schematically indicated 570. Customer sensor 570 is operative to sense users in proximity to the machine. In some embodiments the customer sensor 570 may include an optical sensor, a sonic sensor, an ultrasonic sensor, inductance sensor or other type sensor suitable for detecting the presence of a person. It should be understood that although the sensor shown is positioned on the fascia, other positions and types of sensors may be used. These may include for example, cameras in connection with devices which conduct analysis of image data that identify images that include a person adjacent the machine. Other types of customer sensors such as weight sensors, heat sensors or other types of sensors may be used. In the exemplary embodiment the customer sensor is in operative connection with the at least one processor of the machine so as to carry out steps such as those that are hereinafter described.

In this exemplary embodiment a plurality of UV light sources are positioned so as to emit UV light onto surfaces of the machine that are commonly contacted by users' fingers in the course of conducting transactions. In some exemplary embodiments a plurality of UV light sources that output ultraviolet light in one or more of the UV-A, UV-B and/or UV-C bands may operate to cause ultraviolet light to be emitted in a manner that contacts surfaces of the machine. Such UV light contact may be of sufficient length and intensity to kill germs and provide a disinfecting function on the surfaces of the machine that are routinely contacted by user fingers.

Figure 49:
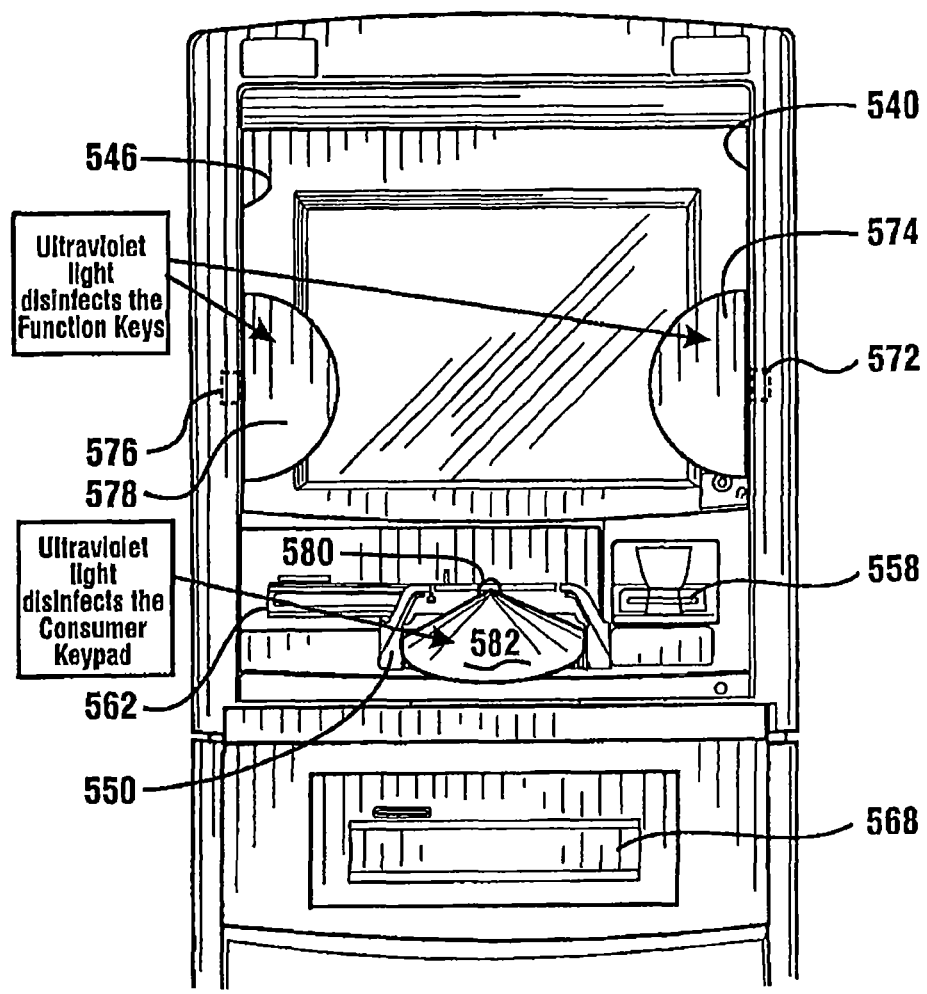
FIG. 49 is a view similar to FIG. 48 but including schematic views of areas contacted by ultraviolet radiation.

In the embodiment represented in FIG. 49, a UV light source 572 shown in phantom, is positioned in supporting relation of the side surface 546 on the right side of the fascia as shown. The UV light source 572 is operative to cause UV light to contact the area of the fascia indicated by the circular area 574. Area 574 includes function keys 542 on the right side of the fascia. A further UV light source 576 shown in phantom is in supporting connection with the opposed side surface 546. UV light source 576 emits UV light that contacts an area schematically indicated 578 which includes the function keys 542 on the left side of the fascia.

In this exemplary embodiment the machine further includes a UV light source 580 in supporting connection with the keypad cover 550. UV light source 580 is selectively operative to output UV light and is operative to cause the UV light to contact an area 582 that includes the keys of the keypad.

It should be understood that in still other embodiments UV light sources may be positioned so as to cause UV light to contact the card area in the area of the card housing 558, the paper outlet area 562 and/or the cash outlet area 568. Of course in other embodiments other or different areas may be contacted by UV light so as to achieve disinfecting of other customer contact points.

In the exemplary embodiment each of the UV light sources is in operative connection through appropriate circuitry with at least one processor in the machine. The at least one processor operates in accordance with its associated programming to selectively cause the UV light sources to operate and output such UV light in a manner that will facilitate disinfecting the areas of the machine that are contacted by the UV light.

In some exemplary embodiments UV light sources may also be included in the interior of the machine housing. This may include for example UV light sources that are operative to contact currency bills that are being accepted into and/or dispensed from the machine. In such embodiments one or more UV light sources may be operative to cause UV light to contact currency bills moving through one or more transports in the machine. This will help to assure that currency bills received from users receive the benefit of disinfecting UV light contact prior to be stored in the machine. Likewise UV light sources in the machine may cause the UV light to contact passing bills that are moving toward a machine outlet so as to be dispensed from the machine. This will help to assure that bills received by customers are treated prior to receipt thereby.

Alternatively or in addition UV light sources within the machine may be operated to disinfect an area inside a card reader in which cards received from users pass during operation of the machine. This may include for example a card transport area through which user cards are moved to read such cards and hold them during operation of the machine. Such a card transport area as well as devices therein are shown in U.S. Pat. No. 7,032,245 the disclosure of which is incorporated herein by reference in its entirety. In some exemplary embodiments the UV light source may be operative to cause UV light to contact structures within the card transport area of a card reader during times that user cards are not positioned therein. Alternatively or in addition, UV light sources may be operated to cause UV light to contact user cards positioned within the transport.

In still other embodiments UV light may be used to disinfect other types of items that are received by or dispensed from the machine. Further in some embodiments other disinfectant techniques of the types previously described or other approaches may be used in combination with UV light to disinfect items internally or externally of the machine as well as to disinfect points of manual contact with the machine.

In some exemplary embodiments the UV light sources are in operative connection with the at least one processor to facilitate operating the UV light sources at appropriate times. This includes for example, operating the UV light sources within the machine at times when items are being moved to be dispensed from the machine such as currency bills. The at least one processor may be operative to cause the UV light sources within the machine to disinfect the currency bills as they are moving toward the cash outlet opening in the machine. Likewise the at least one processor may be operative in accordance with its programming to cause a UV light source positioned adjacent to a card reader and a card transport area therein, to cause UV light to contact a user's card in the card transport path as it is moved or otherwise positioned therein. Likewise the at least one processor may operate at appropriate times to cause UV light to operate and disinfect items received by or dispensed from the machine.

The at least one processor may also be in operative connection with the UV light sources that operate to cause UV light to contact manual contact areas of the machine so as to disinfect those areas of the machine. This may be done in some exemplary embodiments after each transaction session carried out by the machine. In this exemplary embodiment a transaction session includes one or more transaction activities carried out by a given user at the machine between when the user's card is input to a card reader of the machine and a time when the card is taken from the machine. For example the at least one processor may operate in accordance with its programming to determine that the user has completed the transaction session and has taken their card. The processor then operates to cause each of the UV light sources to output UV light that contacts the respective associated manual contact points of the machine. This may be done for a time period as is appropriate to disinfect the areas contacted, which is generally a short period of time. During this period the at least one processor may operate to cause the display of the machine to output at least one message instructing any users who may be waiting at the machine to wait while the machine operates to conduct the disinfecting activities. Of course it should be understood that in some embodiments the display may not output a message specifically indicating the particular disinfecting activity that is occurring. Once the activity is complete the at least one processor may operate to provide indicia which includes instructions for the waiting user to begin their transaction session. Of course this approach is exemplary.

In still other embodiments the at least one processor may operate in accordance with its programming to determine the nature of the transaction conducted by the user who has completed the immediately preceding transaction session. The at least one processor may be programmed to have the capability to determine exactly what manual contact points the user contacted in the course of performing their transaction. For example the user may have only contacted function keys on the one side of the display rather than both sides. Likewise the user may have conducted transactions that would not have resulted in the user receiving a receipt, and thus the user would not have contacted the paper outlet area 562 of the machine. In such embodiments the at least one processor may operate in accordance with its programming to only cause the UV light sources corresponding to the particular areas that would have been manually contacted by the user to output UV light that contacts the corresponding machine contact areas. Such an approach may serve to reduce the number of cycles in which UV light is output and also reduce the exposure of the particular areas of the machine to the UV light which may have a tendency to degrade certain materials over time.

In still other embodiments the at least one processor can operate responsive to sensing a customer with the customer sensor 570 to cause the UV light sources to operate prior to the user commencing a transaction. For example upon sensing a customer approaching the machine the at least one processor may cause the display to output at least one message advising the user to wait for a brief period while the machine is disinfected. During at least a portion of the time that this message is output the at least one processor may be operative to cause the UV light sources to disinfect the areas of the machine with UV light. After the disinfection activity has occurred, the at least one processor may then be operative to output through the display at least one message advising the user to insert their card or otherwise initiate a transaction session. Alternatively or in addition embodiments may also operate to disinfect user contact areas both before and after transaction sessions. The user may also be offered disinfectant lotion or the dispense of a disinfectant material. Of course these approaches are exemplary.

Figure 50:
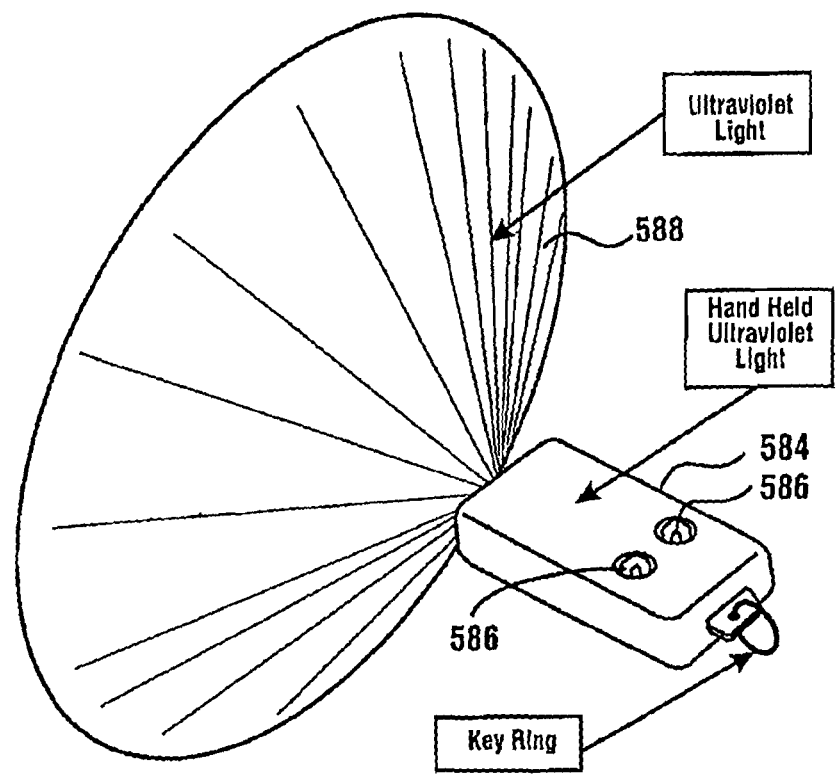
FIG. 50 is a view showing an exemplary device for emitting ultraviolet light.

In still other embodiments other approaches may be used to facilitate disinfecting user contact surfaces of machines. FIG. 50 shows a handheld UV emitting unit 584. The exemplary handheld unit 584 is designed to be a relatively small size and suitable for a user to carry around in a pocket, on a key ring or in another manner similar to a small portable flashlight or similar device. The handheld unit 584 includes input devices 586 that are used by a person to control operation of the handheld unit. The input devices 586 are operative to selectively cause the unit to output disinfecting UV light as schematically represented by the area 588.

Figure 51:
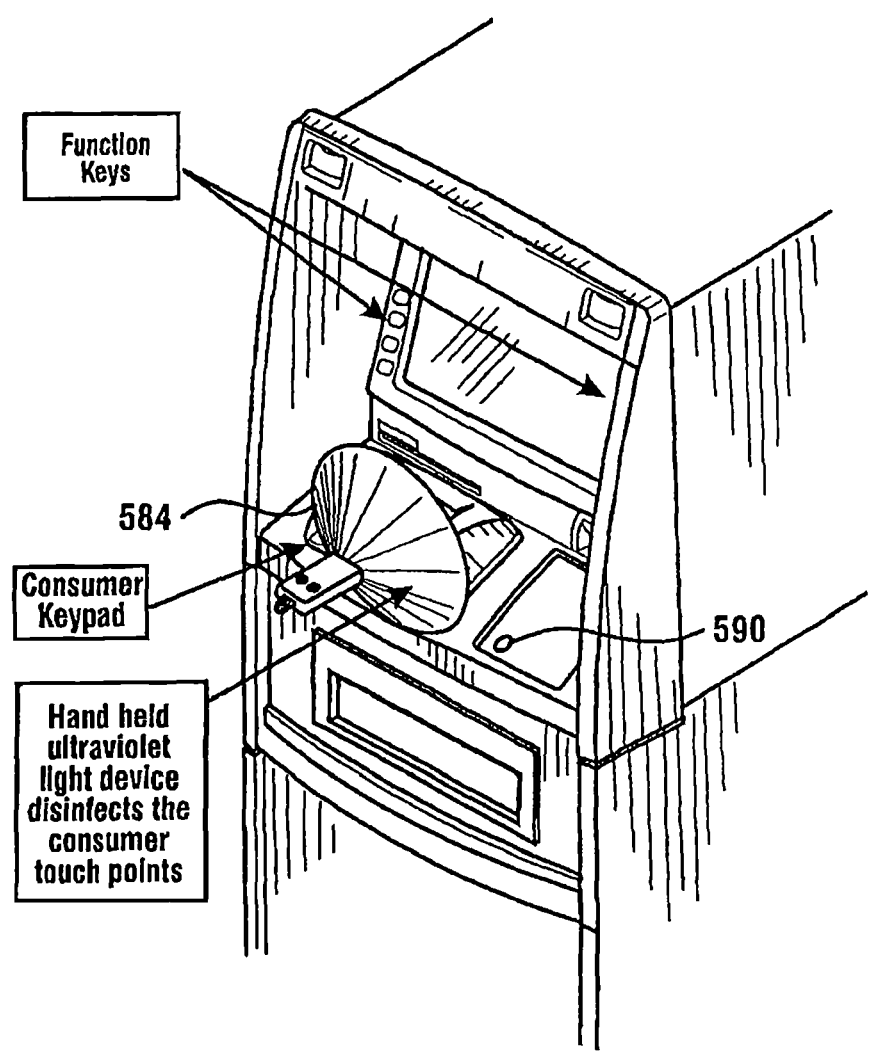
FIG. 51 is an isometric view demonstrating use of the device shown in FIG. 50 to contact manual contact points of an automated banking machine with ultraviolet radiation.

In an exemplary embodiment a user may use the handheld unit 584 to selectively disinfect manual contact areas on a machine before commencing a transaction session. For example as represented in FIG. 51 the user may direct a handheld unit to output UV light that contacts surfaces of the keypad cover and keypad. This may be done to enable the user to disinfect the areas that they wish to contact on the machine before commencing a transaction session or during a transaction session. Likewise the user may operate the handheld device to selectively disinfect other manual contact areas on the machine.

Further in some exemplary embodiments the machine fascia may include one or more sensors schematically indicated 590. In the exemplary embodiment the sensors 590 are operative to sense UV light of the type that would be output by a handheld unit of the type described. Such sensors 590 are in operative connection with appropriate circuitry including the at least one processor. This enables the at least one processor to determine that a person is disinfecting areas of the machine. In some embodiments the at least one processor of the machine may operate in accordance with its programming to perform various functions in response to sensing the disinfecting action by the user. Such actions may include for example causing the processor not to actuate the UV light sources on the machine in response to sensing that the user is disinfecting the machine directly. This will avoid unnecessary operation of the UV light sources and help to prolong their useful life. Alternatively or in addition the at least one processor may operate to cause at least one output through a display that indicates to the user that the machine has sensed that they are disinfecting the machine and to instruct the user to insert their card when they are ready to proceed. Alternatively the machine may operate to offer the user a dispense of disinfectant.

Alternatively in some embodiments the at least one processor may operate in response to sensing the disinfecting activity by the user to cause the UV light sources on the machine to also operate. The at least one processor may cause an output through the display in such circumstances to indicate to the user that they need not disinfect the contact areas of the machine with their handheld unit as the machine is doing so automatically. Such instructions would save the user the time and inconvenience of disinfecting the contact points themselves. It would also give the user greater confidence that the machine is adequately performing disinfecting activities. Of course these approaches are exemplary and in other embodiments other approaches that may be used.

Figure 43:
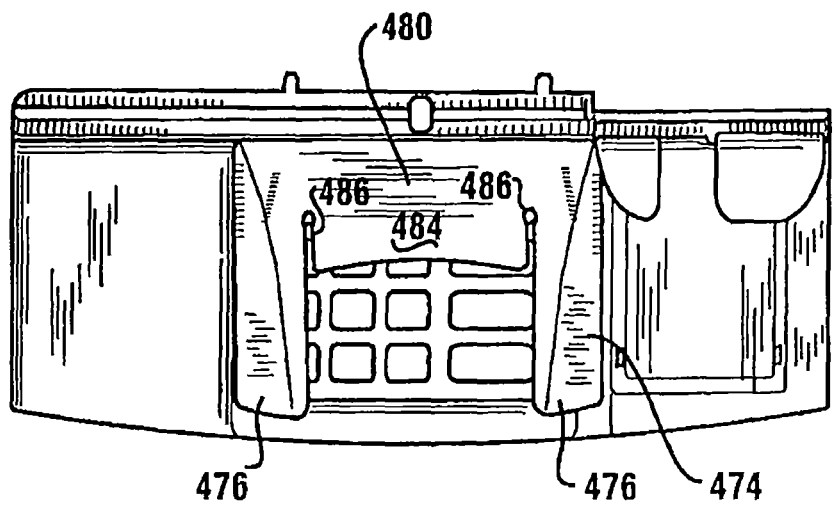
FIG. 43 is a top plan view of a portion of an automated banking machine user interface including a flexible keypad cover that is collapsible shown in an operative position in which digit access to all of the keys of the keypad are provided.
Figure 44:
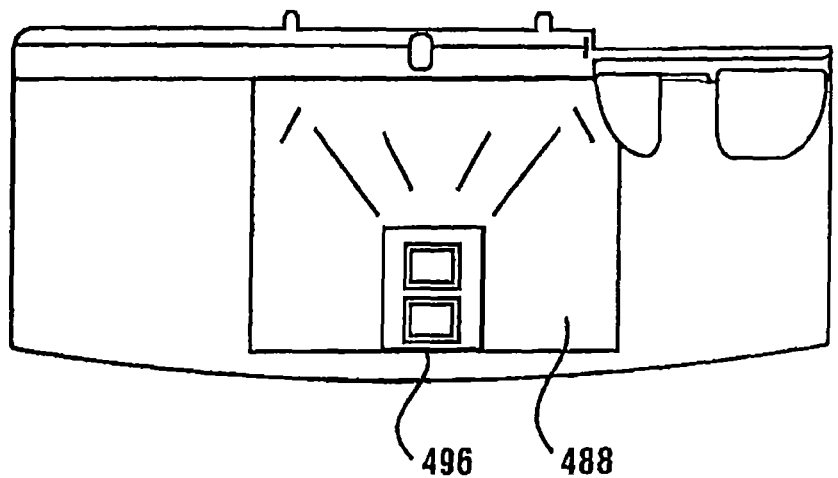
FIG. 44 is a top plan view of the keypad cover similar to FIG. 43 but with the keypad cover in a collapsed position.

FIGS. 43 through 44 disclose yet a further embodiment of the device for reducing the risk of unauthorized interception of user inputs provided through a keypad of a machine. A further fascia 470 includes a keypad 472 including a plurality of keys that are actuatable by a user's digits. A cover 474 is used to minimize the risk of unauthorized interception of inputs through the keypad. Exemplary cover 474 includes a pair of tapered side wall portions 476. Side wall portions 476 terminate in inturned flange portions 478. Inturned flange portions 478 are attached to the fascia. Such attachment may be made in a manner like that previously discussed. Cover 474 includes a top portion 480. The top portion 480 is tapered in a manner generally similar to that discussed in connection with cover 430. The top portion 480 and side wall portions 476 bound an opening 482. Opening 482 overlies at least portions of some of the keys of the keypad in the exemplary embodiment. The opening 482 also enables an ATM user to view engagement of their digits with all of the keys of the keypad.

As best shown in FIG. 43 the cover 474 includes a flap portion 484. In the exemplary embodiment, flap portion 484 is bounded on each transverse side by a slot 486. In the exemplary embodiment the cover 474 is comprised of a flexible material such as a molded urethane. The flexible material of this exemplary embodiment is sufficiently rigid to generally maintain its shape when a user's hand and/or digits are not present within the cover. However, in the exemplary embodiment the flexible nature of the cover 474 enables a user to deform the cover through engagement with their hand and/or fingers when providing inputs to the machine.

For example in the exemplary embodiment the flap portion 484 is enabled to be deformed by the back of the user's hand or fingers in a direction that is generally upward and outward. The slots 46 facilitate the ability of the flap portion to move as desired by a user. The deformation of the flap portion may in some embodiments enable a user to more readily view keys of the keypad that are positioned beneath the flap portion in the undeformed condition of the cover. Likewise a user's hand can deform the side wall portions of the cover to facilitate access and observation to selected keys. This approach can facilitate operation of the machine by the user. Further in exemplary embodiments the deformability and resilient character of the cover may prevent damage and breakage to which covers of more rigid material may be susceptible. Of course it should be understood that although in the embodiment described the entire cover is comprised of flexible material, in other embodiments only selected portions may be comprised of such material while other portions may be comprised of more rigid materials. Further, this exemplary embodiment may be combined with features of other covers and security devices that are described herein.

In still other embodiments a cover may be provided that is selectively movable responsive to at least one processor in the machine between different shapes. For example in an exemplary embodiment a cover overlying the keypad may be selectively changed between an operative position in which a user can access with their digits all of the keys of the keypad, and a collapsed position in which at least some of the keys of the keypad cannot be accessed by a user. This may be accomplished in exemplary embodiments responsive to one or more processors of the machine that operate to place the cover in an operative position when the machine is in a state in which it is able to accept keypad inputs from the user. Similarly in some embodiments the at least one processor may cause the cover to be in the collapsed position when the machine is not in an operative position to accept keypad inputs from the user. In the collapsed position the cover may operate to help to protect the keypad from vandalism, the elements or other undesirable conditions. Of course this approach is exemplary.

Figure 45:
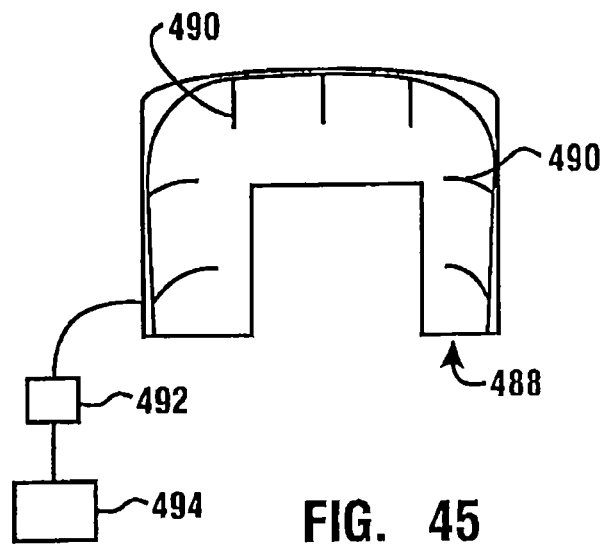
FIG. 45 is a schematic view of a keypad cover that is collapsible including deformable members included therein.

FIG. 45 shows an alternative keypad cover 488. Cover 488 is comprised of suitable flexible material that enables the deformation thereof. Cover 488 includes a plurality of members 490 in supporting connection therewith. In the exemplary embodiment the members 490 may be comprised of shape memory alloy material of a type that changes between different shaped configurations based on the application of electrical energy thereto.

In the exemplary embodiment of cover 488, the members are in operative electrical connection with a driver 492 which is operative to provide suitable electrical energy to cause the members 490 to change from a first shape to a second shape. The at least one driver 492 is in operative connection with at least one processor 494 of the automated banking machine. Processor 494 may in some embodiments include the processors and the controllers that operate to cause the machine to carry out the transaction functions. In other embodiments the at least one processor 494 may include one or more processors that are other than those that primarily cause the machine to carry out transactions, but is in operative connection therewith.

In the exemplary embodiment when the machine is carrying out transaction functions in response to at least one processor, the cover 488 may be in a collapsed position as shown in FIG. 44. In the collapsed position the side walls and top portion of the cover are disposed in close overlying relation of several keys of the keypad. The inner face of the side walls and top portion are also disposed in close adjacent relation of the keys so as to generally prevent digit access to at least some of the keys of the keypad. Of course in some embodiments even with the cover in the collapsed position at least some keys of the keypad may be digit accessible. This is represented by keys 496. Of course this approach is exemplary.

When the machine operates to conduct transactions and/or the transaction flow reaches a state in which the machine is ready to accept a customer's personal identification number (PIN), numerical values or other inputs through the keypad, the at least one processor 494 is operative to cause the driver 492 to actuate the members 490. Upon actuation of the members the flexible material of the cover 488 deforms and changes shape such that the cover of the exemplary embodiment generally corresponds to the shape of cover 474. In this operative position the user of the machine is enabled to access with at least one digit all of the keys of the keypad and to view digit engagement with each of the keys from the point of view of the user.

In an exemplary embodiment the at least one processor of the machine is operative to cause the cover 488 to remain in the operative position throughout the user transaction session. For example the cover may remain in the operative configuration while the user inputs their PIN, numerical values and other inputs until the user indicates to the machine that they do not wish to conduct any further transactions. Thereafter the at least one processor 494 operates to cause the at least one driver to change the shape of the member 490 and in response when the cover 488 returns to the collapsed position. Of course this approach is exemplary.

Figure 46:
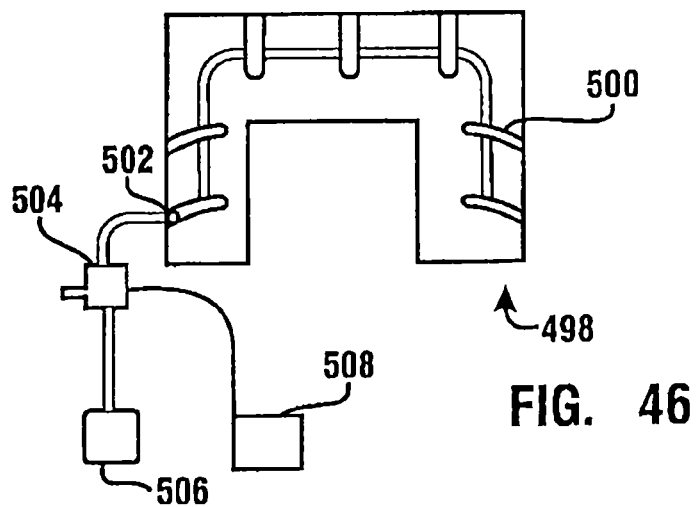
FIG. 46 is a schematic view of a keypad cover that is collapsible including fluid cavities therein.

It should be understood that covers which are changeable between an operative position and a collapsed position may operate using other types of structures to achieve changes in shape. FIG. 46 shows an exemplary embodiment of a cover 498. Cover 498 includes a plurality of fluid cavities 500 therein. In the exemplary embodiment the fluid cavities are embedded in the flexible cover and are fluidly connected to one another as well as to a port schematically indicated 502. In this exemplary embodiment the port 502 is operative to selectively apply and release fluid pressure to the fluid cavities in the cover. Of course it should be understood that this approach is exemplary.

In this embodiment the port 502 is operative to have fluid pressure applied thereto and relieved therefrom responsive to a three-way valve schematically indicated 504. Valve 504 is in fluid communication with a fluid source 506 such as a small air compressor included in the machine. Of course in other embodiments other sources of compressible or incompressible fluid may be used. In the exemplary embodiment the fluid source 506 and the valve 504 are in operative connection with at least one processor 508. Processor 508 may in some embodiments comprise the processor which executes instructions to cause the ATM machine to carry out transactions, or may be a separate processor in operative connection therewith.

In this exemplary embodiment the cover 498 is operative to change between an operative position in which a user is enabled to access with at least one digit all of the keys of the underlying keypad, and a collapsed condition in which digit access to at least some of the keys of the keypad are prevented. This is accomplished in the exemplary embodiment through operation of the at least one processor 508 causing the fluid source 506 and the valve 504 to apply fluid pressure to port 502. In this exemplary embodiment the fluid pressure is transmitted to the fluid cavities 500 which causes the cover 498 to change shape to the operative position. In the operative position a user may provide inputs through the keypad. Thereafter responsive to operation of the machine and the state thereof in which a user no longer needs to provide inputs through the keypad, the at least one processor 508 changes the condition of the valve 504 to relieve fluid pressure from the port 502 and the fluid cavities 500. This causes the exemplary cover 498 to change to the collapsed condition. Of course it should be understood that elastic materials or other biasing mechanisms as well as the drawing of vacuum on the fluid cavities may be provided in some embodiments to facilitate the contraction of the cover into a collapsed position.

It should be understood however that the use of shaped memory members and fluid pressure to change the configuration of the cover and other security devices associated with input devices of a machine, are merely exemplary and in other embodiments other approaches may be used.

Figure 47:
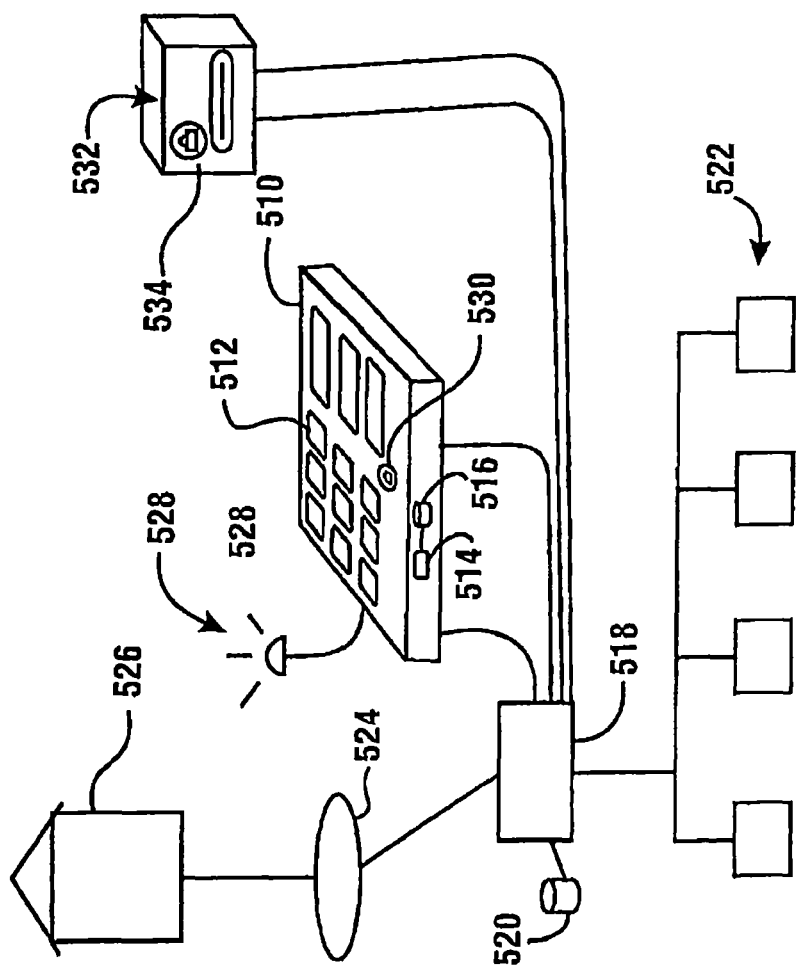
FIG. 47 is a schematic view of a keypad included on a banking machine which includes encryption capabilities and a visual indicator on the banking machine interface which is operative to indicate when user inputs are being encrypted.

FIG. 47 shows yet a further embodiment. This embodiment may be used in conjunction with features of other embodiments described or incorporated by reference. FIG. 47 shows a keypad 510. Keypad 510 of this embodiment comprises a plurality of keys 512 through which an ATM user can provide inputs by accessing the keys with manual digits. Keypad 510 may be of a configuration like that described in other embodiments herein.

The keypad 510 of an exemplary embodiment comprises an encrypting PIN pad (EPP) which is selectively operative to receive inputs through the keys, and encrypt corresponding key input signals within the keypad so that the output from the keypad is encrypted. This approach may be used in some embodiments to reduce the risk that a criminal could decipher ATM user inputs such as a user's PIN. The keypad 510 of the exemplary embodiment is also selectively operative to provide unencrypted outputs responsive to user inputs through the keys. This is done in the course of transactions where the inputs of a user are not necessarily confidential, such as inputs corresponding to amount data related to transactions a user is conducting, transaction selections or other inputs of a type that would not allow a criminal to compromise security for a user's account or other personal data.

In the exemplary embodiment the keypad 510 includes at least one internal processor 514. The processor 514 is in operative connection with the at least one data store 516. In an exemplary embodiment the data store may include digital certificates, at least one public key and at least one private key. The at least one data store 516 may also include other programmed instructions that facilitate maintaining the security of the keypad as well as the machine. Exemplary embodiments of the keypad may include features of those described in U.S. patent application Ser. No. 10/126,808 filed Apr. 19, 2002, the disclosure of which is incorporated herein by reference in its entirety. Of course this approach is exemplary.

In this exemplary embodiment the keypad 510 is in operative connection with at least one processor 518. Processor 518 of the exemplary embodiment is in operative connection with at least one data store. Processor 518 is also in operative connection with a plurality of transaction function devices schematically indicated 522. The transaction function devices may include devices that operate in the machine responsive to the at least one processor 518. These devices may include for example some or all of a display, a card reader, cash dispenser, depository, check acceptor and other devices operative in the machine to carry out transactions.

In this exemplary embodiment the at least one processor 518 executes programmed instructions stored in at least one data store and which are operative to cause the machine to carry out transactions. As schematically indicated, the at least one processor 518 is operative to communicate through at least one appropriate interface in a network 524. Network 524 enables the machine to communicate with at least one remote computer schematically indicated 526. The at least one remote computer with which the machine communicates may include for example, a financial transaction computer which transfers funds and keeps track of accounts held by users of the machine. Of course it should be appreciated that in various embodiments the machine may communicate through numerous different networks and with numerous different remote computers. The configuration shown in FIG. 47 is merely schematic.

In exemplary embodiments the at least one processor 518 is in operative connection with a visual indicator 528. Visual indicator 528 of an exemplary embodiment comprises a light emitter which is changeable between illuminated and unilluminated conditions. The visual indicator 528 is included in the user interface of the machine. In some embodiments it may be operatively connected to the processor through the keypad as shown, or may be connected in other ways. In addition in some exemplary embodiments other types of visual indicators may be used. These may include for example changeable signage indicators, outputs through the display of the user interface, mechanical indicators or other suitable indicators to indicate to a user that inputs they provide at certain times during transactions are being encrypted.

In the exemplary embodiment the at least one processor 518 is operative to cause the machine to carry out transactions. In an exemplary transaction flow the machine may output one or more instructions through the display to indicate to the user that the machine is ready to receive a confidential input such as a user's PIN. Responsive to the at least one processor being in this condition, the processor sends at least one signal to the keypad 510 which causes the keypad to encrypt the inputs thereto prior to delivering signals corresponding to such inputs to the at least one processor. In the exemplary embodiment the at least one processor is operative responsive to providing the output which causes the keypad to encrypt inputs, to also cause the at least one visual indicator 528 to provide a visual output. This visual output indicates to the user that the inputs that they are now providing through the keypad are encrypted.

In the exemplary embodiment the at least one processor provides instructions through a display or other output device to the user which instructs the user to input their PIN, and when they are done to provide an end input. This may include for example pressing a particular key of the keypad or other key or input device of the machine. In the exemplary embodiment responsive to receipt of this end input, the at least one processor is operative to send at least one signal that causes the keypad 510 to cease its encrypting functions. Further the signals from the at least one processor are also operative to cause the at least one visual indicator 528 to change its condition as well. This indicates to the machine user that inputs through the keypad are no longer being encrypted. Of course this approach is exemplary.

In further transaction steps the at least one processor 518 may provide instructions to a user through a screen or other output device. These instructions may include instructions for a user to input selected numerical values or other items through the keypad. In such conditions the at least one processor is operative through signals to the keypad to cause the keypad to receive such inputs and deliver signals corresponding to the inputs to the at least one processor in an unencrypted manner. During receipt of such signals which are not secured through encryption, the at least one processor is operative to cause the at least one visual indicator to be in a condition in which it indicates that the inputs are not encrypted. This may be to have the light emitting device off. Of course this approach is exemplary.

The function of providing to a machine user an indication that sensitive inputs such as the PIN are being encrypted may help to increase user confidence that their personal data is being secured. In addition the failure of the at least one visual indicator to operate at times when a user is being requested to input a PIN or other confidential data, may provide an indication to a user that the machine has been potentially subject to tampering and should not be used. In some embodiments the at least one visual indicator may be included on the keypad. In some exemplary embodiments the indicator may include an illuminated indicator such as a lock, which is indicated 530 in FIG. 47. The exemplary indicator including a lock graphic may serve to communicate to the machine user that their inputs to the keypad are secure. In some exemplary embodiments the indicator may be made as an integral part of a tamper resistant input device such as an Encrypting PIN Pad (EPP). The EPP may be made so that any tampering therewith or unauthorized programming thereof will cause the encryption indicator to cease to function or to function in ways associated with an undesirable condition. In this way it is less likely that a corrupted device will be installed on a banking machine and used by unwary users. In still other embodiments, the at least one processor may cause an output indicating an encrypting condition of a device through the display or other output device of the banking machine. This may include a visual output through the screen which includes a word output such as "keypad input now being encrypted" and/or the output of icons, graphics or other indicating outputs. Of course these approaches are exemplary.

Principles like that applied in connection with the exemplary keypad 510 may also be applied through other transaction devices that are operative to receive sensitive user inputs. For example a card reader schematically indicated 542 may include capabilities for selectively providing encrypted outputs corresponding to the data read from the cards of users. Exemplary embodiments may also include visual indicators 534 which are operative to indicate to users that a device is operating to encrypt the inputs that are being received therethrough. Such indicators may be in addition to or in lieu of indicators of the type previously discussed which are operative to indicate the condition of the device and/or to draw a user's attention thereto. Of course it should be understood that these approaches are exemplary.

In still other exemplary embodiments provision may be made for reducing the risk of unauthorized access to customers' confidential information such as a PIN number. These additional features may include for example, guarding against situations where criminals have programmed the machine or otherwise operatively connected to it in a way that causes the machine to request that a user input their confidential information at a time when the keypad or other device is not operating to encrypt inputs. This may be done for example by including unauthorized computer executable instructions in a data store associated with at least one processor of the machine. Alternatively or in addition, this might be accomplished by programming the machine in a way that causes the machine to connect to a network address which causes the machine to output a request for the user to input their confidential information. In still other situations criminals may include additional processors or other devices in the machine that send signals to the display to provide outputs through the display, which request a user to input their confidential information to the machine.

As can be appreciated these unauthorized outputs through the display or other output device can cause the user to input their confidential information at times during operation of the machine when the authorized programming is not causing the user inputs to be encrypted. As a result criminals can gather the unencrypted data corresponding to confidential inputs and later use the information to obtain unauthorized access to the user's account. In some situations this may be done by storing data corresponding to these inputs in at least one data store in the machine which can later be recovered either locally or remotely. Alternatively or in addition, in some situations the criminals may provide for the inputs to be delivered from the machine through a network to a remote location so as to minimize the risk of detection. Of course these approaches are exemplary of criminal exploits that may be attempted at automated banking machines.

As can be appreciated, in the exemplary embodiment of the automated banking machine during normal operation of the at least one processor 518, the at least one data store 520 includes computer executable instructions which cause the at least one processor to operate the machine to carry out transactions. These computer executable instructions cause the computer to carry out at least one transaction sequence. The transaction sequence that is carried out includes a plurality of states in which the machine is enabled to carry out certain transaction functions. For example in an exemplary embodiment, the at least one processor may wait for a customer to begin a transaction and may output certain displays to attract a customer to the machine. This step in the transaction sequence is associated with a wait state in which the machine is waiting for an initial input from a user to commence a transaction. In an exemplary embodiment the machine senses that the user has presented a card to an opening associated with a card reader, or that a user has otherwise engaged a similar article with the machine. In response to sensing these inputs the computer executable instructions of the at least one processor cause the machine to be in a card read state associated with the transaction sequence in which the card or other article has data read therefrom.

Thereafter responsive to being able to read the card, the at least one processor may then operate in accordance with the computer executable instructions to cause the at least one processor to be placed in a PIN entry state of the transaction sequence. In the PIN entry state of the exemplary embodiment, the at least one processor operates in conjunction with the encrypting PIN pad, namely keypad 510. The keypad operates in accordance with its programming and the instructions from the at least one processor to encrypt inputs from a user that are provided through the keypad. Input of an indication that the PIN has been provided, then causes the at least one processor to move to a next state in the transaction sequence in which the user is presented with options through the display for selecting a type of transaction that they wish to conduct at the machine.

The at least one processor of the machine in its normal operation steps through a series of states which have associated functions, operations and outputs that enable the machine to carry out different transactions. As can be appreciated in the exemplary transaction flow provisions are made in various states for the transaction to take different paths from a given state in the transaction sequence. For example in the transaction selection state the user may be asked if they wish to receive cash or if they wish to make a deposit. Depending on the user's input in response to the outputs through the display, the exemplary machine operates to move through the appropriate states in a transaction sequence for the particular type of transaction that the user has selected. Of course this approach is exemplary and in other embodiments other approaches may be used.

As can be appreciated, the at least one processor causes the machine to operate in accordance with the transaction sequence and cause signals corresponding to inputs through the keypad, card reader and/or other devices to turn on the encryption function during appropriate states in the transaction sequence. When the at least one processor in the machine has the machine in these particular states, the inputs through the keypad or other device capable of encrypting inputs are encrypted to protect the confidential information from interception. Of course in exemplary embodiments in other states in the transaction sequence, the user is not being instructed to input confidential information and the at least one processor causes inputs through the keypad to be output to the circuitry of the machine as signals that are unencrypted. Such unencrypted inputs are then transmitted to the at least one processor so that the machine can then carry out the appropriate transaction steps.

A potential risk arises if a criminal has electronically accessed the machine in ways that cause a request for input of confidential information to be provided from the machine during a state in the transaction sequence when the encryption capabilities of the keypad, card reader or other device with encrypting capabilities, are not turned on. If, for example, the criminal has installed software instructions that provides an unauthorized user exit in the transaction sequence which causes an output through the display that asks the user to re-enter their PIN number, the user may re-enter their PIN number at a time when the encrypting keypad is not operating to encrypt the inputs. Thus the user's confidential information may be input in the clear and intercepted. Likewise similar unauthorized outputs may request a user to reinsert their card at a time when outputs from the card reader are not being encrypted. In still other situations the user may be asked for other types of confidential information such as social security numbers, account numbers, mother's maiden name, etc. all of which might be used to gain unauthorized access to user's accounts or to accomplish identity theft.

As may be appreciated some of the ways in which unauthorized outputs can be caused to be made through a machine display will not necessarily disrupt the normal operation of the at least one processor or the transaction sequence that occurs responsive to the authorized instructions. Indeed as previously discussed, unauthorized devices can be connected to the display, unauthorized network connections or unauthorized computer executable instructions may operate in the at least one processor to perpetrate such unlawful activity. In addition it should be understood that such programming, while discussed as being used in connection with providing outputs through the display, may also be output through other output devices such as the audio outputs associated with voice guidance or other similar output devices which provide instructions to users of the machine to provide inputs.

To minimize such risks exemplary embodiments may include computer executable instructions in the at least one data store, that comprise character recognition software. Further in exemplary embodiments the computer executable instructions include software instructions that are operative to recognize signals that are received by the display on the machine and that cause the display to provide certain outputs. Further the exemplary instructions are operative to determine that the signals being provided correspond based on the operation of the character recognition software, to certain words and/or phrases which suggest that the display is providing outputs to users that instruct the users to input confidential information to the machine.

Thus for example in an exemplary embodiment the at least one processor 518 may be in operative connection with appropriate sensors, interfaces or other devices which sense the signals being received by the display on the machine. The signals are then analyzed through operation of the at least one processor to determine if the signals correspond to characters, phrases and/or other outputs that instruct a user to input confidential information to the machine.

For example in exemplary embodiments, the at least one processor may operate to look for signals which correspond to the words personal identification number, PIN, secret number, account identification number or other words and/or phrases (including in exemplary embodiments words and/or phrases in other languages) that are instructing a user to enter their PIN number.

In an exemplary embodiment, upon determining that the display is outputting such instructions, the at least one processor operates in accordance with its programming to turn on the encryption functions for inputs through the keypad. In this way upon determining that such an output is being provided through the display, the at least one processor assures that the encrypting functions of the keypad are turned on and the signals being output from the keypad are encrypted. The at least one processor can operate to cause inputs through the keypad to be encrypted until the output from the display is determined to no longer ask for a user's confidential information.

In still other embodiments the at least one processor may operate responsive to determining that a particular type of output requesting user confidential information is being presented, to determine the state in the particular transaction sequence in which the authorized software in the machine is currently operating. Thus for example, the at least one processor may operate to determine if the current state in the transaction sequence is the PIN entry state and/or that the at least one processor has already caused the encryption functions of the keypad to be turned on. In an exemplary embodiment the at least one processor upon determining that the machine is acting in a normal manner may take no further action. However, in circumstances where the at least one processor determines that entry of the customer's PIN is being requested at a time other than an appropriate state in the transaction sequence, the at least one processor causes the machine to operate to send at least one message to at least one remote computer indicating an abnormal condition. This may be accomplished in some embodiments in a manner like that described in U.S. Pat. No. 6,297,826 the disclosure of which is incorporated herein by reference in its entirety. Of course in other embodiments other approaches may be used.

In the exemplary embodiment the at least one processor may operate in accordance with its programming to analyze subsequent signals that cause outputs through the display, and to shut off the encrypting functions when the signals received by the display no longer correspond to requests that the customer input confidential information. However, in still other embodiments the at least one processor may be programmed to cause the machine to cease operation either entirely or to cease at least certain functions, upon the at least one processor determining that the display has output a request for confidential information at an inappropriate time during a transaction. Alternatively in other embodiments other approaches may be taken such as contacting a servicing entity or bank personnel or police authorities to advise of a particular suspicious condition. In still other embodiments the at least one processor may operate in a manner like that described in U.S. Pat. No. 7,147,147 the disclosure of which is incorporated herein by reference in its entirety, to capture image data and/or other information that may be useful in determining the cause of the unauthorized machine operation. Of course these approaches are exemplary.

In exemplary embodiments the at least one processor may operate character recognition software therein of the types that are commercially available. These may include for example software available from Carreker Corporation, a2ia or other commercially available software that recognizes characters, words and/or phrases. Such software may be operated to obtain the signals corresponding to those being sent to and/or received at the display, and convert them to suitable data for analysis to enable the at least one processor to determine whether the words, phrases, etc. being looked for are found in the current output display. Further in some embodiments the at least one processor may be connected through an appropriate interface located directly at or within the housing of the display so that the actual signals being delivered thereto are monitored. This may be useful for example in situations where the criminals have included in the machine a separate processor or other device that delivers signals to the display in a switched manner. For example in some embodiments it may be appropriate to integrate the signal sensing devices directly into the display to assure that the sensing devices that deliver the signals to the at least one processor for analysis cannot be bypassed.

In still other embodiments the at least one display may include at least one processor and data store which includes appropriate programs and the ability to provide at least one output back to the processor. Such a system may provide at least one output signal to the processor in the machine responsive to the signals being received by the display which cause outputs therefrom. The at least one processor may operate in accordance with associated programming to assure that the signals being delivered to the display at the particular time, correspond to those signals that the processor and its associated authorized transaction programs are causing to be delivered to the display. If the at least one feedback output signal from the display indicates a variance from what the at least one processor determines that the feedback signal ought to be at the particular time, then the at least one processor may operate in accordance with its programming to take appropriate action. Such appropriate action may include sending messages, disabling functions and/or shutting down the machine. Such feedback output signals may be generated responsive to encryption of signals being received at the display, which signals can then be compared to the values calculated by the at least one processor based on the signals it is causing to be sent to the display. Of course other approaches may be used.

In still other embodiments the machine may operate in a manner that includes at least one camera adjacent to the display. The camera operates to capture images corresponding to screen outputs. This may be done for example in the manner of the incorporated disclosures. Such camera signals may then be analyzed through operation of the at least one processor, or by a separate authorized processing system, to determine if the outputs requesting confidential inputs from a user are being presented at an inappropriate time in the transaction sequence. Such an approach may be useful in environments where it is not possible to assure that the signals actually driving the display can be monitored at all times and/or when there is a risk that a display with antifraud capabilities has been replaced with a different display. Alternatively or in addition, such an approach may be useful in situations where a criminal has overlaid an output device on the outside of the display screen of the machine. For example a criminal may install a liquid crystal pane or other display structure on the outside of the authorized machine display. Such an external display may operate to make it appear that the machine is outputting messages to the user, when the messages are being generated from the unauthorized overlaid display pane. At other times the pane may be operated so as to be transparent. In such circumstances the use of systems with imaging devices such as cameras which monitor the outputs which the user actually sees, and analyzes them for requests for confidential information at inappropriate times in the transaction sequence, or for lack of correspondence with what the authorized software would cause the output to be, may be useful in helping to prevent fraud. Of course these approaches are exemplary and in other embodiments other approaches may be used.

As can be appreciated, in some embodiments the at least one processor which operates to conduct the analysis for inappropriate outputs, may include processors within the machine such as processors included in the keypad or other processors such as distributed processors throughout the machine. In still other embodiments as previously discussed, the analysis may be conducted through external processors such as image analysis devices which operate to capture images or other data from cameras. In still other embodiments the character recognition software and analysis may be conducted within processors located in tamper resistant devices such as the keypad or other devices within the machine that will generally cease to operate if an attempt is made to tamper with their operation or programming. Of course these approaches are exemplary.

In some exemplary embodiments communications between at least one processor in the machine on the display may be used to assure that the display of the at least one processor are both authorized components that are trusted and are intended for operation in the automated banking machine. In exemplary embodiments at least one authorization signal that is operatively communicated between circuitry associated with the display and the at least one processor helps to assure that at least one of the components is a trusted component. In the absence of the at least one authorization signal, the automated banking machine will not carry out at least one transaction function. For example in some embodiments in the absence of the at least one authorization signal the display may cease to operate to provide any visual outputs.

Alternatively in the absence of the at least one authorization signal the display may selectively cease to provide certain outputs such as for example requests for users to provide confidential information such as a PIN. In still other embodiments in the absence of the at least one authorization signal the display may operate to provide an output such as if the machine is not operational and is not in service. Of course these approaches are exemplary.

In some embodiments the at least one authorization signal may include a plurality of signals that are communicated responsive to the at least one processor to the circuitry associated with the display and/or from the display circuitry to the processor. For example the processor may operate to generate a first authorization signal to the display. The display circuitry may thereafter operate in accordance with computer executable instructions stored in connection therewith to cause a second authorization signal to be sent to the processor of the associated display drive and circuitry which operatively communicates with the processor. In some embodiments the authorization signal from the display to the processor may include a portion that is a function of the first authorization signal that is sent to the display circuitry. By having at least a portion of the second authorization signal reconstituted as a function of the first signal, there may be greater assurance that the display operating in the machine is an authorized component. Of course this approach is merely an example.

In some exemplary embodiments the at least one processor may operate to cause the authorization signal to the display to be a function of the card data that is read from the card of the customer that is currently operating the machine. This may include for example an encrypted code that is generally responsive to the card data and which provides a unique data signal to the display circuitry. The display circuitry will then operate in response to certain computer executable instructions in operative connection therewith to carry out one or more mathematical manipulations based on the authorization sent from the processor including the card data and return a second signal to the processor. The processor may then carry out computational functions to verify that the authorization signal generated by the display circuitry corresponds to the card data originally sent. In determining such correspondence the at least one processor may then operate to carry out transaction functions based on assurance that the display is being operated as a trusted component. However, in the event that the authorization signal from the display is determined by the at least one processor to be an improper signal or one that cannot be verified as authorized, the at least one processor may cease to operate the machine to carry out transactions. Alternatively or in addition the at least one processor may cause the automated banking machine to send at least one message from the automated banking machine to at least one remote computer to indicate the possible fraud condition of the machine. Of course these approaches are exemplary.

In still other embodiments the at least one authorization signal sent by the at least one processor to the display may include a time signal. In an exemplary embodiment the at least one processor includes a clock function operating therein which is operative to generate data corresponding to a then current time. Data corresponding to all or a portion of the then current time data may be included in the at least one authorization signal sent by the processor to the display. Alternatively or in addition the at least one processor, the display and/or both may have data associated with one or more respective serial numbers or other numbers associated therewith. The authorization signals communicated may be a function of the respective serial numbers associated with these components. As a result the serial numbers may be used as a basis for assuring that the respective authorized components are operating in the machine.

Alternatively or in addition other parameters may be used as the basis for the authorization signals that are communicated to be sure that the processor and/or the display are authorized components. Of course in some embodiments combinations of multiple parameters may be used.

In still other exemplary embodiments the at least one processor and/or the circuitry associated with the display may be operative to include routines that generate random numbers. For purposes of this disclosure a random number will be deemed to include any form of random characters or values. Such random numbers may be included in the authorization signals that are sent by and/or returned from the various components. For example in some embodiments a random number generated through operation of the processor may be encrypted through operation of the at least one processor and sent as part of the authorization signal through the circuitry associated with the display. The display may thereafter process the data received including the random number and encrypt it in a manner through operation of one or more processors and computer executable instructions associated with the display circuitry. The authorization signal returned by the display to the processor of the machine originating the random number will then be analyzed through operation of the processor to verify that the return signal is based on the original random number and has been manipulated in a manner consistent with the programming of the circuitry in the authorized display. Such determination may be used as the basis for continuing the operation of the at least one processor to carry out transactions. Of course it should be understood that random numbers are but one type of value that may be included in authorization signals.

In still other embodiments each of the at least one processor in the machine on the display circuitry may have an associated respective public/private key pair. In such embodiments the at least one processor in the machine may generate values to be included in an authorization message and encrypt such values using the private key associated with the at least one processor. The circuitry associated with the display may then use the associated public key of the at least one processor to decrypt the message. The ability of the public key associated with the at least one processor to decrypt the message provides assurance that the message is sent by the at least one processor.

In the exemplary embodiment the circuitry associated with the display may thereafter manipulate or otherwise process all or a portion of the data received in the message from the at least one processor to generate a further authorization message. In exemplary embodiments this message may include one or more portions that are a function of the original message from the at least one processor. The circuitry associated with the display may then encrypt the authorization message to the at least one processor using the private key associated with the display circuitry. The message is then communicated through the internal communications channel of the automated banking machine such as a universal serial bus connection or other data bus to the at least one processor. The at least one processor may then decrypt the message from the display in accordance with its associated programming using the public key associated with the display circuitry. The ability of the at least one processor to decrypt the message using the public key of the display circuitry provides assurance that the message originated from the display circuitry. Further the at least one processor may confirm that the message sent by the display circuitry is based on its original message by comparing or manipulating the data included in the authorization message to assure that it corresponds with the data that was originally sent. In some embodiments the programming associated with the display and/or the devices in communication with the processor and driving the display may include anti-tampering features. This may include for example memories that hold data such as public and private key data which are automatically erased in the event of any attempt to access or manipulate the data therein that might be consistent if efforts to reverse engineer the circuitry are made. In still other embodiments such communications circuitry and sensitive data may be encapsulated within physical structures. Such physical structures may be built to destroy any stored information therein in the event an effort is made to open the physical casing. Thus for example physical modules associated with the at least one processor that operate to send messages to the display and/or modules which are included therein or are connected with the display circuitry may be hardened so as to prevent tampering or access thereto. Of course these approaches are exemplary and in other embodiments other approaches may be used.

It should be understood that while the exemplary approach has been discussed in connection with the display of the machine, other embodiments may operate using similar principles for other types of devices on a machine which provide outputs and/or receive inputs. Thus for example the at least one processor in the machine may be programmed to look for requests to input confidential and/or private customer information of the type that can be read from the user's card. This may include for example, asking the customer to re-input a card at an inappropriate time. In exemplary embodiments the at least one processor may operate to turn on an encryption function that can operate in a processor associated with the card reader or other device, to avoid interception of the data as well as to give notification. Further in still other embodiments the at least one processor may include software of a type that recognizes verbal outputs. For purposes of this disclosure software of the type that recognizes verbal outputs will also be called character recognition software. Such software which recognizes verbal outputs may monitor output signals to or through speakers, headphone jacks or other similar output devices on the ATM. The at least one processor may monitor for the output of words requesting the input of user confidential information at inappropriate times in the transaction sequence.

This may minimize the risk for example, that a blind user provides their confidential information in response to voice guidance outputs which are caused to be presented due to criminal modifications to the machine.

Figure 52:
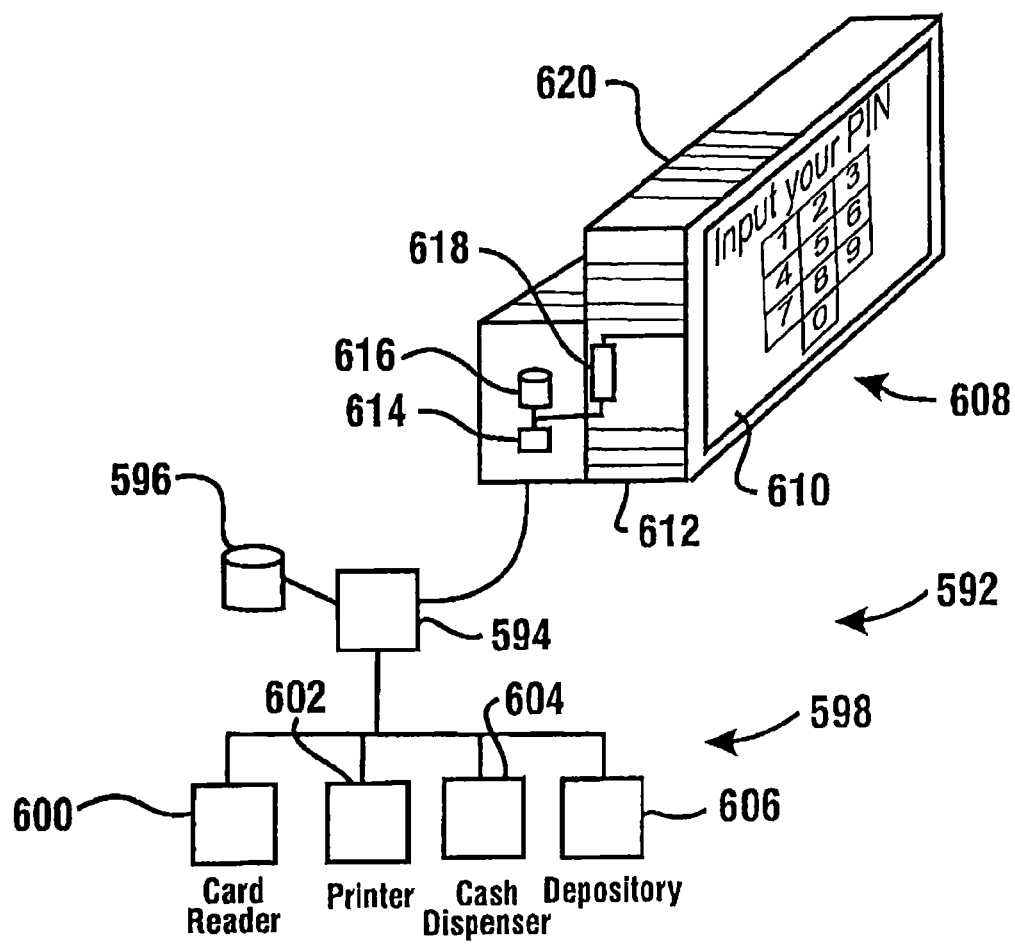
FIG. 52 is a schematic view showing embodiments of an exemplary automated banking machine including a secure touch screen display module.

In addition it should be understood that the features discussed in connection with FIG. 47 may also be used in conjunction with other features described herein. This may include for example devices for limiting unauthorized observation of inputs through the keypad and approaches for minimizing the risk of unauthorized detection of confidential user data. FIG. 52 shows schematically components of yet another alternative embodiment of an automated banking machine generally indicated 592. Machine 592 includes at least one terminal processor 594. Processor 594 is in operative connection with at least one data store 596. As in the other embodiments data store 596 includes data as well as computer executable instructions that are carried out through operation of the processor to operate the machine. Of course it should be understood that while only one processor and data store are shown, embodiments may include numerous processors and data stores.

Terminal processor 594 is in operative connection with transaction function devices of the machine generally indicated 598. The exemplary transaction function devices include card reader 600. Card reader 600 is operative to read data included on user cards. This includes for example data corresponding to financial accounts of users of the automated banking machine. Another exemplary transaction function device is a printer 602. Printer 602 may include a receipt printer of the type that provides users with receipts for transactions conducted at the machine.

Another exemplary transaction function device in machine 592 is a cash dispenser 604. Cash dispenser 604 may be of the type previously described that operates to cause cash such as currency bills that are stored within the machine to be selectively dispensed and made accessible to a user outside the machine. The exemplary machine also includes a depository 606. Depository 606 may be of the type that accepts deposits made by a user into the machine. Such deposits may include in some embodiments deposited items that are included in deposit envelopes. In other embodiments the depository may accept items such as cash or checks.

Of course it should be understood that machine 592 may include other or different types of transaction function devices. These may include for example different types of input devices, output devices as well as devices for performing transaction functions of the type desired at the machine.

In the exemplary embodiment machine 592 includes a touch screen display module 608. In this exemplary embodiment the touch screen display module 608 is a structure or assembly of components designed to provide a secure input device through which users can input data which is protected from being intercepted by unauthorized persons. The exemplary embodiment of the touch screen display module includes an output pane 610. Output pane 610 of the exemplary embodiment comprises a generally transparent pane which is part of a touch sensitive screen.

The touch sensitive screen may be one of several types which can be used to determine the relative location on the screen at which a user makes contact with the screen using their finger. This may include for example in some embodiments a resistance detecting touch sensitive screen. In other embodiments the touch sensitive screen may be of the capacitance detecting type. In still other embodiments the screen may include an acoustic wave detecting type of touch sensitive screen. In still other embodiments other types of touch sensitive screens may be used. As can be appreciated other various suitable types of touch sensitive screens may be used to determine the position of contact made by a user's fingers on the screen so as to detect when a user touches a selectable visible output that is provided from the display.

An exemplary embodiment of the touch screen display module 608 may also include a haptic interface system in order to provide tactile feedback. Example haptic touch screens that may be used in exemplary embodiments may include the haptic touch screens manufactured by Pacinian Corp. of Spokane Wash., or Esterline Advanced Input systems of Bellevue Wash., or may include any other haptic interface system that is operative to provide tactile feedback with a touch screen.

In an exemplary embodiment, the touch screen display module 608 may be comprised of a haptic touch screen that overlies an LCD display screen (or CRT display screen) of the touch screen display module. The haptic touch screen may be selectively configured to provide tactile feedback (e.g., vibration) responsive to touches (e.g., finger presses, finger sliding) in designated positions on the surface of the touch screen that correspond to virtual buttons (e.g., keypad keys and functions keys) or other user interface controls and indicia displayed by the display screen under the haptic touch screen.

The exemplary embodiment further includes a housing 612. The housing 612 of the exemplary embodiment houses internal display module components. These include a display module processor 614. The display module processor is in operative connection with at least one module data store 616. In the exemplary embodiment the at least one display module data store includes a volatile memory in which at least some of the data store therein is erased in the event of power loss. The exemplary display module includes a power supply connection so that the volatile memory of the display module maintains its data when the machine is turned on. In the exemplary embodiment the housing of the display module includes at least one battery 618. The at least one battery operates to provide a source of power so as to enable the volatile memory to maintain data storage even during times when the machine is turned off or unplugged from an AC power source.

In the exemplary embodiment the housing 612 comprises a unitary structure that is designed to require breakage to access the internal components thereof. This may be done for example by providing a permanently sealed assembly so as to avoid the risk that unauthorized persons can gain access to information in the display module data store. For example in an exemplary embodiment the housing includes a plurality of sensors that are operative to sense an effort to access the interior area of the housing. In an exemplary embodiment the sensors may include frangible electrical conductors 620. The exemplary frangible electrical conductors may be operative to electrically connect the electrical power source including the battery and the data store. Such conductors may include thin wires, conductive traces or other conductive items that readily break when disturbed. Attempts to open the housing may fracture one or more of the electrical conductors resulting in a loss of power from the electrical power source and the battery 618 to the display module data store. Thus the sensors detecting possible compromise of the display module, result in the data included in the display module data store being erased.

Further in exemplary embodiments the sensors may include electrically conductive material in at least one transparent pane of the touch screen. This may include for example electrically conductive trace material or other material which is operative to provide a sensor that assures the integrity of the housing. Deformation or breakage to the housing results in the loss of electrical power to the volatile memory resulting in erasure of the data in the data store. In some embodiments for example the sensors including the electrical conductors may be molded into components of the display module so as to minimize the risk that the sensors can be compromised. Of course these approaches are exemplary. Further it should be understood that while in the exemplary embodiment the approach of maintaining power to the data store is used to determine efforts to compromise the display module housing, other approaches may be used in alternative embodiments. These may include for example other types of sensors that detect deformation of the housing which is indicative of efforts at disassembly or compromise.

Likewise other embodiments may include sensing of changes in gas pressure either into or out of the interior area of the housing so as to detect a break in the housing indicating a compromised condition. Of course these approaches are exemplary and in other embodiments other approaches may be used.

In the exemplary embodiment the at least one display module data store is used to store data corresponding to at least one encryption key. In some exemplary embodiments the at least one encryption key may include a symmetric key such as a key that complies with the Data Encryption Standard (DES) or other suitable key type. The at least one processor in the display module may operate in accordance with its programming to cause the display module to output selectable outputs such as the visual representation of a keypad on the display. The visible representation of the keypad may include a plurality of keys, each of which may be selected by a user touching the screen where the key appears.

In exemplary embodiments with a haptic touch screen, the module processor and/or the terminal processor may be operative to configure the haptic touch screen to provide tactile feedback for the displayed keys. Such tactile feedback may by outputted by the haptic touch screen immediately upon detection of a user's finger touching or sliding across a displayed key or other indicia on the screen. In further embodiments such tactile feedback may by outputted by the haptic touch screen in response to the detection of a finger of a user that persists for at least a predetermined amount of time in generally the same location (e.g., a "long press") on the haptic touch screen.

To assist in locating a displayed numeric keypad on the haptic touch screen, in exemplary embodiments, a designated key such as a central key (e.g., a "5" key) of the keypad may be configured to provide a tactile feedback output when initially contacted by a finger, whereas adjacent surrounding keys either do not provide such a tactile feedback or provide a different tactile feedback. Providing a distinctive haptic feedback for a designated key (such as a central "5" key) may enable a visually impaired user to slide a finger around the touch screen to identify the location of the designated key. Once the designated key is found, the user can use its position to determine the location of adjacent keys of the keypad. The user may then long press one or more of the keys to produce an input requested by the machine (e.g., a PIN, amount of value, menu selection).

In exemplary embodiments, tactile feedback may be outputted responsive to the detection of a finger pressing or sliding adjacent the edges of keys or in the border between keys. For example, the spaces between and around keypad keys may correspond to a grid that is configured to provide tactile feedback as the user slides a finger over the spaces between and around displayed keys. A visually impaired user may identify the location of the keypad and the location of individual keys in the keypad by sliding a finger around the screen to identify the location of the grid that defines the keypad.

In example embodiments, the haptic touch screen may be configured to provide different tactile sensations for different locations (e.g., different displayed keys or other indicia) on the screen and for different types of inputs (e.g., sliding a finger or long press of a finger). Such different tactile sensations may be produced by having the haptic touch screen produce different vibration patterns for the different locations and/or types of inputs. Such different vibration patterns may include variations in magnitude, duration, waveform and/or frequency of the vibration.

For example in one embodiment, each numeric key of a keypad displayed by the touch screen and touched by a finger of a user, may produce a unique tactile output in a pattern that can be used to recognize the key being touched. Such a pattern for example may correspond to a series of short and long vibrations based on the Morse Code signals for the particular numeric number associated with the key being touched. Also, it should be appreciated that in addition to outputting tactile outputs, the processor controlling the haptic touch screen may also cause corresponding audio outputs (beeps, words) through a speaker device associated with the display screen (e.g., headphone jack, loud speakers) to be outputted as well.

Responsive to user input corresponding to one of the selectable outputs, the at least one processor operates in accordance with its programming to generate encrypted input data corresponding to the user input. This encrypted input data may be generated in some embodiments by the display module processor encrypting the data corresponding to the input using the stored encryption key. Further in some embodiments the input data may be triple encrypted using the DES key stored in the at least one data store. The at least one processor 614 of the display module may then operate to cause data corresponding to the encrypted input data to be communicated to the terminal processor 594. Of course it should be understood that in some embodiments the display module processor may operate to provide encrypted input data corresponding to multiple user inputs provided as part of a series of inputs from the machine user. This may include for example a plurality of inputs provided by the user which correspond to the user's personal identification number (PIN). Of course this approach is exemplary and in other embodiments other approaches may be used.

It should also be understood that in some embodiments the display module processor may operate executable instructions including communication verification software or other software of the types previously described to assure that it is in operative communication with an authorized terminal processor of the machine. Further in other exemplary embodiments the display module processor may operate character recognition software such that outputs corresponding to requests for input of sensitive data are recognized to assure that any confidential inputs by the customer are properly encrypted.

In still other embodiments the at least one display module processor may be operative to execute instructions which produce the outputs from the display. Thus for example the display module processor and the associated data store may include instructions to produce the graphics and other output content that is presented by the machine to users. In this way the terminal processor 594 need only provide messages to the touch screen display module which indicates the nature of the current output which the touch screen module is to provide. This may be useful in avoiding need for the terminal processor to generate the necessary screen output data. This minimizes the processing power utilized for this purpose by the terminal processor and also minimizes the risk that the display may be operated to output messages to users that are not appropriate. Of course these approaches are exemplary.

In still other embodiments the data store 616 of the touch screen display module may include data corresponding to at least a public/private asymmetric key pair. Likewise the data store 596 associated with the terminal processor may also include data corresponding to another public/private key pair. The public/private key pairs may each be associated with respective digital certificates. The terminal processor 594 and the display module processor 614 may operate to communicate messages using the respective certificates and public and private key pairs which help to assure that each of the processors is in operative communication with the other authorized machine component. This may be done in a manner like that previously discussed.

For example the public key associated with terminal processor 594 may be communicated to the processor in the touch screen display module and stored in data store 616. Likewise the public key associated with the display module may be communicated and stored in data store 596. By exchanging messages which are encrypted with the public keys of the other component, each processor is able to assure that it is in communication with the other authorized component and not with a rogue component that has been installed improperly in the machine. Such assurance may be achieved using techniques that involve the exchange of the certificate data or other secret data or information that helps to assure that each component is authorized to the other.

In still other embodiments communications between the terminal processor 594 and the display module processor 614 may be suitably encrypted so as to minimize the risk of interception. This may include for example encrypting communications of data which generally is not required to be kept secret internally within the machine. Such data may include for example numerical data corresponding to transactions, transaction function selection inputs or other information. This may also include the encryption of messages to the touch screen display module which cause the output of selectable outputs through the display. This may include encryption of messages that cause the display module to output the PIN input or similar outputs.

The use of encryption may further help to assure that the accuracy and secrecy of internal machine communications are properly maintained. Further in some embodiments data such as customer input data corresponding to a PIN may be encrypted using the reversible DES encryption key as well as through communications which are encrypted using asymmetric keys. Of course this approach is exemplary and in other embodiments other approaches may be used.

Figure 53:
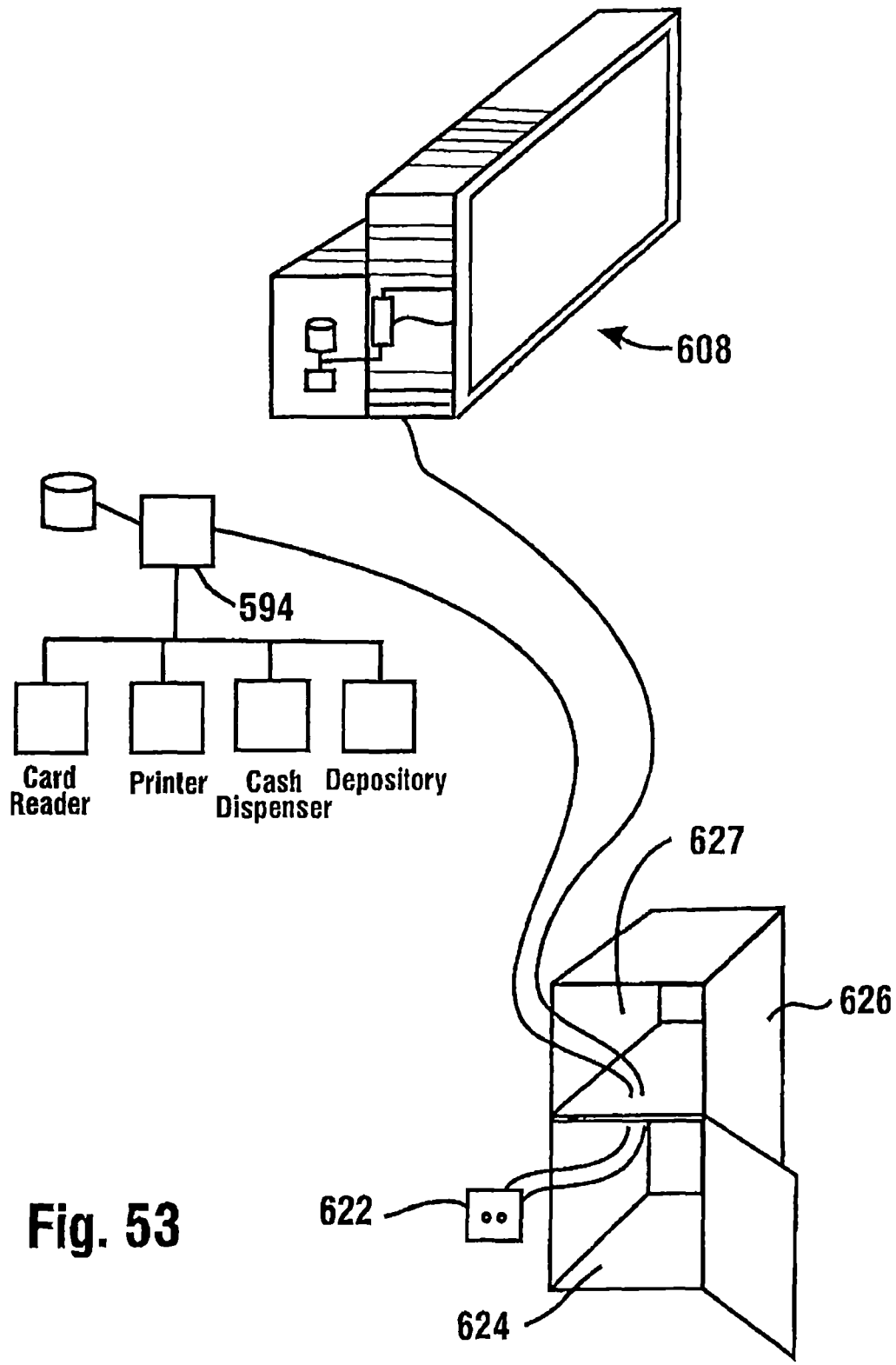
FIG. 53 is a schematic view similar to FIG. 52 but including a secure input device for providing secure communication between the terminal processor and the touch screen display module.

In still another arrangement represented schematically in FIG. 53 secure communications may be further facilitated between the touch screen display module and the terminal processor. In this exemplary embodiment secure communication is facilitated by having the terminal processor and the touch screen display module connected through at least one secure input device schematically indicated 622. In the exemplary embodiment the secure input device includes at least one component having a manually actuatable input device. Further the exemplary secure input device is located within a chest portion 624 of an ATM housing 626. As can be appreciated the touch screen display module 608 and the terminal processor may both be located within the machine housing in an upper portion 627. The upper portion of the housing of this exemplary embodiment is not as secure as the chest portion. The chest portion generally corresponds to a safe with a closable chest door and secure lock. The chest houses valuable documents such as cash. Thus in this exemplary embodiment providing for the secure input device 622 to be accessible only when the chest portion is open assures that persons that provide inputs thereto are those who are authorized to have access to the valuables such as cash that are located in the chest.

In the exemplary embodiment the secure input device 622 comprises at least one processor and at least one data store. The at least one processor is operative to provide for a secure key exchange between the touch screen display module and the terminal processor or other secure communications initialization. Thus in the exemplary embodiment actuation of the secure input device operates to cause the establishment of secure communications between the display module and the terminal processor. This may include communications that cause the public key associated with the terminal processor to be communicated to the touch screen display module and stored in the data store therein, and vice versa. This may also include an exchange of certificate, signature or other verification data. This may be done for example in some embodiments to initialize secure communications so that each of the touch screen display module and terminal processor are recognized by one another as authorized machine components. Thus in such embodiments attempts to replace one or the other of the components will result in the other of such components determining that it is not in communication with an authorized component, and the device will operate in accordance with its programmed instructions to cease communication of sensitive data unless the secure input device is again accessed and is used to reinitialize each of the components to the other.

In still other embodiments the secure input device may operate in accordance with its programming to provide monitoring of the secure communications to help assure that the at least one terminal processor and display module are communicating securely and that there are no signs of efforts to compromise their operation. This may be done for example by using multiple signals and encryption techniques that are exchanged between the devices and the secure input device. The secure input device operates in accordance with its programming to analyze the communications and to discontinue normal operation in the event that conditions corresponding to a possible problem are detected. Further in some embodiments the secure input device may also be in operative connection with other transaction function devices so as to disable them from operation in the event of a possible detected problem such as a security attack. Likewise in still other embodiments the secure input device may also operate to cause the banking machine to give notifications either locally or remotely of suspected problems. Of course these approaches are exemplary and in other embodiments other approaches may be used.

In still other embodiments the processor included in the touch screen display module may have programming that enables the touch screen display module processor to perform the functions performed by the terminal processor in other embodiments. This includes communicating with other transaction function devices in the machine so as to control their operation. Thus for example in some embodiments all of the instructions necessary for operation of the automated banking machine may be included in the data store encapsulated within the display module. Efforts to compromise the display module to gain access to any of the secure programming may result in the loss of operability of the machine. Further as can be appreciated the principles discussed which provide secure communications between the touch screen display module and the terminal processor may be used in alternative embodiments to achieve secure communications between the touch screen display module and the processors operative on individual transaction function devices.

Further in some other exemplary embodiments the touch screen display module may include other input devices that it may be desirable to secure it from tampering. This may include for example card reader components. Thus for example in some embodiments the housing of the touch screen display module may include a card reader device that is operative to read data from user cards. This may include for example components suitable for reading data in a magnetic stripe of the user card. Alternatively this may include contactless card reading devices such as devices that are suitable to read radio frequency or inductance data signals from cards that are positioned in proximity to the reading device. Of course these approaches are exemplary.

By including the card reading capability and user input capability within a single encapsulated display module some embodiments of automated banking machines may reduce the risk of compromise that would otherwise be associated with communications between such components of the machine. Further encapsulating such components within a single assembly may further facilitate machine operation and reduce cost and complexity in machine design. Of course these approaches are exemplary and in other embodiments other approaches may be used. In exemplary embodiments, the terminal processor may be located in a computer mounted in the same automated banking machine as is the described display module. However, in alternative embodiments, the terminal processor/computer that operates the display module and other components in the machine (e.g., cash dispenser, card reader) may correspond to a virtual processor of a virtual machine executing in a remote server. In such embodiments, the display module may include a processor and associated circuitry (referred to herein as a portal device) configured to securely communicate with and carry out a remote client protocol with the virtual machine. Examples of portal devices for use with automated banking machines and the display devices of automated banking machines is shown in U.S. Patent Application No. 61/323,161 filed Apr. 12, 2010 which is hereby incorporated by reference herein in its entirety.

In this described embodiment, the portal device may include processor/controllers adapted to carrying out a remote client protocol such as Teradici PC over IP (PCoIP) protocol. Such a PCoIP protocol is operative to communicate device bus communications corresponding to Universal Serial Bus (USB) communications and display video communications over a TCP/IP network with a remote host processor and/or virtual machine. The portal device may include USB ports for connecting machine devices (e.g., cash dispenser, card reader, display module/touch screen). The portal device may also include video ports for connecting the display screen of the display module.

In this described embodiment, terminal software such as applications and device drivers that operate the automated banking machine, may execute in the virtual processor of the remote virtual machine. USB and video communications on the remote virtual machine may then be communicated to the respective devices and display screen in the automated banking machine via the portal device.

In an example embodiment of a display module that includes a portal device, the display module may include USB ports for connecting devices in the machine (e.g., cash dispenser, card reader) to the portal device. Internally in the display module, the display screen and touch screen may be connected to the portal device. Also for embodiments of the display module with a card reader, such a card reader may be connected to an internal USB port/header in the display module.

Figure 54:
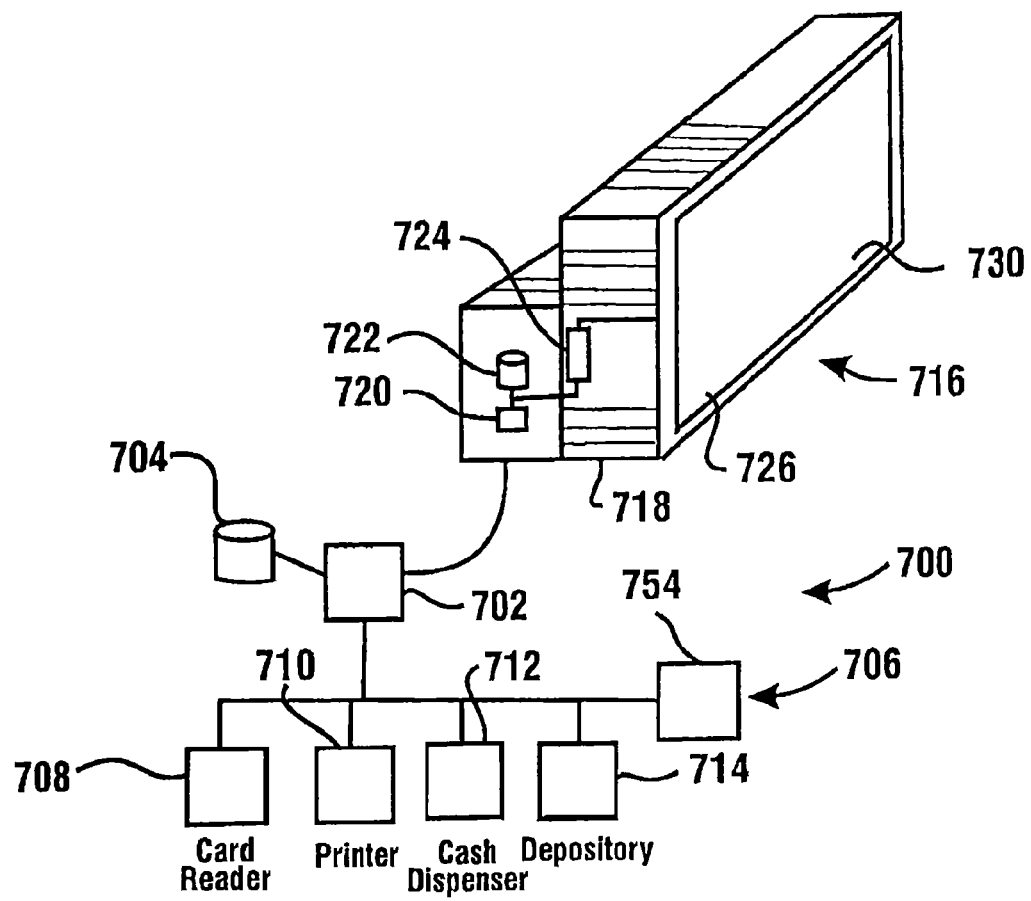
FIG. 54 is a schematic view showing another exemplary embodiment of an automated banking machine.
Figure 55:
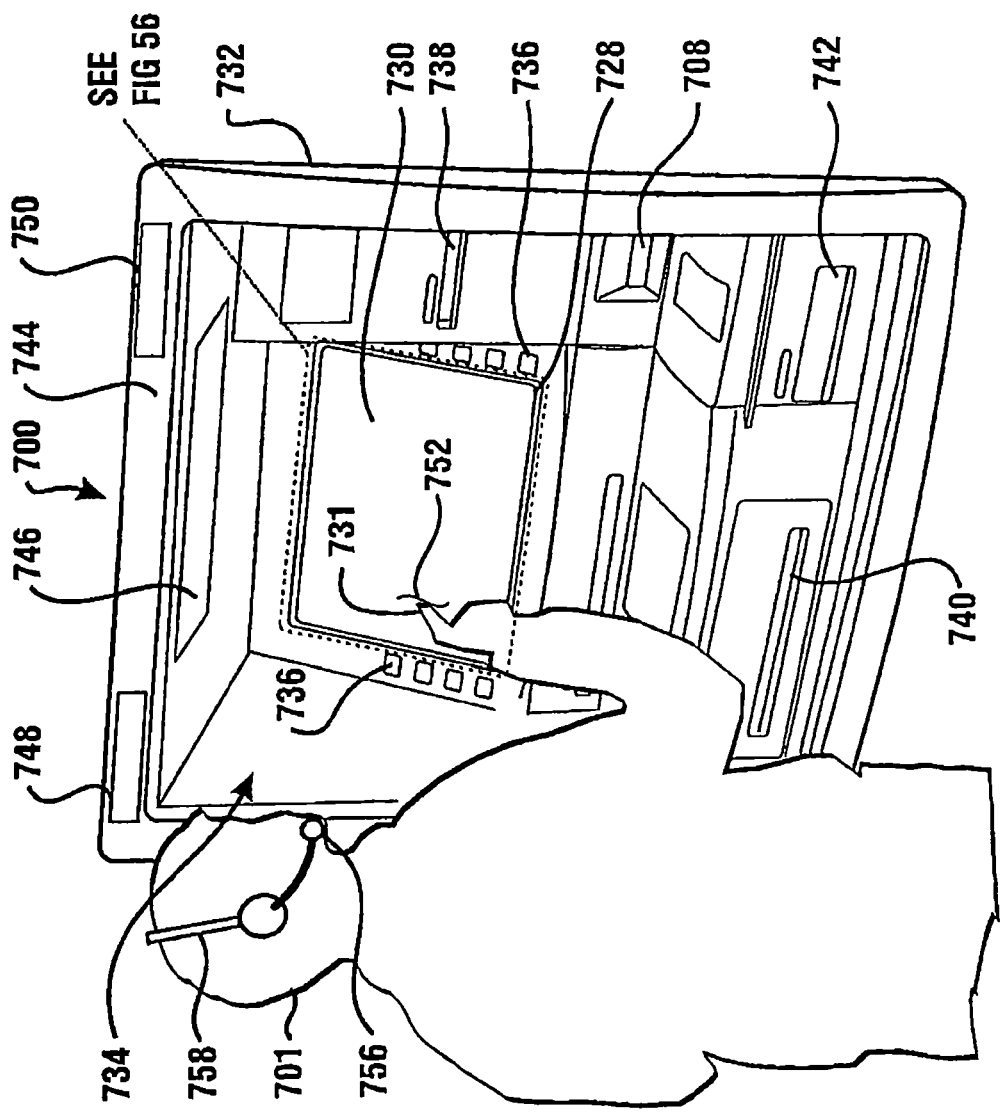
FIG. 55 is an isometric view of the exemplary embodiment of FIG. 54.
Figure 56:
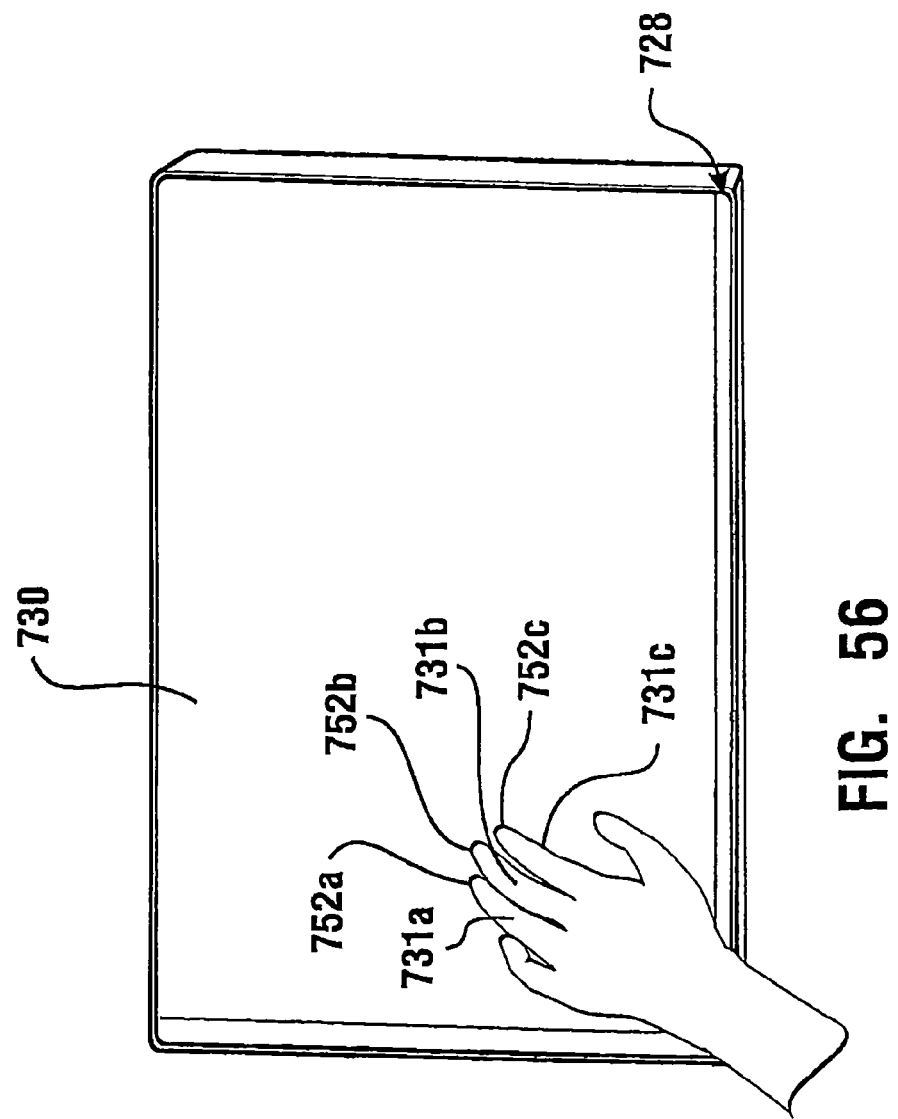
FIG. 56 is an enlarged isometric view of the portion of the automated banking machine as indicated in FIG. 55.

FIGS. 54-56 show a machine 700 of another exemplary embodiment. The machine 700 includes a touch screen display that is configured for use by visually impaired users 701 (FIG. 55). The machine 700 includes at least one terminal processor 702. The terminal processor 702 is in operative connection with at least one data store 704. As in the other embodiments data store 704 includes data as well as computer executable instructions or software that are carried out through operation of the terminal processor to operate the machine. Of course it should be understood that while only one terminal processor and data store are shown, embodiments may include numerous processors and data stores. Alternatively, the terminal processor 702 may not be located within the machine and may be located in a server or other device remote from the machine. For example, the terminal processor 702 may be located in a server that is operatively connected to the machine 700 and also to other machines. This central server may be located remotely from the machines.

The terminal processor 702 is in operative connection with transaction function devices of the machine generally indicated 706. The exemplary transaction function devices include a card reader 708. The card reader 708 is operative to read data included on user cards. This includes for example data corresponding to financial accounts of users of the automated banking machine. Another exemplary transaction function device is a printer 710. The printer 710 may include a receipt printer of the type that provides users with receipts for transactions conducted at the machine.

Another exemplary transaction function device in the machine 700 is a cash dispenser 712. Cash dispenser 712 may be of the type previously described that operates to cause cash such as currency bills that are stored within the machine 700 to be selectively dispensed and made accessible to a user outside the machine 700. The terminal processor 702 is in operative connection with the cash dispenser 712 and the card reader 708. The terminal processor 702 is operative to cause the machine 700 to operate to read card data from a user card and to cause a determination to be made that the card data read from the user card corresponds to an authorized user and an authorized financial account. The terminal processor 702 may then operate to cause cash to be dispensed from the machine 700 to the user 701 and to cause a financial account corresponding to the card data to be assessed for cash dispensed.

The exemplary machine 700 also includes a depository 714. Depository 714 may be of the type that accepts deposits made by a user into the machine 700. Such deposits may include in some embodiments deposited items that are included in deposit envelopes. In other embodiments the depository may accept items such as cash or checks. Of course it should be understood that the machine 700 may include other or different types of transaction function devices. These may include for example different types of input devices, output devices as well as devices for performing transaction functions of the type desired at the machine.

In the exemplary embodiment, the machine 700 includes a touch screen display module 716 that is operatively connected to the terminal processor 702. The touch screen display module includes a housing 718 that houses the internal display module components. These components may include a display module processor 720. The display module processor is in operative connection with at least one module data store 722. In the exemplary embodiment, the housing of the display module may include at least one battery 724. The at least one battery 724 operates to provide a source of power so as to enable volatile memory of the data store 722 to maintain data storage even during times when the machine is turned off or unplugged from an AC power source. These components are designed to provide a secure input device through which users can input data which is protected from being intercepted by unauthorized persons.

The exemplary embodiment of the touch screen display module 716 includes an output pane 726. Output pane 726 of the exemplary embodiment comprises a generally transparent pane which is part of a touch screen display 728. The touch screen display 728 may be one of several types which can be used to determine the relative location on the screen at which user 701 makes contact with an input surface 730 of the touch screen display 728 using his or her fingers 731. This may include for example in some embodiments a resistance detecting touch screen display. In other embodiments the touch screen display 728 may be of the capacitance detecting type. In still other embodiments the touch screen display 728 may include an acoustic wave detecting type. As can be appreciated other various suitable types of touch screen displays 728 may be used to determine the position of contact made by a user's fingers on the touch screen display 728 so as to detect when a user touches the input surface 730 of the touch screen display 728. Also, the machine 700 may include the touch screen display 728 as a standalone component that is operatively connected to the terminal processor 702 instead of being part of a touch screen display module.

The machine 700 is configured to recognize inputs on the touch screen display 728 without the need to display the character to be inputted. In particular, data corresponding to a character is received by the terminal processor 702 in response to a contact with at least one area of the input surface 730 of the touch screen display 728. The area of contact does not include any visible output indicia that corresponds to the character, before the area is contacted. The character may correspond to alphanumerical characters, such as a numerical character, an alphabetic character, or any other type of character.

FIGS. 55 and 56 show one exemplary embodiment that includes this feature. As shown in FIG. 55, the machine 700 includes a fascia 732. The fascia 732 of the exemplary embodiment may include a recessed area 734 in which the touch screen display 728, function key buttons 736, card reader 708 and receipt outlet 738 are positioned. A cash dispense opening 740 and a cash acceptance opening 742 are also positioned on the fascia 732. The fascia may include other openings or devices such as for example, an opening for accepting checks which can be imaged by a check acceptor that includes a scanner. The fascia 732 may include a top panel 744 which is positioned generally above a light source 746 and the user interface of the machine. The top panel portion 744 may include a pair of convex mirrors 748, 750.

In this embodiment, one or more fingers 731 of the user 701 may contact one or more respective areas 752 of the input surface 730 of the touch screen display 728. When the user 701 touches the input surface 730 with one or more of his fingers 731, software running on the terminal processor 702 determines the number of fingers 731 that concurrently contact the input surface 730. The software then determines the numerical character corresponding to this number and sends this data to the terminal processor 702. The data may be sent to the terminal processor 702 when the user 701 removes his or her fingers 731 from the input surface 730. Alternatively, the data may be sent to the terminal processor 702 upon the user 701 removing the fingers 731 and pushing a function key button 736 configured for visually impaired users on the machine 700.

For example, as seen in FIGS. 55 and 56, when the user 701 concurrently touches the input surface 730 of the touch screen display 728 with three fingers 731*a*, 731*b*, 731*c*. The software determines that the number of contact areas 752*a*, 752*b*, 752*c* of finger contacts is three. The software then determines that the numerical character "3" corresponds to this input. Alternatively, the number of areas of finger contacts may correspond to an alphabetic character instead of a numerical character. Alternatively in other embodiments, alphanumeric characters may be indicated by repetitive contacts via a finger with an area of the touch screen. For example, the user may repeatedly touch the screen to indicate a value. In such embodiments, the software may operate to consider such inputs to be an incrementing value or character with each touch provided that the user touches the screen again within a certain time period after the previous touch. If the user does not touch the screen within a given period after the last touch, the computer operates to determine that the desired character of the user corresponds to the last touch contact made with the input surface. Also, other objects such as a stylus may be used instead of fingers to contact areas 752 of the input surface 730 of the touch screen display 728.

The exemplary machine 700 includes an audio output port 754 (FIG. 54) for providing signals usable to produce audio outputs to the user 701 corresponding to the character being input. In the exemplary embodiment shown in FIG. 55, the audio output port 754 includes a headphone jack 756 that is operatively connected to a headphone 758. However, the audio output port 754 may include other output devices such as a Bluetooth port or a speaker. Also, the audio output port 754 may be configured to be in operative communication with a cell phone. The audio output port 754 may alternatively and additionally utilize near field communication. Alternative embodiments may include other types of audio output ports that receive signals that are usable to produce audio outputs.

The audio output port 754 is in operative connection with the terminal processor 702. The terminal processor 702 includes software that generates signals corresponding to verbal outputs of names identifying characters based on inputs received by the terminal processor 702. The terminal processor 702 is operative to cause audio signals corresponding to the alphanumeric character corresponding to the finger contact(s) with the contact surface to be outputted through the audio output port 754. For example, when the user 701 concurrently contacts the input surface 730 of the touch screen display 728 with three fingers, the terminal processor 702 operates to cause the generation of signals usable to produce a verbal output of the number three using an audio output device in connection with the audio output port 754. In an example transaction, the user 701 hears the number three via the headphones 758 and is thus, provided with appropriate audio feedback of the character inputted. The headphones 758 provide secure audio feedback of the character inputted to the user 701 by preventing other persons in the area near the machine 700 from hearing the character inputted. Optionally, the signals usable to produce audio outputs may be encrypted so as to enable the user to hear the character corresponding to the contacts with the input surface.

Various approaches may be used in alternative embodiments to have finger contacts with the input surface to represent various types of alphabetical and/or numerical characters being input to the machine. For example, the number of concurrent finger contacts with the screen may correspond to the input of the corresponding numerical value. This will generally enable a user to selectively input up to ten different numerical values. The machine may operate in accordance with its programming to advise a user that one through nine concurrent finger contacts correspond to those values and that ten concurrent finger contacts with the input surface corresponds to a zero input. Of course this approach is exemplary.

Likewise alphabetical values could be input in various ways. For example, tapping one or more fingers against the screen rapidly may be made to cause the at least one processor to cause signals that correspond to sequential letters of the alphabet to be output to the audio output port. The user could stop further tapping of the screen when the selected alphabetical character has been output. Alternatively placing and holding one finger constantly in contact with the screen and repeatedly touching and disengaging another finger with the screen within a time period may cause the output of a sequence of alphabetical or other characters. Alternatively, repeatedly touching and disconnecting from the screen in two different areas may cause the at least one processor to resolve and produce outputs that correspond to alphabetical (or numerical) characters, that can be iteratively output, randomly presented, scrolled through or otherwise output in a way in which a selected character can be identified by a user. In still other embodiments, a series, number and/or rhythm of conventional finger contacts may be established by convention as corresponding to characters such as numbers, letters, symbols, values, or in addition or alternatively words or phrases. For example, the convention established may be one that blind or sighted users can use when a user interface includes a touch sensitive contact surface so as to provide inputs that can be decoded through operation of a processor as such characters, values, symbols, words, phrases or other things. Such convention can be suitable not only for operating automated banking machines, but also for use in connection with smart phones or other devices that include touch screen or other tactile inputs. In these examples, no corresponding outputs would be provided on the screen to require finger contact with the screen in any particular area or areas. The screen could be blank or could be outputting a design or other indicia not related to the user selections for inputs prior to and/or while the user provides inputs. Alternatively in some embodiments, once the character corresponding to the inputs has been resolved based on the preceding contacts with the input surface, the display may output the character to a user through the display. Alternatively, if the user is operating the machine through a secure voice guidance mode, it may be undesirable to output the actual character and the machine may output a placeholder value such as an asterisk or other icon. Further, in some exemplary embodiments, the at least one processor may operate to give the user the option to either display the selected character on the screen or to avoid displaying the selected character. This feature may allow users with limited sight to help to verify that the character they have selected is the one that they desire. Of course these are only a few exemplary ways in which characters can be selectively input through contact with an input surface.

The characters inputted through contact with the input surface may correspond to one or more characters in the user's personal identification number (PIN). This method may also be used to input the user's entire PIN. Alternatively in some embodiments, the inputted characters may correspond to values, such as the values associated with the financial transaction that the user desires to carry out. In still other embodiments, the inputted characters may correspond to selected types of transactions or other values or selections that a user can provide to an automated banking machine. In an exemplary transaction, the user may have a card read through operation of the card reader 708. The banking machine 700 prompts the user via signals that produce audio outputs through the audio output port to enter his or her PIN through contact with the input surface of the touch screen display 728. The user 701 then contacts the input surface 730 of the touch screen display 728 with one or more fingers 731. In this example, the number of fingers contacting the input surface 730 corresponds to the first character of the PIN. After the terminal processor 702 receives the at least one input corresponding to the first character of the PIN, the terminal processor 702 generates signals that provide a verbal output of the character to the audio output port 754. The user hears the name of the character via the headphone 758. A "cancel" function key button 736 configured for visually impaired users may be provided for the user 701 to press, if the user 701 desires to cancel this input. Outputs may advise the user of the location of this button. Alternatively, an "accept" function key button may be provided on the machine so the user may indicate that the output character is accurate. Alternatively the user may be instructed to touch the screen in a certain way to indicate if the output is correct. For example, the user could be prompted to concurrently place two fingers on input surface of the touch screen to accept the character and three fingers to cancel.

After accepting a first character, the user 701 may then be instructed through audio outputs produced through operation of the at least one processor to again contact the input surface 730 of the touch screen display 728 with one or more fingers 731. The number and/or sequence of fingers 731 contacting the input surface 730 provides an input corresponding to the second character of the PIN. After the terminal processor 702 receives the data corresponding to the second PIN character inputted, the terminal processor 702 generates a verbal output of the character to the audio output port 754. The user 701 hears the name of the second character via the headphone 758. The user can then accept or cancel the character in the manner provided by the machine. This process of inputting characters repeats until all of the characters of the PIN are inputted. Verbal outputs may instruct the user to touch the input source in a certain way (for example with two fingers) to enter the PIN and in another way (for example three fingers) to cancel and start over.

The inputs through contact with the input surface may alternatively correspond to a value associated with cash requested to be dispensed by the machine 700. For example, the machine may prompt the user 701 via an audio output to enter on the touch screen display 728 the amount of cash that the user 701 wants dispensed. The user 701 then contacts the input surface 730 of the touch screen display 728 with one or more fingers 731. The number of fingers 731 and sequence for contacting the input surface 730 corresponds to the first numerical character of the value of the desired amount of cash. After the terminal processor 702 receives the data corresponding to the first numerical character, the terminal processor 702 generates signals corresponding to verbal outputs of the first numerical character to the audio output port 754. The user 701 hears the name of the character via the headphone 758. The user 701 may press the "cancel" function key button 736, if the user 701 desires to cancel this input. This process of inputting a numerical character repeats until all characters of the value associated with the cash dispensed are inputted.

Alternatively or additionally inputs may correspond to other characters, such as characters associated with or that represent functions or values. For example, the machine may be programmed to provide numerous types of transaction functions. These functions may include (for example) cash dispense, balance inquiry, check cashing, deposit and other functions. The at least one processor may operate to receive one or more character inputs via finger contact with the contact surface for the user to select a transaction function. For example the machine may prompt a user at a given time in the transaction sequence carried out responsive to operation of the at least one processor to place one finger in contact with the input surface to select a cash dispenser, two fingers to select a balance inquiry, three fingers to select a deposit and so on for other available transaction types. Alternatively in some example embodiments where a convention has been established for arrangements of single or multiple finger contacts corresponding to characters or words or phrases, the user may provide inputs to the machine using such a series of multi contact inputs to provide instructions to the machine. Of course these approaches are exemplary and in other embodiments other approaches may be used.

It should be understood that in some embodiments only users who communicate with the machine via headphones or other device in operative connection with the output port may operate the machine by providing inputs through finger contact of the type described. In other embodiments other users of the machine may provide inputs to the machine in this manner. In such embodiments the output port of the machine may include or be in operative connection with an audio speaker, visual display or other type of user perceptible output device that enables communication with the machine user. Such communication may direct the user in operation of and to indicate to the user the character values represented by such contact inputs. Alternatively, in some embodiments when a device such as headphones are not in operative connection with the output port the at least one processor of the machine may operate to provide indicia through the screen which instructs sighted users on how to input characters by contact with the touch screen. Further in some alternative embodiments inputs may be provided through contact with items other than a touch screen. This might include a touch pad, signature pad or other contact sensing device on the machine, for example. Alternatively the at least one processor of the machine may be in contact with a wireless output device which enables the user to provide inputs through a mobile wireless device such as a smart phone. In such embodiments, the user may provide transaction inputs through finger contact with the screen or other input devices of the smart phone. The user may also be able to receive audio outputs securely using a headset that is in operative connection with the smart phone. This may include, for example, a Bluetooth enabled headset which enables the user to privately hear the audio outputs produced through operation of the processor of the machine responsive to the finger contacts with the screen of the portable wireless device. Of course these approaches are exemplary and in other embodiments, other approaches may be used.

Figure 57:
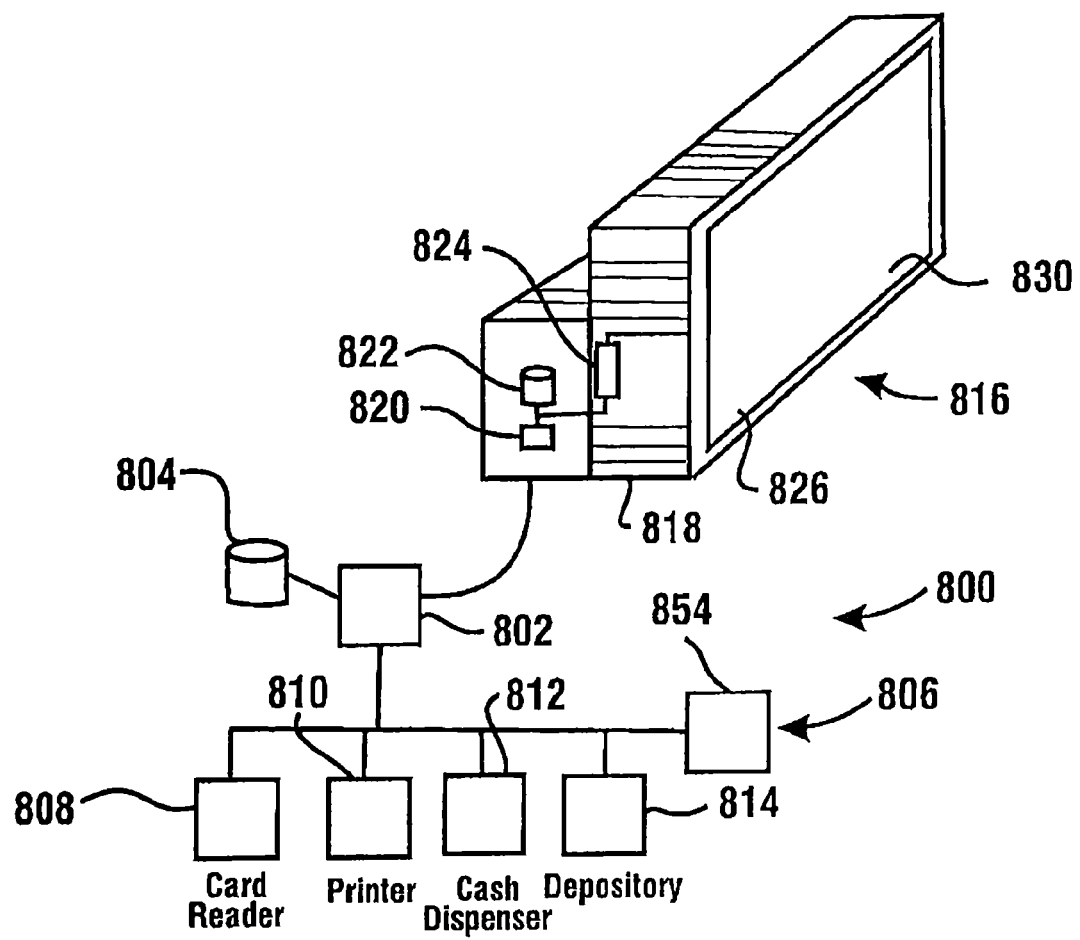
FIG. 57 is a schematic view showing another exemplary embodiment of an automated banking machine.
Figure 58:
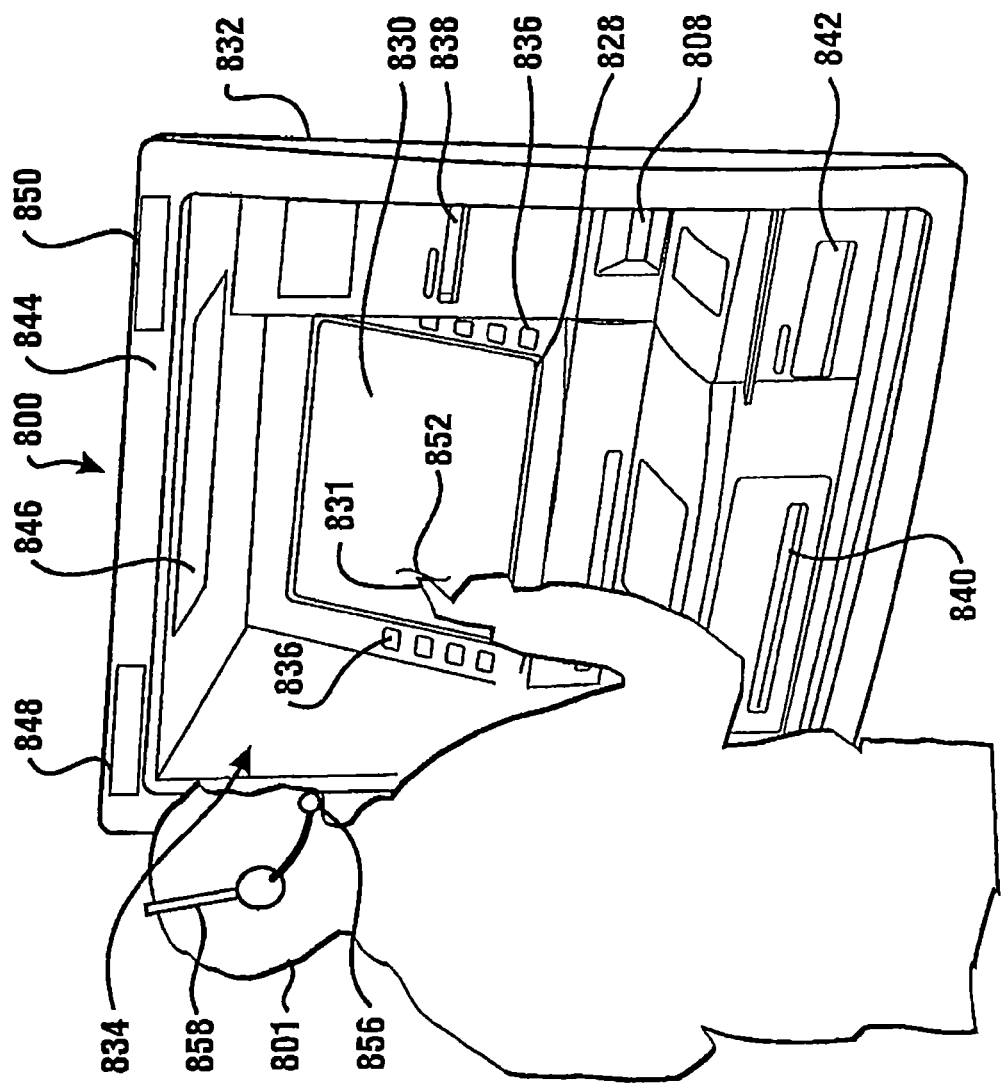
FIG. 58 is an isometric view of the exemplary embodiment of FIG. 57.

FIG. 57 shows an alternative exemplary embodiment of a machine for visually impaired users 801 (FIG. 58). The machine 800 is in operative connection with at least one terminal processor 802. The terminal processor 802 is in operative connection with at least one data store 804. Similar to some of the other example embodiments data store 804 includes data as well as computer executable instructions or software that are carried out through operation of the terminal processor to operate the machine. Of course it should be understood that while only one terminal processor 802 and data store 804 are shown, embodiments may include numerous processors and data stores. Alternatively, the terminal processor 802 may not be located within the machine 800 and may be located in a server or other device remote from the machine.

The terminal processor 802 is in operative connection with transaction function devices of the machine generally indicated 806. The exemplary transaction function devices 806 include a card reader 808. The card reader 808 is operative to read data included on user cards. This includes for example data corresponding to financial accounts of users of the automated banking machine. Another exemplary transaction function device is a printer 810. The printer 810 may include a receipt printer of the type that provides users with receipts for transactions conducted at the machine.

Another exemplary transaction function device in the machine 800 is a cash dispenser 812. Cash dispenser 812 may be of the type previously described that operates to cause cash such as currency bills that are stored within the machine 800 to be selectively dispensed and made accessible to a user outside the machine 800. The terminal processor 802 is in operative connection with the cash dispenser 812 and the card reader 808. The terminal processor 802 is operative to cause the machine 800 to operate to read card data from a user card and to cause a determination to be made by communication with another computer or otherwise that the card data read from the user card corresponds to an authorized user and/or an authorized financial account. The terminal processor is also operative to receive at least one input such as a user identifying PIN. The terminal processor may also operate to cause a determination to be made that the PIN is valid. The terminal processor 802 may then operate responsive at least in part to one or both determinations to cause cash to be dispensed from the machine 800 to the user and to cause a financial account corresponding to the card data to be assessed for cash dispensed.

The exemplary Machine 800 also includes a depository 814. Depository 814 may be of the type that accepts deposits made by a user into the machine 800. Such deposits may include in some embodiments deposited items that are included in deposit envelopes. In other embodiments the depository may accept items such as cash or checks. Of course it should be understood that the machine 800 may include other or different types of transaction function devices. These may include for example different types of input devices, output devices as well as devices for performing transaction functions of the type desired at the machine.

In the exemplary embodiment, the machine 800 includes a touch screen display module 816 that is operatively connected to the terminal processor 802. The touch screen display module 816 includes a housing 818 that houses the internal display module components. These components may include a display module processor 820. The display module processor is in operative connection with at least one module data store 822. In the exemplary embodiment, the housing of the display module may include at least one battery 824. The at least one battery 824 or operates to provide a source of power so as to enable volatile memory of the data store 822 to maintain data storage even during times when the machine is turned off or unplugged from an AC power source. These components are designed to provide a secure input device through which users can input data which is protected from being intercepted by unauthorized persons.

The exemplary embodiment of the touch screen display module 816 includes a pane 826. Pane 826 of the exemplary embodiment comprises a generally transparent pane which is part of a touch screen display 828. The touch screen display 828 may be one of several types which can be used to determine the relative location on the screen at which user 801 makes contact with an input surface 830 of the touch screen display 828 using his or her fingers 831. This may include for example in some embodiments a resistance detecting touch screen display 828. In other embodiments the touch screen display 828 may be of the capacitance detecting type. In still other embodiments the touch screen display 828 may include an acoustic wave detecting type. In still other embodiments, a camera may be positioned either behind or in front of the pane to determine the point of user finger contact with the input surface. As can be appreciated other various suitable types of touch screen displays 828 may be used to determine the position of contact made by a user's fingers on the touch screen display 828 so as to detect when a user touches the input surface 830 of the touch screen display 828. Also, the machine 800 may include the touch screen display 828 as a standalone component that is operatively connected to the terminal processor 802 instead of being part of a touch screen display module.

The exemplary machine 800 is configured to recognize inputs on the touch screen display 828 without the need to display the character inputted. In particular, data corresponding to a character is received by the terminal processor 802 in response to a contact with at least one area 852 of the input surface 830 of the touch screen display 828. The area 852 of contact does not include any visible output indicia that corresponds to the character, before the area 852 is contacted.

The character may correspond to a numerical character, an alphabetic character, or any other type of character. As shown in FIG. 58, the machine 800 includes a fascia 832. The fascia 832 of the exemplary embodiment may include a recessed area 834 in which the touch screen display 828, function key buttons 836, card reader 808 and receipt outlet 838 are positioned. The fascia may include an opening for the receipt of one or more checks which can be passed to a check acceptor including a scanner within the machine. A cash dispense opening 840 and a cash acceptance opening 842 are also positioned on the fascia 832.

In this example embodiment, a user contacts the input surface 830 of the touch screen display 828 with his finger 831 and draws the character on the area 852 of the input surface 830 with his finger 831. For example, as represented in FIG. 58, the user touches the input surface 830 of the touch screen display 828 with his finger 831 and draws the number one. Alternatively, the user may contact the input surface 830 of the touch screen display 828 with the stylus or other writing instrument and draw the character on the input surface 830 using the stylus or other writing instrument. In exemplary embodiments, the at least one processor operates to receive an input corresponding to a character responsive to a line or lines drawn through finger contact with the input surface. The programming associated with the at least one processor may operate in some environments to analyze a cursive character represented by the user's movement of the finger while in continuous contact with the input surface. In still other embodiments, the programming associated with the at least one processor may operate to provide persistence through a period of finger contacts to the input surface during a relatively small period of time. Thus, for example, the user may be able to create a character by printing or writing while removing the finger from contact with the machine between strokes. Thus, in such exemplary embodiments, a character may be indicated by drawing through finger contact with the input surface, a number of different lines which make up the character the drawing of such lines being done by the user repeatedly engaging and disconnecting their finger from the input surface. Of course these approaches are exemplary and in other embodiments other approaches may be used.

The at least one processor operates to execute instructions which analyze the line or lines drawn through finger contact with the input surface. The computer executable instructions operating in the at least one processor are operative to resolve a character corresponding to the character drawn by the user through contact with the input surface. Handwriting recognition software running on the terminal processor 802 or other processor determines the character corresponding to the handwritten character drawn on the input surface 830 of the touch screen display 828. The data may be resolved by the terminal processor 802 when the user removes his or her finger 831 from the input surface 830. Alternatively, the data may be resolved through operation of the terminal processor 802 upon the user removing his finger 831 and pushing a function key button 836 or taking other action suitable for visually impaired users on the machine 800. This may be done, for example, in the manner previously described such as by instructing the user to contact the input surface with two fingers concurrently to accept the resolved character that is output and to concurrently contact the input surface with three or more fingers to cancel the resolved character and try again. Of course these approaches are exemplary of approaches that may be used for this purpose.

The exemplary machine 800 includes an audio output port 854 (FIG. 57) for providing audio feedback to the user after inputting the character. In the exemplary embodiment shown in FIG. 58, the audio output port 854 includes a headphone jack 856 that is operatively releasably connected to a headphone 858. However, as previously discussed, in other embodiments the audio output port 854 may include other output devices such as a Bluetooth port or a speaker. Also, the audio output port 854 may be configured to be in operative communication with a cell phone. The audio output port 854 may also utilize near field communication.

The audio output port 854 is in operative connection with the at least one terminal processor 802. The terminal processor 802 may include software that generates signals corresponding to verbal outputs of characters based on data received by the terminal processor 802. The terminal processor 802 is operative to cause audio signals corresponding to the name of the character to be outputted through the audio output port 854. For example, after the terminal processor 802 receives the data corresponding to the number one drawn on the input surface 830 of the touch screen display 828, the terminal processor 802 generates output signals usable to produce an audio output of the number "one" to the audio output port 854. The user 801 hears the number one via the headphone 858 and is thus, provided with appropriate audio feedback of the character inputted. The headphone 858 provides secure audio feedback of the character inputted to the user 801 by preventing other persons in the area near the machine 800 from hearing the character inputted. Optionally, the verbal signals may be encrypted so that they can only be determined by the hardware device of the user 801 which decrypts the audio outputs.

In some embodiments input characters may correspond to characters in the personal identification number (PIN). This method may also be used to input the entire PIN. In particular, the user 801 may insert his or her card through the card reader 808 and the machine 800 prompts the user via an audio output to enter his PIN on the touch screen display 828. The user then draws the first character of the PIN on the input surface 830 of the touch screen display 828. After the terminal processor 802 receives or resolves the inputs corresponding to the character drawn on the input surface 830 of the touch screen display 828, the terminal processor 802 resolves the character and produces signals usable to product a verbal output of the character through the audio output port 854. The user 801 hears the sounds corresponding to the type of the character via the headphone 858. A "cancel" function key button 836 configured for visually impaired users or other type may be provided for the user 801 to press or input, if the user 801 desires to cancel this input. Alternatively or in addition an "accept button" or other input device or other approach may be provided for a user to accept or reject selections in a manner like that previously described.

After a first character is input, the exemplary at least one processor operates in accordance with its programming to cause the output of signals that prompt the user to input the next character of their PIN. In exemplary embodiments, this may be done through signals usable to produce audio outputs via the headphone or other audio output device. In some embodiments the at least one processor may alternatively or also operate to provide outputs through the display which prompt the user to provide an input corresponding to the next character of the user's PIN. The at least one processor then receives an input corresponding to the next PIN character as the user draws the next character of the PIN on the input surface 830 of the touch screen display 828. After the terminal processor 802 receives the data corresponding to this character drawn on the input surface 830 of the touch screen display 828, the terminal processor 802 generates signals corresponding to a verbal output of the type of character through the audio output port 854. The user 801 hears the name type of the character via the headphone 858. The user is then enabled to accept or cancel the indicated character that is described through the verbal output. This process of inputting characters repeats until all of the characters of the PIN are inputted. Alternatively, the touch screen display 828 may be configured to allow either inputting a character by drawing it on the input surface 830 of the touch screen display 828, or inputting a character by touching the input surface 830 of the touch screen display 828 concurrently with the fingers 831 of the user 801. For example, for a PIN that has the characters "31", the number three may be inputted by touching the input surface 830 of the touch screen display 828 concurrently with the fingers 831 of a user 801, and the number one may be drawn by the user on the input surface 830 of the touch screen display 828. Alternatively or in addition, the programming associated with the at least one processor in some embodiments may enable the input of characters by repeated contact via finger with the screen or combinations of contacts such as one or more continuous contacts with concurrent repeated contact and releases with the screen. As previously discussed, numerous different combinations of continuous and periodic contacts and/or the drawing of characters on the input surface can be used in various embodiments to provide inputs which can be resolved through operation of one or more processors as characters or other types of inputs to be received by the machine.

Alternatively, in some embodiments instead of drawing and input of data of each character of the PIN to the terminal processor 802 one character at a time, the entire PIN may be drawn on the input surface 830 of the touch screen display 828, and the input corresponding to all of the characters of the PIN may then be received and/or resolved all at once to the terminal processor 802. In this example, the user would hear the verbal output of the entire PIN after the terminal processor 802 resolves the characters in the PIN data. Alternatively the PIN data may be output visually through the screen or the user may have the option to allow the characters included in the PIN to be output through the display of the machine or in some cases the display of a phone or other personal device. Similar to the approaches previously described, using this approach, the user will have the option to either indicate that the resolved PIN data is correct or to cancel the input if it is not correct and provide another input.

In some embodiments input characters may alternatively correspond to a value associated with cash dispensed by the machine 800. For example, the machine 800 may prompt the user 801 via an audio output to enter on the touch screen display 828 the amount of cash that the user 801 wants dispensed. The user 801 then draws the first numerical character of the value of the desired amount of cash on the input surface 830 of the touch screen display 828. After the terminal processor 802 or other processor receives the one or more inputs corresponding to the first character drawn on the input surface 830 of the touch screen display 828, the terminal processor 802 or other processor generates a verbal output signal of the character to the audio output port 854. The user 801 hears the name of the character via the headphone 858. The user 801 may accept or cancel and retry the input in the manner previously described. This process of inputting a numerical character repeats until all the characters of the value associated with the cash dispensed are inputted. Alternatively, the touch screen display 828 may be configured to allow either inputting a character of the value by drawing it on the input surface 830 of the touch screen display 828, or inputting a character of the value by touching the input surface 830 of the touch screen display 828 simultaneously with the fingers 831 of a user 801.

Alternatively, instead of drawing and sending data of each numerical character of the value associated with the cash dispensed to the terminal processor 802 one character at a time, the entire value may be drawn on the input surface 830 of the touch screen display 828, and the input corresponding to all of the characters of the value may then be used to resolve the entire value through operation of the terminal processor 802 or other processor. In this example, the user 801 would hear the verbal output of the value after the terminal processor 802 receives the data corresponding to all of the characters of the value.

It should be understood that other types of characters or other indicia can be input in this manner, such as characters or indicia corresponding to functions or other types of values (e.g., one finger contact for cash withdrawal, and so on). Further, in some embodiments finger contact may be used by users other than those that are visually impaired to operate the machine. For example in some embodiments finger contact data may be communicated via audio or visual output devices to sighted machine users to enable operation of the machine. Further in some embodiments users may provide inputs by touching a tactile sensing device such as a touch pad, signature pad or other device that senses finger contact(s), position and/or movement.

In addition in some embodiments, the machine may communicate via the outlet port with a user's phone or other portable device to provide audio or visual outputs that enable interfacing with the machine. In still other embodiments the machine may be operative to communicate with a user's portable interface device such as a smart phone or an iPad® device produced by Apple Computer. In such circumstances the machine may communicate with such a device such that the input surface on the device serves as the contact surface for inputs for the machine. Thus for example, a portable device of the type that has a screen that can sense contact by and/or movement of a user's finger thereon, may be used as the contact surface for inputs to the machine. The inputs through the portable device may be communicated to the machine via Bluetooth or near field communication, for example. Thus the portable device may be used in lieu of or in addition to the input surface on the machine for purposes of providing inputs. In some embodiments, automated banking machines may be programmed to operate to receive user inputs through a touch screen that corresponds to visual outputs for some users who provide inputs to indicate that they wish to operate the machine in that manner. Other users may provide inputs to the machine via contact with an input surface on the touch screen display of the machine with audio or visual feedback via headphones, a visual display or other output device. Other users may interface with the machine such that the surface of the machine becomes the contact sensitive screen of the user's personal portable device. Further, in various examples, processors associated with the touch screen, various circuit boards, the user's personal portable device and/or a central terminal processor may operate to determine the nature of user contacts with the input surface and resolve characters representative thereof. Of course these approaches are exemplary and in other embodiments, different or other combinations of approaches may be used.

Other exemplary embodiments of a machine for the visually impaired that recognize inputs on a touch screen display without the need to display the character inputted may be provided. For example, a user may successively touch the input surface of the touch screen display with his finger.

Software running on the terminal processor or other processor determines the number of successive touches on the input surface. The software then determines the numerical or other character corresponding to this input. The data may be resolved by the terminal processor or other processor after a predetermined time elapses from the last touch on the input surface. Alternatively, the data may be resolved by another processor and sent to the terminal processor upon the user pushing a function key button on the machine. For example, a user may touch (and disengage) the input surface three successive times. The software determines that this corresponds to the number three and sends this data to the terminal processor after five seconds has elapsed from the third touch of the input surface if another touch is not detected. Similar to the previously mentioned embodiments, the machine includes an audio output port for providing audio feedback to the user after inputting the character.

In other example embodiments, a user may touch the input surface and slide or drag his finger along the input surface. As the user drags his finger, verbal outputs corresponding to sequential numerical characters may be resolved through operation of at least one processor and signals corresponding thereto outputted to the audio port. For example, the sequential verbal outputs of the numerical characters generated may begin with the number nine and count down to zero (i.e. 9, 8, 7, 6, 5, 4, 3, 2, 1, 0). In another example, the sequential verbal outputs of the numerical characters generated may begin with zero and count up to the number nine (i.e. 0, 1, 2, 3, 4, 5, 6, 7, 8, 9). These sequences may be repeated as the finger drags along the input surface. Alternatively or in addition, sequences may include alphabetical characters or other types of characters or indicia. The user hears the name of the numerical characters via the head phone or other output device. When the user hears the desired number to be inputted, he stops moving his finger. Data corresponding to this last numerical character heard by the user is then resolved as the selected character through operation of a processor. In examples where a separate processor resolves the character data, the data may be sent to the terminal processor after the user removes his finger off the input surface of the touch screen display when a desired character or other indicia has been output. Alternatively, the data may be resolved or sent to the terminal processor upon the user removing his finger and then pushing a function key button or proving another type of input through the machine. Optionally, in some examples the user may touch the input surface with his finger and thumb and slide them on the input surface towards or away from each other to provide selected inputs. For example, when the finger and thumb are moved towards each other in contact with the input surface (i.e., pinching movement), verbal outputs corresponding to the counting down of numerical characters (or other types of characters) are generated. When the finger and thumb are moved away from each other in contact with the input surface, verbal outputs corresponding to the counting up of numerical characters (or other types of characters) are generated. In other alternative embodiments, letters, numbers, words, characters or other values may be input via a series of single or multiple finger contacts with the input surface of the display. Such multiple contact sequences may be part of an established convention by which individuals can provide inputs to devices with touch screen or other tactile displays without the need for specific numeric keys. Of course these approaches are merely exemplary of finger contact and movement that can be used for character selection and input.

Some exemplary automated banking machines with the touch screen display (or other tactile device) which can be operated in the manner described may have advantages over other machines for the visually impaired. For example, the machine may not require a keyboard and/or Braille keys for the visually impaired to feel or otherwise allows the visually impaired to operate. Further such features may also be used to facilitate the operation of automated banking machine by sighted users and/or users who wish to interface with machines through tactile inputs or through their personal portable devices.

Some exemplary automated banking machine with the touch screen display (or other tactile input device) which can be operated in the manner described may have advantages over other machines that can be used by the visually impaired. For example, the machine may not require a keyboard and/or Braille keys for the visually impaired to feel or otherwise allow the visually impaired to operate the machine. Further such features may also be used to facilitate the operation of automated banking machines by sighted users and/or users who wish to interface with machines through their personal portable devices.

In some circumstances, criminals or other unauthorized person may place a small camera in a hidden location to view the keypad. The camera can view images related to user inputs through keys on the keypad by a user. The criminal may also acquire card data through a skimming device. This skimming may involve, for example, putting a device adjacent the card slot of the machine that reads the magnetic card stripe as the user card passes through the slot. The images of the key inputs in combination with the card data acquired by a skimming device may allow the criminals to produce a fictitious card and access the user's account.

Figure 59:
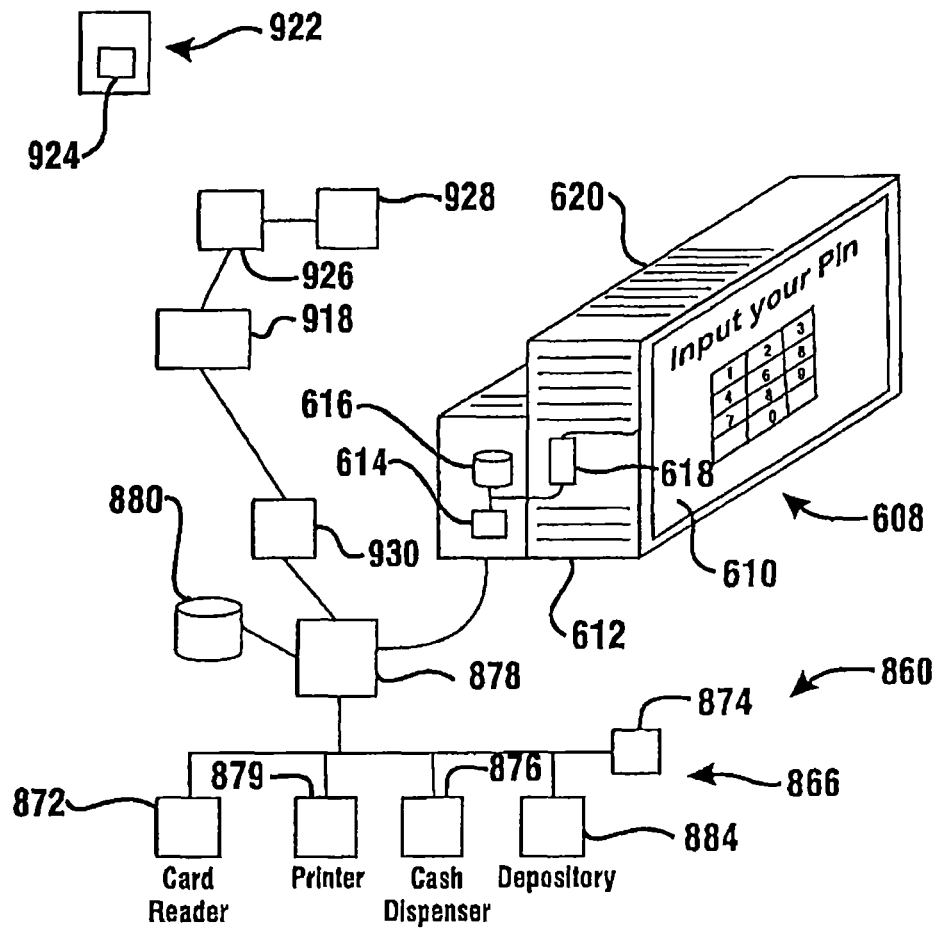
FIG. 59 is schematic view showing another exemplary embodiment an automated banking machine and an unauthorized spy camera installed on the automated banking machine.
Figure 60:
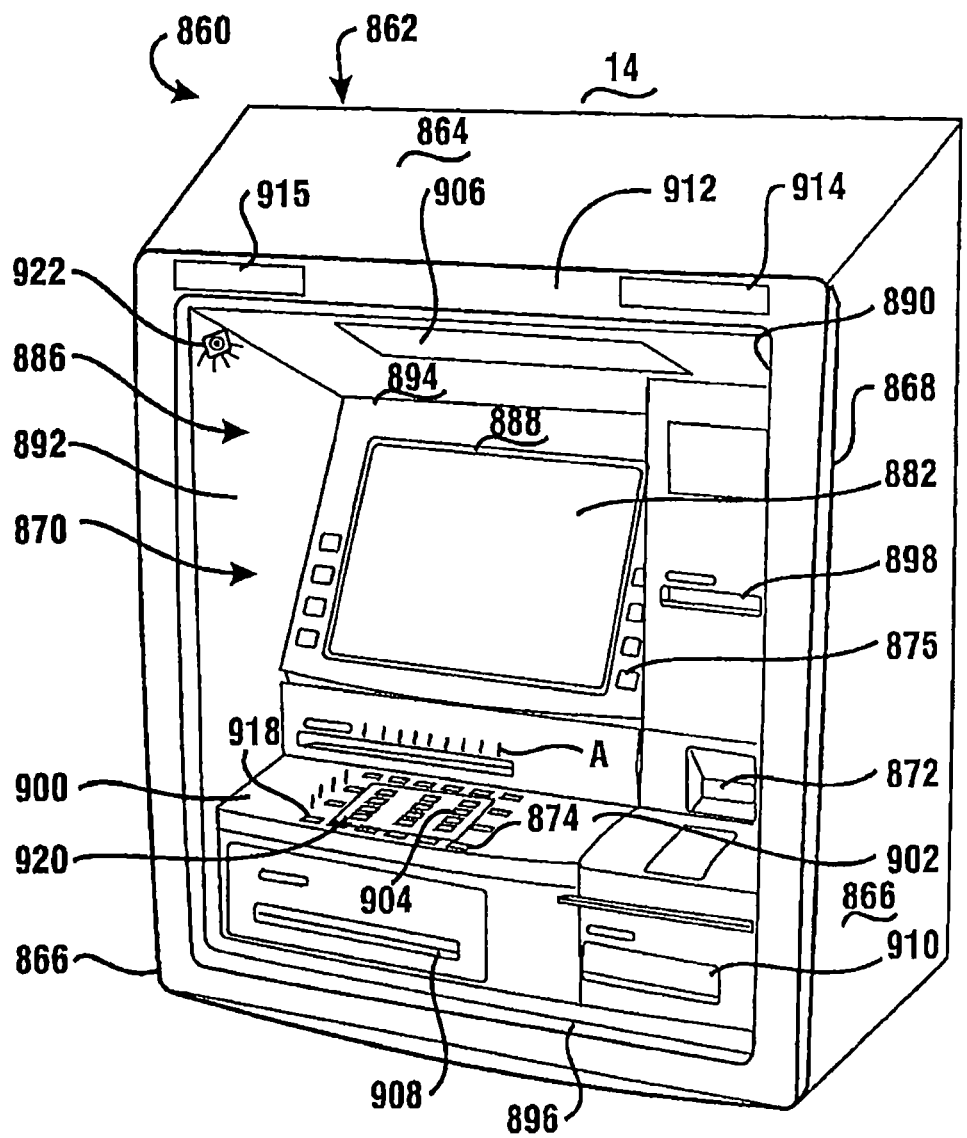
FIG. 60 is an isometric view of the exemplary embodiment shown in FIG. 59.

FIGS. 59 and 60 show an automated banking machine 860 that reduces the risk of such an unauthorized viewing by the camera of the customer inputs to a keypad of an automated banking machine.

Referring to FIGS. 59 and 60, this machine 860 is a through-the-wall type machine that includes a housing 862. Such components may be those previously mentioned in connection with the description of FIGS. 2 and 3. The housing may include an upper portion 864, side portions 866, and a fascia 868. The upper portion 864 and side portions 866 may be in connection with the fascia 868. The fascia 868 is accessible to users of the machine who are positioned externally of wall 14. In some embodiments wall 14 may be an exterior building wall and the machine 860 may be one that is configured for use in a walk-up or drive-up environment. In other embodiments the machine may be used in an indoor environment. Of course this configuration is exemplary and in other embodiments, other types of configurations may be used.

The exemplary machine includes a user interface generally indicated 870. The user interface of the exemplary embodiment includes input devices for receiving inputs from users. These input devices include a card reader 872, a keypad 874, and function keys 875. As depicted in FIG. 59, the machine 860 is in operative connection with at least one computer 878. The computer 878 is in operative connection with at least one data store 880. As in the other embodiments data store 880 includes data as well as computer executable software instructions or software that are carried out through operation of the computer to operate the machine. Of course it should be understood that while only one computer and data store are shown, some embodiments may include numerous computers or processors and data stores. Alternatively, the computer 878 may not be located within the machine and may be located in a server or other device remote from the machine. For example, the machine may be operated as a virtual machine and the computer 878 may be located in a central server that is operatively connected to the machine 860 and also to other machines. This central server may be located remotely from the machines.

The computer 878 is in operative connection with transaction function devices of the machine generally indicated 866. The exemplary transaction function devices include a card reader 872. The card reader 872 is operative to read data included on user cards. This includes for example, data corresponding to financial accounts of users of the automated banking machine. Another exemplary transaction function device is a printer 879. The printer 879 may include a receipt printer of the type that provides users with receipts for transactions conducted at the machine.

Another exemplary transaction function device in the machine 860 is a cash dispenser 876. Cash dispenser 876 may be of the type previously described that operates to cause cash such as currency bills that are stored within the machine 860 to be selectively dispensed and made accessible to a user outside the machine 860. The computer 878 is in operative connection with the cash dispenser 876 and the card reader 872. The computer 878 is operative to cause the ATM 860 to operate to read card data from a user card and to cause a determination to be made that the card data read from the user card corresponds to an authorized user or an authorized financial account. The computer is also operative to cause a determination to be made that an input user PIN corresponds to the correct PIN for that account. The computer 878 may then operate to cause cash to be dispensed from the machine 860 to the user and to cause a financial account corresponding to the card data to be assessed for cash dispensed. The machine 860 includes a display 882 as shown in FIG. 60. The display 882 may be a touch screen that is part of the touch screen display module 608 previously mentioned or other suitable display screen. FIG. 59 also shows the touch screen module 608 included in the machine 860. Other types of suitable visual displays may also be used.

The exemplary machine 860 also includes a depository 884. Depository 884 may be of the type that accepts deposits made by a user into the machine 860. Such deposits may include in some embodiments deposited items that are included in deposit envelopes. In other embodiments the depository may accept items such as cash or checks. Of course it should be understood that the machine 860 may include other or different types of transaction function devices. These may include for example different types of input devices, output devices as well as devices for performing transaction functions of the type desired at the machine.

As shown in FIG. 60, the fascia 868 of the exemplary embodiment may include a recessed area 886 defined by a front face 888, and right, left, upper, and lower faces 890, 892, 894, 896 that extend outwardly or forwardly from the front face 888. The display 882, function key buttons 875, card reader 872 and receipt outlet 898 are positioned on the front face 888. The fascia 868 includes a shelf 900 that extends outwardly from the front face 888 near the lower end of the display 882. The shelf 900 includes an upper exterior surface 902 that in some embodiments may extend generally horizontal (i.e., perpendicular with the wall) or slopes outwardly and slightly downwardly from the front face 888. The keypad 874 is mounted to or is otherwise generally coplanar with the shelf 900. The keypad 874 is operative to receive user inputs. In particular, the keypad 874 includes push button keys 904 that may be depressed by the finger of a user to provide inputs to the machine 860. Some user inputs through the keypad may correspond to a personal identification number (PIN).

Alternative inputs devices may be used. For example, the display may be in the form of a touch screen that displays a keypad such as that previously mentioned and shown in FIG. 52. Alternatively other embodiments may utilize a touch screen that receives inputs based on the number of concurrent digit contacts or iterative digit contacts. Other types of input devices that receive inputs based on digit contact may be used. The exemplary recessed area 886 is illuminated by a light source 906 positioned on the top face 894. Light source 906 provides illumination generally in the downward direction so as to enable the user to more readily view the locations of the input and output devices on the fascia of the machine. A cash dispense opening 908 and a cash acceptance opening 910 are also positioned on the fascia 868. The fascia 868 may include a top panel portion 912 which is positioned generally above a light source 906 and the user interface of the machine. The top panel portion 912 may include a pair of convex mirrors 914, 916.

Light emitters 918 are provided on the upper exterior surface 902 of the shelf 900 and surround the keypad 874. Each exemplary light emitter 918 is operative to emit infrared light or other light that has a frequency that is not in the visible range, which visible range is generally between 405 THz to 790 THz. In the exemplary embodiment, the infrared light emitted by these light emitters 918 is generally invisible to the eye of the user or other any other person. The exemplary infrared light emitted by the emitters may have a frequency that is between 1 THz and 400 THz. The exemplary light emitters are spaced from each other along the surface and located adjacent or in close proximity to the peripheral end 920 of the keypad 874.

Alternatively in other embodiments, emitters may be arranged in other locations. As indicated by illumination lines A of FIG. 60, each light emitter emits infrared light in a direction that is generally perpendicular to the plane of the area on the shelf 900 and the keys of keypad 874. The light emitters 918 direct the infrared light toward the area from which inputs to the keypad can be viewed by an electronic spying camera 922, which may have been placed by criminals on the machine or adjacent thereto. The camera 922 may be placed on a location of the machine that obscures the camera from view or machine users. For example, the camera may be placed on the upper left corner of the recessed area 886 as shown in FIG. 60. The camera 922 could also be recessed into the top face or left face or concealed by a housing. Alternatively, the camera could be located on other structures that are not part of the machine. The camera may be at any location in which it is capable of being directed to view the keypad 874 and user inputs thereto.

The exemplary infrared light is at an intensity that is sufficient to cause the camera 922 directed at the keypad 874 to not be able the capture sufficiently detailed images of the keypad 874 and the user's digit contacts therewith. In particular, the camera 922 includes an image sensor 924 that converts an optically sensed radiation to electrical signals. The image sensor 924 may include a charge-coupled device (CCD) in the form of a chip. When light strikes the CCD, it is held as a small electrical charge in each image sensor element. The charges are converted to voltage one pixel at a time as they are read from the chip. Additional circuitry in the camera converts the voltage into digital information. Alternatively, the camera may include other types of image sensors such as a complementary metal-oxide-semiconductor (CMOS) sensor. Of course, other image sensor types may be used.

When the light emitters 918 emit the infrared light at a sufficient intensity, the image sensor 924 is overloaded with the light and cannot produce a visible image with sufficient contrast to show features of the user fingers as they engage keys of the keypad. In the exemplary embodiment infrared light emitted by the light emitters 918 is invisible to the human eye but is of sufficient intensity to overwhelm the imaging sensors of the camera, so that they cannot properly resolve images of the keys or user's fingers in the area of the keypad. In the exemplary arrangement, the light also radiates outward at a sufficient angle, with respect to the keypad 874, to cause the camera 922 to not be able to successfully produce images that show the keypad 874 at a camera location on the machine. In some embodiments, multiple light emitters 918 may be configured to emit light at a plurality of different frequencies. Such emitters may emit light in the visible and non-visible range. This emission of the light at different frequencies may make it more difficult for infrared blocking filters or other selective filter circuitry to block all of the light, since the blocking filters generally block the light at only one at a frequency, or within a relatively small range of frequencies. Thus the sensors of the camera can be flooded and the camera rendered ineffectual at intercepting user inputs.

In some embodiments, emitters may be positioned to prevent unauthorized cameras from resolving images of other input devices other than or in addition to a keypad. For example, in cases where a touch screen module such as those previously described are used to receive confidential inputs, emitters may be positioned to prevent camera viewing of the screen. Further, in situations where other output or input devices provide visible data that is desired to protect from interception, emitters may be operated responsive to operation of at least one processor associated with the machine to reduce the risk of interception.

As shown in FIG. 59, a exemplary light emitter 918 may be operatively connected to a light sensor 926. The light sensor 926 is operative to detect the presence or the intensity of the infrared light emitting from the light emitter 918. The signals from the sensor may be received by at least one processor through an appropriate interface. The processor may operate in accordance with its programming to determine whether the light emitter 918 is emitting radiation with sufficient intensity to individually or in combination with other emitters, overload the image sensor 924 of the unauthorized camera. The light sensor may be operatively connected to one or more processors. The one or more processors may operate in accordance with their programming to determine whether the sensor or sensors are receiving sufficient radiation to render ineffective a camera. The processor may operate to produce one or more signals responsive to the determination. In some embodiments the at least one processor may be in operative connection with an indicator 928 that is operative to indicate an abnormal condition of the light emitter in response to at least one processor being in a condition in which the processor directs the light emitter to operate, the at least one processor determining the at least one light sensor is detecting that the at least one light emitter 918 is not emitting light or a light at a programmed level of intensity. The indicator 928 may be an audio or visual alarm. The indicator may be one or more outputs from the display. For example, the indicator 928 may generate an alarm that indicates an attempt to block the light emitters. The indicator 928 may also be a display that may graphically show the amount of intensity such as a servicer display on the machine. The display may be part of a portable computer, cell phone, iPod®, iPad®, personal digital assistant (PDA) or other portable device. The indicator may also be a device that sends signals to another device located remotely from the machine. In some embodiments the processor associated with the machine may operate responsive to the signals to cause the machine to go out of service and no longer perform transactions.

The light emitters 918 may be operative to emit infrared or other radiation only at certain times. In particular, each light emitter may be operatively connected to a controller 930 for controlling the operation of the light emitters. The controller 930 may be operatively connected to the computer 878. The controller 930 may be operative to cause the light emitters to emit infrared light at an appropriate time during a transaction sequence of the machine. For example, the controller 930 may be programmed to cause the light emitters 918 to emit the infrared light only when the machine is at points in a transaction sequence when inputs from a user may be received through the keypad 874. In another example, the controller may be programmed to cause the light emitters 918 to emit the infrared light only when the machine is in condition to receive a user input PIN. The controller 930 may also be programmed to cause the light emitters 918 to emit infrared light when the machine 860 is initially turned on. This may be done to test the operative status of the components. Alternatively, the light emitter 918 may be operatively connected to the computer 878 instead of a separate controller 930. In some embodiments computer executable software instructions running on the computer 878 may operate to control the operation of the light emitters 918.

Figure 61:
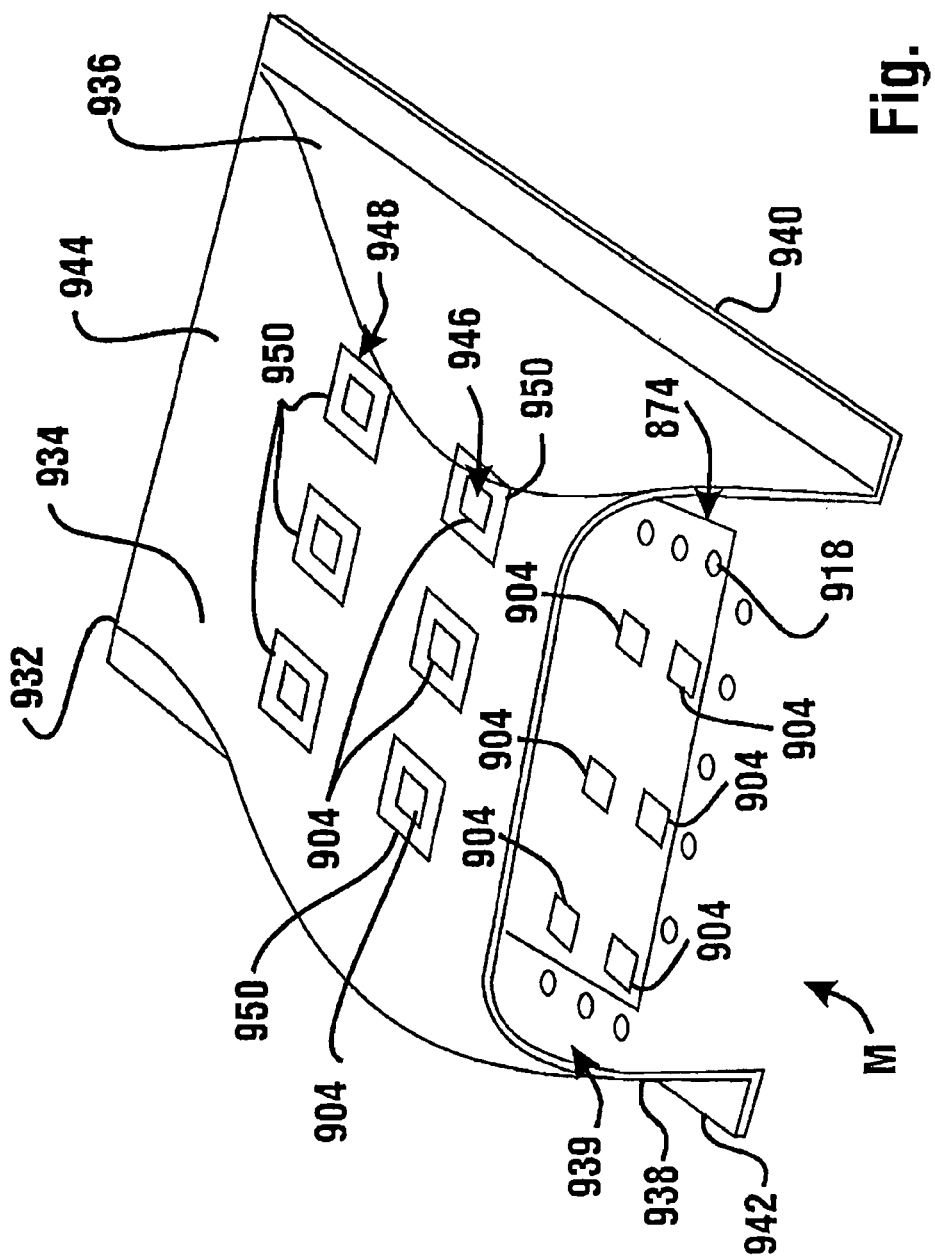
FIG. 61 is a schematic top and front isometric view of a portion of the banking machine of FIG. 60 and an associated keypad cover.
Figure 63:
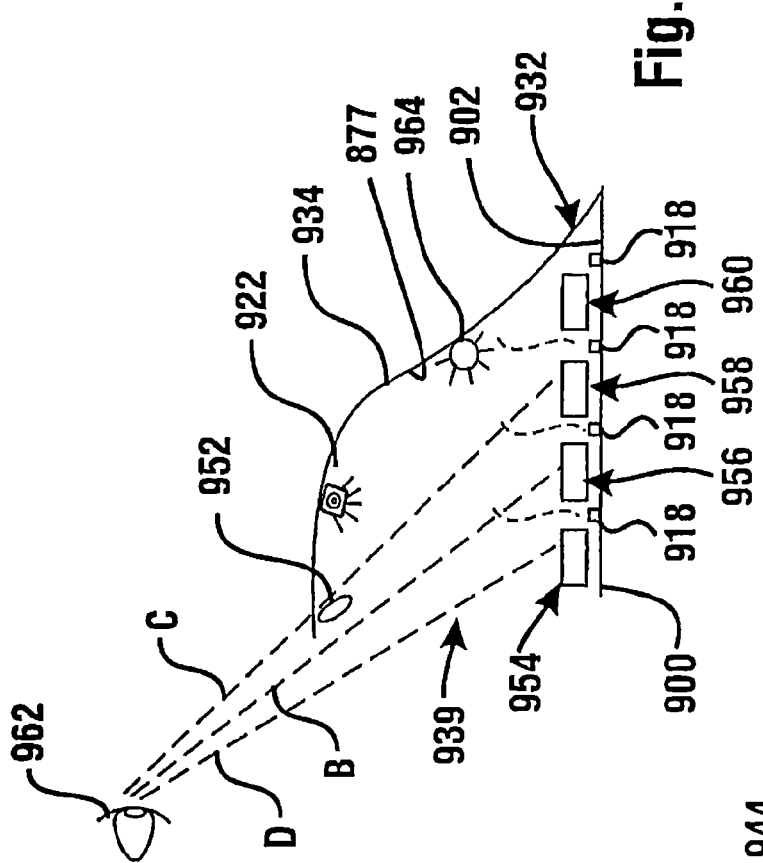
FIG. 63 is a schematic right side plan view of the banking machine and associated keypad cover with the right sidewall and flange removed for illustrative purposes.
Figure 62:
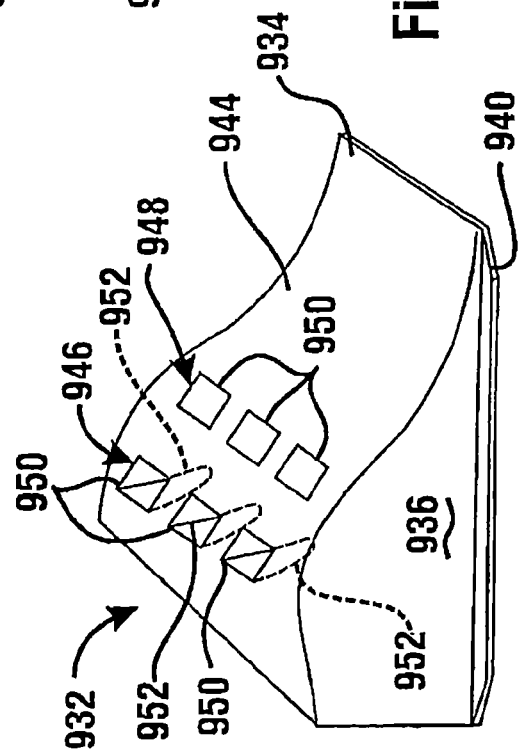
FIG. 62 is a schematic side isometric view of the keypad cover of FIG. 61.

A keypad cover may be provided on the machine that at least partially covers the keypad. The cover may of the types previously mentioned and shown in the Figures. However, in some circumstances the inner surface of the cover may provide a location for installation of a camera by criminals to view the keypad. The camera can then record images related to touching of keys on the keypad by a user to provide inputs. FIGS. 61-63 show an exemplary arrangement of a cover 932 covering the keypad 874 on the machine 860 that prevents such an unauthorized viewing by the camera 922 placed on inner side 877 of the cover. In this arrangement, the exemplary cover 932 is operative to allow the user inputting the inputs to view the keypad 874 through the cover 932, but limit viewing of the user's input operation of the keypad 874 by another. The cover 932 includes a top portion 934 and right and left sidewall portions 936, 938 comprised of generally nontransparent material. The top portion 934 and sidewall portions 936, 938 bound an opening 939. Opening 939 enables users to extend their digits through the opening generally in the direction of arrow M so as to enable a user to engage all of the key engaging surfaces of the keys 904 which make up the keypad.

Figure 64:
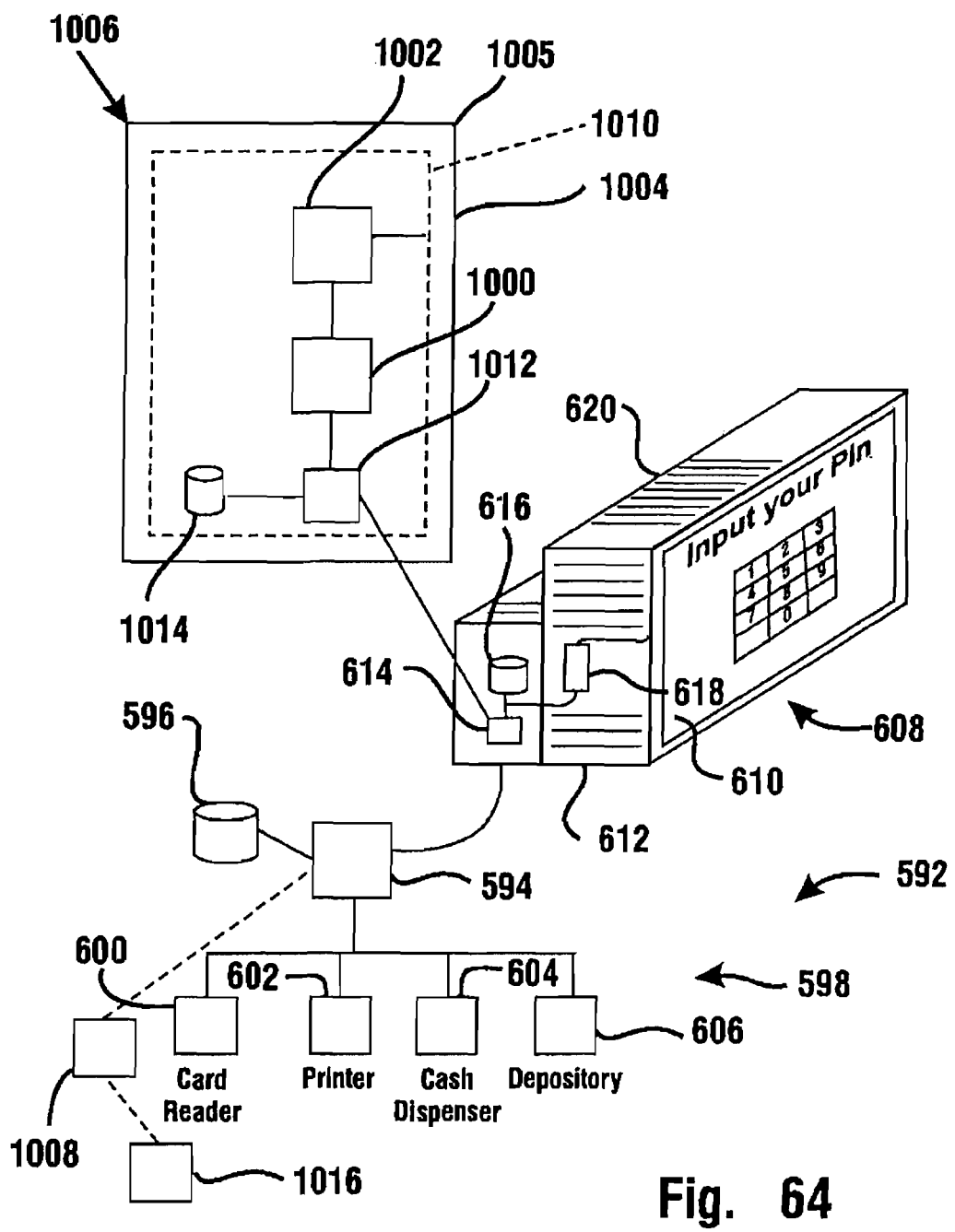
FIG. 64 is a schematic view of an alternative exemplary embodiment of an automated banking machine.

In this exemplary embodiment the cover 932 is operatively connected to an automated banking machine fascia 868. The right and left sidewall portions 936, 938 terminate into corresponding outwardly extending flange portions 940, 942. In the exemplary embodiment, the flange portions are sized so as to extend in corresponding shaped recesses or pockets within the shelf 900 of the fascia 868. The top portion 934 is undulated. Specifically, the top exemplary portion 934 has a top surface 944 that starting from the front end convexly curves upwardly and rearwardly and then downwardly and rearwardly and then downwardly. The top surface 944 then concavely curves rearwardly and downwardly to the rear end. The exemplary top portion includes first and second rows 946, 948 of three openings 950 each of which serve as visual openings. The openings 950 are shaped similar to the keys 904 on the keypad 874. In this exemplary arrangement, the openings 950 and keys 904 are square shaped. The openings 950 are sized the same as or slightly larger than the keys 904 of the keypad 874. The first row 946 of three openings is positioned adjacent or in close proximity to the front end of the top portion 934 and extends along the front end. As depicted in FIGS. 62 and 64, a louver 952 is attached to a front end of each opening 950. Each louver 952 extends downwardly and rearwardly from the front end. That is each louver 952 angles or slants toward the keypad 874 and away from the keypad operator. The louvers 952 cuts down on sight lines of the keys from viewpoints at the rear and sides of the cover 932. The second row of openings 950 is located rearwardly adjacent the first row 946 of openings and extends generally parallel to the first row of openings. The second row of openings is positioned to cut down on sight lines from viewpoints of the keypad 874 from the rear and sides.

The exemplary keypad 874 includes first, second, third and fourth rows 954, 956, 958, 960 of three pushbutton keys 904. Each row extends left to right as viewed in FIG. 61. That is each row extends generally transversely with respect to the point of view of the user of the keypad. The first row 954 of keys may be located generally directly under the first row of openings. The second row 956 of keys is located rearwardly adjacent the first row of keys. The third row 958 of keys is located rearwardly adjacent the second row of keys, and the fourth row 960 of keys is located rearwardly adjacent the third row of keys.

The exemplary openings are positioned to allow the user (schematically indicated at 962) to view the keypad. Specifically, as depicted in FIG. 63, the user can see the first row of keys as indicated by the line of sight D through opening 939. The user can see the second row of keys as indicated by the line of sight B. The cover 932 does not block the view of the first and second row of keys from the normal point of view of the user. The user may be able to see the third row of keys through the first row of openings as indicated by the line of sight C, and as illustrated in FIG. 61, the user may be able to see the fourth row of keys through the second row of openings. However, the cover 932 limits viewing of the user's inputs to the keypad 874 by another. A light source 964 that emits light in the visible range may be placed on the inner side 877 of the cover at the top portion or one of the sidewalls to illuminate the keypad 874. The emitted light may be white, green, blue or any other suitable color.

In the exemplary arrangement infrared light emitters 918 are provided adjacent the keypad 874. Each light emitter emits infrared light that is directed toward the inner side 877 of the cover 932. The exemplary light emitters 918 emit the infrared light to cause the camera 922 to not be able to view the keypad at any location on the inner side 877 of the cover 932. This exemplary embodiment may include elements such as the light sensors, controller indicator, and indicator functions similar to those discussed above. Alternatively, the light emitters may be placed on the inner side of the cover or at other locations. The light emitters could be placed on other types of covers such as those covers previously mentioned.

In some example embodiments, the locking mechanism 52 for the banking machine chest may be actuated and controlled by an electronic lock. The electronic lock may be a combination lock. In some embodiments it may include an electronic lock configured so that the combination that will open the lock at the current time, is calculated as a function of varying values such as the combination that was used to open the lock the last time, what time it currently is, and other factors. As a result, in such example embodiments to open the chest, the servicer has to contact a remote service center, identify the lock involved either by the lock, serial number, or the machine location and/or other identifying information. The servicer receives a combination from the remote service center via a cell phone or some other way, and may then open the lock. The combination lock may include at least one processor and at least one data store that stores data every time the lock is opened regarding the lock opening event. This data may include, for example, the time and date of the opening, the combination used to open the lock, and how long the lock was open before it was locked again. This data may be recovered from the data store in the lock. However, in some embodiments this data may only be accessed from the lock at the site of the machine. Also, as seen in FIG. 6, such a lock may be located relatively low on the machine and thus requires a servicer or other person to bend down to access the lock. Also, some of the sites may not have proper lighting and this may cause the servicer or other person to sometimes enter the wrong combination. Further, such an elaborate electronic combination lock may be expensive.

An alternative approach may provide advantages. Referring to FIG. 64, an input device that is operative to receive user inputs to conduct financial transfers is configured to cause an actuator 1000 to open a lock or locking mechanism 1002 of a door 1004 of a chest 1006 of the automated banking machine 592. The chest 1006 is generally constructed and operated in a manner similar to the chest 48 except as specifically discussed. The input device includes a secure input device such as the touch screen display module 608 with the keypad or other data entry arrangement displayed on the screen. Alternatively, the secure input device may be the key pad 510 such as the encrypting PIN pad (EPP) which is selectively operative to receive inputs through the keys, and encrypt corresponding key input signals within the keypad so that the output from the keypad is encrypted. The input device may alternatively include a handheld device 1008 such as a cell phone, a personal digital assistant, a pager, iPad®, iPod® or other suitable handheld device. In general, the input device may be any suitable input device that is operative to receive user inputs to an automated banking machine.

The locking mechanism 1002 is operative to selectively enable securing the chest door 1004 in a locked condition. The locking mechanism 1002 may be of the type described in U.S. Pat. No. 6,089,168, which is incorporated by reference in its entirety as if fully rewritten herein. Of course other suitable boltworks can be utilized. The locking mechanism 1002 may be part of a lock module 1010. The lock module 1010 may also include the actuator 1000. The actuator 1000 is operatively connected to the locking mechanism 1002 and is operative to cause the locking mechanism 1002 to at least one of lock and unlock the door 1004 to the chest 1006. The actuator 1000 may include a solenoid or any other suitable actuator such as a motor, cylinder, or rotary actuator. The lock module 1010 may also include at least one processor 1012 that is in operative connection with the actuator 1000. The processor 1012 is also in operative connection with at least one data store 1014. In the exemplary embodiment, the at least one data store 1014 includes a non-volatile memory in which at least some of the data in the data store 1014 therein is not erased in the event of power loss. The exemplary actuator may include a power supply connection so that the memory of the display module maintains its data when the machine 592 is turned off. The power supply may include, for example, a battery, a capacitor or other suitable power source.

The display module processor 614 may be programmed to calculate a combination that will open the locking mechanism 1002. The combination may be based on factors and/or combinations of portions thereof. For example, the factors may include the current time, the combination last used to open the chest door of the machine 592, the serial number associated with a processor or other component of the machine 592, or one or more digital certificates or public or private keys. In addition, the combination may be based on other factors which may be more difficult for a criminal to calculate. These factors may include operation factors of the machine 592. For example, the operation factors may include the number of transactions conducted at the machine in the last 24 hours, the amount of cash dispensed by the machine during a predetermined time, and the number of times the at least one user input has inputted a particular input value. These factors may alternatively include different or other factors that can be remotely monitored or obtained at a remote system that is capable of using them to calculate a then current combination or other values from which a combination may be resolved.

With the machine in a service mode responsive to user inputs corresponding to the selectable outputs, the display module processor 614 operates in accordance with its programming to generate a service interface designed to receive inputs from a servicer. The service interface may include an interface portion for input of a combination. The servicer provides input selections and the processor is operative to generate encrypted input data corresponding to the user inputs. This encrypted input data may be generated in some embodiments by the display module processor 614 encrypting the data corresponding to the inputs using a stored encryption key. Further in some embodiments the input data may be triple encrypted using the DES key stored in the at least one data store 616. The at least one processor 614 of the display module 698 may then operate to cause data corresponding to the encrypted input data to be communicated to the lock module processor 1012. In some embodiments the display module processor 614 may operate to provide encrypted input data corresponding to multiple user inputs provided as part of a series of inputs from the servicer. This may include for example a plurality of inputs provided by the user which correspond to the user's personal identification number (PIN), a lock combination, or other input data. Of course this approach is exemplary and in other embodiments other approaches may be used.

It should also be understood that in some embodiments the display module processor 614 may execute programmed instructions including communication verification software or other software of the types previously described to assure that it is in operative communication with an authorized lock of the chest 1006. Likewise, the lock module processor 1012 may operate executable instructions including communication verification software or other software of the types previously described to assure that it is in operative communication with an authorized display module processor 614. This may be accomplished using approaches like those described in U.S. patent application Ser. No. 13/405,643 filed Feb. 27, 2012 the disclosure of which is incorporated herein by reference in its entirety.

In still other embodiments the data store 616 of the touch screen display module 608 may include data corresponding to at least one public/private asymmetric key pair. Likewise the data store 1014 associated with the lock module 1010 may also include data corresponding to another public/private key pair. The public/private key pairs may each be associated with respective digital certificates. The lock module processor 1012 and the display module processor 614 may operate to communicate messages using the respective certificates and public and private key pairs which help to assure that each of the processors is in operative communication with the other authorized machine component.

For example, the public key associated with lock module processor 1012 may be communicated to or otherwise securely input to the processor 614 in the touch screen display module 608 and stored in data store 616. Likewise the public key associated with the display module may be communicated to or otherwise securely input to the lock module processor 1012 and stored in data store 1014. By exchanging messages which are encrypted with the public keys of the other component, which can only be decrypted using the associated private keys, each processor is able to assure that it is in communication with the other authorized component and not with a rogue component that has been installed improperly in the machine. Such assurance may be achieved using techniques that involve the exchange of the certificate data or other secret data or information that helps to assure that each component is authenticated to the other.

In still other embodiments communications between the lock module processor 1012 and the display module processor 614 may be suitably encrypted so as to minimize the risk of interception. This may include for example encrypting communications of data which generally might not otherwise be required to be kept secret internally within the machine 592. Such data may include for example numerical data corresponding to transactions, transaction function selection inputs or other information. This may also include the encryption of messages from a processor associated with operation of the machine to the touch screen display module 608 which cause the output of selectable outputs through the display. This may include encryption of messages that cause the display module 608 to output the prompts for input of a servicer's PIN input or similar outputs. The use of encryption may further help to assure that the accuracy and secrecy of internal machine communications are properly maintained. Further in some embodiments data such as customer input data corresponding to a PIN may be encrypted using the reversible DES encryption algorithm using a DES key as well as through communications which are encrypted using asymmetric keys. Of course these approaches are exemplary and in other embodiments other approaches may be used.

The exemplary embodiment may be operative to prevent a "man in the middle" attack by requiring the display module processor 614 to authenticate itself to the lock module processor 1012. Examples of methods and systems usable by components to authenticate each other in an ATM are shown in U.S. Pat. No. 8,100,323 the disclosure of which is incorporated herein by reference herein in its entirety. Example embodiments that may establish secure communications between components and a computer of an automated banking machine, may or may not include a trusted platform module (TPM). The machine may be operative to establish a trusted platform (TP) using the TPM and associated software which complies with a trusted computing platform or base specification. The trusted platform may be used to perform all or portions of the cryptographic functions for the software and hardware components of the machine to establish secure communications between the components.

The operation of an example embodiment will now be discussed. To unlock the door 1004 of the chest 1006, the servicer or other authorized person first places the machine 592 in the service mode. This may be done, for example, by swiping or inserting a servicer card, which has data associated with servicer, through the card reader 600. Then, the servicer enters a personal identification number (PIN) that authenticates the servicer as an authorized servicer. Alternatively a servicer could connect a device, such as a secure token of a wired or wireless type in operative connection with the machine to provide authorization data that can be used to identify an authorized servicer. Additional authentication data could be provided. For example, the servicer could receive a call or text message on his or her cell phone 1008 indicating that their access credentials are being used at the machine and prompt the servicer to provide an input via their cell phone 1008 or to an input device on the machine to allow access to continue. One example of this type of authentication is disclosed in U.S. Pat. No. 7,866,544, the entire disclosure of which is incorporated herein by reference. Biometric identifiers (e.g. iris scan, fingerprint, etc.) that correspond to data on the card or other article, or which is compared to data stored in another data store, could also be used to provide additional authentication data, which is used by at least one process to determine that received data corresponds to an authorized servicer. Once the servicer is adequately authenticated, the exemplary machine then provides a servicer interface via the display screen of the display module 608 prompting the servicer to select options from a menu for servicing the machine 592. One of the options on the menu would be to unlock the chest 1006 of the machine 592. When the servicer selects this option, the display module 608 would display a message prompting the servicer to enter a combination via inputs through the input device.

In the exemplary embodiment, the servicer communicates to a remote apparatus 1016 such as a server at a remote service center to obtain data corresponding to a combination that will open the locking mechanism 1002 for the door 1004 of the chest 1006. The servicer may call, send a text message or communicate in other ways using his or her cell phone 1008 or other handheld device. Alternatively, devices other than handheld devices may be used by the servicer to communicate to the remote apparatus 1016. These devices may include desktop or laptop personal computer or input devices on the machine itself such as a servicer display. After receiving the communication from the servicer requesting the combination, the remote apparatus 1016 calculates the data corresponding to the current combination and communicates the data to the servicer through the cell phone 1008 via simulated voice or text message or via other means. The servicer then inputs the combination via the input device associated with the machine. If the input device is the touch screen display module 608, the combination could be entered by touching areas of a keypad displayed on the touch screen. In other examples, the input device for the combination may be the EPP. In other examples the combination may be input through a portable wireless device. In alternative embodiments the automated banking machine may be operated at least in part responsive to inputs to a portable wireless device. This could be done using the principles described in U.S. patent application Ser. No. 13/317,087 filed Oct. 7, 2011; Ser. No. 13/311, 033 filed Dec. 5, 2011; and/or Ser. No. 12/927,988 filed Dec. 1, 2010, the disclosures of each of which are incorporated herein by reference in their entirety.

In other example embodiments, the input device of the machine may include a wireless communication port. The wireless communication port may be associated with one or more processors and associated data stores. Such processors and data stores may be associated generally with the wireless communication and/or lock control functions. In other embodiments, the associated processors and data stores may be included in one or more computers that cause the operation of the machine to accomplish financial transfers. In some embodiments the wireless port may communicate with wireless devices of consumers which are associated with financial transfers. Further in some embodiments the wireless port may receive the servicer inputs from a portable wireless device which are operative to cause a change in condition of the lock. In other embodiments, the input device may include a bar code reader which operates to read data output through a display of a portable wireless device. Inputs operative to cause a change in condition of the lock may be received through the bar code reader. Other example embodiments may receive servicer inputs through an input device that receives inputs based on tracking where on a screen a user is looking. This may be done using at least one camera as an input device in a manner like that described in U.S. patent application Ser. No. 12/930,724 filed Jan. 14, 2011 and/or Ser. No. 12/800,184 filed May 10, 2010, the disclosures of each of which are incorporated herein by reference in their entirety. Of course in other embodiments other input devices may be used.

In the example embodiment, the display module processor 614 then determines if the servicer input combination corresponds to an appropriate combination based on all of the factors that are used in determining the then appropriate combination. If the display module processor 614 determines that the combination is appropriate, then the display module processor 614 sends at least one communication including at least one message to the lock module processor 1012 to open the locking mechanism 1002. This at least one message is then authenticated through operation of the lock module processor. The lock module processor 1012 then operates responsive at least in part to the at least one message to cause the actuator 1000 to open the locking mechanism 1002. The door 1004 may then be moveable between a closed position in which the door at least partially covers an opening 1005 of the chest 1006, and an open position which allows access to the interior of the chest 1006.

If the display module processor 614 determines that the combination is not appropriate, the exemplary display module 608 outputs an indication of this condition through the display screen. Alternatively or in addition, the display module 608 may send a message to the remote apparatus 1016 that the combination that was input is not appropriate. The remote apparatus 1016 may then send a message to the servicer's cell phone 1008 notifying them of this condition. The cell phone 1008 then communicates this situation to the user through outputs such as simulated voice, text message or other outputs. Alternatively, the display module processor 614 may determine the combination for the locking mechanism 1002 and communicate this data to the remote apparatus 1016.

Alternatively in other embodiments, data corresponding to a combination usable to unlock the lock of the machine may be provided through a servicer's portable device in a form that can be used to provide a visible output to the display thereof. Such an output may include a two-dimensional bar code which can be read through operation of a scanner on the machine. In some embodiments, the visible output may correspond to encrypted data sensed from the remote apparatus 1016. Alternatively and/or in addition, the visible output may be a function of data received from the remote apparatus and data stored in the servicer's portable device. This may include, for example, data corresponding to a digital certificate that is stored in the portable device and which can be identified through operation of at least one processor on the machine to resolve data that can be authenticated for purposes of opening a lock. Alternatively or in addition, in other embodiments, the remote apparatus 1016 may operate to cause data to be sent to both the machine and the servicer's portable device. The data sent to the user's portable device may be operative to generate visible outputs or other outputs which are provided as inputs to the display module or a reader on a machine. The data delivered to the machine may then be utilized through operation of the at least one processor as one of the factors that is utilized in resolving the data corresponding to the servicer inputs for purposes of verifying the propriety of the input data for purposes of opening the lock.

In still other embodiments, at least one processor associated with the machine, such as within the display module, may operate to generate values which are utilized in connection with determining the appropriate inputs to be provided by a servicer in opening the lock. For example in some embodiments, at least one processor of the machine may generate a random value or pseudo random value that is not predetermined, and which is provided to a servicer or the servicer's portable device. For example in some embodiments, a value may be a random number that is output through the display screen. Alternatively in some example embodiments, the value may be output via wireless communications such as Bluetooth and transmitted to the servicer's portable device. The servicer may then operate their portable device to input the value that was output from the display of the machine along with instructions to utilize the value for purposes of providing one or more outputs. Alternatively the servicer's portable device may operate in accordance with its programming to utilize data received wirelessly from the machine for purposes of calculating one or more outputs. The portable device may operate in accordance with its programming to utilize data received from the remote system as well as data received from the machine for purposes of providing one or more outputs that may be utilized for purposes of opening the chest. Such values may include, for example, providing a two-dimensional bar code or a QR code that can be output through the display of the device and which can be read by a reader on the machine. Alternatively the portable device may provide values that can be input through the display module or other input device on a machine for purposes of receiving the data. Alternatively and/or in addition, the portable device may deliver the data resolved through operation of the portable device wirelessly through a wireless port of the machine. Further in some embodiments, multiple inputs such as manual inputs and wireless inputs may be received. At least one processor in the machine may then operate to receive the data that is provided and make at least one determination concerning whether the input data is appropriate for purposes of unlocking the lock. Of course these approaches are exemplary and in other embodiments, other approaches may be used. Such approaches may include features such as those used in U.S. Pat. No. 7,992,778, the disclosure of which is incorporated herein by reference in its entirety.

In alternative examples, the EPP of the machine may serve as the input device for receiving input of the data corresponding to the combination, and may include the processor and data stores for determining an appropriate combination. In other embodiments, other modules which serve as input devices may perform such functions.

As previously mentioned, the example display module 608 of some embodiments is configured to minimize the risk of tampering with the software that calculates the validity of the then current input combination that will open the locking mechanism 1002 to the door 1004 of the chest 1006. If attempts are made to compromise the module, the routines and/or stored data will be erased or otherwise modified so that they cannot be reversed engineered or recovered. The display module 608 may also store data in its data store 616 regarding the complete history of all activities related to opening of or attempts to open the chest 1006. This may include the successful opening attempts, the failed opening attempts, how long the chest was open, etc. In addition, when the display module 608 serves as a servicer interface for servicing activities, the display module 608 may store other data related to servicing activities. This data may include data related to each time that the receipt paper, financial documents or other consumable items are loaded into or removed from the machine 592. The display module 608 may also store in its data store 616 data related to diagnostic tests conducted on components of the machine 592 and the results of each test. This stored data can provide a detailed service history of the machine 592.

Periodically, or on an ongoing real time basis, the display module processor 614 may upload or send all or portions of this data to the remote apparatus 1016 so that the data may be analyzed. This makes it possible for an entity operating the machine to review the activity that has occurred via recovery of data from the remote apparatus 1016. One example showing principles related to how this may be done is disclosed in U.S. Pat. No. 7,445,144, the entire disclosure of which is incorporated by reference. In alternative example embodiments, data may be stored in distributed systems including multiple network connected servers and data stores. Further in some embodiments such distributed systems may include cloud storage environments wherein data related to machine operation is stored in a distributed environment such as a private or public cloud. In such environments the stored data may be accessed via different systems for different purposes. This may include, for example, accessing selected data for purposes of determining a need for future service related to a particular machine. This may include, for example, predicting the future need for replacement or repair of particular parts based on data concerning operational features of various devices within the machine.

Also in some example systems, data may be accessed by a remote server for purposes of calculating values that can be utilized for purposes of resolving a then-current combination for opening the chest lock associated with a particular machine. Thus, for example, in some embodiments the remote apparatus 1016 which comprises one or more computers may operate to calculate a current combination for opening a lock of the machine by utilizing different parameters associated with operation of the machine that have been stored in the data stores in association with machine operation. When this data is communicated to the servicer and/or to the machine at the time of lock opening, the data communicated may include data which corresponds to the particular parameters that are being utilized for purposes of calculating the then-current combination. Such data may be included in one or more messages provided to the servicer's portable device and communicated to the machine therefrom. Alternatively and/or in addition, the data utilized for purposes of calculating the combination may be communicated directly to the machine from one or more remote servers. The machine may then operate in accordance with its programming to provide the appropriate mathematical manipulations to the communicated data for purposes of verifying the correctness of the combination data provided by the servicer and if the input data from the servicer corresponds to the resolved appropriate input data based on the selected parameters, at least one processor in the machine causes the lock to change from the locked to the unlocked condition. Of course it should be understood that these approaches are exemplary and other approaches utilizing these principles may also be used.

In some embodiments, the service history and the history of the locking mechanism operation may be displayed via the touch screen display of the display module 608 and also printed using the receipt printer 602 to authorized servicers. For example, servicers or other persons who load cash into the machine 592 may provide inputs through the touch screen of the display module 608 or other input device to open the chest and indicate that they are removing cassettes containing currency or other financial documents. The machine 592 then keeps track of how much money should be in those cassettes that are being removed. Also, a cash handler may input via the touch screen or other input device that they are replacing the partially depleted cassettes with cassettes loaded with money and also indicate how much money or how many bills of a given type are in the cassettes being installed. The servicer may also take the steps necessary to replace the receipt paper and do other servicing activities.

Once the servicer finishes these activities, the servicer takes the necessary steps to again close the chest and relock the lock. This may occur automatically or it can be done by providing an input or inputs to the touch screen display or other input device. Once this activity is completed, the cash handler may need a receipt to indicate that they performed these service activities on this particular machine. By providing inputs through the touch screen or other input device, the servicer can then print out a receipt indicating exactly what they did. This may include the amount and nature of cash that was taken from the machine 592, the amount and nature of cash that was loaded into the machine 592, the time it was done, the machine 592 involved, and any other data pertinent to keep in such records. Alternatively, the servicer could have his or her handheld device 1008 that has wireless or other communication technology, receive and store data that includes this information. For example, the handheld device 1008 and the machine may each include a wireless Bluetooth port or a Near Field Communication (NFC) port or any other suitable port that allows the exchanging of this data over short distances (using radio frequency transmissions). Alternatively other communications methods may be used such as infrared (IR) or other communications. In some embodiments, this data can be displayed on the display screen of the handheld device 1008 or communicated to the servicer via simulated voice messages outputted from the handheld device 1008. Of course these approaches are exemplary and in other embodiments other approaches may be used.

Figure 65:
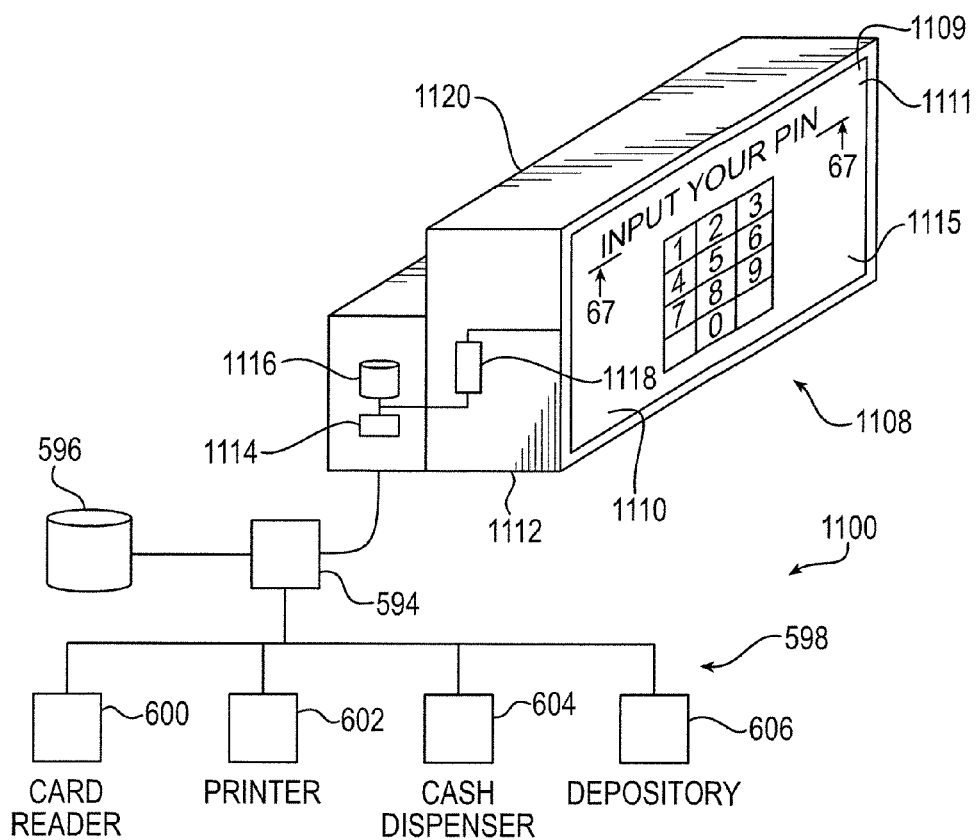
FIG. 65 is a schematic view showing an example embodiment of an automated banking machine including a secure keypad module.

FIG. 65 shows schematically components of another alternative example embodiment of an automated banking machine generally indicated 1100. Machine 1100 includes at least one computer which is alternatively referred to as a terminal processor 594 which is in operative connection with at least one data store 596. As in other described embodiments, data store 596 includes data corresponding to computer executable instructions that are carried out through operation of the processor to cause operation of the machine. Of course it should be understood that while only one processor and data store are shown, other example embodiments may include numerous processors and data stores. In alternative example embodiments, the terminal processor may not be located within the machine, and rather may be located in a server or other device that is remote from the machine. For example, the machine may be operated as a virtual machine and the computer instructions that cause operation of the machine may be executed in a server that is operatively connected to the machine and also to other machines. Such a server may be located remotely from the automated banking machines and connected thereto through one or more network connections.

The terminal processor 594 is in operative connection with transaction function devices of the machine generally indicated 598. The exemplary transaction function devices include a card reader 600, a printer 602 and a cash dispenser 604 similar to those previously described.

In the example embodiment, the machine 1100 includes a keypad module 1108. The keypad module is alternatively referred to herein as a display module and/or an auxiliary display. In this example embodiment, the keypad module 1108 which is alternatively referred to herein as a display module comprises a structure including an assembly of components configured to provide a secure input device through which users can input data which is protected from being intercepted by unauthorized persons. The exemplary embodiment of the keypad module 1108 includes a touch or contact sensitive screen 1109. The touch sensitive screen 1109 may be one of several types which can be used to determine the relative location on the screen at which a user makes contact through one or more fingers or other items such as a stylus. This may include, for example, in some embodiments a resistance detecting touch sensitive screen. In other embodiments, the touch sensitive screen may be of the capacitance detecting type. In still other embodiments, the screen may include an acoustic wave detecting type of touch sensitive screen. In still other embodiments, other types of touch or contact sensitive screens may be used. As can be appreciated, other various suitable types of touch sensitive screens may be used to determine the positions of contacts made by a user's finger or fingers on the touch screen so as to detect when a user makes contact in an area of the screen that corresponds to selectable visual indicia that is output through a display 1111 of the touch screen of the module.

An exemplary embodiment of the keypad module 1108 may also include a haptic interface in order to provide a user with tactile feedback. Example haptic touch screens may be used in some example embodiments and may include haptic touch screens manufactured by Pacinian Corp. of Spokane, Wash. or Esterline Advanced Input Systems of Bellevue, Wash. or may include other haptic interface systems that are operative to provide tactile feedback to a user's fingers that are in contact with an input surface of the touch screen.

In this example embodiment the touch screen 1109 may be comprised of a touch membrane 1110 that overlies a display 1111. The touch membrane 1110 of this example embodiment includes a generally transparent pane that includes an input surface 1115. The input surface includes areas that are configured to be contacted via finger contacts from users. These areas may correspond to selectable indicia output through the display. Contact with the input surface in areas corresponding to currently displayed indicia may provide user input data to the machine such as a personal identification number (PIN), a transaction selection, character values and/or monetary amounts. The example touch membrane 1110 generally overlies the display 1111. The display 1111 may in some examples be an LCD display, a CRT display, an OLED display or other suitable display type. The display 1111 may operate responsive to operation of at least one processor to display indicia in areas corresponding to contact areas on the input surface of the touch membrane. The display 1111 may also display indicia corresponding to transaction instructions or other indicia. For example, transaction instructions may be outputted through the display and then at the appropriate time, the display 1111 can display indicia corresponding to keypad keys which the machine user can select via touch contact with the corresponding overlying contact areas of the touch membrane 1110. Further in some example embodiments the touch membrane 1110 may comprise a haptic touch membrane that is selectively configured to provide haptic feedback (for example vibration) responsive to touches (e.g., finger presses, finger sliding) in designated positions on the input surface 1015 of the touch membrane 1110 that correspond to the displayed virtual buttons or other indicia output by the display 1111 that underlies the touch membrane 1110.

Figure 67:
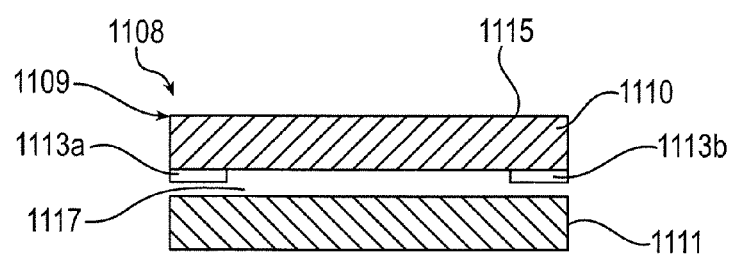
FIG. 67 is a schematic sectional view of the keypad module taken along line 67-67 of FIG. 65.
Figure 66:
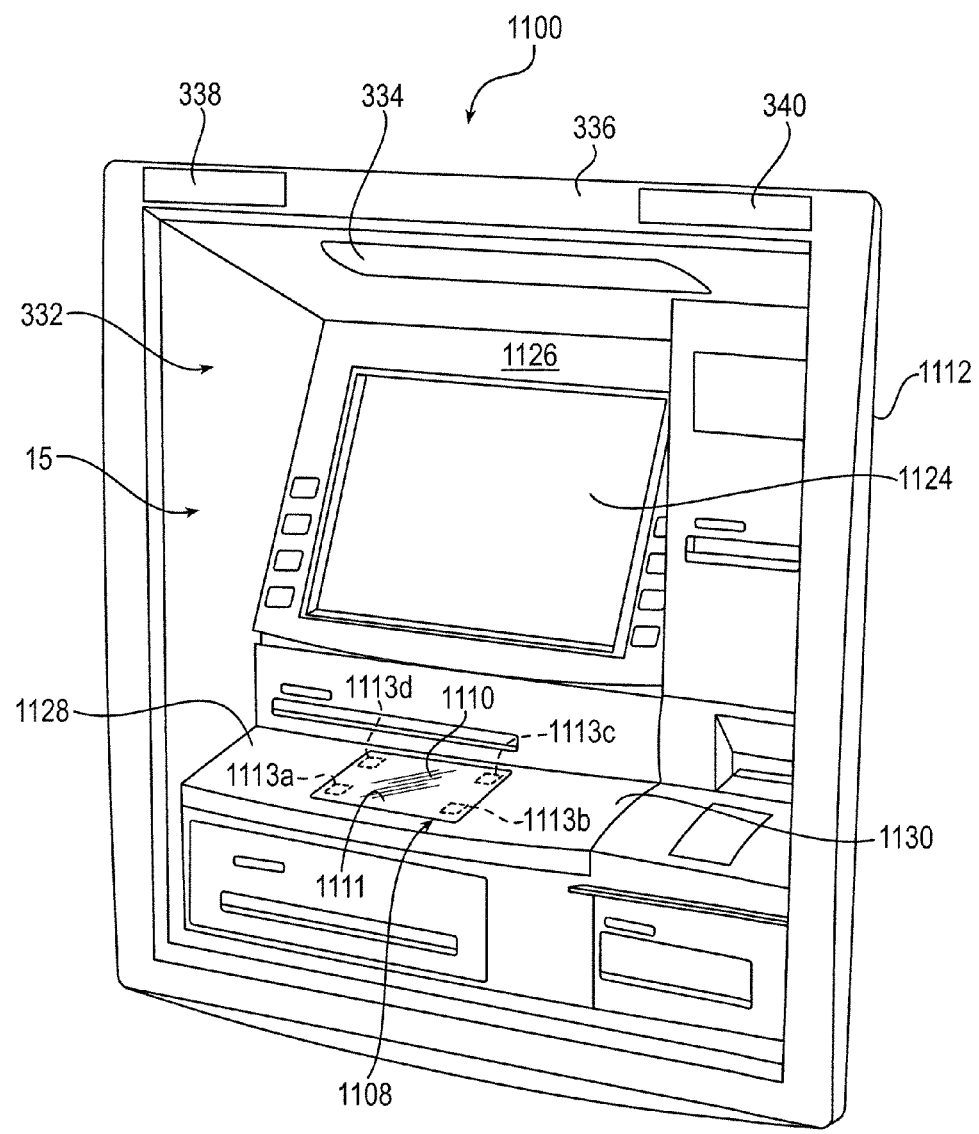
FIG. 66 is an isometric view of the automated banking machine interface of the machine shown in FIG. 65.

Referring to FIGS. 66 and 67, the example touch screen 1109 may include four force sensors 1113*a*, 1113*b*, 1113*c* and 1113*d*. In this example embodiment, a gap 1117 (See FIG. 67) is located between the touch membrane 1110 and the display 1111 to allow movement and/or deformation of the touch membrane. Each sensor is operatively attached to a respective corner of the touch membrane. The force sensors are operative to sense and provide outputs that correspond to an amount and/or direction of force at the respective sensor. At least one processor in operative connection with the sensors is active responsive to the detected values and programmed instructions to determine the location at which the touch membrane 1110 is being contacted. This arrangement allows the force sensors to sense the location or area on the input surface of the touch membrane where the user's finger or other touching device is in contact therewith. In the example embodiment the force sensors are in operative connection with a keypad module processor 1114 which operates to resolve the data corresponding to the location of contact.

Referring to FIG. 65, the example embodiment further includes a housing 1112. The housing 1112 of the example embodiment houses display module components. For example, the housing may house the keypad module processor 1114 and one or more keypad module data stores 1116. In the example embodiment, the at least one keypad module data store includes a volatile memory in which at least some of the data stored therein is erased in the event that power thereto is disconnected. The example keypad module 1108 includes a power supply which is in operative connection with electrical power source of the automated banking machine so that the volatile memory in the keypad module 1108 maintains its data when the automated banking machine is in operation. Further, the exemplary embodiment includes within the housing 1112 of the keypad module at least one battery 1118 or other power source. The at least one battery or other power source operates to provide a source of electrical power so as to enable the volatile memory to maintain its data even during times when the machine 1100 is turned off or unplugged from its source of AC power.

In the example embodiment, the housing 1112 comprises a unitary structure that is designed to require breakage to access internal components thereof. This may be accomplished in some embodiments by having the housing as a permanently sealed assembly so as to reduce the risk of unauthorized persons gaining access to information in the keypad module data store. For example, in an exemplary embodiment the housing includes a plurality of sensors that are operative to sense efforts to access the interior area of the housing. For example, the sensors may include frangible electrical conductors 1120. The exemplary frangible electrical conductors may be operative to electrically connect the electrical power source such as the battery and maintain electrical power to the data store. Such conductors may include in some example arrangements thin wires, conductive traces or other conductive items that readily break when displaced or deformed. Attempts to open the housing 1112 will generally fracture and separate such one or more electrical conductors resulting in a loss of power from the battery 1118 to the display module data store. Thus the sensors operate to detect possible compromise of the key module housing and results in the data included in the keypad module being erased in the event an effort is made to compromise the integrity of the module.

Further in exemplary embodiments the sensors for detecting efforts to breach the housing of the display module may include electrically conductive material which extends in at least one transparent pane or touch membrane of the touch screen. This may include, for example, electrically conductive trace material or other material that is operative to provide integrity of the component portion. Such conductive trace or similar material may be suitably deformable during normal module operation. However, excessive deformation or breakage of the touch membrane results in detection of the abnormal condition and disconnection of electrical power to the volatile memory resulting in erasure of the data in the data store 1116. In some example embodiments, the sensors including the electrical conductors may be molded into components of the module so as to minimize the risk that sensors can be compromised. Of course these approaches are exemplary. Further it should be understood that the approach of maintaining power to a volatile data store is only an example of a way of detecting efforts to compromise the module. Other approaches may be used in other embodiments such as sensors that detect deformation of one or more areas of the module housing indicative of efforts of disassembly or attempted breach of the housing. Other embodiments may include features for pressurizing or evacuating an interior area of the housing and may include a pressure sensor in operative connection with the interior area. Changes in fluid pressure sensed through operation of the sensor may indicate changes in fluid pressure either into or out of the interior area of the housing so as to detect a break indicating a compromised condition. A circuit in operative connection with the pressure sensor may then operate to cause the sensitive data to immediately be erased from the at least one data store. In other examples, inductance and/or capacitance sensors may be used to detect changes in structural features or properties associated with efforts to compromise or detect signals within the structure. Of course these approaches are exemplary and in other embodiments, other approaches may be used.

In an example embodiment the at least one keypad module data store is used to store data corresponding to at least one encryption key. In some example embodiments, the at least one encryption key may include a symmetric key such as a key that complies with the Data Encryption Standard (DES) or other suitable encryption key type. The at least one processor 1114 of the module 1108 may operate in accordance with its programming to cause the keypad module to output selectable visual indicia such as a visual representation of the keypad through the display 1111. The visual representation of the keypad may include indicia corresponding to a plurality of selectable keys, each of which may be selected by a user touching the input surface of the touch membrane in the area overlying where the key appears.

In example embodiments that include a haptic type touch screen, the module processor and/or the terminal processor may be operative to configure the haptic touch screen to provide tactile feedback related to contact with indicia corresponding to displayed keys. Such tactile feedback may be output by the haptic touch screen immediately upon detection of the user's finger touching or sliding across a display key or other indicia on the screen. Alternatively such tactile feedback may be output through the touch screen in response to detection of a finger of a user that persists for at least a predetermined amount of time in generally the same location such as a long touch on the input surface of the haptic touch screen.

In some example embodiments to assist in locating a displayed icon or other indicia on the haptic touch screen, the module processor operates to cause the input surface overlying a designated key to provide haptic feedback. In some embodiments the designated key may comprise a central key (e.g., a "5" key) of the keypad so as to provide tactile feedback when the input surface overlying the key is contacted by a finger. In some example embodiments, contact with the input surface in an area adjacent thereto may provide no tactile feedback or may provide a different form of tactile feedback. Providing distinctive haptic feedback for a designated key (such as a central keypad key) may enable a visually impaired user to slide a finger on the input surface to identify the location of an identifiable key. Once the identified key is found, the user can then use this position to determine the locations corresponding to indicia which represent adjacent keys of the standard keypad. The user may then press more forcefully or provide a long touch in areas of one or more keys to provide inputs to the automated banking machine. Such inputs may include, for example, a personal identification number, a transaction selection, an amount of value or other suitable inputs.

In an example embodiment, tactile feedback on the input surface may be provided responsive to detection of a finger pressing or sliding adjacent to the edges of indicia corresponding to keys or in boundaries corresponding to the border between indicia representative of keys. For example, the spaces between and around indicia corresponding to displayed keypad keys may correspond to a grid of contours produced on the input surface so as to provide tactile feedback as the user slides a finger over the spaces between and around the indicia corresponding to keys so that a visually impaired user may identify the location of the key of the keypad. In such embodiments a user may identify the locations of individual keys represented on the keypad by lightly sliding a finger around the input surface to identify the location of the grid that defines the keypad. Of course this approach may also be used in connection with finding other types of selectable displayed outputs that are provided through the module.

In an example embodiment, the haptic touch screen may be configured to provide different tactile sensations for different locations which correspond to different types of indicia output through the screen. Different types of tactile outputs may also be provided depending on different types of desired inputs through sliding a finger or providing a long touch forefinger. Such different tactile outputs may be produced by having the input surface of the haptic touch screen produce different surface configurations or vibrations added to the different locations and/or for different types of selectable inputs. Such different vibration patterns and surface configurations may include variations in magnitude, contour, duration, waveform, frequency of vibration or other properties that are detectable via touch.

In an example embodiment, each numeric key of a keypad displayed via the keypad module and touched by a finger of the user may produce a unique tactile output in a pattern that can be used to recognize the key being touched. Such a pattern, for example, may correspond to a series of short and long vibrations based on a detectable pattern that is known to correspond to a particular number or value associated with the "key" being currently touched. Also, it should be appreciated that in addition to outputting tactile outputs, the processor controlling the haptic touch screen may also cause corresponding audio outputs from the machine through a speaker device which may be associated with the machine. This may include, for example, beeps, words or other audible indicia that can be output to speakers, through a headphone connected to a headphone jack on the machine or other output device that can receive and/or generate audible indicia.

Responsive to user inputs corresponding to one of the selectable outputs indicia, the at least one processor 1114 operates in accordance with its programming to generate encrypted input data corresponding to the user input. The encrypted input data may be generated in some embodiments by the keypad module processor 1114 operating to encrypt data corresponding to the input using one or more stored encryption keys. Further, in some embodiments the input data may be triple encrypted using the DES key stored in the at least one data store 1116. The at least one processor 1114 of the display module may operate to cause data corresponding to the encrypted input to be communicated to the terminal processor. Of course it should be understood that in some embodiments, the keypad module processor 1114 may operate to provide encrypted input data corresponding to multiple user inputs provided as part of a series of inputs from the user. This may include, for example, a plurality of inputs provided by the user which correspond to the user's personal identification number or other values. Of course this approach is exemplary and in other embodiments, other approaches may be used.

For example, in some embodiments the touch screen display module which is able to detect vibratory properties of an item in contact with the input surface of the display may be used to receive inputs from a vibrating smart phone or other portable object carried by a user. For example, a portable smart phone or other portable object of the user may operate to vibrate responsive to data that is programmed or otherwise input into the device. This may include in some embodiments, software instructions corresponding to an application stored in a smart phone that allows the user to program the device to provide vibratory outputs that correspond to data. These vibratory outputs may be presented in Morse code or other suitable protocols where they are known to correspond to particular alphanumeric or other values that may be utilized as inputs to the automated banking machine.

For example, in some arrangements an application executed through operation of a processor associated with a smart phone may operate to receive data corresponding to a user's account number or other value that corresponds to a user's account. This may be received via keys or other input devices on the smart phone. Such a value may be securely stored in the smart phone such that the vibratory outputs corresponding thereto are only output from the phone in response to one or more secret inputs that are known only to the authorized user of the phone. Such secret inputs may be established via programming provided by the owner of the phone so as to select only the inputs that will be known to that particular user. In the example embodiment responsive to the user providing those inputs that will cause vibratory output in the phone corresponding to the account number, the phone operates a short time later to vibrate in a manner that corresponds to the user's account number data and/or other transaction data that is desired to be securely input. The delay enables the user to place the phone in contact with the input surface of the touch screen. The vibratory pattern output through the phone is detectable via the sensors associated with the touch screen and enables the input of account number information or other transaction information to the machine, which can then be used for purposes of conducting a transaction. It can be appreciated that the vibratory patterns associated with the smart phone may generally not be visually perceptible by unauthorized persons or subject to interception by criminal interception devices that may be applied to the machine. This may be particularly true in cases where the vibratory pattern corresponding to the data is encrypted in a manner that prevents criminals from readily resolving the underlying data, but that enables the vibratory pattern to be interpreted through operation of the machine.

In addition or in the alternative, a smart phone or other portable device may be operative to provide other inputs to the machine. This might include, for example, data corresponding to a user's PIN number. The PIN number may also be securely stored in a smart phone such that vibratory outputs corresponding thereto are only accessible responsive to a user designating input. Thus in the example embodiment, subsequent to the user providing the inputs necessary to cause output of vibratory values corresponding to a PIN, the smart phone thereafter is operative to provide the vibratory outputs that correspond thereto while in contact with the input surface of the touch screen. Further some embodiments may include sensors that are operative to detect when the smart phone is in such contact with the input surface. The output of vibratory indicia therefrom is delayed until such contact or conditions corresponding to such contact is detected.

In still other example embodiments, other values which may be programmed into the smart phone by a user may be output in a vibratory manner. This may include, for example, other identifying indicia, transaction selections, value amounts or other items that need to be conveyed to the machine. The user may program the smart phone or other portable device to provide these inputs to the machine via vibratory patterns or properties that can be sensed via the input surface of a touch screen or other contact sensitive surface and which can be resolved through operation of at least one processor in operative connection therewith.

Likewise in other example embodiments, a smart phone application may be operative to cause a smart phone to receive vibratory outputs through movement of a haptic surface of a touch screen display module. This is done for smart phones that include sensors that can detect phone orientation, acceleration and/or other properties that correspond to phone orientation or movement. Thus for example information regarding a user's account, transaction details, account balances and the like may be communicated from the automated banking machine to the smart phone or similar device via vibratory outputs provided through the haptic interface surface. In this manner the user may receive data or details of the particular transaction that has been conducted. In other example embodiments, vibratory inputs received by the phone from the haptics interface may cause the phone to provide output vibratory data. Further in some example embodiments the smart phone or other portable device may carry out via a vibratory communication to transfer machine stored value which corresponds to monetary value in an electronic wallet. Such an electronic wallet may include online or offline type electronic wallet which provides monetary value that the user can then utilize in transactions that are conducted with other devices through their smart phone.

Further in some embodiments, vibratory communication of data may be utilized in connection with other forms of local communication that may be affected with a cell phone or other portable device. This may include, for example, wireless communications carried out with a smart phone via near field communication (NFC) or Bluetooth. In some example embodiments, the phone may operate to provide inputs via multiple output types such as sonic, ultrasonic, radio frequency communication and/or vibratory communication for purposes of carrying out a transaction. Likewise the phone may receive inputs via sonic, ultrasonic, radio frequency, vibratory and/or other input types so as to receive data from the machine. This enables the carrying out of transactions which may include different forms of data or portions of certain data that may be more suitably provided through different means of communication. Further in some example transactions, the smart phone may use communication of data via the different types of communication to provide identification values or other data to the automated banking machine. These additional types of data inputs and values may facilitate more securely and accurately identifying the particular user and/or avoiding the unauthorized interception of data that is communicated to and from the machine. Of course these approaches are exemplary and in other embodiments, other approaches may be used.

In some example embodiments, the keypad module processor 1114 may operate by executing instructions including communication verification software and other types of software of the types previously referenced, to assure that it is in operative communication with an authorized terminal processor 594 or other device of the machine. Further in other exemplary embodiments, the keypad module processor 1114 may operate character recognition software so that outputs corresponding to requests to users for input of sensitive data are recognized. This capability can be utilized to assure that any confidential inputs by the customer are properly encrypted and that such requests for confidential information are not caused to be output at inappropriate times due to software exploits or other criminal activities that cause malicious operation of the automated banking machine.

In still other embodiments, the at least one keypad module processor 1114 may be operative to execute instructions which produce the outputs from the display 1111. In such example embodiments the keypad module processor 1114 and the associated data store 1116 may include instructions that are operative to produce the graphics, text and/or other output indicia that is presented by the machine to users. In this way the terminal processor 594 or other circuitry which causes outputs may only provide messages to the keypad module which indicates the nature of the currently required output from the module. This approach may be useful in avoiding the need for the terminal processor to generate all the necessary screen output data. This approach may also minimize the processing power required for this purpose by the terminal processor and may also minimize the risk that the display may be operative to output messages to machine users that are not appropriate. In addition, this approach may be useful when the machine is operated in response to a remote application or a remote virtual machine. Having the capability of the processor in the module to output one or more screens, or to execute certain interface logic in the event the connection to the remote computer is lost, may avoid disruption of customer transactions. Of course these approaches are exemplary.

In still other embodiments, the data store 1116 of the keypad module may include data corresponding to at least one public/private asymmetric key pair. Likewise one or more data stores associated with the terminal processor may also include data corresponding to one or more public/private key pairs. The public/private key pairs may each be associated with respective digital certificates. The terminal processor 594 and the keypad module processor 1114 may operate to communicate messages using the respective certificates and public and private key pairs to help assure that each is in operative communication with the other authorized machine component. This may be done in a manner like that previously discussed. For example, the public key associated with the terminal processor may be communicated to the processor 1114 in the keypad module and stored in data store 1116. Likewise the public key associated with the keypad module may be communicated to the terminal processor and stored in an associated data store 596. By exchanging messages which are encrypted with the public keys of the other component (which can only be decrypted using the associated private keys of the respective other component) each processor is able to assure that it is in communication with the other authorized component and not with a rogue component that has been installed by criminals in the machine. Such assurance may be achieved using techniques that involve the exchange of certificate data or other secret data or information that helps to assure each component is authorized to interoperate with the other.

In still other example embodiments communications between the terminal processor and the keypad module processor may be suitably encrypted so as to minimize the risk of interception. This may include, for example, encrypting communication of data which is generally not required to be kept secret internally within the machine. Such data may include, for example, numerical data corresponding to transactions, transaction function selection inputs or other information. This may also include the encryption of messages to the touch screen display module which cause the output of selectable outputs through the display. This may also include encryption of messages that cause the display module to output prompts for input of a user's PIN or similar outputs. The use of encryption may further help to assure that the accuracy and secrecy of internal machine communications are properly maintained. Further, in some example embodiments data such as customer input data corresponding to a PIN may be encrypted using a reversible DES encryption algorithm using one or more DES keys as well as through communications which are encrypted using asymmetric keys. Of course these approaches are exemplary and in other embodiments, other approaches may be used.

Referring to FIG. 66, the automated banking machine may include a fascia 1122. The fascia 1122 is generally similar to the fascia 12 of automated banking machine 10. A display 1124 is in operatively supported connection with the machine and is positioned to be visible through the front face 1126 of the fascia 1122. The display 1124 may be a backlit type LCD display or other suitable display type. The display 1124 is generally larger than the display screen 1111 of the keypad module 1108. In some example embodiments the keypad module may serve as an auxiliary display in operation of the machine. The primary display 1124 operates responsive to operation of at least one terminal processor to display indicia which corresponds to instructions on how to operate the machine. Alternatively or in addition, primary display 1124 may be operated to display advertising or other promotional information. Alternatively example embodiments of automated banking machines may operate to use the primary display 1124 of the user interface except in special circumstances such as for blind or disabled users in which case the keypad module is used to provide outputs. At least one processor may operate to provide switching of the location of machine output indicia for purposes of receiving user instructions, responsive to one or more types of user inputs that enable switching between the two different displays as the currently operative user interface. In other exemplary embodiments, when the auxiliary display provides the operative user interface the primary display 1124 may be used for advertising, promotional and other purposes. Specific transaction related outputs are provided and inputs are received through the auxiliary display. Alternatively in still other example embodiments, an automated banking machine may include only the display of the display module 1108 for purposes of providing the user interface for machine operation and may utilize the space that would otherwise be utilized by the primary display for other purposes such as areas for other transaction function devices, audio/video communications with a remote service provider, presentation of promotional material or other purposes. Of course approaches are exemplary and in other embodiments, other approaches may be used.

In the case of example machine 1100, the fascia may also include a shelf 1128 that extends generally outwardly from the front face 1126 below the display 1124. The exemplary shelf 1128 includes an upper exterior surface 1130 that may extend generally horizontally and alternatively may slope somewhat outwardly and slightly downwardly in a direction away from the front face 1126. The keypad module 1108 is mounted in operatively supported connection with the machine. In an exemplary embodiment the module is mounted so that its input surface is accessible as an upper surface portion of the shelf 1128. In some example embodiments, the input surface of the display module 1108 may extend in a co-planar manner with the upper surface of the shelf.

At least one processor included in the display module (or in operative communication with the display module) may operate in accordance with its programming to cause the display of the display module to output user selectable output indicia corresponding to selections that may be provided to the automated banking machine. In some embodiments the indicia may include graphical indicia which corresponds to buttons or keys of a virtual keypad which have a generally similar appearance to physical buttons or keys that may be utilized for inputs on automated banking machines. Selectable graphical indicia that may be output through the screen of the display module may correspond to numbers, amounts, words, or other data that can be selected by a user touching the input surface and which corresponds to inputs that may be utilized to conduct one or more transactions or other functions through operation of the machine.

Figure 70:
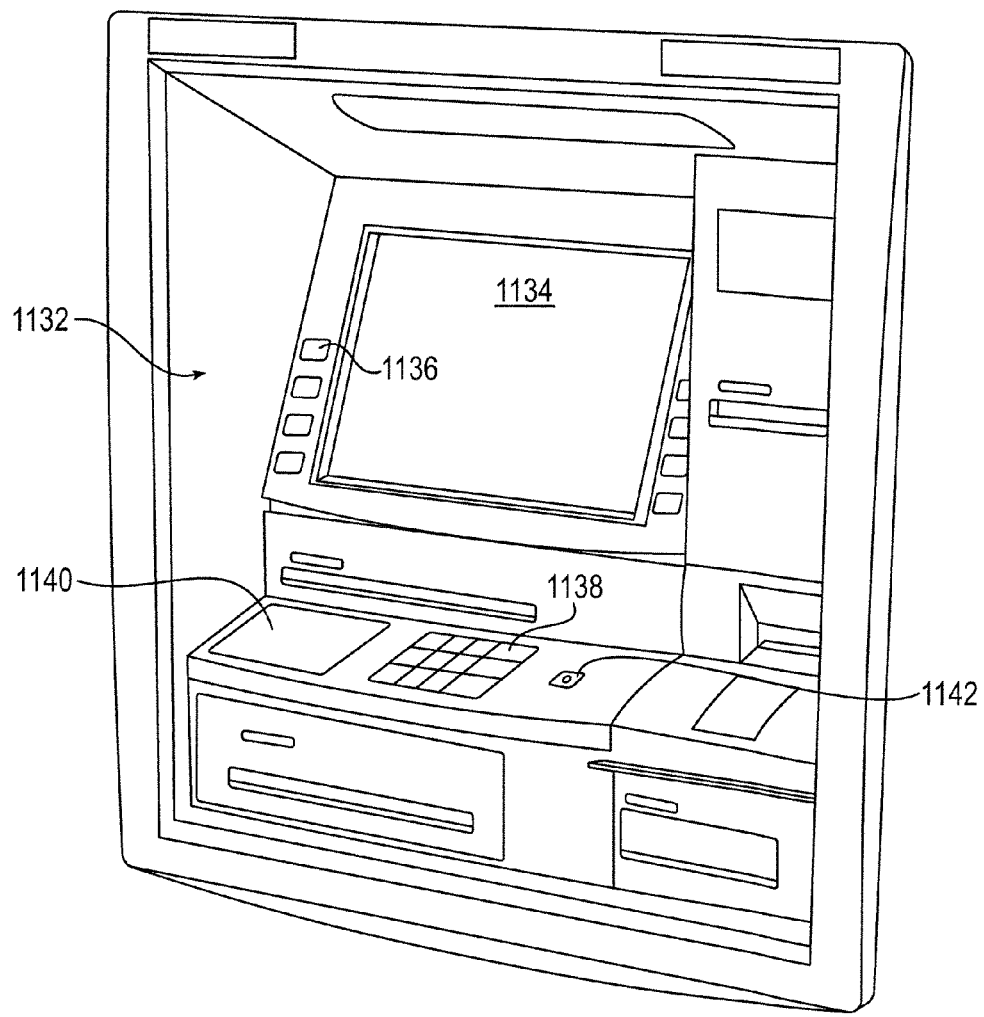
FIG. 70 is a front isometric view of a customer interface of an alternative example embodiment of an automated banking machine.

FIG. 70 shows another alternative example of a user interface associated with an automated banking machine 1132. Machine 1132 includes a cash dispensing automated banking machine that operates responsive to data read from user cards and other user input data. Machine 1132 may generally operate in a manner similar to the automated banking machines previously described except for the features explicitly discussed.

Automated banking machine 1132 includes a primary display 1134. Display 1134 may be one of the types previously discussed that provide visible outputs that provide output indicia including instructions that enable user operation of the machine. Display 1134 may include a touch screen display which can receive user inputs by touch contact with an input surface thereof. In some embodiments, the primary display 1134 may be part of a secure module of the types previously discussed. In other embodiments the display 1134 may not be a touch screen type display and may be operated so as to provide outputs that are selectable by machine users through contact with function key buttons 1136, a plurality of which are shown positioned adjacent to the display, or through other input devices of the machine.

The exemplary machine 1132 also includes a keypad 1138. Keypad 1138 may include an alphanumeric type keypad that may receive inputs by a user physically depressing keys that are included in the keypad. In some example embodiments the keypad may include an encrypting PIN pad (EPP) which operates to encrypt certain inputs that are received from the user. In the exemplary embodiment the keypad 1138 includes a plurality of keys which are labeled with alphanumeric values that correspond to selectable user inputs. Also in the exemplary embodiment the keypad 1138 includes a plurality of additional keys that can be used to select functions which may be carried out by the machine. Such functions may include for example, a cancel function, a clear function or other functions that may be commonly desired in machine operation. Although keypad 1138 as shown does not include a PIN pad shield overlying the keypad to shield inputs thereto from visual observation by unauthorized persons, it should be understood that in other embodiments such a keypad shield may be employed.

The example machine 1132 also includes an auxiliary display 1140. In the example embodiment, auxiliary display 1140 includes a touch screen display which is operated to provide visible outputs and which may receive user inputs by contact with an input surface which extends over the top of the display. In some exemplary embodiments, the auxiliary display may be a secure keypad module like keypad module 1108. Alternatively in other embodiments the auxiliary display may include other or different features from the previously described keypad module. Further, in some exemplary arrangements the auxiliary display may have a shield structure which overlies at least a portion of the auxiliary display so as to shield viewing inputs thereto by unauthorized persons. Such a shield may in some embodiments be similar to a keypad shield.

In the exemplary embodiment the auxiliary display may be operated responsive to at least one processor to provide output indicia corresponding to transaction options or inputs selectable by a user in the course of operation of the machine. The user can select and input transaction related selection inputs to the auxiliary display through finger contact with the input surface. Some example embodiments may include haptic features and other features like those previously discussed so as to facilitate providing outputs and receiving inputs through the auxiliary display.

In operation of some example embodiments, the machine 1132 may operate in a normal operation mode to carry out transactions for consumers by providing outputs through the primary display. In the normal operation mode, inputs are received from users through input devices which include the touch screen associated with the primary display, the keypad 1138, the function keys 1136 and other input devices. During normal operation in some embodiments, the auxiliary display may be blank. Alternatively the auxiliary display may operate to output promotional materials or other data not directly related to the current state of the user transaction. In still other alternative arrangements, the auxiliary display may operate in the normal transaction operation mode of the machine to replicate all or portions of the transaction selections that are being output through the primary display. Alternatively in some embodiments the auxiliary display may output additional or supplemental instructions for machine operation. The use of the auxiliary display in the normal transaction mode operation will depend on the particular programming associated with the machine.

In an example embodiment, the machine 1132 is operative to enable users to perform transactions via the user interface provided through the auxiliary display responsive to one or more user inputs. In some example embodiments the auxiliary display may present the indicia corresponding to the user selections, and the primary display may be blank or may provide no information related to the particular current transaction. For example in some embodiments, the primary display may operate to display promotional material or advertising content that is unrelated to current status of the transaction.

In example embodiments, at least one processor associated with a machine may cause the auxiliary display to become the operative user interface and cause transaction related indicia to be output through the auxiliary display and cease to be output through the primary display, responsive to one or more user inputs. Such inputs may include selection of indicia output through the touch screen display of the primary display. Alternatively, the auxiliary display may become the operative user interface responsive to inputs through the auxiliary display. For example, the auxiliary display may provide an output which indicates to the user that they can operate the machine through the auxiliary display by providing one or more inputs to the auxiliary display. Alternatively, the auxiliary display may indicate that such inputs may be provided through the keypad or other input devices. Alternatively and/or in addition, such action selections may be discontinued from the primary display, and/or caused to be additionally output from the auxiliary display responsive to the processor in the machine sensing certain activities. The activities may include for example, the connection of headphones to the headphone jack 1142 on the machine. The connection of headphones to a headphone jack may correspond to a situation where the machine is being operated by a blind user or a disabled person. In such circumstances, it may be advisable in some embodiments to have the primary display cease to provide transaction related outputs which might be observed or otherwise intercepted by unauthorized persons in operation of the machine by a disabled individual. Likewise an example machine may be configured so as to cause transaction selections to be presented on the primary display and cease to be output through the auxiliary display or to cause outputs on both displays responsive to the receipt of one or more inputs. Numerous different arrangements for providing output indicia that the user can select to change the transaction interface from the primary display to the auxiliary display and vice versa, or to provide the operative transaction interface through both displays may be provided. Some example machines may include features like those described in U.S. patent application Ser. No. 13/136,431 filed Aug. 1, 2011, the disclosure of which is incorporated herein by reference in its entirety.

In an example embodiment, providing one or more inputs that cause the operative transaction interface and transaction selections be provided on the auxiliary display, enables the user to receive the visible output indicia through the auxiliary display and to provide inputs by touch selecting such indicia. Of course in such transactions in some embodiments the user may alternatively or additionally provide inputs and input data through the keypad 1138. The position of the auxiliary display in the exemplary embodiment enables users to more readily shield the display and their inputs thereto from observation by unauthorized persons. Further, the lower position of the auxiliary display relative to the primary display enables individuals who may be short in stature or who may be in a wheelchair to more readily provide inputs with less risk of unauthorized observation. For example, in some example embodiments transactions may be conducted by a user receiving output instructions through the auxiliary display and providing transaction selecting inputs thereto. Further in the exemplary embodiment, transaction selection inputs and additional transaction related data such as a user's PIN, amount data and the like may be input via the keypad 1138. Of course it should be understood that in other arrangements, particularly in embodiments where the auxiliary display is a secure keypad module like that previously discussed, the auxiliary display may provide a secure sole output and input device for the conduct of such user transactions. Also in some example arrangements, the display may provide outputs only and inputs are received through the keypad and/or other input devices. When a user transaction is completed, and the user receives the return of their card for example, the programming of the exemplary automated banking machine may operate to again change the machine operation so that the primary display 1134 presents the primary user interface or alternatively both the primary and auxiliary display are operative.

In further alternative arrangements further features may be provided through operation of the auxiliary display. Such features may include, for example, enabling a user who is performing transactions through the auxiliary display to modify indicia that is output through the auxiliary display. For example, the input surface of the auxiliary display may enable a user to provide finger movement which causes indicia to be enlarged, reduced in size, and/or moved on the auxiliary display. Thus for example, a user who is operating the machine through the auxiliary display may place two fingers in contact therewith in an area of particular indicia. Moving the two fingers apart in a spreading motion is detected through the input surface, and at least one processor associated with the display causes the indicia in the area underlying and between the fingers to be enlarged in response thereto. In some arrangements, tapping the contact surface with one or multiple fingers may change the nature of output indicia or may be used to indicate selections. Further in other alternative arrangements, the at least one processor may operate to sense contact with the input surface of two disposed fingers that are then brought closer together. Such action may minimize indicia output in the area where the user has "pinched" the input surface allowing the user to more clearly see other aspects of output indicia. In some arrangements such pinching actions can minimize certain areas of an output display screen may cause enlargement of other areas. In still other example arrangements user contact with the input surface of the auxiliary display may operate to cause indicia thereon to be moved relative to the display. Thus for example in corresponding relation with finger movement, indicia can be moved down, up, across or even rotated to facilitate presentation and selection thereof as desired by the user. Alternatively, in some arrangements finger movement in contact with the touch sensing surface of the auxiliary display may cause scrolling of output material or a page turning effect. In the example embodiment the at least one processor associated with the auxiliary display is capable of providing these functions so as to facilitate the user's operation thereof and/or the provision of inputs thereto. In still other arrangements haptics features so as to provide tactile outputs and facilitate receiving user inputs may also be included in connection with the auxiliary display. Of course numerous additional display features may be utilized in connection with the auxiliary display for providing user outputs and/or for receiving transaction inputs in the course of conducting transactions at the machine.

In still other arrangements, the auxiliary display may be used to provide additional or different features. For example in some arrangements the input surface of the auxiliary display may be utilized as a touchpad for use in connection with the primary display. Such arrangements of one or more inputs received from an input device of the user interface enables the user to utilize the auxiliary display in a manner similar to a touch pad computer mouse. Thus for example instead of touching indicia corresponding to selections on the primary display to provide inputs, the user may instead manipulate a pointing device including suitable circuitry including a processor and software which provides at least one graphic output through the primary display. The graphic output can be moved to a desired location on the primary display with finger contact with the input surface of the auxiliary display. The user may then select inputs corresponding to indicia in the area of a pointer graphic output on the primary display controlled by the pointing device by touching the touch pad, pressing a key of the keypad or providing another suitable input. This arrangement may facilitate the ability of the machine user to select items on the primary display and provide inputs corresponding thereto without the need to contact the primary display or a function key button adjacent thereto. Such a feature may be useful for individuals that have limited reach capabilities who cannot reach a particular region where selectable indicia is being presented on the primary display. Through operation of the auxiliary display as a touchpad, such a user may select indicia or regions of the primary display without the need for physical contact therewith. The feature may be particularly useful in arrangements where the primary display is relatively large and the user is unable to physically contact all the different areas of the display where selectable options and indicia are presented.

In still other arrangements, the auxiliary display may also operate in a touch pad type mode to enable a user to selectively move indicia and/or selectable options on the primary display. Thus for example if the user is unable to reach sufficiently far to contact the primary display or a function key associated therewith to select a particular transaction option, the user may, through contact with the input surface of the auxiliary display, cause indicia on the primary display to be moved responsive to finger movement. This may include for example the ability of the user to move an area of the primary display output which includes an area of contact with the display to input a transaction selection, to a different area such as a lower area on the primary display. The transaction selection may be moved responsive to contact with the input surface of the auxiliary display to a position at which the user can reach the transaction selection and select it for purposes of carrying out a transaction. Alternatively or in addition, in some embodiments at least one processor and software associated with the machine is operative so the user can pan, scroll and/or page through transaction options on the primary display through contact with the input surface of the auxiliary display. In this manner the user may selectively position indicia associated with transaction options in a desired location of the primary display for selection via touch or other means. This might include, for example, a suitably low position so that the indicia can be touched on the primary display by the user in cases where the primary display is a touch screen. Alternatively or in addition, the indicia may be moved to be aligned with a function key button or other suitable selection input device which can then be selected by a user through contact with the button. Through other arrangements, transaction selections can be presented in ways where they are not all visible simultaneously on the primary display. A user through operation of the auxiliary display may operate to survey and make available transaction options of different types by moving indicia corresponding to transaction options and selections that may be aligned vertically or horizontally and move them selectively for user presentation and selection on the screen. In other arrangements a touch pad or other contact sensing device can be operated by a user instead of a contact surface of an auxiliary display. Of course these approaches are exemplary and in other embodiments, other approaches may be used.

In other example arrangements, touch contact with the input surface of the auxiliary display may be operative to move indicia from the primary display to another output device. For example, such inputs may move output visible indicia and/or areas or icons for selectable inputs to the auxiliary display. For example, the primary display may include a graphic or other indicia which corresponds to the auxiliary display. Manipulation of the graphic pointer and providing an input to select the auxiliary display may cause the indicia and the areas associated with inputs corresponding to the selections to be output through the auxiliary display. Alternatively or in addition, indicia on the primary display may be highlighted or otherwise selected through inputs through the touch surface of the auxiliary display, and pulled and moved on the primary display through finger engagement and movements on the touch surface of the auxiliary display to the indicia on the primary display which corresponds to the auxiliary display. Such actions causes at least one processor in operative connection with the machine to cause the selected output indicia and selection areas or icons to be output through the auxiliary display. Once the selected indicia has been moved to the auxiliary display in this manner, the user may provide inputs or otherwise manipulate such indicia in the desired manner through touch with the auxiliary display to provide inputs to the machine. Further in other example arrangements, the auxiliary display may include indicia which enables the receipt of user inputs that are operative to move or otherwise cause selected indicia or transaction selection options being output on the auxiliary display to be output on the primary display.

In still other exemplary arrangements, the machine may be operated in response to inputs by a user through a portable wireless device such as a mobile phone. This may be done using features such as those described in U.S. Pat. Nos. 8,281, 989; 8,245,915; 8,240,556; 8,191,767; 8,186,578; 8,172,130; 8,070,055; 8,011,575; 7,946,477; 7,896,235; and 7,946,480, the disclosures of each of which are incorporated herein by reference in their entirety. In exemplary arrangements at least one processor associated with the machine may operate to enable a user to move indicia and/or selections corresponding to machine inputs, from the primary display to the user's portable wireless device. This may be done when the machine has established operative communication with the portable wireless device. Inputs via the contact surface of the auxiliary display or a touch pad may be operative to move indicia on the primary display to the indicia corresponding to the portable wireless device. This may be done for example by inputs that select and pull indicia to the graphic corresponding to a wireless device. Alternatively, the pointer may be used to provide selections that cause the user interface to be moved. Such inputs then cause communication with the portable wireless device that operates to cause the transaction selections to be output via the user interface of the portable wireless device. For example, selectable indicia and options may be output from the touch screen display of the portable device. Alternatively or in addition, audio outputs may be provided form the device. Alternatively in some arrangements, inputs to the user interface of the portable device may be operative to cause the device and machine to operate to cause indicia and selections to be moved onto the portable device. Once the user transaction interface selections are available for selection on the portable device, the user may provide transaction selection inputs through the user interface of the portable device. Communications corresponding to such inputs are communicated wirelessly to the machine to be used in machine operation. Further in some alternative arrangements, indicia and/or selection options presented via the user interface on the portable device can be moved or otherwise caused to be presented on the primary display and/or the auxiliary display. This may be accomplished responsive to inputs to the interface of the portable device and/or inputs to input devices of the machine. These features may enhance user privacy and security for transactions while facilitating machine operation. Of course, these approaches may be used in alternative configurations for various machines and systems.

In still other arrangements the input surface of the auxiliary display may be utilized in connection with the primary display for purposes of modifying output indicia to facilitate operation of the user. For example, by providing one or more inputs that cause the auxiliary display to be utilized in a pointer mode, the user may provide inputs through the input surface to control the graphic pointer to select indicia in a particular area of the primary display. The user may then contact the input surface with two fingers and spread them apart while in contact with the input surface in a manner like that previously described. In such arrangements the current area of the pointer on the primary display are visually enlarged for ease of viewing by the machine user. Likewise in some embodiments positioning the pointer in a particular area of the display and then providing a pinching action with two fingers on the input surface of the auxiliary display causes indicia on the primary display screen in the area of the pointer to be minimized. Further in still other exemplary embodiments, the use of the pointing device may enable a user to use the pointing device to circumscribe a particular area of the primary display. This may be done by line drawing actions controlled via contact with the input surface or other input device. The user may then provide inputs through touch contacts with the auxiliary display, the keypad or otherwise to the machine, that causes the indicia in the circumscribed area to be output through the auxiliary display. Output of such area on the auxiliary display may facilitate the user's viewing of the indicia presented therein and may facilitate the selection of transaction options through contact with the auxiliary display. Of course it should be understood that these approaches are exemplary and in other embodiments other features and approaches may be utilized.

In still other example arrangements, depending on the type of information being input to the machine, the at least one processor may be operative to display data that has been input by a user in one or more predefined fields or regions on a display of the machine. For example the user may input via a physical keypad or the auxiliary display, an amount of money to dispense through operation of the cash dispenser in the automated banking machine. The at least one processor may operate in accordance with its programming to cause the display to visually output the amount that was inputted in order to provide the user with the ability to visually verify that the amount entered is what they intended.

In other arrangements a primary display or a sole display on a machine may be operative to receive inputs that cause the relocation or modification of output indicia or transaction selection indicia, such as icons or touch areas for providing inputs. For example, a touch screen display may operate to output indicia, which indicia is subject to movement by user contact with the contract surface of the display in an area away from the displayed indicia. For example, an exemplary arrangement may enable a user to move a finger against the contact surface to "pull" the indicia on the screen toward a location desired by the user. For example, a user who desires indicia and/or a selectable area or item to be lower on the display can contact the display and provide a downward finger movement while maintaining such contact. At least one processor of an exemplary embodiment operates responsive to the input to cause the indicia to move relatively downward on the display. The finger contact and movement process can be repeated by a user until the indicia is in a location on the display desired by the user. Thus for example, a user may move the indicia associated with a desired user input or selection to a position on the display that a user can more readily touch, see or block from unauthorized observation. Alternatively in example arrangements, the at least one processor may operate to move indicia in various directions as directed by finger contact. This can include up/down, left/right and movement in angular directions based on the direction of the user's finger movement. In the exemplary arrangement this enables a user to position output indicia and selection input areas such as touch areas or icons to a location desired by the user. Further in other example arrangements, the machine enables users to provide inputs that are operative to enlarge, reduce, reorient or otherwise change indicia output on the display through various types of finger contact with the contact surface. This may include changing outputs in a manner like that previously discussed in connection with outputs from the auxiliary display. Further, other arrangements may include relocating output indicia and selection input areas by making finger contact with the indicia and "pulling" the indicia by maintaining finger contact with the contact surface, to place the indicia in a new location on the screen. Of course these approaches are exemplary.

In exemplary arrangements to further enhance security and privacy of the information that has been input by the user and which is output through a display, at least one processor of an example embodiment may be operative to display the entered information as distorted indicia that is computationally generally not possible for computers that are widely available to accurately decipher via optical character recognition algorithms within a reasonably short time. However, such distorted indicia may be relatively more easily deciphered by a human visually looking at the distorted indicia.

Figure 68:
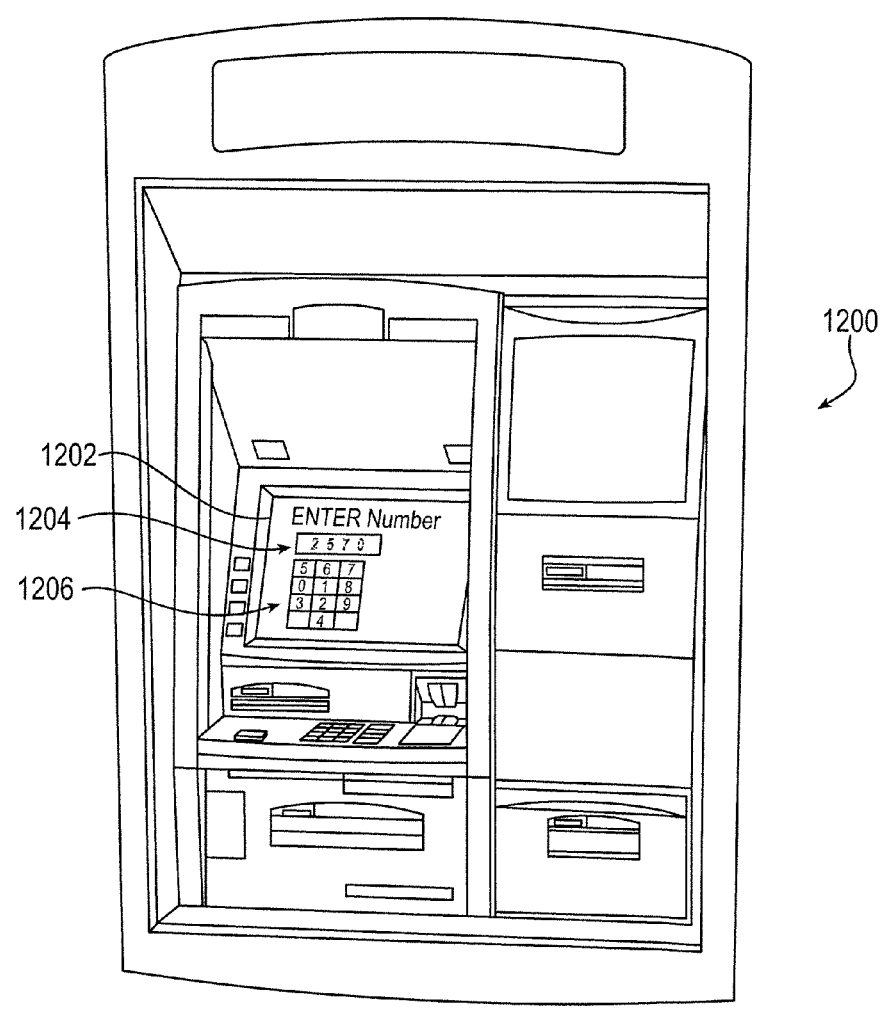
FIG. 68 is an isometric view of an example embodiment of an automated banking machine that includes a virtual keypad.

FIG. 68 shows an example of an automated banking machine 1200 which is operative to display distorted indicia 1202 in response to inputs via a virtual keypad 1204 displayed through a display 1206. In this example, the distorted indicia 1202 corresponds to an image of inputted numbers or an amount of value that was input by a user through one or more input devices of the machine. However, it should be understood that in other examples the automated banking machine may display indicia corresponding to other inputted data, such as text, alphanumeric characters or symbols, as distorted indicia.

The input numbers, letters or other symbols (which are collectively referred to herein as symbols) may be displayed as distorted indicia with distorted features. Such distorted features may be produced through operation of one or more processors such that the symbols partially overlap or are oriented at different angles are non linearly arranged, have different textures, have jagged contours, are bent and/or curved in one or more directions, are elongated in one or more dimensions, have different backgrounds, are partially covered or intersected by other geometric figures or lines, or are otherwise randomly or unpredictably positioned, angled and/ or oriented with graphic objects, and/or which are subject to other distortion which increases the difficulty in accurately resolving the nature of such symbols via a machine compared to a human.

In example embodiments, a set of symbols that are displayed adjacent to each other in a common region such as a text field, may be generated such that each respective symbol includes at least one different distorted feature relative to the other symbols included in the fields. As used herein non-distorted indicia corresponds to a grouping of spaced apart recognizable symbols that are displayed on a substantially blank or uniform background in a font that displays the same symbol in a uniform manner without the presence of distorted features. As used herein, the modifying of the displayed symbols using standard font modifying features such as upper case, lower case, bold, italic, superscript, subscript, underline, strikeout, and/or a changed font size, is not considered to transform non-distorted indicia into distorted indicia. However, rendering such symbols in a font distorting the symbol in such font by adding distorted features such as additional curves or bends or adding intersecting graphics or other indicia, does correspond to distorted indicia as used herein.

For example the distorted indicia may include symbols originally generated or rendered in a known font (e.g., Arial, Times Roman, etc.) and that have been bent or curved into a shape not specified by the known font in a different manner for each symbol. In an example embodiment, the distorted indicia may be rendered as an image or bitmap that is then displayed in the location of a respective text field on the display module.

In some embodiments the distorted indicia may correspond to symbols used for CAPTCHA processes. However, it should be appreciated that rather than using the CAPTCHA symbols as a type of challenge response test to ensure that an actual human being is providing information to the input devices (rather than a computer program), the described example embodiment uses the distorted indicia to make it difficult for unauthorized devices near the machine (e.g., an external camera that may have been installed by criminals) or software executing on the machine in the form of exploits, to accurately determine the data that has been inputted and displayed through operation of the machine display.

In addition, it should be appreciated that this described example embodiment of displaying distorted indicia can be used for many kinds of inputs such as inputs provided through selections made using a mouse or other selected transaction data. For example, some automated banking machines which dispense cash, other types of self-service terminals, and other devices which receive user inputs may be operative to prompt a user to enter information such as their name, social security number, driver's license number, date of birth, address, account information, security password, personal identification number, or other information required to be kept secure and private. The principles described herein may be applied to display outputs corresponding to such input data.

Figure 69:
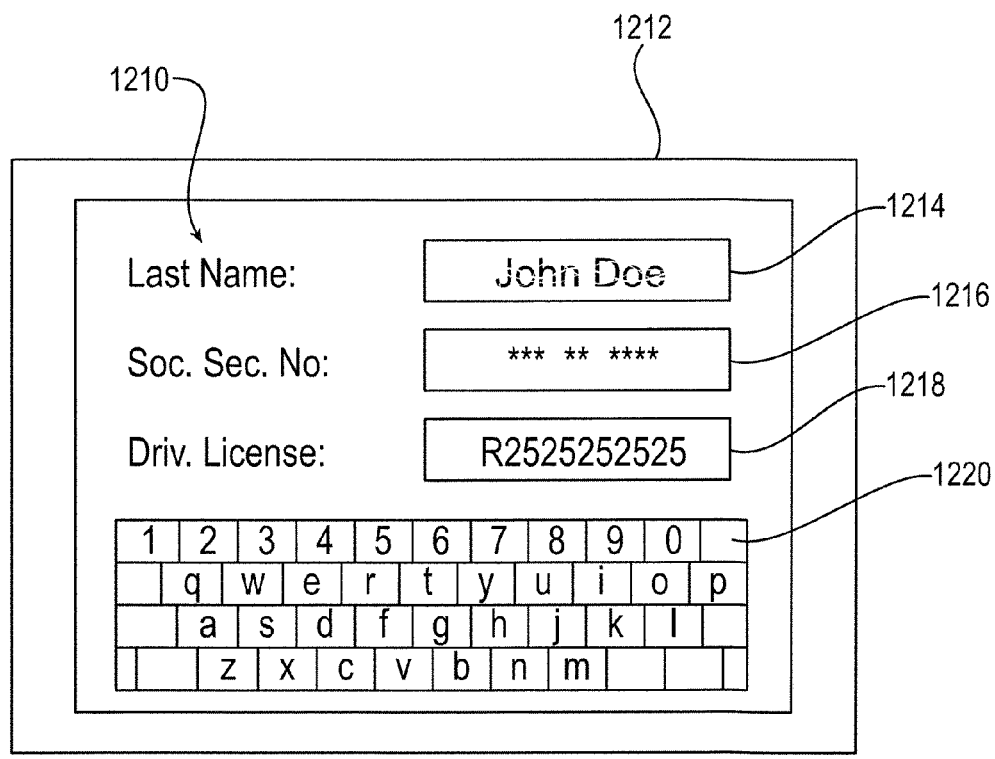
FIG. 69 is a plan view of an example embodiment of a touch screen display module displaying a virtual keypad.

FIG. 69 shows an example of screen display output 1210 outputted by an example display 1212 which includes text fields 1214, 1216 and 1218. These text fields are output in different regions of the display and are shown populated by symbols corresponding to the inputs to a virtual keypad 1220. In this example embodiment, the virtual keypad has a plurality of keys representative of a QWERTY keyboard. However, it should be understood that in other embodiments the keypad may include different symbols, different order, a random order, and may include more, less and/or different types of symbols and input selection options.

In example embodiments as a user inputs information for a particular text field such as the "last name" text in field 1214, the at least one processor is operative to cause the display to produce corresponding distorted symbols in the text field. In this example embodiment, each symbol is distorted in a different manner than the previously displayed symbol. However, in other embodiments, or in other text fields presented in the same embodiment, the at least one processor may be operative to cause the display module to initially display non-distorted indicia.

For example, in FIG. 69, the "DRIV. LICENSE" text field 1218 shows non-distorted indicia while the text field is currently active for a user operating the machine to input text data therein. This may be referred to as the condition where the particular text field is operative for accepting inputs or has the focus for the corresponding graphical user interface. However, in this example embodiment when the text field 1218 is no longer currently active for inputting text data therein (for example the current condition of the machine changes so another text data field has the current focus) the at least one processor is operative to cause the text field that does not have current focus to display only distorted indicia that corresponds to the previously shown non-distorted indicia. This is accomplished in the exemplary embodiment by the at least one processor generating in an image or bitmap of the distorted indicia and causing the image/bitmap to be displayed in the same general location on the display as the original text field that included the non-distorted indicia. When in operation of the machine the text field 1218 becomes active again, which might occur for example if the user has to change the data in the field, or if new data is required to be entered for an additional aspect of the transaction or in the course of another transaction, the at least one processor is operative to cause the text field to again display the non-distorted indicia. This exemplary approach enables the contents of the text field to be more easily reviewed by the user. To return the indicia to the non-distorted form, when the field again has the focus the at least one processor is operative to remove the image/bitmap of the distorted indicia, and causes the display module to display the text field with the undistorted indicia.

In other example embodiments when a text field is no longer active to receive inputs thereto, the at least one processor may permit the non-distorted indicia to remain visible for a predetermined amount of time after which the at least one processor is operative to automatically change the text field so as to display distorted indicia. Of course it should be understood that this approach is exemplary and in other embodiments, other approaches may be used. These approaches may include, for example, only displaying distorted indicia, or alternatively in embodiments with a primary display in an auxiliary display, providing the non-distorted indicia on the auxiliary display, and providing distorted indicia on the primary display. Of course these approaches are exemplary.

To further enhance security of input information, example embodiments of distorted indicia text fields may be generated by one or more software components that are operative to cause data associated with each text field to be stored in an encrypted form in a data store associated with the at least one processor. The at least one software component may cause the at least one processor to be operative to also decrypt such data when needed to generate non-distorted indicia to display in a non-distorted text field or to otherwise use such data in connection with transaction functions. The encryption key or keys used to encrypt and decrypt inputted data may correspond to encryption keys only known or made available to the software component. For example, the encryption key may be decrypted when needed by software instructions using a trusted platform module (TPM) that is associated with at least one processor.

Also in some example embodiments the inputted data may be encrypted with a session key that is different for each user or user session. Such a session key may be generated and/or determined by the at least one processor executing instructions of a software component after a user successfully authenticates himself or herself to the automated banking machine or other terminal. This may be done, for example, by the machine operating to determine that data read from a card and an input customer PIN or other data corresponds to data for an authorized account or user. For example, a user specific session key associated with the account data read from a card or other article can be securely retrieved from a remote server using the account data. Also the at least one processor may be operative to generate a session key for each user. Such a session key can be securely transmitted to the remote server for use in decrypting encrypted input data sent to the remote server by the at least one processor responsive to the software component. In an example embodiment, the described software component may be operative to cause at least one processor to establish an encrypted communication channel with a remote server using SSL or other encryption protocol for use with communicating the input data and/or the session key with the remote server.

Such described software components may be operative to execute in the at least one processor associated with a display module of an automated banking machine and/or other terminal or computing device. However, in further example embodiments the described software components such as those that generate a virtual keypad and cause output of distorted indicia in one or more text field on the display, may correspond to a browser based application. The browser based application may include an Active X component or a Java Applet. Such a browser based application may cause the indicia to be displayed through a web page output on a user's personal computing device such as a mobile phone, a tablet, PC or other device that is operative to display web pages on a touch screen or other output device.

For example, a web page may require a user to enter private information associated with financial, medical or other private data. To enhance the security of such information, the described software capabilities may be used to enter the information via the described virtual keypad associated with the outputs produced responsive to instructions included in the software component rather than a physical keyboard or default graphical keyboard of a computing device.

In addition, with respect to operation of an automated banking machine, it should be appreciated that the at least one processor may be operative to display distorted indicia for graphical user interfaces used by a consumer of the machine as well as graphical user interfaces used by a servicer who provides service activities at the machine. For example, when a technician is carrying out service actions which configure and/or provide service on an automated banking machine, diagnostic and/or administrative information may be input to the machine. Such inputs when displayed through the display module or other display of the automated banking machine may be displayed as distorted indicia of the types discussed previously, to prevent the input information from being observed and deciphered using external cameras installed by criminals and/or through other software exploits or other methods. Examples of such inputs provided by a service technician displayed as distorted indicia may include for example network addresses, license information, account information, terminal identifiers, configuration data, service security passwords or other information that may be input to or output by an automated banking machine.

Thus, the automated banking machines and systems of the exemplary embodiments may achieve one or more of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:
1. Apparatus comprising:
an automated banking machine that is operative to cause financial transfers responsive at least in part to data read from data bearing records, wherein the machine includes
  a card reader, wherein the card reader is operative to read card data, wherein the card data corresponds to a financial account,
  a touch screen display, wherein the touch screen display includes an input touch surface,
  a cash dispenser,
    at least one processor associated with the machine, wherein the at least one processor is in operative connection with the card reader, the touch screen display and the cash dispenser,
    wherein the at least one processor is operative to cause
    a determination to be made that card data read from a user card through operation of the card reader corresponds to a financial account on which a transaction is authorized to be conducted through operation of the machine,
      responsive at least in part to the determination, the cash dispenser to operate to cause cash to be dispensed from the machine,
      the financial account to be assessed a value associated with the dispensed cash,
wherein the at least one processor is operative to cause selectable visible indicia corresponding to a transaction option to be output through the touch screen display,
wherein the at least one processor is operative to receive an input corresponding to user selection of the transaction option responsive at least in part to user touch contact with an area of the touch surface corresponding to the selectable visible indicia,
wherein the at least one processor is operative to move the selectable visible indicia on the touch screen display responsive to receipt of at least one user input through touch contact with the touch surface,
wherein the at least one user input includes a first user input corresponding to finger movement in a finger direction in maintained engagement with the touch surface, in an area of the touch surface away from where the output selectable visible indicia,
wherein the at least one processor is operative responsive at least in part to the first user input to cause the selectable visible indicia to move in an indicia direction corresponding to the finger direction,
wherein the touch surface extends in generally a vertical plane, and wherein the indicia direction includes at least one of up, down, left and right,
wherein the finger movement of the first user input is operative to cause the at least one processor to cause the selectable visible indicia to move to a new location on the touch screen display,
wherein the input corresponding to user selection of the transaction option is received responsive to user touch contact in an area of the touch surface corresponding to the new location, and
wherein the at least one processor is operative to cause output of the selectable visible indicia to at least one of change rotational orientation relative to the machine and change distorted condition, responsive at least in part to at least one touch input received through the touch surface.

2. The apparatus according to claim 1
wherein the at least one processor is operative to cause the selectable visible indicia to move responsive at least in part to at least one user input including finger movement in maintained engagement with the touch surface in an area of the touch surface away from the output selectable visible indicia.

3. The apparatus according to claim 1
wherein the at least one processor is operative responsive at least in part to the first user input to cause the selectable visible indicia to be moved in the indicia direction an indicia relocation distance,
wherein the indicia relocation distance has a corresponding relationship to a finger engagement distance of finger movement in maintained engagement with the touch surface during the first user input.

4. The apparatus according to claim 3
wherein the selectable visible indicia is movable a plurality of times during a transaction responsive to a plurality of user inputs,
wherein responsive at least in part to each user input the at least one processor is operative to cause the selectable visible indicia to move in a respective indicia direction corresponding to the finger direction associated with the respective user input, and an indicia relocation distance corresponding to a finger engagement distance associated with the respective user input.

5. The apparatus according to claim 1
wherein the at least one processor is operative to cause output of the selectable visible indicia to change size responsive at least in part to at least one touch input through the touch surface.

6. The apparatus according to claim 1
wherein the machine includes an auxiliary touch screen display, wherein the auxiliary touch screen display is separate from the touch screen display,
wherein the at least one processor is operative to cause the selectable visible indicia to be output through the auxiliary touch screen display responsive to at least one touch input through the touch surface.

7. The apparatus according to claim 6
wherein the auxiliary touch screen display is positioned relatively vertically lower than the touch screen display.

8. The apparatus according to claim 7
wherein the auxiliary touch screen display includes an auxiliary touch screen display touch surface, wherein the auxiliary touch screen display touch surface extends at an angle of at least 90 degrees relative to the touch surface of the touch screen display.

9. The apparatus according to claim 1
wherein the at least one processor is operative to cause data corresponding to the selectable visible indicia to be communicated to a portable wireless device in operative connection with the machine, responsive at least in part to receipt of at least one touch input through the touch surface.

10. The apparatus according to claim 1
wherein the machine includes an auxiliary touch input device, wherein the auxiliary touch input device is separate from the touch screen display and is in operative connection with the at least one processor, wherein the at least one processor is operative to cause at least one visible graphic indicator to be output through the touch screen display and to be positioned responsive at least in part to at least one touch input through the auxiliary touch input device.

11. The apparatus according to claim 10
wherein the at least one processor is operative to receive the input corresponding to user selection of the transaction option, responsive at least in part to at least one touch input through the auxiliary touch input device that causes the graphic visible indicator to be positioned on the touch screen display in a position corresponding to the selectable visible indicia.

12. The apparatus according to claim 10
wherein the at least one processor is operative to cause size change of the selectable visible indicia output through the touch screen display, responsive at least in part to at least one touch input received through the auxiliary touch input device.

13. The apparatus according to claim 10
wherein the at least one processor is operative to cause relocation of the selectable visible indicia output through the touch screen display, responsive at least in part to at least one touch input received through the auxiliary touch input device.

14. The apparatus according to claim 10
wherein the at least one processor is operative to receive data responsive to vibrational inputs from a portable vibrating device in contact with at least one of the touch screen display and the auxiliary touch input device.

15. The apparatus according to claim 10
wherein the machine includes an auxiliary touch screen display separate from the touch screen display, and wherein the auxiliary touch screen display includes the auxiliary touch input device.

16. The apparatus according to claim 15
wherein the at least one processor is operative to receive the input corresponding to user selection of the transaction option responsive at least in part to user touch contact with at least one of the auxiliary touch screen display and the touch screen display.

17. The apparatus according to claim 16
wherein the machine includes a secure touch screen display module, wherein the secure touch screen display module includes at least one of the touch screen display and the auxiliary touch screen display.

18. Apparatus comprising:
an automated banking machine that is operative to cause financial transfers responsive at least in part to data read from data bearing records, wherein the machine includes
  a card reader, wherein the card reader is operative to read card data, wherein the card data corresponds to a financial account,
  a touch screen display, wherein the touch screen display includes an input touch surface,
  a cash dispenser,
  at least one processor associated with the machine, wherein the at least one processor is in operative connection with the card reader, the touch screen display and the cash dispenser,
    wherein the at least one processor is operative to cause
      a determination to be made that card data read from a user card through operation of the card reader corresponds to a financial account on which a transaction is authorized to be conducted through operation of the machine,
      responsive at least in part to the determination, the cash dispenser to operate to cause cash to be dispensed from the machine,
      the financial account to be assessed a value associated with the dispensed cash, wherein the at least one processor is operative to cause selectable visible indicia corresponding to a transaction option to be output through the touch screen display,
wherein the at least one processor is operative to receive an input corresponding to user selection of the transaction option responsive at least in part to user touch contact with an area of the touch surface corresponding to the selectable visible indicia,
wherein the at least one processor is operative to move the selectable visible indicia on the touch screen display responsive to receipt of at least one user input through touch contact with the touch surface,
wherein the at least one user input includes a first user input corresponding to finger movement in a finger direction in maintained engagement with the touch surface, in an area of the touch surface away from where the output selectable visible indicia,
wherein the at least one processor is operative responsive at least in part to the first user input to cause the selectable visible indicia to move in an indicia direction corresponding to the finger direction,
wherein the touch surface extends in generally a vertical plane, and wherein the indicia direction includes at least one of up, down, left and right,
wherein the finger movement of the first user input is operative to cause the at least one processor to cause the selectable visible indicia to move to a new location on the touch screen display,
wherein the machine includes an auxiliary touch screen display, wherein the auxiliary touch screen display is separate from the touch screen display, and
wherein the at least one processor is operative to cause the selectable visible indicia to be output through the auxiliary touch screen display responsive to at least one touch input through the touch surface.

19. The apparatus according to claim 18
wherein the at least one processor is operative to cause the selectable visible indicia to move responsive at least in part to at least one user input including finger movement in maintained engagement with the touch surface in an area of the touch surface away from the output selectable visible indicia.

20. The apparatus according to claim 18
wherein the at least one processor is operative responsive at least in part to the first user input to cause the selectable visible indicia to be moved in the indicia direction an indicia relocation distance,
wherein the indicia relocation distance has a corresponding relationship to a finger engagement distance of finger movement in maintained engagement with the touch surface during the first user input.

21. The apparatus according to claim 20
wherein the selectable visible indicia is movable a plurality of times during a transaction responsive to a plurality of user inputs,
wherein responsive at least in part to each user input the at least one processor is operative to cause the selectable visible indicia to move in a respective indicia direction corresponding to the finger direction associated with the respective user input, and an indicia relocation distance corresponding to a finger engagement distance associated with the respective user input.

22. The apparatus according to claim 18
wherein the at least one processor is operative to cause output of the selectable visible indicia to change size responsive at least in part to at least one touch input through the touch surface.

23. The apparatus according to claim 18 wherein the auxiliary touch screen display is positioned relatively vertically lower than the touch screen display.

24. The apparatus according to claim 23 wherein the auxiliary touch screen display includes an auxiliary touch screen display touch surface, wherein the auxiliary touch screen display touch surface extends at an angle of at least 90 degrees relative to the touch surface of the touch screen display.

25. The apparatus according to claim 18 wherein the at least one processor is operative to cause data corresponding to the selectable visible indicia to be communicated to a portable wireless device in operative connection with the machine, responsive at least in part to receipt of at least one touch input through the touch surface.

26. The apparatus according to claim 18 wherein the machine includes an auxiliary touch input device, wherein the auxiliary touch input device is separate from the touch screen display and is in operative connection with the at least one processor, wherein the at least one processor is operative to cause at least one visible graphic indicator to be output through the touch screen display and to be positioned responsive at least in part to at least one touch input through the auxiliary touch input device.

27. The apparatus according to claim 26 wherein the at least one processor is operative to receive the input corresponding to user selection of the transaction option, responsive at least in part to at least one touch input through the auxiliary touch input device that causes the graphic visible indicator to be positioned on the touch screen display in a position corresponding to the selectable visible indicia.

28. The apparatus according to claim 26 wherein the at least one processor is operative to cause size change of the selectable visible indicia output through the touch screen display, responsive at least in part to at least one touch input received through the auxiliary touch input device.

29. The apparatus according to claim 26 wherein the at least one processor is operative to cause relocation of the selectable visible indicia output through the touch screen display, responsive at least in part to at least one touch input received through the auxiliary touch input device.

30. The apparatus according to claim 26 wherein the at least one processor is operative to receive data responsive to vibrational inputs from a portable vibrating device in contact with at least one of the touch screen display and the auxiliary touch input device.

31. The apparatus according to claim 26 wherein the machine includes an auxiliary touch screen display separate from the touch screen display, and wherein the auxiliary touch screen display includes the auxiliary touch input device.

32. The apparatus according to claim 31 wherein the at least one processor is operative to receive the input corresponding to user selection of the transaction option responsive at least in part to user touch contact with at least one of the auxiliary touch screen display and the touch screen display.

33. The apparatus according to claim 32 wherein the machine includes a secure touch screen display module, wherein the secure touch screen display module includes at least one of the touch screen display and the auxiliary touch screen display.

34. Apparatus comprising:
an automated banking machine that is operative to cause financial transfers responsive at least in part to data read from data bearing records, wherein the machine includes
 a card reader, wherein the card reader is operative to read card data, wherein the card data corresponds to a financial account,
 a touch screen display, wherein the touch screen display includes an input touch surface,
 a cash dispenser,
  at least one processor associated with the machine, wherein the at least one processor is in operative connection with the card reader, the touch screen display and the cash dispenser,
 wherein the at least one processor is operative to cause
 a determination to be made that card data read from a user card through operation of the card reader corresponds to a financial account on which a transaction is authorized to be conducted through operation of the machine,
  responsive at least in part to the determination, the cash dispenser to operate to cause cash to be dispensed from the machine,
   the financial account to be assessed a value associated with the dispensed cash,
wherein the at least one processor is operative to cause selectable visible indicia corresponding to a transaction option to be output through the touch screen display,
wherein the at least one processor is operative to receive an input corresponding to user selection of the transaction option responsive at least in part to user touch contact with an area of the touch surface corresponding to the selectable visible indicia,
wherein the at least one processor is operative to move the selectable visible indicia on the touch screen display responsive to receipt of at least one user input through touch contact with the touch surface,
wherein the at least one user input includes a first user input corresponding to finger movement in a finger direction in maintained engagement with the touch surface, in an area of the touch surface away from where the output selectable visible indicia,
wherein the at least one processor is operative responsive at least in part to the first user input to cause the selectable visible indicia to move in an indicia direction corresponding to the finger direction,
wherein the touch surface extends in generally a vertical plane, and wherein the indicia direction includes at least one of up, down, left and right,
wherein the finger movement of the first user input is operative to cause the at least one processor to cause the selectable visible indicia to move to a new location on the touch screen display, and
wherein the machine includes an auxiliary touch input device, wherein the auxiliary touch input device is separate from the touch screen display and is in operative connection with the at least one processor, wherein the at least one processor is operative to cause at least one visible graphic indicator to be output through the touch screen display and to be positioned responsive at least in part to at least one touch input through the auxiliary touch input device.

35. The apparatus according to claim 34 wherein the at least one processor is operative to receive the input corresponding to user selection of the transaction option, responsive at least in part to at least one touch input through the auxiliary touch input device that causes the graphic visible indicator to be positioned on the touch screen display in a position corresponding to the selectable visible indicia.

36. The apparatus according to claim 34
wherein the at least one processor is operative to cause size change of the selectable visible indicia output through the touch screen display, responsive at least in part to at least one touch input received through the auxiliary touch input device.

37. The apparatus according to claim 34
wherein the at least one processor is operative to cause relocation of the selectable visible indicia output through the touch screen display, responsive at least in part to at least one touch input received through the auxiliary touch input device.

38. The apparatus according to claim 34
wherein the at least one processor is operative to receive data responsive to vibrational inputs from a portable vibrating device in contact with at least one of the touch screen display and the auxiliary touch input device.

39. The apparatus according to claim 34
wherein the machine includes an auxiliary touch screen display separate from the touch screen display, and wherein the auxiliary touch screen display includes the auxiliary touch input device.

40. The apparatus according to claim 39
wherein the at least one processor is operative to receive the input corresponding to user selection of the transaction option responsive at least in part to user touch contact with at least one of the auxiliary touch screen display and the touch screen display.

41. The apparatus according to claim 40
wherein the machine includes a secure touch screen display module, wherein the secure touch screen display module includes at least one of the touch screen display and the auxiliary touch screen display.

42. The apparatus according to claim 34
wherein the at least one processor is operative to cause the selectable visible indicia to move responsive at least in part to at least one user input including finger movement in maintained engagement with the touch surface in an area of the touch surface away from the output selectable visible indicia.

43. The apparatus according to claim 34
wherein the at least one processor is operative responsive at least in part to the first user input to cause the selectable visible indicia to be moved in the indicia direction an indicia relocation distance,
wherein the indicia relocation distance has a corresponding relationship to a finger engagement distance of finger movement in maintained engagement with the touch surface during the first user input.

44. The apparatus according to claim 43
wherein the selectable visible indicia is movable a plurality of times during a transaction responsive to a plurality of user inputs,
wherein responsive at least in part to each user input the at least one processor is operative to cause the selectable visible indicia to move in a respective indicia direction corresponding to the finger direction associated with the respective user input, and an indicia relocation distance corresponding to a finger engagement distance associated with the respective user input.

45. The apparatus according to claim 34
wherein the at least one processor is operative to cause output of the selectable visible indicia to change size responsive at least in part to at least one touch input through the touch surface.

46. The apparatus according to claim 34
wherein the machine includes an auxiliary touch screen display, wherein the auxiliary touch screen display is separate from the touch screen display,
wherein the at least one processor is operative to cause the selectable visible indicia to be output through the auxiliary touch screen display responsive to at least one touch input through the touch surface.

47. The apparatus according to claim 46
wherein the auxiliary touch screen display is positioned relatively vertically lower than the touch screen display.

48. The apparatus according to claim 47
wherein the auxiliary touch screen display includes an auxiliary touch screen display touch surface, wherein the auxiliary touch screen display touch surface extends at an angle of at least 90 degrees relative to the touch surface of the touch screen display.

49. The apparatus according to claim 34
wherein the at least one processor is operative to cause data corresponding to the selectable visible indicia to be communicated to a portable wireless device in operative connection with the machine, responsive at least in part to receipt of at least one touch input through the touch surface.

* * * * *